(12) United States Patent
Fukagawa et al.

(10) Patent No.: US 7,719,644 B2
(45) Date of Patent: May 18, 2010

(54) OPTICAL COMPENSATION SHEET, POLARIZING PLATE AND LIQUID CRYSTAL DISPLAY

(75) Inventors: Nobutaka Fukagawa, Minami-Ashigara (JP); Hiromoto Haruta, Minami-Ashigara (JP); Aiko Yoshida, Minami-Ashigara (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 448 days.

(21) Appl. No.: 11/816,879

(22) PCT Filed: Feb. 24, 2006

(86) PCT No.: PCT/JP2006/304019

§ 371 (c)(1),
(2), (4) Date: Aug. 22, 2007

(87) PCT Pub. No.: WO2006/098162

PCT Pub. Date: Sep. 21, 2006

(65) Prior Publication Data

US 2009/0033835 A1    Feb. 5, 2009

(30) Foreign Application Priority Data

Feb. 25, 2005  (JP)  ............................. 2005-051750
Mar. 22, 2005  (JP)  ............................. 2005-082765

(51) Int. Cl.
*G02F 1/1335*    (2006.01)

(52) U.S. Cl. ........................... 349/117; 349/96; 349/99; 349/119

(58) Field of Classification Search ................... 349/96, 349/117, 181, 119
See application file for complete search history.

(56) References Cited

U.S. PATENT DOCUMENTS 6,400,433 B1    6/2002  Arakawa et al.

FOREIGN PATENT DOCUMENTS

| JP | 2000-227520 A | 8/2000 |
| JP | 2004-326089 A | 11/2004 |
| WO | 03/018672 A1 | 3/2003 |
| WO | 2004/068226 A1 | 8/2004 |
| WO | WO 2004/068226 A1 * | 8/2004 |
| WO | 2005/022214 A1 | 3/2005 |

OTHER PUBLICATIONS

International Search Report for PCT/JP2006/304019, dated Jun. 13, 2006.

* cited by examiner

*Primary Examiner*—Uyen-Chau N Le
*Assistant Examiner*—Kajli Prince
(74) *Attorney, Agent, or Firm*—Buchanan Ingersoll & Rooney PC

(57) ABSTRACT

An optical compensation sheet is provided and has a stretched polymer film or stretched cellulose acylate film and at least one optical anisotropic layer containing a liquid crystal compound, and has retardations satisfying the specific relationships defined in the specification.

17 Claims, 4 Drawing Sheets

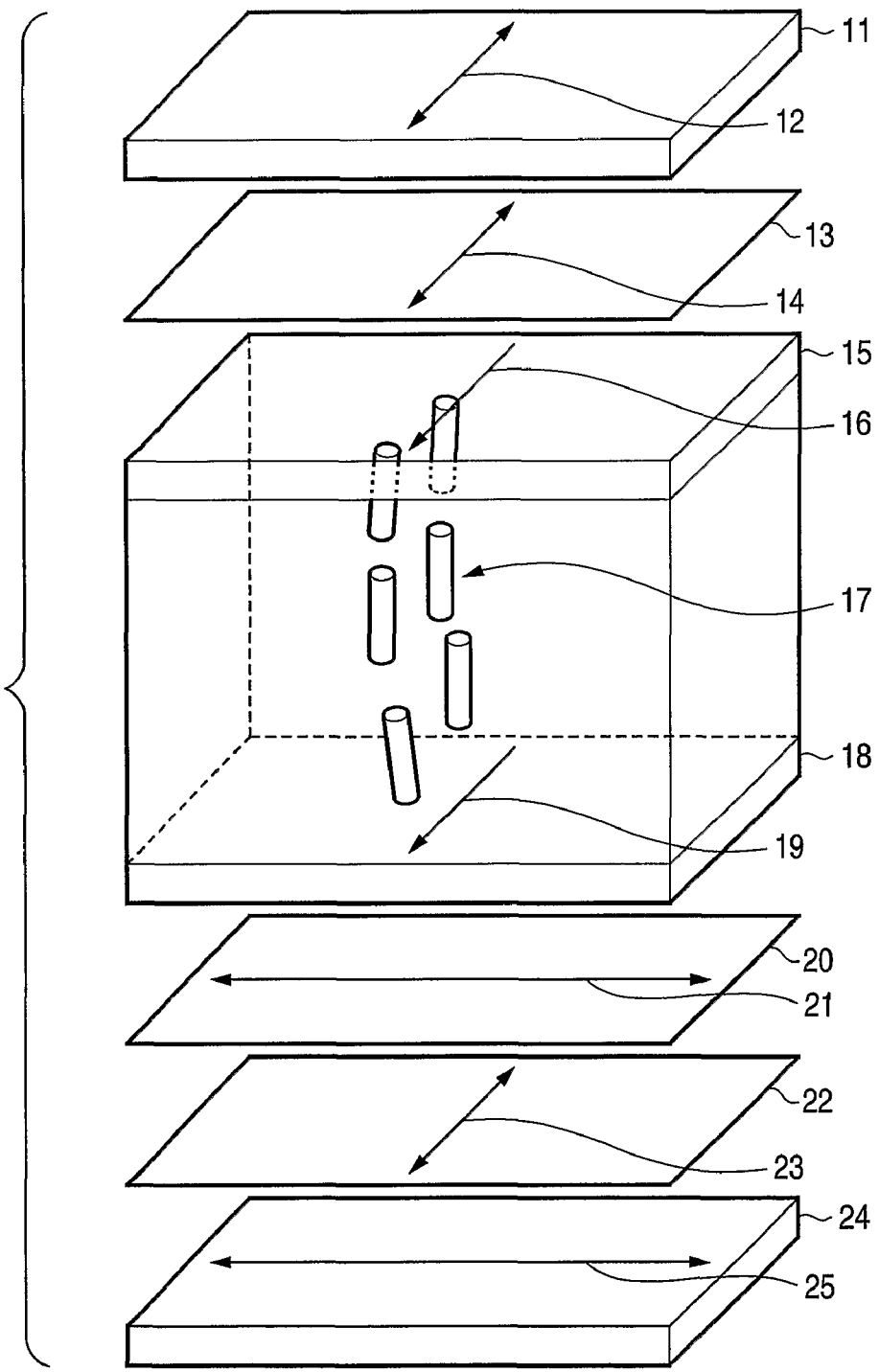

OPTICAL COMPENSATION SHEET, POLARIZING PLATE AND LIQUID CRYSTAL DISPLAY

TECHNICAL FIELD

The present invention relates to an optical compensation sheet, a polarizing plate and a liquid crystal display.

BACKGROUND ART

A liquid crystal display has been used widely more and more year by year as a space-saving image display device that consumes little electric power. A liquid crystal display has heretofore been greatly disadvantageous in that it has a great dependence of image on viewing angle. In recent years, however, a VA mode of high viewing angle liquid crystal has been put into practical use. With this trend, the demand of liquid crystal displays has been rapidly growing also in the market of electrical appliance requiring a high fidelity image such as television set.

Under these circumstances, the optically-compensatory member to be used in the improvement of tint, contrast and their viewing angle dependence in liquid crystal displays, too, is required to have further improvement in optical compensation properties.

Referring to optically-compensatory film for VA mode liquid crystal displays, it has heretofore been known that one comprising an A plate and a C plate in combination has a great effect of improving the contrast viewing angle.

Further, WO2004/068226 A1 discloses a technique which involves optical compensation by a polymer film having wavelength dispersion which is different from in-plane retardation to thickness-direction retardation, whereby contrast can be further enhanced and tint in black display can be close to gray.

However, this method leaves something to be desired in effect of improving tint viewing angle. This method is disadvantageous in that the tint change becomes remarkable particularly after prolonged display under high temperature and humidity conditions. Thus, it has been desired to provide improvements in this method.

Further, JP-A-2004-326089 discloses a technique involving a stacking of retardation layers comprising a retardation layer having a positive refractive anisotropy and an optical axis in the in-plane thereof and a retardation layer having a negative refractive anisotropy and an optical axis in the direction normal to the surface thereof stacked in combination, wherein as the retardation layer having a positive refractive anisotropy and an optical axis in the in-plane thereof there is used a stretched polymer film having reverse wavelength dispersion characteristics such that retardation falls as the wavelength drops and as the retardation layer having a negative refractive anisotropy and an optical axis in the direction normal to the surface thereof there is used a coat layer having true wavelength dispersion characteristics such that retardation rises as the wavelength drops, whereby the contrast can be further enhanced and the tint in black display is close to gray.

However, the above cited technique is disadvantageous in that the use of the aforementioned laminate of retardation layers as protective film for polarizing plate causes the deterioration of the polarization properties of the polarizer and the polarizing plate. This citation is also disadvantageous in that when the adhesion of the polarizer is insufficient, the protective film is peeled off the polarizer during the preparation of the polarizing plate or the storage of the polarizing plate thus prepared under high temperature and humidity conditions. Accordingly, the aforementioned laminate of retardation layers must be used stuck to other polarizing plate protective films other than cellulose acetate film with an adhesive before use. Improvements have been desired in respect to productivity and cost.

DISCLOSURE OF THE INVENTION

An object of an illustrative, non-limiting embodiment of the invention is to provide an optical compensation sheet, which can maintain a high fidelity image even after prolonged lighting under high humidity. Another object of an illustrative, non-limiting embodiment of the invention is to provide an optical compensation sheet, which when used as a protective film for polarizing plate, undergoes no exfoliation or the like even under high temperature and humidity, exerts a great effect of improving the tint and the dependence of contrast on viewing angle and maintains a high fidelity image even after prolonged lighting under high humidity.

Still another object of an illustrative, non-limiting embodiment of the invention is to provide a polarizing plate and a liquid crystal display comprising the aforementioned optical compensation sheet.

The present inventors made extensive studies. As a result, it was found that the aforementioned tint change is attributed to wavelength dispersion change. In other words, the polymer disclosed in WO2004/068226 A1 has a wavelength dispersion of polarity anisotropy which is different from main chain to side chain. By allowing these wavelength dispersions to cancel each other, a wavelength dispersion which is different from in-plane retardation to thickness-direction retardation is realized. However, the photoelastic modulus is unavoidably raised, resulting in the rise of retardation change caused by the occurrence of stress in the film. In particular, this trouble becomes serious particularly when the liquid crystal display is lighted under high humidity conditions over an extended period of time, the shrinkage of the polyvinyl alcohol constituting the polarizer is accompanied by the occurrence of a great stress in the optical compensation sheet.

The present inventors found that when a film obtained by stretching a polymer comprising a monomer component having a small intrinsic birefringence has an optical anisotropic layer having a liquid crystal compound aligned perpendicular to the aforementioned stretching direction provided thereon, an ideal wavelength dispersion of retardation can be realized. Further, a liquid crystal display which shows little tint change even after prolonged lighting under high temperature and humidity conditions can be realized. Thus, the invention has been worked out.

1) An optical compensation sheet comprising: a stretched polymer film: and at least one optical anisotropic layer containing a liquid crystal compound, wherein the optical compensation sheet has retardations satisfying relationships (A) to (F):

$$30 \text{ nm} < Re(546) < 150 \text{ nm} \tag{A}$$

$$100 \text{ nm} < Rth(546) < 400 \text{ nm} \tag{B}$$

$$0.5 < Re(480)/Re(546) < 1 \tag{C}$$

$$1.0 < Re(628)/Re(546) < 2.0 \tag{D}$$

$$1.0 < Rth(480)/Rth(546) < 1.5 \tag{E}$$

$$0.7 < Rth(628)/Rth(546) < 1.0 \tag{F}$$

wherein Re ($\lambda$) is a in-plane retardation (nm) (i.e., a retardation in a plane of the optical compensation sheet) at a wavelength of $\lambda$ nm; and Rth ($\lambda$) is a thickness-direction retardation (nm) (i.e., a retardation in a direction perpendicular to the plane of the optical compensation sheet) at a wavelength of $\lambda$ nm.

2) The optical compensation sheet as defined in Clause 1), wherein the slow axis of the stretched polymer film and the slow axis of the optical anisotropic layer containing a liquid crystal are perpendicular to each other.

3) The optical compensation sheet as defined in Clause 1) or 2), wherein the stretched polymer film has retardations satisfying relationships (G) to (J):

$$0.95 < Re(480)/Re(546) < 1.05 \quad (G)$$

$$0.95 < Re(628)/Re(546) < 1.05 \quad (H)$$

$$0.95 < Rth(480)/Rth(546) < 1.05 \quad (I)$$

$$0.95 < Rth(628)/Rth(546) < 1.05 \quad (J)$$

wherein Re ($\lambda$) is a in-plane retardation (nm) (i.e., a retardation in a plane of the stretched polymer film) at a wavelength of $\lambda$ nm; and Rth ($\lambda$) is a thickness-direction retardation (nm) (i.e., a retardation in a direction perpendicular to the plane of the stretched polymer film) at a wavelength of $\lambda$ nm.

4) The optical compensation sheet as defined in any one of Clauses 1) to 3), wherein the optical anisotropic layer has retardations satisfying relationships (K) to (N):

$$1.0 < Re(480)/Re(546) < 2.0 \quad (K)$$

$$0.5 < Re(628)/Re(546) < 1.0 \quad (L)$$

$$1.0 < Rth(480)/Rth(546) < 2.0 \quad (M)$$

$$0.5 < Rth(628)/Rth(546) < 1.0 \quad (N)$$

wherein Re ($\lambda$) is a in-plane retardation (nm) (i.e., a retardation in a plane of the optical anisotropic layer) at a wavelength of $\lambda$ nm; and Rth ($\lambda$) is a thickness-direction retardation (nm) (i.e., a retardation in a direction perpendicular to the plane of the optical anisotropic layer) at a wavelength of $\lambda$ nm.

5) The optical compensation sheet as defined in any one of Clauses 1) to 4), wherein the photoelastic modulus of the stretched polymer film is $5 \times 10^{-13}$ cm$^2$/dyn ($5 \times 10^{-8}$ cm$^2$/N) or less.

6) The optical compensation sheet as defined in any one of Clauses 1) to 5), wherein the stretched polymer film is a cycloolefin polymer film.

7) A polarizing plate comprising: a polarizer; and two protective films disposed on the respective side thereof, wherein at least one of the two protective films is an optical compensation sheet defined in any one of Clauses 1) to 6).

8) A liquid crystal display comprising: a liquid crystal cell; and two polarizing plates disposed on the respective side thereof, wherein at least one of the two polarizing plates is a polarizing plate defined in Clause 7).

9) The liquid crystal display as defined in Clause 8), wherein the liquid crystal cell is of VA mode.

10) An optical compensation sheet comprising: a stretched cellulose acylate film; and at least one optical anisotropic layer containing a liquid crystal compound, wherein the optical compensation sheet has retardations satisfying relationships (A'), (B'), (C), (D), (E') and (F'):

$$20 \text{ nm} < Re(546) < 150 \text{ nm} \quad (A')$$

$$50 \text{ nm} < Rth(546) < 400 \text{ nm} \quad (B')$$

$$0.5 < Re(480)/Re(546) < 1 \quad (C)$$

$$1.0 < Re(628)/Re(546) < 2.0 \quad (D)$$

$$1.0 < Rth(480)/Rth(546) < 2.0 \quad (E')$$

$$0.5 < Rth(628)/Rth(546) < 1.0 \quad (F')$$

wherein Re($\lambda$) represents a in-plane retardation at a wavelength of $\lambda$ nm; and Rth($\lambda$) represents a thickness-direction retardation at a wavelength of $\lambda$ nm.

11) The optical compensation sheet as defined in Clause 10), wherein the slow axis of the stretched cellulose acylate film and the slow axis of the optical anisotropic layer are perpendicular to each other.

12) The optical compensation sheet as defined in Clause 10) or 11), wherein the stretched cellulose acylate film has retardations satisfying relationships (G') to (J'):

$$0.90 < Re(480)/Re(546) < 1.10 \quad (G')$$

$$0.90 < Re(628)/Re(546) < 1.10 \quad (H')$$

$$0.90 < Rth(480)/Rth(546) < 1.10 \quad (I')$$

$$0.90 < Rth(628)/Rth(546) < 1.10 \quad (J')$$

wherein Re ($\lambda$) is a in-plane retardation (nm) (i.e., a retardation in a plane of the stretched cellulose acylate film) at a wavelength of $\lambda$ nm; and Rth ($\lambda$) is a thickness-direction retardation (nm) (i.e., a retardation in a direction perpendicular to the plane of the stretched cellulose acylate film) at a wavelength of $\lambda$ nm.

13) The optical compensation sheet as defined in any one of Clauses 10) to 12), wherein the optical anisotropic layer has retardations satisfying relationships (K') to (N'):

$$1.0 < Re(480)/Re(546) < 4.0 \quad (K')$$

$$0.1 < Re(628)/Re(546) < 1.0 \quad (L')$$

$$1.0 < Rth(480)/Rth(546) < 4.0 \quad (M')$$

$$0.1 < Rth(628)/Rth(546) < 1.0 \quad (N')$$

wherein Re ($\lambda$) is a in-plane retardation (nm) (i.e., a retardation in a plane of the optical anisotropic layer) at a wavelength of $\lambda$ nm; and Rth ($\lambda$) is a thickness-direction retardation (nm) (i.e., a retardation in a direction perpendicular to the plane of the optical anisotropic layer) at a wavelength of $\lambda$ nm.

14) The optical compensation sheet as defined in any one of Clauses 10) to 13), wherein the stretched cellulose acylate film contains a cellulose acylate having a substitution degree of 2.00 to 2.90.

15) The optical compensation sheet as defined in any one of Clauses 10) to 14), wherein the stretched cellulose acylate film is stretched crosswise (i.e., in a wide direction of the stretched cellulose acylate film) at a factor of 1% to 200%.

16) The optical compensation sheet as defined in any one of Clauses 10) to 15), wherein the stretched cellulose acylate film contains a retardation developing agent having a molar absorptivity of 1,000 or less at a wavelength of 360 nm to 700 nm.

17) The optical compensation sheet as defined in Clause 16), wherein the retardation developing agent is represented by formula (11):

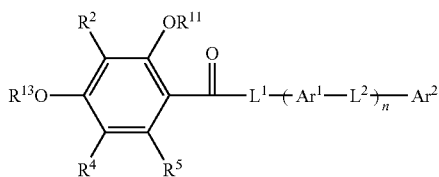

wherein $R^2$, $R^4$ and $R^5$ each independently represent a hydrogen atom or substituent; $R^{11}$ and $R^{13}$ each independently represent a hydrogen atom or alkyl group; $L^1$ and $L^2$ each independently represent a single bond or divalent group; $Ar^1$ represents an arylene group or aromatic heterocyclic group; $Ar^2$ represents an aryl group or aromatic heterocyclic group; n represents an integer of 3 or more; and $L^2$'s and $Ar^1$'s present in a number of n may be the same or different, with the proviso that $R^{11}$ and $R^{13}$ are different from each other and the alkyl group represented by $R^{13}$ is free of hetero atom.

18) A polarizing plate having a polarizer and two protective films disposed on the respective side thereof, wherein at least one of the two protective films comprises an optical compensation sheet defined in any one of Clauses 10) to 17).

19) A liquid crystal display having a liquid crystal cell and two polarizing plates disposed on the respective side thereof, wherein at least one of the two polarizing plates is one defined in Clause 18).

20) The liquid crystal display as defined in Clause 19), wherein the liquid crystal cell is of VA mode.

An optical compensation sheet of the invention can provide a liquid crystal display which shows little tint change ever after prolonged lighting.

Further, an optical compensation sheet, which when used as a protective film for polarizing plate, undergoes no exfoliation or the like even under high temperature and humidity, exerts a great effect of improving the tint and the dependence of contrast on viewing angle and maintains a high fidelity image over an extended period of time even under high humidity and a polarizing plate and a liquid crystal display comprising same can be provided.

BRIEF DESCRIPTION OF THE DRAWINGS

FIG. 2 is a schematic diagram illustrating an exemplary embodiment of a liquid crystal display of the invention.

Figure 1A:
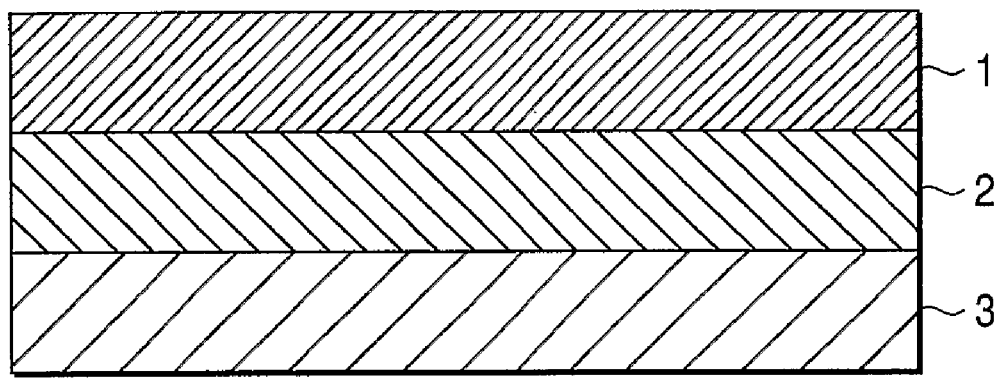
FIGS. 1A and 1B each is a schematic diagram illustrating an exemplary embodiment of a polarizing plate of the invention.

Reference Numerals and Signs in FIGS. 1 to 4 are set forth below:

| | |
|---|---|
| 1, 1a, 3 | Protective film |
| 2 | Polarizer |
| 3 | Optical anisotropic layer |
| 4 | Stretched polymer film |
| 10 | Liquid Crystal Display |
| 11 | Upper polarizing plate |

-continued

| | |
|---|---|
| 12 | Absorption axis of upper polarizing plate |
| 13 | First optical anisotropic layer |
| 14 | Direction of slow axis of first optical anisotropic layer |
| 15 | Upper electrode substrate of liquid crystal cell |
| 16 | Direction of control of alignment in upper substrate |
| 17 | Liquid crystal layer |
| 18 | Lower electrode substrate of liquid crystal cell |
| 19 | Direction of control of alignment in lower substrate |
| 20 | Second optical anisotropic layer 1 |
| 21 | Direction of slow axis of second optical anisotropic layer 1 |
| 22 | Second optical anisotropic layer 2 |
| 23 | Direction of slow axis of second optical anisotropic layer 2 |
| 24 | Lower polarizing plate |
| 25 | Direction of absorption axis of lower polarizing plate |

DETAILED DESCRIPTION OF THE INVENTION

<Stretched Polymer Film>

A stretched polymer film of the invention (hereinafter referred to also as "specific retardation film") will be first described.

<Polymer Material>

As the polymer to be used in the formation of the stretched polymer film in the invention there is preferably used one having a small intrinsic birefringence as well as a small photoelastic modulus.

The photoelastic modulus of the polymer is preferably $5 \times 10^{-8}$ $cm^2/N$ or less, more preferably $3 \times 10^{-8}$ $cm^2/N$ or less.

Particularly preferred among the polymers satisfying the aforementioned requirements are cycloolefin polymer films.

A cycloolefin polymers which are preferably used in the invention will be further described hereinafter.

<Cycloolefin Polymer Film>

(Cycloolefin-based Addition Polymer)

In the invention, the cycloolefin polymer to be used in the formation of the stretched polymer film is preferably a cyclic olefin-based addition polymer comprising a structural unit (a) represented by the following formula (1) and a structural unit (b) represented by the following formula (2) in a proper proportion:

(a)

wherein $A_1$, $A_2$, $A_3$ and $A_4$ each independently represent a hydrogen atom, $C_1$-$C_{10}$ alkyl or aryl group, $C_4$-$C_{15}$ cycloalkyl group or halogen atom; $A_1$ to $A_4$ each include an alkylene group formed by $A_1$ and $A_2$, $A_1$ and $A_3$ or $A_2$ and $A_4$; and r represents an integer of from 0 to 2.

The structural unit (a) is formed by subjecting a cyclic olefin compound (hereinafter referred to as "specific monomer (A)" represented by the following formula (3) to addition polymerization.

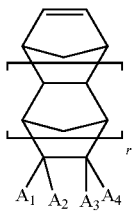

wherein $A_1$, $A_2$, $A_3$ and $A_4$ each independently represent a hydrogen atom, $C_1$-$C_{10}$ alkyl or aryl group, $C_4$-$C_{15}$ cycloalkyl group or halogen atom; $A_1$ to $A_4$ each include an alkylene or alkylidene group formed by $A_1$ and $A_2$, $A_1$ and $A_3$ or $A_2$ and $A_4$; and r represents an integer of from 0 to 2.

Specific examples of the "specific monomer (A)" represented by the formula (3) include bicyclo[2.2.1]hepto-2-ene, 5-methyl-bicyclo[2.2.1]hepto-2-ene, 5-ethyl-bicyclo[2.2.1]hepto-2-ene, 5-propyl-bicylco[2.2.1]hepto-2-ene, 5-butyl-bicylco[2.2.1]hepto-2-ene, 5-pentyl-bicylco[2.2.1]hepto-2-ene, 5-hexyl-bicylco[2.2.1]hepto-2-ene, 5-heptyl-bicylco[2.2.1]hepto-2-ene, 5-octyl-bicyclo[2.2.1]hepto-2-ene, 5-decyl-bicyclo[2.2.1]hepto-2-ene, 5-dodecyl-bicyclo[2.2.1]hepto-2-ene, 5,6-dimethyl-bicyclo[2.2.1]hepto-2-ene, 5-methyl-5-ethyl-bicyclo[2.2.1]hepto-2-ene, 5-phenyl-bicyclo[2.2.1]hepto-2-ene, 5-cyclohexyl-bicyclo[2.2.1]hepto-2-ene, 5-cyclooctyl-bicyclo[2.2.1]hepto-2-ene, 5-fhloro-bicyclo[2.2.1]hepto-2-ene, 5-chloro-bicyclo[2.2.1]hepto-2-ene, tricyclo[4.2.0.15,8]nona-2-ene, 1-methyltricyclo[4.2.0.15,8]nona-2-ene, 6-methyltricyclo[4.2.0.15,8]nona-2-ene, tricyclo[5.2.1.02,6]deca-8-ene, 3-methyltricyclo[5.2.1.02,6]deca-8-ene, 4-methyltricyclo[5.2.1.02,6]deca-8-ene, tricyclo[6.2.1.02,7]undeca-9-ene, 1-methyltricyclo[6.2.1.02,7]undeca-9-ene, 3-methyltricyclo[6.2.1.02,7]undeca-9-ene, 1-ethyltricyclo[6.2.1.02,7]undeca-9-ene, 3-ethyltricyclo[6.2.1.02,7]undeca-9-ene, tricyclo[8.2.1.02,9]trideca-11-ene, 1-methyltricyclo[8.2.1.02,9]trideca-11-ene, 5-methyltricyclo[8.2.1.02,9]trideca-11-ene, tetracyclo[4.4.0.12,5.17,10]dodeca-3-ene, 8-methyl-tetracyclo[4.4.0.12,517,10]dodeca-3-ene, and 8-ethyl-tetracyclo[4.4.0.12,517,10]dodeca-3-ene.

Alternatively, a cyclic diolefin-based compound such as 5-vinyl-bicyclo[2.2.1]hepto-2-ene, 5-(1-butenyl)-bicyclo[2.2.1]hepto-2-ene, tricyclo[5.2.1.02,6]deca-3,8-diene, 1-methyltricyclo[5.2.1.02,6]deca-3,8-diene and 1-ethyltricyclo[5.2.1.02,6]deca-3,8-diene may be subjected to addition polymerization, and then subjected to hydrogenation of cyclic olefininically unsaturated bond present in its side chains to produce a structural unit (a).

Preferred among these "specific monomers (A)" are bicyclo[2.2.1]hepto-2-ene and tricyclo[5.2.1.02,6]deca-8-ene. Tricyclo[5.2.1.02,6]deca-8-ene is present in endo form and exo form. In the invention, tricyclo[5.2.1.02,6]deca-8-ene in endo form is preferred to that in exo form because the finally obtained film has an enhanced toughness. Preferably, tricyclo[5.2.1.02,6]deca-8-ene which is in endo form in a proportion of 80% or more is used. A method is also preferably employed which comprises subjecting tricyclo[5.2.1.02,6]deca-3,8-diene in endo form to addition polymerization, and then subjecting cyclic olefinically unsaturated bond left in its side chains to hydrogenation. In this case, too, the content of tricyclo[5.2.1.02,6]deca-8-ene in endo form is preferably 80% or more. The cyclic olefin-based polymer thus obtained not only exhibits an excellent transparency and heat resistance but also has a low water absorption, a low dielectric and a high toughness. These "specific monomers (A)" may be used singly or in combination of two or more thereof.

The structural unit (b) represented by the following formula (2) is formed by subjecting a cyclic olefin represented by the following formula (4) (hereinafter referred to as "specific monomer (B)" to addition polymerization.

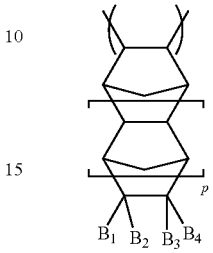

wherein $B_1$ to $B_4$ each independently represent a hydrogen atom, alkyl group, cycloalkyl group, aryl group, halogenated alkyl group, hydrolyzable silyl group or polar group represented by —$(CH_2)jX$, and at least one of $B_1$ to $B_4$ include hydrolysable silyl group or polar group represented by —$(CH_2)jX$. Wherein, X represents —$C(O)OR^1$ or —$OC(O)R^2$ (in which $R^1$ and $R^2$ each represent a $C_1$-$C_{10}$ alkyl, alkenyl, cycloalkyl or aryl group or a substituent selected from the group consisting of groups comprising halogen substitution products thereof) and j represents an integer of from 0 to 3; $B^1$ to $B^4$ each include an alkyl group formed by $B^1$ and $B^3$ or $B^2$ and $B^4$ or an alkylidenyl group formed by $B^1$ and $B^2$ or $B^3$ and $B^4$; and p represents an integer of from 0 to 2.

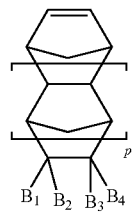

wherein $B_1$ to $B_4$ are as defined in the formula (2); and p represents an integer of from 0 to 2.

Specific examples of the "specific monomer (B)" will be given below, but the invention is not limited thereto. 5-Methoxycarbonyl-bicyclo[2.2.1]hepto-2-ene, 5-ethoxycarbonyl-bicyclo[2.2.1]hepto-2-ene, 5-butoxycarbonyl-bicyclo[2.2.1]hepto-2-ene, 5-methyl-5-methoxycarbonyl-bicyclo[2.2.1]hepto-2-ene, 5-methyl-5-ethoxycarbonyl-bicyclo[2.2.1]hepto-2-ene, 5-methyl-5-propoxycarbonyl-bicyclo[2.2.1]hepto-2-ene, 5-methyl-5-butoxycarbonyl-bicyclo[2.2.1]hepto-2-ene, 5-ethyl-5-methoxycarbonyl-bicyclo[2.2.1]hepto-2-ene, 5-methyl-5-trifluoromethoxycarbonyl-bicyclo[2.2.1]hepto-2-ene, 5-methyl-bicyclo[2.2.1]hepto-2-ene-5-ilmethyl carboxylic acid ethyl, acrylic acid-1-methyl-bicyclo[2.2.1]hepto-3-ene, methacrylic acid-1-methyl-bicyclo[2.2.1]hepto-3-ene, 5,6-di(methoxycarbonyl)-bicyclo[2.2.1]hepto-2-ene, 5,6-di(methoxycarbonyl)-bicyclo[2.2.1]hepto-2-ene, 8-methyl-8-methoxycarbonyl-tetracyclo[4.4.0.12,5.17,10]dodec-3-ene, 8-methyl-8-ethoxycarbonyl-tetracyclo[4.4.0.12,5.17,10]dodeca-3-ene, 5-triemthoxysilyl-bicyclo[2.2.1]hepto-2-ene, 5-dimethoxychlorosilyl-bicyclo[2.2.1]hepto-2-ene, 5-methoxychloromethylsilyl-bicyclo[2.2.1]

hepto-2-ene, 5-dimethoxychlorosilyl-bicyclo[2.2.1]hepto-2-ene, 5-methoxyhydridemethylsilyl-bicyclo[2.2.1]hepto-2-ene, 5-dimethoxyhydridesilyl-bicyclo[2.2.1]hepto-2-ene, 5-methoxydimethylsilyl-bicyclo[2.2.1]hepto-2-ene, 5-triethoxysilyl-bicyclo[2.2.1]hepto-2-ene, 5-diethoxy chlorosilyl-bicyclo[2.2.1]hepto-2-ene, 5-ethoxychloro methylsilyl-bicyclo[2.2.1]hepto-2-ene, 5-diethoxy hydridesilyl-bicyclo[2.2.1]hepto-2-ene, 5-ethoxy dimethylsilyl-bicyclo[2.2.1]hepto-2-ene, 5-ethoxy diethylsilyl-bicyclo[2.2.1]hepto-2-ene, 5-propoxy dimethylsilyl-bicyclo[2.2.1]hepto-2-ene, 5-tripropoxy silyl-bicyclo[2.2.1]hepto-2-ene, 5-triphenoxysilyl-bicyclo[2.2.1]hepto-2-ene, 5-trimethoxysilylmethyl-bicyclo[2.2.1]hepto-2-ene, 5-dimethylchlorosilyl-bicyclo[2.2.1]hepto-2-ene, 5-methyldichlorosilyl-bicyclo[2.2.1]hepto-2-ene, 5-trichlorosilyl-bicyclo[2.2.1]hepto-2-ene, 5-diethylchlorosilyl-bicyclo[2.2.1]hepto-2-ene, 5-ethyldichlorosilyl-bicyclo[2.2.1]hepto-2-ene, 5-(2-trimethoxysilyl)ethyl-bicyclo[2.2.1]hepto-2-ene, 5-(2-dimethoxychlorosilyl)ethyl-bicylco[2.2.1]hepto-2-ene, 5-(1-trimethoxy silyl)ethyl-bicylco[2.2.1]hepto-2-ene, 5-(2-trimethoxysilyl)propyl-bicylco[2.2.1]hepto-2-ene, 5-(1-trimethoxysilyl)propyl-bicylco[2.2.1]hepto-2-ene, 5-triethoxysilylethyl-bicylco[2.2.1]hepto-2-ene, 5-dimethoxymethylsilylmethyl-bicylco[2.2.1]hepto-2-ene, 5-trimethoxypropylsilyl-bicylco[2.2.1]hepto-2-ene, 5-methyl-5-(3-triethoxysilyl) propoxycarbonyl-bicylco[2.2.1]hepto-2-ene, 8-triethoxysilyl-tetracyclo[4.4.0.12,5,17,10]dodeca-3-ene, 8-methyldimethoxysilyl-tetracyclo[4.4.0.12,5.17,10]dodeca-3-ene, 5-[1'-methyl-2',5'-dioxa-1'-silacyclopentyl]-bicylco[2.2.1]hepto-2-ene, 5-[1'-methyl-3',3',4',4'-tetraphenyl-2',5'-dioxa-1'-silacyclopentyl]-bicylco[2.2.1]hepto-2-ene, 5-[1'-methyl-3',3',4',4'-tetramethyl-2',5'-dioxa-1'-silacyclopentyl]-bicylco[2.2.1]hepto-2-ene, 5-[1'-phenyl-2',5'-dioxa-1'-silacyclopentyl]-bicylco[2.2.1]hepto-2-ene, 5-[1'-ethyl-2',5'-dioxa-1'-silacyclopentyl]-bicylco[2.2.1]hepto-2-ene, 5-[1',3'-dimethyl-2',5'-dioxa-1'-silacyclopentyl]-bicylco[2.2.1]hepto-2-ene, 5-[1'-methyl-3',4'-dimethyl-2',5'-dioxa-1'-silacyclopentyl]-bicylco[2.2.1]hepto-2-ene, 5-[1'-methyl-2',6'-dioxa-1'-silacyclohexyl]-bicylco[2.2.1]hepto-2-ene, 5-[1'-ethyl-2',6'-dioxa-1'-silacyclohexyl]-bicylco[2.2.1]hepto-2-ene, 5-[1',3'-dimethyl-2',6'-dioxa-1'-silacyclohexyl]-bicylco[2.2.1]hepto-2-ene, 5-[1'-methyl-4',4'-dimethyl-2',6'-dioxa-1'-silacyclohexyl]-bicylco[2.2.1]hepto-2-ene, 5-[1'-methyl-4',4'-dimethyl-2',6'-dioxa-1'-silacyclohexyl]-bicylco[2.2.1]hepto-2-ene, 5-[1'-methyl-4',4'-dimethyl-2',6'-dioxa-1'-silacyclohexyl]-bicylco[2.2.1]hepto-2-ene, 5-[1'-phenyl-4',4'-dimethyl-2',6'-dioxa-1'-silacyclohexyl]-bicylco[2.2.1]hepto-2-ene, 5-[1'-methyl-4'-phenyl-2',6'-dioxa-1'-silacyclohexyl]-bicylco[2.2.1]hepto-2-ene, 5-[1'-methyl-4'-spiro-cyclohexyl-2',6'-dioxa-1'-silacyclohexyl]-bicylco[2.2.1]hepto-2-ene, 5-[1'-methyl-4'-ethyl-4'-butyl-2',6'-dioxa-1'-silacyclohexyl]-bicylco[2.2.1]hepto-2-ene, 5-[1'-methyl-3',3'-dimethyl-5'-methylene-2',6'-dioxa-1'-silacyclohexyl]-bicylco[2.2.1]hepto-2-ene, 5-[1'-phenyl-2',6'-dioxa-1'-silacyclohexyl]-bicylco[2.2.1]hepto-2-ene, 5-[1'-methyl-3'-phenyl-2',6'-dioxa-1'-silacyclohexyl]-bicylco[2.2.1]hepto-2-ene, 5-[1'-methyl-4',4'-dimethyl-2',6'-dioxa-1'-silacyclohexyl]-7-oxa-bicylco[2.2.1]hepto-2-ene, 5-[1'-methyl-2',6'-dioxa-1'-silacyclohexyl]-7-oxa-bicylco[2.2.1]hepto-2-ene, 5-[1'-methyl-2',7'-dioxa-1'-silacycloheptyl]-bicylco[2.2.1]hepto-2-ene, 8-[1'-methyl-4',4'-dimethyl-2',6'-dioxa-1'-silacyclohexyl]-tetracyclo[4.4.0.12,517,10]dodeca-3-ene, 8-[1'-methyl-2',6'-dioxa-1'-silacyclohexyl]-tetracyclo[4.4.0.12,517,10]dodeca-3-ene, 8-methyl-8-carboxymethyl-9-carboxy methyltetracyclo[4.4.0.12,5.17,10]-3-dodecene. These "specific monomers (B)" may be used singly or in combination of two or more thereof.

The proportion of the structural unit (b) in the cyclic olefin-based polymer is from 5 to 95 mol-%, preferably from 10 to 90 mol-%, more preferably from 20 to 80 mol-% based on the total structural units. When the proportion of the structural unit (b) in the cyclic olefin-based polymer is too small, the resulting cyclic olefin-based polymer can exhibit deteriorated adhesion to the polyvinyl alcohol to be used in the polarizer. On the other hand, when the proportion of the structural unit (b) in the cyclic olefin-based polymer is too great, the resulting cyclic olefin-based polymer exhibits a great hygroscopicity and hence a deteriorated dimensional stability. The alignment of the structural unit (b) in the cyclic olefin-based polymer may be random or block and is not limited but is preferably random. Further, the cyclic olefin-based addition polymer containing a structural unit (b) having a hydrolyzable silyl group or a reactive substituent such as ester group, acryloyl group and methacryloyl group as a side chain substituent can be crosslinked with a crosslinking agent described later to form a crosslinked cyclic olefin-based polymer film.

Into the cyclic olefin-based polymer to be used in the invention can be introduced a structural unit (c) obtained by the addition polymerization of a "specific α-olefin compound".

Specific examples of the "specific α-olefin compound" include ethylene, propylene, 1-butene, 1-hexene, 1-octene, trimethylsilylethylene, triethylsilylethylene, and styrene. Preferred among these compounds is ethylene.

By introducing a repeating unit (c) derived from "specific α-olefin compound" into a polymer, the glass transition temperature of the cyclic olefin-based polymer can be controlled. The proportion of the repeating unit (c) in the cyclic olefin-based polymer to be used in the invention is from 0 to 30 mol-%, preferably from 0 to 20 mol-%. When the proportion of the repeating unit (c) is more than 30 mol-%, the cyclic olefin-based polymer exhibits a glass transition temperature as low as 170° C. or less and can show deterioration in heat resistance to disadvantage.

The molecular weight of the cyclic olefin-based polymer to be used in the invention is represented in polystyrene equivalence. The number-average molecular weight and weight-average molecular weight of the cyclic olefin-based polymer are from 10,000 to 300,000 and from 20,000 to 700,000, preferably from 20,000 to 200,000 and 50,000 to 500,000, more preferably from 50,000 to 150,000 and 100,000 to 300,000, respectively. When the number-average molecular weight and the weight-average molecular weight of the cyclic olefin-based polymer are less than 10,000 and less than 20,000, respectively, the resulting film of cyclic olefin-based polymer exhibits a deteriorated toughness and thus can be easily cracked. On the other hand, when the number-average molecular weight and the weight-average molecular weight of the cyclic olefin-based polymer are more than 300,00 and 700,000, respectively, the resulting cyclic olefin-based polymer solution exhibits a raised viscosity. Thus, the cyclic olefin-based polymer solution exhibits a deteriorated workability in film formation by a solvent casting method. Further, the resulting film exhibits deteriorated surface conditions.

The glass transition temperature of the cyclic olefin-based polymer to be used in the invention is from 180° C. to 450° C., preferably from 200° C. to 400° C. When the glass transition temperature of the polymer is less than 180° C., the resulting cyclic olefin-based polymer exhibits an insufficient heat resistance. On the other hand, when the glass transition temperature of the cyclic olefin-based polymer is more than 450° C., the resulting film has no toughness and thus can be easily cracked.

For the preparation of the cyclic olefin-based polymer to be used in the invention, the "specific monomer (A)" is mainly used. If necessary, the "specific monomer (B)" is used to form crosslink or provide adhesion. Further, if necessary, the "specific α-olefin compound" is used to control the glass transition temperature. The method of producing the cyclic olefin-based polymer will be further described hereinafter.

Examples of the polymerization catalyst include single complex catalysts such as palladium, nickel, cobalt, titanium and zirconium and multicomponent catalysts exemplified in the following clauses [1], [2] and [3], but the invention is not limited thereto.

[1] Single complex catalyst such as Pd and Ni: [Pd$(CH_3CN)_4$][$BF_4$]$_2$, [Pd(PhCN)$_4$][$SbF_6$], [($\eta^3$-crotyl)Pd(cyclooctadiene)][$PF_6$], [($\eta^3$-crotyl)Ni(cycloocta-1,5-diene)][B$(3,5$-d$(CF_3)_2C_6F_3)_4$], [($\eta^3$-crotyl)Ni(cycloocta-1,5-diene)][$PF_6$], [($\eta^3$-crotyl)Ni(cycloocata-1,5-diene)][B$(C_6F_5)_4$], [($\eta^3$-crotyl)Ni(cycloocta-1,5-diene)][$SbF_6$], toluene.Ni$(C_6F_5)_2$, benzene.Ni$(C_6F_5)_2$, mesitylene.Ni$(C_6F_5)_2$-ethylether.Ni$(C_6F_5)_2$

[2] Combination of a multicomponent catalyst d-μ-chlorobis(6-methoxybicyclo[2.2.1]hepto-2-ene-endo-5σ,2π)Pd made of a combination of a palladium complex having σ- or σ, π-bond and an organic aluminum or ultrastrong acid salt with a compound selected from the group consisting of methyl alumoxane (abbreviated as MAO), AgSbF$_6$ and AgBF$_4$. Combination of [($\eta^3$-aryl)PdCl]$_2$ and AgSbF$_6$ or AgBF$_4$. Combination of [(1,5-cyclooctadiene)Pd(CH$_3$)Cl], PPh$_3$ and NaB[3,5-$(CF_3)_2C_6H_3$]$_4$.

[3] Multicomponent catalyst comprising the following 1) transition metal compound selected from the group consisting of nickel compound, cobalt compound, titanium compound and zirconium compound, 2) compound selected from the group consisting of ultrastrong acid, Lewis acid and ionic boron compound and 3) organic aluminum compound.

1) Transition Metal Compound

1)-1: Nickel compound and cobalt compound: Compound selected from the group consisting of at least one compound selected from the group of compounds exemplified below, organic carboxylic acid salt of nickel or cobalt, organic phosphite, organic phosphate, organic sulfonate and β-diketone compound. Nickel 2-ethylhexanoate, nickel naphthenate, cobalt naphthenate, nickel oleate, nickel dodecanoate, cobalt dodecanoate, cobalt neodecanoate, nickel dodecylbenzenesulfonate, nickel bis(acetylacetonate), nickel bis(ethylacetoacetate). Compound obtained by modifying the aforementioned organic carboxylate of nickel with an ultrastrong acid such as tetrafluoroboric acid, trifluoroacetic acid and acetone hexafluoride. Diene- or triene-coordinated complex of nickel, e.g., nickel complexes such as dichloro(1,5-cyclooctadiene) nickel, [($\eta^3$-crotyl)(1,5-cyclooctadiene)nickel]hexafluorophosphate, and tetrafluoroborate and terakis[3,5-bis(trifluoromethyl)]borate complex thereof, 5,9-cyclododecatriene) nickel, bis (norbornadiene) nickel and bis(1,5-cyclooctadiene)nickel, complex having ligands having atoms such as P, N and O connected to nickel, e.g., bis(triphenylphosphine)nickel dichloride, bis(triphenylphosphine)nickel dibromide, bis(triphenylphosphine)cobalt dibromide, bis[N-(3-t-butylsalicylidene)phenylaminate]nickel, Ni[PhC(O)CH](Ph), Ni(OC(C$_6$H$_4$)PPh)(H)(PCy$_3$), Ni[OC(O)(C$_6$H$_4$)P](H) (PPh$_3$), reaction product of bis(1,5-cyclooctadiene)nickel and PhC(O)CH=PPh$_3$, nickel complex such as 6-(i-Pr)$_2$C$_6$H$_3$N=CHC$_6$H$_3$(O)(Anth)](Ph)(PPh$_3$)Ni (in which Anth stands for 9-anthracenyl, Ph stands for phenyl and Cy stands for cyclohexyl)

1)-2: Titanium compound and zirconium compound: [t-BuNSiMe(Me$_4$Cp)]TiCl$_2$, (Me$_4$CP)(O—$^i$Pr$_2$C$_6$H$_3$)$_2$TiCl, (Me$_4$Cp)TiCl$_3$, (Me$_4$Cp)Ti(OBu)$_3$, [t-BuNSiMeFlu]tiMe$_2$, [t-BuNSiMeFlu]TiCl$_2$,Et(Ind)$_2$ZrCl$_2$, Ph$_2$C(Ind)(Cp)ZrCl$_2$, $^i$Pr(Cp)(Flu)ZrCl$_2$, $^i$Pr(3-tert-But-Cp)(Ind)ZrCl$_2$, $^i$Pr(Cp)(Ind)ZrCl$_2$, Me$_2$Si(Ind)$_2$ZrCl$_2$, Cp$_2$ZrCl$_2$, [Cp stands for cyclopentadienyl, Ind stands for Indenyl and Flu stands for Fluorenyl]

2) Compound selected from the group consisting of ultrastrong acid, Lewis acid compound and ionic boron compound: Examples of the ultrastrong acid include hexafluoroamimonic acid, hexafluorophosphoric acid, hexafluoroarsenic acid, trifluoroacetic acid, fluorosulfuric acid, trifluoromethanesulfonic acid, tetrafluoroboric acid, tetrakis(pentafluorophenyl)boric acid, tetrakis[3,5-bis(trifluoromethyl) phenyl] boric acid, p-toluenesulfonic acid, and pentafluoropropionic acid. Examples of the Lewis acid compound include complexes of boron trifluoride with ether, amine and phenol, complexes of aluminum trifluoride with ether, amine and phenol, boron compounds such as tris(pentafluorophenyl)borane and tris[3,5-bis(trifluoromethyl)phenylborane, aluminum compounds such as aluminum trifluoride, aluminum tribromide, ethyl aluminum dichloride, ethyl aluminum sesquichloride, diethyl aluminum fluoride and tri (pentafluorophenyl)aluminum, organic halogen compounds showing Lewis acid properties such as hexafluoroacetone, hexachloroacetone, chloranyl and hexafluoromethyl ethyl ketone, and compounds showing Lewis acid properties such as titanium tetrachloride and pentafluoroantimony. Examples of the ionic boron compound include triphenylcarbenium tetrakis(pentafluorophenyl)borate, triphenylcarbenium tetrakis[3,5-bis(trifluoromethyl)phenyl]borate, triphenylcarbenium tetrakis[2,4,6-trifluorophenyl]borate, triphenylcarbenium teraphenyl borate, tributulammonium tetrakis (pentafluorophenyl)borate, N,N-dimethylanilinium tetrakis (pentafluorophenyl)borate, N,N-diethylanilium tetrakis(pentafluorophenyl)borate, and N,N-diphenyl anilium tetrakis (pentafluorophenyl)borate.

3) Organic aluminum compound: For example, alkyl alumoxane compounds such as methyl alumoxane, ethyl alumoxane and butyl alumoxane, alkyl aluminum compounds such as trimethyl aluminum, triethyl aluminum, triisobutyl aluminum, diisobutyl aluminum hydride, diethyl aluminum chloride, diethyl aluminum fluoride, ethyl aluminum sesquichloride and ethyl aluminum dichloride or a mixture of the aforementioned alkyl alumoxane compound and the aforementioned alkyl aluminum compound are preferably used.

These single complex catalysts or multicomponent catalysts are used in an amount falling within the range defined below. The transition metal compound such as nickel compound, palladium compound, cobalt compound, titanium compound and zirconium compound is used in an amount of from 0.02 to 100 mmol per molar atom of monomer. The organic aluminum compound is used in an amount of from 1 to 5,000 mols per molar atom of transition metal compound. The ultrastrong acid, Lewis acid and ionic boron compound are used each in an amount of from 0 to 100 mols per molar atom of transition metal compound.

The cyclic olefin-based polymer can be obtained by polymerization in one or two solvents selected from the group consisting of alicyclic hydrocarbon solvent such as cyclohexane, cyclopentane and methyl cyclopentane, aliphatic hydrocarbon solvent such as hexane, heptane and octane, aromatic hydrocarbon solvent such as toluene, benzene, xylene and mesitylene and halogenated hydrocarbon solvent such as dichloromethane, 1,2-dichloroethane, 1,1-dichloroethane, tetrachloroethane, chlorobenzene and dichlorobenzene in the presence of a single complex catalyst or multicomponent catalyst comprising the aforementioned components at the temperature from −20° C. to 120° C.

(Cycloolefin-based Ring-opening Polymer)

As the cycloolefin polymer according to the invention there is preferably used a ring-opening polymer having a repeating unit represented by the following formula (5) or (6).

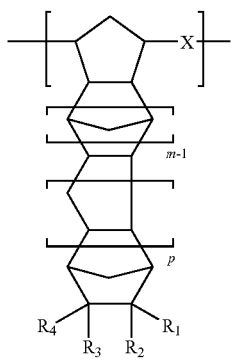

Formual (5)

wherein m represents an integer of 1 or more; p represents an integer of 0 or 1 or more; X represents a vinylene group (—CH═CH—) or ethylene group (—CH$_2$CH$_2$—); R$_1$ to R$_4$ each independently represent a hydrogen atom, halogen atom, substituted or unsubstituted C$_1$-C$_{30}$ hydrocarbon group which may have a connecting group containing oxygen atom, nitrogen atom, sulfur atom or silicon atom or polar group.

R$_1$ and R$_2$, R$_3$ and R$_4$ or R$_2$ and R$_3$ may be connected to each other to form a carbon ring or heterocyclic group having a monocyclic structure or a polycyclic structure obtained by condensation with other rings. The carbon ring or heterocyclic group thus formed may be an aromatic or nonaromatic ring.

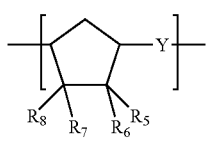

Formula (6)

wherein Y represents a vinylene group (—CH═CH—) or ethylene group (—CH$_2$CH$_2$—); R$_5$ to R$_8$ each independently represent a hydrogen atom, halogen atom, substituted or unsubstituted C$_1$-C$_{30}$ hydrocarbon group which may have a connecting group containing, oxygen atom, nitrogen atom, sulfur atom or silicon atom or polar group. R$_5$ and R$_6$, R$_7$ and R$_8$ or R$_6$ and R$_7$ may be connected to each other to form a carbon ring or heterocyclic group (the structure represented by the formula (1) is excluded) having a monocyclic structure or a polycyclic structure obtained by condensation with other rings. The carbon ring or heterocyclic group thus formed may be an aromatic or nonaromatic ring.

The aforementioned polymers of the formulae (5) and (6) are synthesized as (co)polymer (hereinafter referred to also as "specific polymer") of monomers shown below in the following clauses (a) to (d).

(a) Ring-opening polymer of compound represented by the following formula (7) (hereinafter referred to also as "specific monomer D")

(b) Ring-opening polymer of specific monomer D with a compound copolymerizable with the specific monomer D (hereinafter referred to also as "copolymerizable monomer")

(c) Hydrogenation product of the aforementioned ring-opening polymer (a) or ring-opening polymer (b)

(d) Compound obtained by Friedel-Kraft's reaction of the aforementioned ring-opening polymer (a) or ring-opening polymer (b) or hydrogenation product thereof

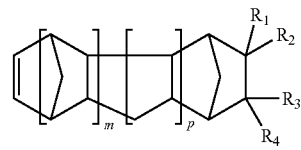

Formula (7)

wherein m represents an integer of 1 or more; p represents an integer of 0 or 1 or more; R$_1$ to R$_4$ each independently represent a hydrogen atom, halogen atom, substituted or unsubstituted C$_1$-C$_{30}$ hydrocarbon group which may have a connecting group containing, oxygen atom, nitrogen atom, sulfur atom or silicon atom or polar group. R$_1$ and R$_2$, R$_3$ and R$_4$ or R$_2$ and R$_3$ may be connected to each other to form a carbon ring or heterocyclic group having a monocyclic structure or a polycyclic structure obtained by condensation with other rings. The carbon ring or heterocyclic group thus formed may be an aromatic or nonaromatic ring.

The specific polymer is preferably obtained by the copolymerization of a compound represented by the following formula (8) (hereinafter referred to also as "specific monomer E") as a copolymerizable monomer with a specific monomer D and a specific monomer E. The specific retardation film which is eventually obtained from the specific polymer having the aforementioned structure shows a further improvement in mechanical properties such as toughness. Further, when stretched, the specific polymer can be easily provided with a desired retardation required for specific retardation film.

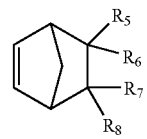

Formula (8)

wherein R$_5$ to R$_8$ each independently represent a hydrogen atom, halogen atom, substituted or unsubstituted C$_1$-C$_{30}$ hydrocarbon group which may have a connecting group containing, oxygen atom, nitrogen atom, sulfur atom or silicon atom or polar group. R$_5$ and R$_6$, R$_7$ and R$_8$ or R$_6$ and R$_7$ may be connected to each other to form a carbon ring or heterocyclic group having a monocyclic structure or a polycyclic structure obtained by condensation with other rings (except the structure represented by the formula (5)). The carbon ring or heterocyclic group thus formed may be an aromatic or nonaromatic ring.

Further, the specific polymer is a ring-opening polymerization product of a specific monomer D and a specific monomer E and preferably has a structural unit derived from the specific monomer D represented by the formula (5) (hereinafter referred to also as "structural unit d") and a structural unit derived from the specific monomer E represented by the formula (6) (hereinafter referred to also as "structural unit e"). A specific polymer having such an arrangement is advantageous in that the heat resistance and the heat-workability involving stretching can be well balanced.

Examples of the halogen atom in the formulae (7) and (8) include fluorine atom, chlorine atom, and bromine atom.

Examples of the $C_1$-$C_{30}$ hydrocarbon group include alkyl groups such as methyl group, ethyl group and propyl group; cycloalkyl groups such as cyclopentyl group and cyclohexyl group, and alkenyl groups such as vinyl group, allyl group and propenyl group.

The substituted or unsubstituted hydrocarbon group in the formulae (5) to (8) may be connected to the cyclic structure directly or via a connecting group (linkage).

Examples of the connecting group include $C_1$-$C_{10}$ divalent hydrocarbon groups [e.g., alkylene group represented by —(CH$_2$)q- (in which q is an integer of from 1 to 10)], and connecting groups containing oxygen atom, nitrogen atom, sulfur atom or silicon atom [e.g., carbonyl group (—CO—), oxycarbonyl group (—O(CO)—), sulfone group (—SO$_2$—), ether bond (—O—), thioether bond (—S—), imino group (—NH—), amide bond (—NHCO—, —CONH—), siloxane bond (—OSi(R9 8-methyl-8-n-propoxycarbonyl tetracyclo[4.4.0.12,5.17,10]-3-dodecene, 8-methyl-8-isopropoxycarbonyltetracyclo[4.4.0.12,12,5.17,10]-3-dodecene, 8-fluoro-8-pentafluoroethyl-9,9-bis(trifluoromethyl)tetracyclo[4.4.0.12,5.17,10]-3-dodecene, 8,9-difluoro-8-heptafluoro-iso-propyl-9-trifluoromethyltetracyclo[4.4.0.12,5.17,10]-3-dodecene, 8-chloro-8,9,9-trifluorotetracyclo[4.4.0.12,5.17,10]-3-dodecene, 8,9-dichloro-8,9-bis (trifluoromethyl) tetracyclo[4.4.0.12,5.17,10]-3-dodecene, 8-(2,2,2-trifluoroethoxycarbonyl)tetracyclo[4.4.0.12,5.17,10]-3-dodecene, 8-methyl-8-(2,2,2-trifluoroethoxycarbonyl)tetracyclo[4.4.0.12,5.17,10]-3-dodecene, 8-(4-biphenylcarbonyloxymethyl)tetracyclo[4.4.0.12,5.17,10]-3-dodecene, 8-(4-biphenylcarbonyloxyethyl)tetracyclo[4.4.0.12,5.17,10]-3-dodecene, 8-methyl-8-(4-biphenylcarbonyloxymethyl)tetracyclo[4.4.0.12,5.17,10]-3-dodecene, 8-(2-biphenylcarbonyloxymethyl)tetracyclo[4.4.0.12,5.17,10]-3-dodecene, 8-methyl-8-(2-biphenylcarbonyloxymethyl)tetracyclo[4.4.0.12,5.17,10]-3-dodecene, 8-(3-biphenylcarbonyloxymethyl) tetracyclo[4.4.0.12,5.17,10]-3-dodecene, 8-methyl-8-(3-biphenylcarbonyloxymethyl)tetracyclo[4.4.0.12,5.17,10]-3-dodecene, 8-(1-naphthylcarbonyloxymethyl) tetracyclo[4.4.0.12,5.17,10]-3-dodecene, 8-methyl-8-(1-naphthylcarbonyloxymethyl)tetracyclo[4.4.0.12,5.17,10]-3-dodecene, 8-(2-naphthylcarbonyloxymethyl)tetracyclo[4.4.0.12,5,5.17,10]-3-dodecene, 8-methyl-8-(2-naphthylcarbonyloxymethyl)tetracyclo[4.4.0.12,5.17,10]-3-dodecene, 8-(9-anthracenylcarbonyloxy methyl)tetracyclo[4.4.0.12,5.17,10]-3-dodecene, 8-methyl-8-(9-anthracenylcarbonyloxymethyl)tetracyclo[4.4.0.12,5.17, 10]-3-dodecene, Diels-Alder adduct of 1,2-(2H,3H-[1,3] epicyclopenta)-1,2-dihydro acenaphthylene and cyclopentadiene]. The specific monomer D is not limited to these compounds. These compounds may be used singly or in combination of two or more thereof as specific monomer D.

Preferred among these compounds are compounds having at least one polar group per molecule. In particular, the compound of the formula (3) wherein $R_1$ and $R_3$ each represent a hydrogen atom or $C_1$-$C_{10}$ hydrocarbon group, $R_2$ and $R_4$ each correspond to hydrogen atom or monovalent organic group and at least one of $R_2$ and $R_4$ is a polar group other than hydrogen atom and hydrocarbon group is preferred because it enhances the adhesion to other materials.

The content of the polar groups in the specific polymer thus obtained is determined by the desired function required for the finally obtained specific retardation film and is not specifically limited. The content of the structural unit derived from the specific monomer D having polar groups in all the structural units derived from the specific monomer a is normally 1 mol-% or more, preferably 5 mol-% or more, more preferably 10 mol-% or more. All the structural units derived from the specific monomer D may have polar groups.

As the specific monomer D there is preferably used a compound of the formula (7) wherein at least one of $R_2$ and $R_4$ has a polar group represented by the formula (9) because the glass transition temperature and hygroscopicity of the specific polymer thus obtained can be easily controlled.

wherein n represents an integer of from 0 to 5; and $R_{10}$ represents a monovalent organic group.

Specific examples of the monovalent organic group represented by $R_{10}$ in the formula (9) include alkyl groups such as methyl group, ethyl group and propyl group, aryl groups such as phenyl group, naphthyl group, anthracenyl group and biphenylyl group; and monovalent groups having aromatic rings such as fluorene (e.g., diphenylsulfone, tetrahydrofluorene) and heterocyclic groups such as furane ring and imide ring.

In the formula (9), n represents an integer of from 0 to 5, preferably from 0 to 2, more preferably 0. The smaller n is, the higher is the glass transition temperature of the specific polymer thus obtained to advantage. In particular, the specific monomer a wherein n is 0 is desirable because it can be easily synthesized.

Further, the specific monomer a preferably has an alkyl group connected to the carbon atom to which a polar group represented by the formula (9) is connected in the formula (7). In this arrangement, the heat resistance and the hygroscopicity of the specific polymer thus obtained can be well balanced. The number of carbon atoms in the alkyl group is preferably from 1 to 5, more preferably from 1 to 2, particularly preferably 1.

As the specific monomer D there is preferably used one of the formula (7) wherein m is 1 and p is 0 because a specific polymer having a high glass transition temperature can be obtained.

Specific examples of the specific monomer E include bicylco[2.2.1]hepto-2-ene, tricyclo[5.2.1.02,6]deca-8-ene, tricyclo[6.2.1.02,7]undeca-9-ene, 5-methyl bicyclo[2.2.1]hepto-2-ene, 5-ethylbicyclo[2.2.1]hepto-2-ene, 5-methoxycarbonylbicyclo[2.2.1]hepto-2-ene, 5-methyl-5-methoxycarbonylbicyclo[2.2.1]hepto-2-ene, 5-phenoxycarbonylbicyclo[2.2.1]hepto-2-ene, 5-methyl-5-phenoxycarbonylbicyclo[2.2.1]hepto-2-ene, 5-cyanobicyclo[2.2.1]hepto-2-ene, 5-ethylidenebicyclo[2.2.1]hepto-2-ene, 5-phenylbicyclo[2.2.1]hepto-2-ene, 5-(2-naphtyl)bicyclo[2.2.1]hepto-2-ene (α form and β form), 5-fluorobicyclo[2.2.1]hepto-2-ene, 5-fluoro methylbicyclo[2.2.1]hepto-2-ene, 5-trifluoromethyl bicyclo[2.2.1]hepto-2-ene, 5-pentafluoroethylbicyclo[2.2.1]hepto-2-ene, 5,5-difluorobicyclo[2.2.1]hepto-2-ene, 5,6-difluoro bicyclo[2.2.1]hepto-2-ene, 5,5-bis(trifluoromethyl)bicyclo[2.2.1]hepto-2-ene, 5,6-bis(trifluoromethyl)bicyclo[2.2.1]hepto-2-ene, 5-methyl-5-trifluoromethyl bicyclo[2.2.1]hepto-2-ene, 5,5,6-trifluorobicyclo[2.2.1]hepto-2-ene, 5,5,6-tris(fluoromethyl)bicyclo[2.2.1]hepto-2-ene, 5,5,6,6-tetrafluorobicyclo[2.2.1]hepto-2-ene, 5,5,6,6-tetrais(trifluoromethyl)bicyclo[2.2.1]hepto-2-ene, 5,5-difluoro-6,6-bis(trifluoromethyl)bicyclo

[2.2.1]hepto-2-ene, 5,6-difluoro-5,6-bis(trifluoromethyl) bicyclo[2.2.1]hepto-2-ene, 5,5,6-trifluoro-5-trifluoromethylbicyclo[2.2.1]hepto-2-ene, 5-fluoro-5-pentafluoroethyl-6,6-bis(trifluoromethyl)bicyclo[2.2.1] hepto-2-ene, 5,6-difluoro-5-heptafluoro-iso-propyl-6-trifluoro methylbicyclo[2.2.1]hepto-2-ene, 5-chloro-5,6,6-trifluorobicyclo[2.2.1]hepto-2-ene, 5,6-dichloro-5,6-bis (trifluoromethyl)bicyclo[2.2.1]hepto-2-ene, 5,5,6-trifluoro-6-trifluoromethoxybicyclo[2.2.1]hepto-2-ene, 5,5,6-trifluoro-6-heptafluoropropoxybicyclo[2.2.1]hepto-2-ene, 5-(4-phenylphenyl)bicyclo[2.2.1]hepto-2-ene, 4-(bicyclo [2.2.1]hepto-5-ene-2-il)phenylsulfonyl benzene, 5-(4-biphenylcarbonyloxymethyl)bicyclo[2.1.1]hepto-2-ene, 5-(4-biphenylcarbonyloxyethyl)bicyclo[2.2.1]hepto-2-ene, 5-(4-biphenylcarbonyloxypropyl)bicyclo[2.2.1]hepto-2-ene, 5-methyl-5-(4-biphenylcarbonyloxymethyl)bicyclo[2.2.1] hepto-2-ene, 5-(2-biphenylcarbonyloxymethyl)bicyclo [2.2.1]hepto-2-ene, 5-(2-biphenylcarbonyloxyethyl)bicyclo [2.2.1]hepto-2-ene, 5-methyl-5-(2-biphenylcarbonyloxymethyl)bicyclo[2.2.1]hepto-2-ene, 5-(3-biphenylcarbonyloxymethyl)bicyclo[2.2.1]hepto-2-ene, 5-(3-biphenylcarbonyloxyethyl)bicyclo[2.2.1]hepto-2-ene, 5-(1-naphthylcarbonyloxymethyl)bicyclo[2.2.1]hepto-2-ene, 5-(1-naphthylcarbonyloxyethyl)bicyclo[2.2.1]hepto-2-ene, 5-methyl-5-(1-naphthylcarbonyloxymethyl)bicyclo [2.2.1]hepto-2-ene, 5-(2-naphthylcarbonyloxymethyl) bicyclo[2.2.1]hepto-2-ene, 5-(2-naphthylcarbonyloxyethyl) bicyclo[2.2.1]hepto-2-ene, 5-methyl-5-(2-napthylcarbonyloxymethyl)methylbicyclo[2.2.1]hepto-2-ene, 5-(9-anthracenylcarbonyloxymethyl)bicyclo[2.2.1] hepto-2-ene, 5-(9-anthracenylcarbonyloxyethyl)bicyclo [2.2.1]hepto-2-ene, 5-methyl-5-(9-anthracenyl carbonyloxymethyl)bicyclo[2.2.1]hepto-2-ene, and Diels-Alder adduct of acenaphthylene and cyclopentadiene. The specific monomer e is not limited to these compounds. These compounds may be used singly or in combination of two or more thereof as specific monomer e.

The specific polymer obtained by the copolymerization of the specific monomer D and the specific monomer E may be obtained by the copolymerization of these specific monomers with copolymerizable monomers other than the aforementioned specific monomer D and specific monomer E.

Other examples of the copolymerizable monomer include cycloolefins such as cyclobutene, cyclopentene, cycloheptene, cyclooctene and dicyclopentadiene. The number of carbon atoms in cycloolefin is preferably from 4 to 20, more preferably from 5 to 12. The specific monomer D and optionally specific monomer E may be polymerized in the presence of an unsaturated hydrocarbon-based polymer having an olefinically unsaturated bond in its main chain such as polybutadiene, polyisoprene, styrene-butadiene copolymer, ethylene-nonconjugated diene copolymer and polynorbornene. The specific polymer thus obtained is useful as a raw material of resin having a great impact resistance.

The specific polymer preferably exhibits an intrinsic viscosity (ηinh) of from 0.2 to 5 dl/g, more preferably from 0.3 to 4 dl/g, particularly preferably from 0.5 to 3 dl/g as measured in 30° C. chloroform. When the intrinsic viscosity of the specific polymer exceeds 5 dl/g, the resulting solution exhibits too high a viscosity and hence a deteriorated workability. On the contrary, when the intrinsic viscosity of the specific polymer falls below 0.2 dl/g, the resulting film may exhibit a deteriorated strength.

Referring to the molecular weight of the specific polymer, the number-average molecular weight (Mn) and the weight-average molecular weight (Mw) of the specific polymer in polystyrene equivalence as measured by gel permeation chromatography (GPC) are normally from 8,000 to 1,000,000 and from 20,000 to 3,000,000, preferably from 10,000 to 500,000 and from 30,000 to 1,000,000, more preferably from 20,000 to 100,000 and 40,000 to 500,000, particularly preferably from 30,000 to 100,000 and from 40,000 to 300,000, respectively.

Referring to the molecular weight distribution of the specific polymer, Mw/Mn is normally from 1.5 to 10, preferably from 2 to 8, more preferably from 2.5 to 5, particularly preferably from 2.5 to 4.5.

The glass transition temperature (Tg) of the specific polymer can be properly changed by adjusting the kind of the structural unit a and the structural unit b of the specific polymer and the ratio of the structural unit a to the structural unit b or adding additives to the specific polymer. The glass transition temperature (Tg) of the specific polymer is normally from 100° C. to 250° C., preferably from 110° C. to 200° C., more preferably from 120° C. to 180° C. When Tg of the specific polymer is 100° C. or less, the resulting specific polymer exhibits a lowered heat deformation temperature and thus can be disadvantageous in heat resistance. Further, the optical characteristics of the finally obtained film can be affected by temperature. When Tg of the specific polymer is 250° C. or more, the thermoplastic norbornene-based resin can be thermally deteriorated in the case where the specific polymer is stretched at a temperature around Tg.

In the specific polymer having a structural unit d and a structural unit e, the molar ratio (D/E) of specific monomer D to specific monomer E is preferably from 95/5 to 5 to 95, more preferably from 95/5 to 60/40. When the proportion of the structural unit d exceeds the above defined range, an effect of improving toughness or desired optical properties cannot be expected. On the contrary, when the proportion of the structural unit d falls below the above defined range, the resulting specific polymer exhibits a lowered glass transition temperature and thus can be disadvantageous in heat resistance.

In the specific polymer having a structural unit d and a structural unit e, the ratio (composition ratio) of the structural unit d and the structural unit e in the polymer is preferably dispersed slightly in the entire range of molecular weight distribution. In some detail, when the dispersion of the proportion of arbitrary molecular weight in the ratio of the specific monomer D to the specific monomer E to be used in the polymerization reaction is within ±50%, preferably ±30%, more preferably ±20%, a more uniform specific retardation film can be obtained. Further, when the dispersion falls within the above defined range, the resulting stretched film exhibits a further uniformity in retardation.

The conditions under which the specific polymer obtained by the ring-opening copolymerization of the specific monomer D and optically the specific monomer E or other copolymerizable monomers and optionally hydrogenating the ring-opening copolymer is produced will be described hereinafter.

Ring-opening Polymerization Catalyst:

The ring-opening polymerization of the monomers is effected in the presence of a metathesis catalyst.

The metathesis catalyst is a catalyst made of at least one combination selected from the group consisting of (a) at least one selected from the group consisting of W, Mo and Re compounds and (b) compounds belonging to group IA (e.g., Li, Na, K), group IIA (e.g., Mg, Ca), IIB group (e.g., Zn, Cd, Hg), group IIIB (e.g., B, al), group IVA (e.g., Ti, Zr) or group IVB (e.g., Si, Sn, Pb) of Deming's periodic table and having at least one element-carbon bond or element-hydrogen bond.

In this case, the metathesis catalyst may have an additive (c) described later incorporated therein to enhance the catalytic activity.

Representative examples of W, Mo or Re compounds as component (a) include those disclosed in JP-A-1-240517 such as $WCl_6$, $MoCl_5$ and $ReOCl_3$.

Specific examples of the component (b) include those disclosed in JP-A-1-240517 such as n-$C_4H_9Li$, $(C_2H_5)_3Al$, $(C_2H_5)_2AlCl$, $(C_2H_5)_{1.5}AlCl_{1.5}$, $(C_2H_5)AlCl_2$, methyl alumoxane and LiH.

Representative examples of the component (c) employable herein include alcohols, aldehydes, ketones and amines. Further, compounds disclosed in JP-A-1-240517 can be used.

Referring to the amount of the metathesis catalyst to be used, the molar ratio of the aforementioned component (a) to the specific monomer D and specific monomer E (hereinafter altogether referred to as "specific monomer") is normally from 1:500 to 1:50,000, preferably from 1:1,000 to 1:10,000.

The atomic ratio of the component (a) to the component (b) is from 1:1 to 1:50, preferably from 1:2 to 1:30.

The atomic ratio of the component (c) to the component (a) is from 0.005:1 to 15:1, preferably from 0.05:1 to 7:1.

Molecular Weight Adjustor:

The adjustment of the molecular weight of the specific monomer can be carried out by adjusting the polymerization temperature and the kind of the catalyst and the solvent. In the invention, the adjustment of the molecular weight of the specific monomer can be carried out also by allowing a molecular weight adjustor to be present in the reaction system. Preferred examples of the molecular weight adjustor include α-olefins such as ethylene, propene, 1-butene, 1-pentene, 1-hexene, 1-heptene, 1-octene, 1-nonene and 1-decene, and styrenes. Preferred among these compounds are 1-butene and 1-hexene.

These molecular weight adjustors may be used singly or in combination of two or more thereof.

The amount of the molecular weight adjustor to be used is from 0.005 to 0.6 mols, preferably from 0.02 to 0.5 mols per mol of the specific monomer to be used in the polymerization reaction.

Solvent for Ring-opening Polymerization Catalyst:

Examples of the solvent to be used in the ring-opening polymerization reaction include alkanes such as pentane, hexane, heptane, octane, nonane and decane, cycloalkanes such as cyclohexane, cycloheptane, cyclooctane, decaline and norbornane, aromatic hydrocarbons such as benzene, toluene, xylene, ethyl benzene and cumene, halogenated hydrocarbon compounds such as chlorobutane, bromohexane, methylene chloride, dichloroethane, hexamethylene dibromide, chlorobenzene, chloroform and tetrachloroethylene, saturated carboxylic acid esters such as ethyl acetate, n-butyl acetate, iso-butyl acetate and methyl propionate, and ethers such as dimethoxyethane, dibutyl ether and tetrahydrofurane. These solvents may be used singly or in combination of two or more thereof. Preferred among these solvents are aromatic hydrocarbons.

Referring to the amount of the solvent to be used, the weight ratio of solvent to specific monomer is normally from 1:1 to 10:1, preferably from 1:1 to 5:1.

Hydrogenation:

The ring-opening copolymer obtained by the aforementioned ring-opening polymerization can be used as specific polymer as it is but is preferably subjected to hydrogenation of olefinically unsaturated bond left therein to produce a hydrogenated copolymer.

The hydrogenated copolymer has an excellent heat stability and thus is not little subject to thermal deterioration of characteristics when worked and stretched to form a film or when used as a product. The hydrogenated product exhibits a percent olefinically unsaturated bond hydrogenation of 50% or more, preferably 70% or more, more preferably 90% or more, particularly preferably 98% or more. In the case where the ring-opening copolymer to be used in hydrogenation has an aromatic ring in its molecule, the aromatic ring is not substantially hydrogenated when hydrogenation is effected.

The hydrogenation reaction is carried out by an ordinary method. In some detail, to a solution of a ring-opening copolymer is added a hydrogenation catalyst. The mixture is then reacted with a hydrogen gas having ordinary pressure to 300 atm., preferably from 3 to 200 atm, preferably at a temperature of from 0° C. to 200° C., preferably from 20° C. to 180° C.

As the hydrogenation catalyst there may be used one for use in ordinary hydrogenation reaction of olefinic compound. As the hydrogenation catalysts, heterogeneous catalysts and homogeneous catalysts are known. In the case where a ring-opening polymer having a substituent having an aromatic ring in its molecule is hydrogenated, conditions such that the unsaturated bond in the aromatic ring cannot be not substantially hydrogenated are preferably selected.

Examples of the heterogeneous catalysts include solid catalysts having a noble metal such as palladium, platinum, nickel, rhodium and ruthenium supported on a carrier such as carbon, silica, alumina and titania. Examples of the homogeneous catalysts include nickel naphthenate/triethyl aluminum, nickel acetyl acetonate/triethyl aluminum, cobalt octenate/n-butyl lithium, titanocene dichloride/diethyl aluminum monochloride, rhodium acetate, chlorotris(triphenylphosphine)rhodium, dichlorotris(triphenylphosphine)ruthenium, chlorohydrocarbonyl tris(triphenylphosphine)ruthenium, and dichlorocarbonyl tris(triphenylphosphine)ruthenium. The catalyst may be used in the form of powder or grain.

These hydrogenation catalysts are used in such an amount that the weight ratio of ring-opening polymer to hydrogenation catalyst is from $1:1\times10^{-6}$ to 1:2.

Examples of the thermoplastic norbornene-base resing also include comertial films, for example, ARTON (trade mark) manufactured by JSR Corporation, and ZEONOR (trade mark) manufactured by Zeon Corporation.

(Production of Film)

In the invention, the thermoplastic norbornene-based resin made of specific polymer can be formed into a film by a melt forming method or solution casting method (solvent casting method). The solvent casting method is preferred because an unworked film having a high uniformity in thickness and a good surface smoothness can be obtained. As the solvent casting method there may be used a method which comprises dissolving or dispersing a thermoplastic norbornene-based resin in a solvent to prepare a film-forming solution having a thermoplastic norbornene-based resin incorporated therein in a proper concentration, pouring or spreading the film-forming solution onto a proper carrier, drying the coated carrier, and then peeling the film off the carrier.

In the case where the thermoplastic norbornene-based resin is dissolved or dispersed in a solvent, the concentration of the thermoplastic norbornene-based resin is normally from 0.1 to 90% by weight, preferably from 1 to 50% by weight, more preferably from 10 to 35% by weight. When the concentration of the thermoplastic norbornene-based resin falls below 0.1% by weight, it is likely that the unworked film having a desired thickness can be difficultly obtained. Further, when drying is effected to remove the solvent, the evaporation of the solvent can be easily accompanied by foaming or the like, making it likely that the unworked film having a good surface smoothness can be difficultly obtained. On the other hand, when the concentration of the thermoplastic norbornene-based resin exceeds 90% by weight, the film-forming solution exhibits too high a viscosity, it is likely that a film having uniform thickness or surface conditions can be difficultly obtained.

The viscosity of the film-forming solution is normally from 1 to 1,000,000 (mPa·s), preferably from 10 to 100,000 (mPa·s), more preferably from 100 to 50,000 (mPa·s), particularly preferably from 1,000 to 40,000 (mPa·s) at room temperature.

Examples of the solvent to be used in the preparation of the film-forming solution include aromatic solvents such as benzene, toluene and xylene, cellosolve-based solvents such as methyl cellosolve, ethyl cellosolve and 1-methoxy-2-propanol, ketone-based solvents such as diacetone alcohol, acetone, cyclohexanone, methyl ethyl ketone, 4-methyl-2-pentanone, cyclohexanone, ethyl cyclohexanone and 1,2-dimethyl cyclohexane, ester-based solvents such as methyl lactate and ethyl lactate, halogen-containing solvents such as 2,2,3,3-tetrafluoro-1-propanol, methylene chloride and chloroform, ether-based solvents such as tetrahydrofurane and dioxane, and alcohol-based solvents such as 1-pentanol and 1-butanol.

When a solvent having SP value (solubility parameter) of normally from 10 to 30 (MPa1/2), preferably from 10 to 25 (MPa1/2), more preferably from 15 to 25 (MPa1/2), particularly preferably from 15 to 20 (MPa1/2) is used besides the aforementioned solvents, a worked film having good surface uniformity and optical properties can be obtained.

The aforementioned solvents may be used singly or in combination of two or more thereof. In the case where two or more of these solvents are used in combination, it is preferred that SP value of the mixed solvent thus obtained fall within the above defined range. In this case, SP value of the mixed solvent can be determined from the weight ratio of the various solvents constituting the mixed solvent. SP value of a mixture of two solvents, for example, can be calculated by the equation: SP value=W1·SP1+W2·SP2 supposing that W1 and W2 are the weight proportion of the solvents, respectively, and SP1 and SP2 are the SP value of the solvents, respectively.

In the case where as the solvent for film-forming solution there is used a mixed solvent, a good solvent for thermoplastic norbornene-based resin and a poor solvent for thermoplastic norbornene-based resin can be combined to obtain an unworked film having a light diffusion capacity. In some detail, supposing that SP value of the thermoplastic norbornene-based resin is SPx, SP value of the good solvent for the thermoplastic norbornene-based resin is SPy and SP value of the poor solvent for the thermoplastic norbornene-based resin is SPz, the unworked film thus obtained can be provided with a light diffusion capacity by predetermining the difference between SPx and SPy to be preferably 7 or less, more preferably 5 or less, particularly preferably 3 or less, the difference between SPx and SPz to be preferably 7 or more, more preferably 8 or more, particularly preferably 9 or more, and the difference between SPy and SPz to be preferably 3 or more, more preferably 5 or more, even more preferably 7 or more. As a result, the finally obtained specific retardation film can be provided with a light diffusion capacity.

The proportion of the poor solvent in the mixed solvent is preferably 50% by weight or less, more preferably 30% by weight or less, particularly preferably 15% by weight or less, most preferably 10% by weight or less. The difference in boiling point between poor solvent and good solvent is preferably 1° C. or more, more preferably 5° C. or more, particularly preferably 10° C. or more, most preferably 20° C. or more. It is particularly preferred that the boiling point of the poor solvent be higher than that of the good solvent.

The temperature at which the thermoplastic norbornene-based resin is dissolved or dispersed in the solvent may be room temperature or high temperature. By thoroughly stirring, a film-forming solution having the thermoplastic norbornene-based resin dissolved or dispersed uniformly therein can be obtained.

Further, by properly adding a colorant such as dye and pigment to the film-forming solution as necessary, a colored unworked film can be obtained.

For the purpose of improving the surface smoothness of the unworked film thus obtained, the film-forming solution may have a leveling agent incorporated therein. As such a leveling agent there may be used any ordinary leveling agent. Specific examples of the leveling agent include fluorine-based nonionic surface active agents, special acrylic resin-based leveling agents, and silicone-based leveling agents.

As the carrier for forming the liquid layer of film-forming solution there may be used a metal drum, a steel belt, a film made of polyester such as polyethylene terephthalate (PET) and polyethylene naphthalate (PEN) or a polytetrafluoroethylene belt. The spreading of the film-forming solution can be carried out by a method using a die or coater, a spraying method, a brush coating method, a roll coating method, a spin coating method, a dipping method or the like.

By repeatedly spreading the film-forming solution, the thickness and surface smoothness of the unworked film thus obtained can be controlled.

In the case where as the carrier there is used a polyester film, a surface-treated film may be used.

As the surface treatment method there may be used any commonly practiced hydrophilicization method, e.g., method which comprises accumulating an acrylic resin or sulfonic base-containing resin by coating or lamination or a method which comprises enhancing the hydrophilicity of the surface of a film by corona discharge or the like.

The specific method for removing the solvent from the liquid layer in the solvent casting method is not specifically limited. Any commonly practiced drying method may be employed. For example, a method which comprises passing the liquid layer through a drying oven over a plurality of rollers may be employed. However, when the evaporation of the solvent is accompanied by bubbling at the drying step, the properties of the finally obtained specific retardation film are remarkably deteriorated. In order to avoid this trouble, it is preferred that the drying step consist of two or more steps where the temperature or air flow is controlled.

The residual solvent content in the unworked film thus obtained is normally 10% by weight or less, preferably 5% by weight or less, more preferably 1% by weight or less, particularly preferably 0.5% by weight or less. When the residual solvent content in the unworked film exceeds 10% by weight, the specific retardation film obtained by stretching the unworked film exhibits a great dimensional change with time in actual use to disadvantage. Further, the residual solvent causes the drop of glass transition temperature and hence the deterioration of heat resistance to disadvantage.

In order to fairly effect the stretching described later, it may be necessary that the residual solvent content in the unworked film be properly adjusted within the above defined range. In some detail, in order to stretch the film such that the film can be stably and uniformly provided with retardation, the residual solvent content in the unworked film may be predetermined to be normally from 0.1 to 10% by weight, preferably from 0.1 to 5% by weight, more preferably from 0.1 to 1% by weight. By allowing a slight amount of a solvent to remain in the unworked film, the unworked film can be easily stretched or easily controlled in its retardation.

In the invention, the thickness of the unworked film is normally from 1 to 500 μm (1,000 to 500,000 nm), preferably from 1 to 300 μm (1,000 to 300,000 nm), more preferably from 1 to 200 μm (1,000 to 200,000 nm), most preferably from 1 to 100 μm (1,000 to 100,000 nm). When the thickness of the unworked film falls below 1 μm, the unworked film can be substantially difficultly handled. On the other hand, in the case where the thickness of the unworked film is 500 μm or more, when the unworked film is wound up in rolled form, the unworked film is curled and thus can be difficultly handled during post-working step or the like.

The distribution of thickness of unworked film normally falls within ±20%, preferably ±10%, more preferably ±5% from average thickness. The fluctuation of thickness per cm is normally 10% or less, preferably 5% or less, more preferably 1% or less, particularly preferably 0.5% or less. By predetermining the thickness distribution of unworked film within the above defined range, the occurrence of retardation unevenness can be prevented during the stretching of the unworked film.

Specific examples of the stretching method for producing the specific retardation film include known monoaxial stretching method and biaxial stretching method.

In some detail, a crosswise monoaxial stretching method involving tenter method, a roll nip compressive stretching method, a longitudinal monoaxial stretching method using two sets of rolls having different circumferences, a biaxial stretching method having a crosswise monoaxial method and a longitudinal monoaxial method in combination, or a stretching method involving inflation method may be employed.

In the case of monoaxial stretching method, the stretching rate is normally from 1 to 5,000%/min, preferably from 50 to 1,000%/min, more preferably from 100 to 1,000%/min, particularly preferably from 100 to 500%/min.

In the case of biaxial stretching method, stretching may be effected in two directions at the same time or may be effected first in one direction and then in a direction different from the first stretching direction. During this procedure, the angle of crossing of two stretching axes for controlling the shape of index ellipsoid of the stretched film is determined by desired properties and thus is not specifically limited but is normally from 60° to 120°. The stretching rate may be the same or different from one stretching direction to another and is normally from 1 to 5,000%/min, preferably from 50 to 1,000%/min, more preferably from 100 to 1,000%/min, particularly preferably from 100 to 500%/min.

The temperature at which stretching is effected is not specifically limited but normally ranges within a range of Tg±30° C., preferably Tg±15° C., more preferably from Tg−5° C. to Tg+15° C. wherein Tg is the glass transition temperature of the thermoplastic norbornene-based resin used. When the stretching temperature falls within the above defined range, the occurrence of retardation unevenness can be suppressed. Further, the index ellipsoid can be easily controlled to advantage.

The stretching ratio is determined by the desired properties and thus is not specifically limited but is normally from 1.01 to 10, preferably from 1.03 to 5, more preferably from 1.03 to 3. When the stretching ratio is 10 or more, the retardation can be difficultly controlled.

The film thus stretched may be directly cooled but is preferably kept at an ambient temperature of from Tg−20° C. to Tg for at least 10 seconds or more, preferably from 30 seconds to 60 minutes, more preferably from 1 minute to 60 minutes so that it is thermally set. In this manner, a retardation film which exhibits little change of retardation of transmitted light and thus is stable can be obtained.

The percent thermal dimensional shrinkage of the specific retardation film is normally 10% or less, preferably 5% or less, more preferably 3% or less, particularly preferably 1% or less when the film is heated to 100° C. for 500 hours.

In order to predetermine the percent dimensional shrinkage within the above defined range, the raw materials of the thermoplastic norbornene-based resin, e.g., specific monomer a, specific monomer b or other copolymerizable monomers can be properly selected. In addition, the percent dimensional shrinkage can be controlled by casting method or stretching method.

The thermal percent shrinkage of the unworked film left unstretched is normally 5% or less, preferably 3% or less, more preferably 1% or less, particularly preferably 0.5% or less when the film is heated to 100° C. for 500 hours.

The film thus stretched has molecules aligned therein as a result of stretching and thus gives retardation to transmitted light. The retardation can be controlled by adjusting the kind of the thermoplastic norbornene-based resin to be used as a raw material, the stretching ratio, the stretching temperature, the thickness of the unstretched film (unworked film) or the like. Referring now to stretching ratio, even if the thickness of the unstretched films are the same, the greater the stretching ratio of the film is, the greater is the absolute value of retardation of transmitted light. Thus, by changing the stretching ratio, a film capable of giving a desired retardation to transmitted light can be obtained. Referring to the thickness of unstretched film (unworked film), even if the stretching ratio of the unstretched films are the same, the greater the thickness of the unstretched film is, the greater is the absolute value of retardation given to transmitted light. Thus, by changing the thickness of the unstretched film, a retardation film capable of giving a desired retardation to transmitted light can be obtained. Referring to the stretching temperature, the lower the stretching temperature is, the greater is the absolute value of retardation of transmitted light. Thus, by changing the stretching temperature, a retardation film capable of giving a desired retardation to transmitted light can be obtained.

In order to adjust the thickness of the specific retardation film, the thickness of the specific retardation film can be controlled by adjusting the thickness of the unworked film, the stretching ratio or the like. In some detail, the thickness of the retardation film can be reduced by reducing the thickness of the unworked film or by raising the stretching ratio.

The number of bright points on the aforementioned specific retardation film per $m^2$ is 10 or less, preferably 7 or less, more preferably 5 or less, particularly 3 or less, most preferably 0 or 1.

The term "bright point" as used herein is meant to indicate partial light leakage visually observed as viewed with the specific retardation film disposed interposed between polarizing plates aligned in crossed Nicols. In general, those having an outer diameter of 1 μm or more (diameter if the light leakage is circular or longitudinal length if the light leakage has any of other shapes) are measured.

Of course, those having a smaller size may be measured as bright point depending on the properties required. The bright point is presumably attributed to partial unevenness in retardation in a small area. In other words, when the unworked film has foreign matters or bubbles present therein, even if those are too small to be visually observed, stress is concentrated into the site having foreign matters or bubbles when the film is stretched. Thus, the retardation of the site into which stress has been concentrated may differ from that of the peripheral sites. It is thought that this retardation difference causes light leakage.

Further, the number of foreign matters on the specific retardation film per m² is preferably 10 or less, more preferably 5 or less, particularly preferably 3 or less, most preferably 0 or 1.

The term "foreign matters" as used herein is meant to indicate those which substantially prevent the transmission of light by the specific retardation film. When these foreign matters are present in the specific retardation film, the intensity of light transmitted by the specific retardation film is affected. Accordingly, when such a retardation film is used in liquid crystal displays, etc., pixel drop or deterioration of characteristics can occur.

The size of the foreign matters to be measured is normally 1 μm or more as calculated in terms of outer diameter (diameter if the light leakage is circular or longitudinal length if the light leakage has any of other shapes) but may be smaller than this range depending on the properties required.

(Retardation of Film)

The retardation of the stretched polymer film of the invention thus obtained satisfies the following relationships (A2), (B2), (G) to (J):

$$30 \text{ nm} < Re(546) < 400 \text{ nm} \quad (A2)$$

$$30 \text{ nm} < Rth(546) < 400 \text{ nm} \quad (B2)$$

$$0.95 < Re(480)/Re(546) < 1.05 \quad (G)$$

$$0.95 < Re(628)/Re(546) < 1.05 \quad (H)$$

$$0.95 < Rth(480)/Rth(546) < 1.05 \quad (I)$$

$$0.95 < Rth(628)/Rth(546) < 1.05 \quad (J)$$

The relationship (A2) is more preferably 40 nm<Re (546) <300 nm, most preferably 40 nm<Re (546)<200 nm.

The relationship (B2) is more preferably 50 nm<Rth (546) <300 nm, most preferably 70 nm<Rth (546)<250 nm.

The relationships (G) and (H) are more preferably 0.98<Re (480)/Re (546)<1.02 and 0.98<Re (628)/Re (546)<1.02, respectively.

By predetermining the wavelength dispersion of retardation within the above defined range, an optical compensation sheet having a great effect of improving contrast and tint can be obtained.

The terms "Re" and "Rth" as used herein are meant to indicate in-plane retardation and thickness direction retardation, respectively. Re(λ) is measured by the incidence of light having a wavelength λ nm in the direction normal to the film in "KOBRA 21ADH" (produced by Ouji Scientific Instruments Co. Ltd.). Rth(λ) is calculated by "KOBRA 21ADH" on the basis of retardation values measured in the total three directions, i.e., Re(λ), retardation value measured by the incidence of light having a wavelength λ nm in the direction inclined at an angle of +40° from the direction normal to the film with the in-plane slow axis (judged by "KOBRA 21ADH") as an inclined axis (rotary axis), retardation value measured by the incidence of light having a wavelength λ nm in the direction inclined at an angle of −40° from the direction normal to the film. As a hypothetical average refractive index there may be used one disclosed in "Polymer Handbook", John Wiley & Sons, Inc. and various catalogues of optical films. For the cellulose acylate films having an unknown average refractive index, an Abbe refractometer may be used.

The average refractive index of main optical films are exemplified below. Cellulose acylate (1.48), cycloolefin polymer (1.52), polycarbonate (1.59), polymethylene methacrylate (1.49), polystyrene (1.59). By inputting the hypothetic average refractive indexes and film thicknesses, KOBRA 21ADH calculates $n_x$, $n_y$ and $n_z$. $Nz=(n_x-n_z)/(n_y-n_z)$ also is calculated by the $n_x$, $n_y$, and $n_z$.

(Photoelastic Modulus)

The photoelastic modulus of the stretched polymer film according to the invention is preferably $50 \times 10^{-8}$ cm²/N or less, more preferably $4 \times 10^{-8}$ cm²/N, even more preferably $3 \times 10^{-8}$ cm²/N ($5 \times 10^{-13}$ cm²/dyn). When the photoelastic modulus of the stretched polymer film falls within the above defined range, the retardation change of the optical compensation film developed when exposed to high temperature and humidity while being incorporated in polarizing plate can be eliminated to advantage. In the case where the optical compensation film of the invention having an optical anisotropic layer provided on a stretched polymer film is used as a protective film for polarizing plate, when two sheets of protective film disposed on the both sides of the polarizer have different photoelastic moduli, it is preferred that the photoelastic modulus of the protective film on the liquid crystal cell side be smaller than that of the protective film on the air side. The photoelastic modulus can be determined by means of an ellipsometer (produced by Shimadzu Corporation).

(Moisture Permeability)

For the determination of moisture permeability, various samples are each measured for moisture permeability according to JIS Z 0208. The moisture permeability is then calculated in terms of water content (g) evaporated per m² in 24 hours. The moisture permeability of the protective film for polarizing plate is one of film physical properties closely related to the durability of the polarizing plate. It is known that the deterioration of polarization properties of a polyvinyl alcohol polarizer dyed with iodine by deiodization is accelerated by water content. In order to remove the water content by drying during the production of polarizing plate, the moisture permeability of the protective film is preferably lowered. On the other hand, the moisture permeability during the production of polarizing plate is preferably low because the entrance of water content from the exterior can be suppressed.

Accordingly, in order to satisfy the opposing requirements, it is necessary that the protective film for polarizing plate have a proper water permeability. Accordingly, the moisture permeability of the stretched polymer film to be stuck to the polarizer as a protective film for polarizing plate at 60° C.-90% RH for 24 hr is preferably not smaller than 1 g/m² to not greater than 1,000 g/m², more preferably from not smaller than 10 g/m² to not greater than 700 g/m².

(Equilibrium Water Content)

For the evaluation of water content of a film, the film may be measured for equilibrium water content at predetermined temperature and humidity. The equilibrium water content of a film can be calculated by allowing the film sample to stand at 25° C. and 80% RH for 24 hours, measuring the water content of the sample thus equilibrated by Karl Fischer method, and then dividing the water content (g) by the weight (g) of the sample.

The equilibrium water content of the stretched polymer film according to the invention at 25° C. and 80% RH is preferably not smaller than 0.01% by weight to not greater than 2% by weight, more preferably from not smaller than 0.01% by weight to not greater than 1% by weight.

(Surface Treatment of Film)

The stretched polymer film according to the invention is preferably subjected to hydrophilicization to have an assured adhesion to the polarizer, the optical anisotropic layer or the alignment layer disposed between the optical anisotropic layer and the stretched polymer film of the invention.

The surface treatment can be carried out by a method which comprises providing an adhesive layer as disclosed in JP-A-2000-24167, JP-A-10-130402, JP-A-2002-148436, JP-A-2002-90546 and JP-A-2001-350017 or a surface treatment method such as corona discharge as disclosed in JP-A-2001-350018.

<Stretched Cellulose Acylate Film>

A stretched cellulose acylate film of the invention will be further described hereinafter.

(Cellulose Acylate Film)

A cellulose acylate to be used in the invention will be first described.

The substitution degree of cellulose acylate means the acylation ratio of three hydroxyl groups present in the constituent unit of cellulose (β1→4-glycoside-bonded glucose). The substitution degree (acylation degree) can be calculated from the measurements of the amount of bonded aliphatic acid per unit weight of constituent of cellulose. The measurement is effected according to ASTM D817-91.

The cellulose acylate of the invention is a preferably a cellulose acetate having an acylation degree of from not smaller than 2.00 to not greater than 2.90, more preferably from not smaller than 2.2 to not greater than 2.8.

Another preferred cellulose acylate of the invention is a mixed aliphatic ester having an acylation degree of from not smaller than 2 to not greater than 2.9 comprising an acetyl group and a $C_3$-$C_4$ acyl group. The acylation degree of the cellulose acylate is more preferably from not smaller than 2.2 to not greater than 2.85, most preferably from not smaller than 2.4 to not greater than 2.8. Further, the acetylation degree of the cellulose acylate is preferably less than 2.5, more preferably less than 1.9.

The ratio of acylation degree of 6-position to total acylation degree is preferably not smaller than 0.25, more preferably not smaller than 0.3.

The cellulose acylate to be used in the invention preferably has a weight-average molecular weight of from 350 to 800, more preferably from 370 to 600. Further, the cellulose acylate to be used in the invention preferably has a number-average molecular weight of from 70,000 to 230,000, more preferably from 75,000 to 230,000, most preferably from 78,000 to 120,000.

The cellulose acylate to be used in the invention can be synthesized in the presence of an acid anhydride or acid chloride as an acylating agent. In the case where the acylating agent is an acid anhydride, an organic acid (e.g., acetic acid) or methylene chloride is used as a reaction solvent. As a catalyst there is used a protonic catalyst such as sulfuric acid. In the case where the acylating agent is an acid chloride, a basic compound is used as a catalyst. In the mostly industrial synthetic method, a cellulose is esterified with an organic acid (acetic acid, propionic acid, butyric acid) corresponding to acetyl group and other acyl groups or a mixed organic acid component containing an acid anhydride thereof (acetic anhydride, propionic anhydride, butyric anhydride) to synthesize a cellulose ester.

In this method, a cellulose such as cotton linter and wood pulp is activated with an organic acid such as acetic acid, and then esterified with a mixed solution of organic acid components as described above in the presence of a sulfuric acid catalyst in most cases. The organic acid anhydride is normally used in excess at stoichiometric point with respect to hydroxyl group present in the cellulose. In this esterification process, hydrolysis reaction (depolymerization reaction) of cellulose main chain (β1→4-glycoside bond) proceeds in addition to the esterification reaction. When the hydrolysis reaction of the main chain proceeds, the polymerization degree of cellulose ester drops, deteriorating the physical properties of the cellulose ester film thus produced. Therefore, the reaction conditions such as reaction temperature is preferably determined taking into account the polymerization degree or molecular weight of the cellulose ester thus obtained.

In order to obtain a cellulose ester having a polymerization degree (high molecular weight), it is important to adjust the highest temperature at the esterification step to 50° C. or less, preferably from 35° C. to 50° C., more preferably from 37° C. to 47° C. When the highest temperature is 35° C. or less, the esterification reaction can smoothly proceed to advantage. When the reaction temperature is 50° C. or less, no troubles such as drop of polymerization degree of cellulose ester can occur to advantage.

When the reaction is suspended while suppressing the temperature rise after esterification reaction, the drop of polymerization degree can be further suppressed, making it possible to synthesize a cellulose ester having a high polymerization degree. In other words, when a reaction stopper (e.g., water, acetic acid) is added after the termination of reaction, the excessive acid anhydride which has not taken part in the esterification reaction is hydrolyzed to produce a corresponding organic acid as a by-product. This hydrolysis reaction is accompanied by violent heat generation that causes the rise of the temperature in the reaction device. When the adding rate of the reaction stopper is not too great, no problem can occur that heat is suddenly generated in excess of the cooling capacity of the reaction device, causing remarkable progress of hydrolysis reaction of cellulose main chain and hence the drop of polymerization degree of cellulose ester thus obtained. Further, during the esterification reaction, the catalyst is partly bonded to the cellulose. The majority of the catalyst bonded to the cellulose is then dissociated from the cellulose during the addition of the reaction stopper. When the adding rate of the reaction stopper is not too great, reaction time long enough to dissociate the catalyst from the cellulose can be assured, making it difficult for catalyst to be partly left bonded to the cellulose. The cellulose ester having a strong acid catalyst partly bonded thereto has a very poor stability and thus can be easily decomposed to reduce its polymerization degree when the product is heated and dried. For these reasons, the reaction stopper is preferably added in 4 minutes or more, more preferably from 4 to 30 minutes after esterification reaction to stop the reaction. When the reaction stopper is added in 30 minutes or less, no problem such as drop of industrial productivity can occur.

As the reaction stopper there is normally used water or an alcohol capable of decomposing an acid anhydride. In the invention, however, a mixture of water and an organic acid is preferably used as a reaction stopper to prevent the precipitation of a triester having a low solubility in the various organic solvents. When the esterification reaction is effected under the aforementioned conditions, a high molecular cellulose ester having a weight-average molecular weight of 500 or more can be easily synthesized.

The stretched cellulose acylate film of the invention preferably contains a retardation developing agent. The retardation developing agent of the invention will be further described hereinafter.

The retardation developing agent of the invention preferably exhibits a molar absorptivity of 1,000 or less at a wavelength of from not smaller than 360 nm to 750 nm to prevent unnecessary coloring of the film. More preferably, the molar absorptivity of the retardation developing agent is 1,000 or less at a wavelength of not smaller than 330 nm to not greater than 750 nm. The use of a retardation developing agent having a molar absorptivity of 1,000 or less at a wavelength of not smaller than 330 nm to not greater than 750 nm makes it easy to obtain a cellulose acylate film satisfying the aforementioned relationships (C) and (D) to advantage.

For the measurement of molar absorptivity, a commercially available spectrophotometer (e.g., UV3400, produced by Shimadzu Corporation) may be used.

The retardation developing agent of the invention is preferably a compound represented by the formula (11). The compound represented by the formula (11) will be further described hereinafter.

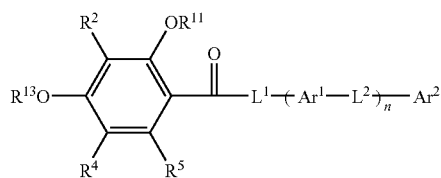

wherein $R^2$, $R^4$ and $R^5$ each independently represent a hydrogen atom or substituent; $R^{11}$ and $R^{13}$ each independently represent a hydrogen atom or alkyl group; $L^1$ and $L^2$ each independently represent a single bond or divalent group; $Ar^1$ represents an arylene group or aromatic heterocyclic group; $Ar^2$ represents an aryl group or aromatic heterocyclic group; n represents an integer of 3 or more; and $L^2$'s and $Ar^1$'s present in a number of n may be the same or different, with the proviso that $R^{11}$ and $R^{13}$ are different from each other and the alkyl group represented by $R^{13}$ is free of hetero atom.

In the formula (11), $R^2$, $R^4$ and $R^5$ each independently represent a hydrogen atom or substituent. As the substituent there may be used a substituent T described later.

$R^2$ is preferably a hydrogen atom, alkyl group, alkoxy group, amino group or hydroxyl group, more preferably a hydrogen atom, alkyl group or alkoxy group, even more preferably a hydrogen atom, alkyl group (preferably having from 1 to 4 carbon atoms, more preferably methyl group), alkoxy group (preferably having from 1 to 12 carbon atoms, more preferably from 1 to 8 carbon atoms, even more preferably from 1 to 6 carbon atoms, particularly preferably from 1 to 4 carbon atoms), particularly preferably a hydrogen atom, methyl group or methoxy group, most preferably a hydrogen atom.

$R^4$ is preferably a hydrogen atom or electron-donating group, more preferably a hydrogen atom, alkyl group, alkoxy group, amino group or hydroxyl group, more preferably a hydrogen atom, $C_1$-$C_4$ alkyl group, $C_1$-$C_{12}$ alkoxy group (preferably having from 1 to 12 carbon atoms, more preferably from 1 to 8 carbon atoms, even more preferably from 1 to 6 carbon atoms, particularly preferably from 1 to 4 carbon atoms), particularly preferably a hydrogen atom or $C_1$-$C_4$ alkyl group, $C_1$-$C_4$ alkoxy group, most preferably a hydrogen or methoxy group.

$R^5$ is preferably a hydrogen atom, halogen atom, alkyl group, alkoxy group, amino group or hydroxyl group, more preferably a hydrogen atom, alkyl group or alkoxy group, more preferably a hydrogen atom, alkyl group (preferably having from 1 to 4 carbon atoms, more preferably methyl group) or alkoxy group (preferably having from 1 to 12 carbon atoms, more preferably from 1 to 8 carbon atoms, even more preferably from 1 to 6 carbon atoms, particularly preferably from 1 to 4 carbon atoms), particularly preferably a hydrogen atom, methyl group or methoxy group, most preferably a hydrogen atom.

R11 and R13 each independently represent a hydrogen atom or alkyl group. $R^{11}$ and $R^{13}$ are different from each other and the alkyl group represented by $R^{13}$ is free of hetero atom. The term "hetero atom" as used herein is meant to indicate an atom other than hydrogen atom and carbon atom such as oxygen atom, nitrogen atom, sulfur atom, phosphor atom, silicon atom, halogen atom (F, Cl, Br, I) and boron atom.

The alkyl group represented by $R^{11}$ or $R^{13}$ is a straight-chain, branched or cyclic substituted or unsubstituted alkyl group. Preferred examples of such an alkyl group include substituted or unsubstituted $C_1$-$C_{30}$ alkyl groups, substituted or unsubstituted $C_3$-$C_{30}$ cycloalkyl groups, substituted or unsubstituted $C_5$-$C_{30}$ bicycloalkyl groups (i.e., monovalent group obtained by removing one hydrogen atom from $C_5$-$C_{30}$ bicycloalkane), and tricyclostructure having many cyclic structures.

Preferred examples of the alkyl group represented by $R^{11}$ or $R^{13}$ include methyl, ethyl, n-propyl, isopropyl, n-butyl, sec-butyl, t-butyl, n-pentyl, iso-pentyl, n-hexyl, n-heptyl, n-octyl, tert-octyl, 2ethylhexyl, n-nonyl, 1,1,3-trimethylhexyl, n-decyl, 2-hexyldecyl, cyclohexyl, cycloheptyl, 2-hexenyl, oleyl, linoleyl, and linonenyl. Examples of the cycloalkyl group include cyclohexyl, cyclopentyl, and 4-n-dodecylcyclohexyl. Examples of the bicylcoalkyl group include bicyclo[1,2,2]heptane-2-il, and bicyclo[2,2,2]octane-3-il.

$R^{11}$ is more preferably a hydrogen atom, methyl group, ethyl group, n-propyl group or isopropyl group, particularly preferably a hydrogen atom or methyl group, most preferably a methyl group.

$R^{13}$ is particularly preferably an alkyl group having two or more carbon atoms, more preferably three or more carbon atoms. Those having a branched or cyclic structure are particularly preferably used.

Specific examples of the alkyl group represented by $R^{13}$ will be given below, but the invention is not limited thereto.

O-1
—CH₃

O-2
—C₂H₅

O-3
—C₃H₇(n)

O-4
—C₃H₇(i)

O-5
—C₄H₉(n)

O-6
—C(CH₃)₃

O-7
—C₅H₁₁(n)

O-8
—CH₂CH₂CH(CH₃)CH₃

-continued

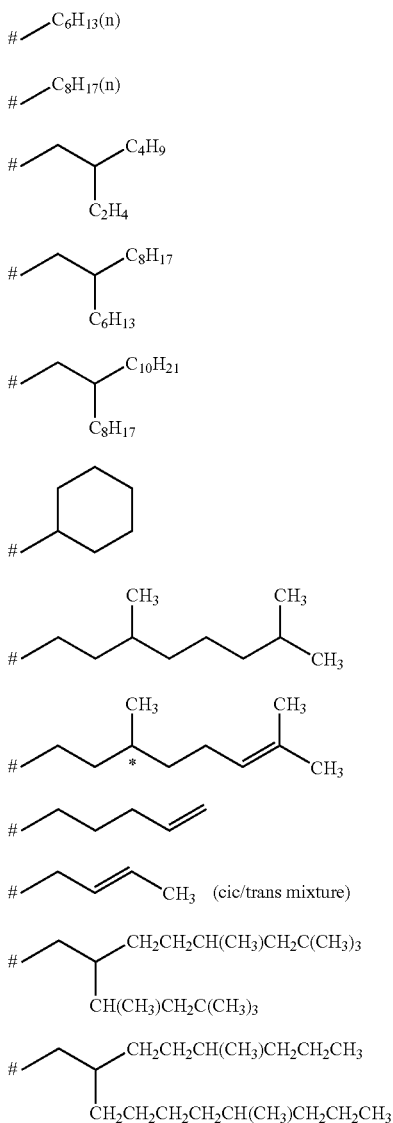

| | |
|---|---|
| | O-9 |
| | O-10 |
| | O-11 |
| | O-12 |
| | O-13 |
| | O-14 |
| | O-15 |
| | O-16 |
| | O-17 |
| | O-18 |
| | O-19 |
| | O-20 |

In the aforementioned examples, the symbol # indicates the oxygen atom side of the molecule.

$Ar^1$ represents an arylene group or aromatic heterocyclic group. All $Ar^1$'s in the repeating unit may be the same or different. $Ar^2$ represents an aryl group or aromatic heterocyclic group.

In the formula (11), the arylene group represented by $Ar^1$ is preferably a $C_6$-$C_{30}$ arylene group which may be monocyclic or may form a condensed ring with other cycles. If possible, the arylene group may have substituents. As such a substituent there may be used a substituent T described later. The arylene group represented by $Ar^1$ is more preferably a $C_6$-$C_{20}$, particularly preferably $C_6$-$C_{12}$ arylene group such as phenylene group, p-methylphenylene group and naphthylene group.

In the formula (11), the aryl group represented by $Ar^2$ is preferably a $C_6$-$C_{30}$ aryl group which may be monocyclic or may form a condensed ring with other cycles. If possible, the aryl group may have substituents. As such a substituent there may be used a substituent T described later. The arylene group represented by $Ar^2$ is more preferably a $C_6$-$C_{20}$, particularly preferably $C_6$-$C_{12}$ arylene group such as phenylene group, p-methylphenylene group and naphthylene group.

In the formula (11), the aromatic heterocyclic group represented by $Ar^1$ or $Ar^2$ may be an aromatic heterocyclic group containing at least one of oxygen atom, nitrogen atom and sulfur atom, preferably a 5-membered or 6-membered aromatic heterocyclic group containing at least one of oxygen atom, nitrogen atom and sulfur atom. If possible, the aromatic heterocyclic group may further have substituents. As such a substituent there may be used a substituent T described later.

Specific examples of the aromatic heterocyclic group represented by $Ar^1$ or $Ar^2$ in the formula (11) include furane, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole, tetrazaindene, pyrrolotriazole, and pyrazolotriazole. Preferred examples of the aromatic heterocyclic group include benzimidazole, benzoxazole, and benzotriazole.

In the formula (11), $L^1$ and $L^2$ each independently represent a single bond or divalent connecting group. $L^1$ and $L^2$ may be the same or different. All $L^2$'s in the repeating unit may be the same or different.

Preferred examples of the divalent connecting group include —O—, —NR— (in which R represents a hydrogen atom or an alkyl or aryl group which may have substituents), —CO—, —SO$_2$—, —S—, alkylene group, substituted alkylene group, alkenylene group, substituted alkenylene group, alkinylene group, and group obtained by the combination of two or more thereof. More desirable among these divalent connecting groups are —O—, —NR—, —CO—, —SO$_2$NR—, —NRSO$_2$—, —CONR—, —NRCO—, —COO—, —OCO—, and alkinylene group. R is preferably a hydrogen atom.

In the compound represented by the formula (11) of the invention, $Ar^1$ is connected to $L^1$ and $L^2$. When $Ar^1$ is a phenylene group, $L^1$-$Ar^1$-$L^2$ and $L^2$-$Ar^1$-$L^2$ are most preferably in para-position (1,4-position) relationship.

In the formula (11), n represents an integer of 3 or more, preferably from 3 to 7, more preferably from 3 to 7, even more preferably from 3 to 6.

Among the compounds represented by the formula (11), those represented by the following formulae (12) and (13) are particularly preferred.

Formula (12):

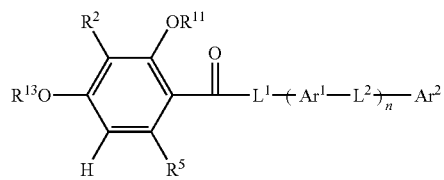

wherein $R^2$ and $R^5$ each independently represent a hydrogen atom or substituent; $R^{11}$ and $R^{13}$ each independently represent a hydrogen atom or alkyl group; $L^1$ and $L^2$ each independently represent a single bond or divalent group; $Ar^1$ represents an arylene group or aromatic heterocyclic group; $Ar^2$ represents an aryl group or aromatic heterocyclic group; n represents an integer of 3 or more; and $L^2$'s and $Ar^1$'s present in a number of n may be the same or different, with the proviso that $R^{11}$ and $R^{13}$ are different from each other and the alkyl group represented by $R^{13}$ is free of hetero atom.

In the formula (12), $R^2$, $R^5$, $R^{11}$ and $R^{13}$ are as defined in the formula (11), including their preferred ranges. Further, $L^1$, $L^2$, $Ar^1$ and $Ar^2$ are as defined in the formula (11), including their preferred ranges.

Formula (13):

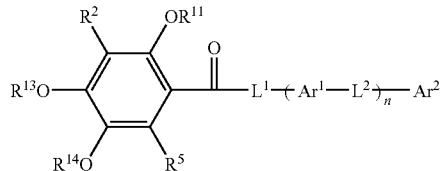

wherein $R^2$ and $R^5$ each independently represent a hydrogen atom or substituent; $R^{11}$, $R^{13}$ and $R^{14}$ each independently represent a hydrogen atom or alkyl group; $L^1$ and $L^2$ each independently represent a single bond or divalent group; $Ar^1$ represents an arylene group or aromatic heterocyclic group; $Ar^2$ represents an aryl group or aromatic heterocyclic group; n represents an integer of 3 or more; and $L^2$'s and $Ar^1$'s present in a number of n may be the same or different, with the proviso that $R^{11}$ and $R^{13}$ are different from each other and the alkyl group represented by $R^{13}$ is free of hetero atom.

In the formula (13), $R^2$, $R^5$, $R^{11}$ and $R^{13}$ are as defined in the formula (11), including their preferred ranges. Further, $L^1$, $L^2$, $Ar^1$ and $Ar^2$ are as defined in the formula (11), including their preferred ranges.

$R^{14}$ represents a hydrogen atom or alkyl group. As the alkyl group of $R^{14}$ there may be used any one of those exemplified as preferred examples with reference to $R^{11}$ and $R^{13}$. $R^{14}$ is preferably a hydrogen atom or $C_1$-$C_4$ alkyl group, more preferably a hydrogen atom or $C_1$-$C_3$ alkyl group, even more preferably a methyl group. $R^{11}$ and $R^{14}$ may be the same or different. It is particularly preferred that $R^{11}$ and $R^{14}$ be a methyl group at the same time.

Compounds represented by the formula (14-A) or (14-B) are also preferred.

Formula (14-A):

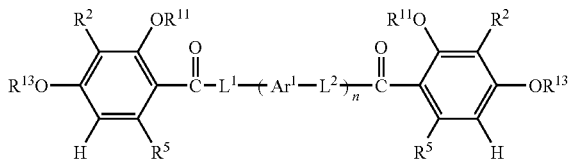

wherein $R^2$ and $R^5$ each independently represent a hydrogen atom or substituent; $R^{11}$ and $R^{13}$ each independently represent a hydrogen atom or alkyl group; $L^1$ and $L^2$ each independently represent a single bond or divalent group; $Ar^1$ represents an arylene group or aromatic heterocyclic group; n represents an integer of 3 or more; and $L^2$'s and $Ar^1$'s present in a number of n may be the same or different, with the proviso that $R^{11}$ and $R^{13}$ are different from each other and the alkyl group represented by $R^{13}$ is free of hetero atom.

In the formula (14-A), $R^2$, $R^5$, $R^{11}$, $R^{13}$, $L^1$, $L^2$, $Ar^1$ and n are as defined in the formula (11), including their preferred ranges.

Formula (14-B):

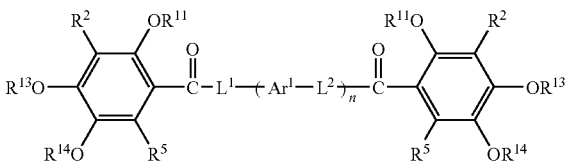

wherein $R^2$ and $R^5$ each independently represent a hydrogen atom or substituent; $R^{11}$, $R^{13}$ and $R^{14}$ each independently represent a hydrogen atom or alkyl group; $L^1$ and $L^2$ each independently represent a single bond or divalent group; $Ar^1$ represents an arylene group or aromatic heterocyclic group; n represents an integer of 3 or more; and $L^2$'s and $Ar^1$'s present in a number of n may be the same or different, with the proviso that $R^{11}$ and $R^{13}$ are different from each other and the alkyl group represented by $R^{13}$ is free of hetero atom.

In the formula (14-B), $R^2$, $R^5$, $R^{11}$, $R^{13}$, $R^{14}$, $L^1$, $L^2$, $Ar^1$ and n are as defined in the formula (11), including their preferred ranges.

The aforementioned substituent T will be further described hereinafter.

Preferred examples of the substituent T include halogen atoms (e.g., fluorine, chlorine, bromine, iodine), alkyl groups (preferably $C_1$-$C_{30}$ alkyl group, e.g., methyl, ethyl, n-propyl, isopropyl, t-butyl, n-octyl, 2-ethylhexyl), cycloalkyl groups (preferably $C_3$-$C_{30}$ substituted or unsubstituted cycloalkyl group, e.g., cyclohexyl, cyclopentyl, 4-n-dodecylhexyl), bicycloalkyl groups (preferably $C_5$-$C_{30}$ substituted or unsubstituted bicycloalkyl group, i.e., monovalent group obtained by removing one hydrogen atom from $C_5$-$C_{30}$ bicycloalkane, e.g., bicyclo[1,2,2]heptane-2-il, bicyclo[2,2,2]octane-3-il), alkenyl groups (preferably $C_2$-$C_{30}$ substituted or unsubstituted alkenyl group, e.g., vinyl group and allyl group), cycloalkenyl groups (preferably $C_3$-$C_{30}$ substituted or unsubstituted cycloalkenyl group, i.e., monovalent group obtained by removing one hydrogen atom from $C_3$-$C_{30}$ cycloalkene, e.g., 2-cyclopentene-1-il, 2-cyclohexene-1-il), bicycloalkenyl groups (substituted or unsubstituted bicycloalkeneyl group, preferably $C_5$-$C_{30}$ substituted or unsubstituted bicycloalkenyl group, i.e., monovalent group obtained by removing one hydrogen atom from bicycloalkene having one double bond, e.g., bicyclo[2,2,1]hepto-2-ene-1-il, bicyclo[2,2,2]octo-2-ene-4-il), alkinyl groups (preferably $C_2$-$C_{30}$ substituted or unsubstituted alkinyl group, e.g., ethinyl group, propargyl group), aryl groups (preferably $C_6$-$C_{30}$ substituted or unsubstituted aryl group, e.g., phenyl group, p-tollyl group, naphthyl group), heterocyclic groups (preferably monovalent group obtained by removing one hydrogen atom from 5-membered or 6-membered substituted or unsubstituted aromatic or nonaromatic heterocyclic compound, more preferably $C_3$-$C_{30}$ 5-membered or 6-membered aromatic heterocyclic group, e.g., 2-furyl group, 2-chenyl group, 2-pyridyl group, 2-pyrimidinyl group, 2-benzothiazolyl group), cyano groups, hydroxyl groups, nitro groups, carboxyl groups, alkoxy groups (preferably $C_1$-$C_{30}$ substituted or unsubstituted alkoxy groups, e.g., methoxy group, ethoxy group, isopropoxy group, t-butoxy group, n-octyloxy group, 2-methoxy ethoxy group), aryloxy groups (preferably $C_6$-$C_{30}$ substituted or unsubstituted aryloxy group, e.g., phenoxy group, 2-methylphenoxy group, 4-tert-butyl phenoxy group, 3-nitrophenoxy group, 2-tetradecanoyl aminophenoxy group), silyloxy groups (preferably $C_3$-$C_{20}$ silyloxy group, e.g., trimethylsilyloxy group, tert-butyldimethylsilyloxy group), heterocyclic oxy groups (preferably $C_2$-$C_{30}$ substituted or unsubstituted heterocyclic oxy group, e.g., 1-phenyltetrazole-5-oxy group, 2-tetrahydropyranyloxy group), acyloxy groups (preferably formyloxy group, $C_2$-$C_{30}$ substituted or unsubstituted alkylcarbonyloxy group, $C_6$-$C_{30}$ substituted or unsubstituted arylcarbonyloxy group, e.g., formyloxy group, acetyloxy group, pivaloyloxy group, stearoyloxy group, benzoyloxy group, p-methoxyphenylcarbonyloxy group), carbamoyloxy groups (preferably $C_1$-$C_{30}$ substituted or unsubstituted carbamoyloxy group, e.g., N,N-dimethylcarbamoyloxy group, N,N-diethylcarbamoyl oxy group, morpholinocarbonyloxy group, N,N-di-n-octylaminocarbonyloxy group, N-n-octylcarbamoyloxy group), alkoxycarbonyloxy groups (preferably $C_2$-$C_{30}$ substituted or unsubstituted alkoxycarbonyloxy group, e.g., methoxycarbonyloxy group, ethoxycarbonyloxy group, tert-butoxycarbonyloxy group, n-octylcarbonyloxy group), aryloxycarbonyloxy groups (preferably $C_7$-$C_{30}$ substituted or unsubstituted aryloxycarbonyloxy group, e.g., phenoxycarbonyloxy group, p-methoxyphenoxy carbonyloxy group, p-n-hexadecyloxyphenoxycarbonyloxy group), amino groups (preferably amino group, $C_1$-$C_{30}$ substituted or unsubstituted alkylamino group, $C_6$-$C_{30}$ substituted or unsubstituted anilino group, e.g., amino group, methylamino group, dimethylamino group, anilino group, N-methyl-anilino group, diphenylamino group), acylamino groups (preferably formylamino group, $C_1$-$C_{30}$ substituted or unsubstituted alkylcarbonylamino group, $C_6$-$C_{30}$ substituted or unsubstituted arylcarbonylamino group, e.g., formylamino group, acetylamino group, pivaloylamino group, lauroylamino group, benzoylamino group), aminocarbonylamino groups (preferably $C_1$-$C_{30}$ substituted or unsubstituted aminocarbonylamino group, e.g., carbamoylamino group, N,N-dimethylaminocarbonyl amino group, N,N-diethylaminocarbonylamino group, morpholinocarbonylamino group), alkoxycarbonylamino groups (preferably $C_2$-$C_{30}$ substituted or unsubstituted alkoxycarbonylamino group, e.g., methoxycarbonylamino group, ethoxycarbonylamino group, tert-butoxycarbonylamino group, n-octadecyloxycarbonyl amino group, N-methyl-methoxycarbonylamino group), aryloxycarbonylamino groups (preferably $C_7$-$C_{30}$ substituted or unsubstituted aryloxycarbonylamino group, e.g., phenoxycarbonylamino group, p-chlorophenoxy carbonylamino group, m-n-octyloxyphenoxycarbonylamino group), sulfamoylamino groups (preferably $C_0$-$C_{30}$ substituted or unsubstituted sulfamoylamino group, e.g., sulfamoylamino group, N,N-dimethylaminosulfonylamino group, N-n-octylaminosulfonylamino group), alkylsulfonyl groups and arylsulfonyl groups (preferably $C_1$-$C_{30}$ substituted or unsubstituted alkylsulfonylamino group, $C_6$-$C_{30}$ arylsulfonylamino group, e.g., methylsulfonylamino group, butylsulfonylamino group, phenylsulfonylamino group, 2,3,5-trichlorophenylsulfonylamino group, p-methylphenyl sulfonylamino group), mercapto groups, alkylthio groups (preferably $C_1$-$C_{30}$ substituted or unsubstituted alkylthio group, e.g., methylthio group, ethylthio group, n-hexadecylthio group), arylthio groups (preferably $C_6$-$C_{30}$ substituted or unsubstituted arylthio group, e.g., phenylthio group, p-chlorophenylthio group, m-methoxy phenylthio group), heterocyclic thio groups (preferably $C_2$-$C_{30}$ substituted or unsubstituted heterocyclic thio group, e.g., 2-benzothiazolylthio group, 1-phenyl tetrazole-5-ilthio group), sulfamoyl groups (preferably $C_0$-$C_{30}$ substituted or unsubstituted sulfamoyl group, e.g., N-ethylsulfamoyl group, N-(3-dodecyloxypropyl)sulfamoyl group, N,N-dimethylsulfamoyl group, N-acetyl sulfamoyl group, N-benzoylsulfamoyl group, N-(N'-phenyl carbamoyl)sulfamoyl group), sulfo groups, alkylsulfinyl groups and arylsulfinyl groups (preferably $C_1$-$C_{30}$ substituted or unsubstituted alkylsulfinyl group, $C_6$-$C_{30}$ substituted or unsubstituted arylsulfinyl group, e.g., methylsulfinyl group, ethylsulfinyl group, phenylsulfinyl group, p-methylsulfinyl group), alkylsulfonyl groups and arylsulfonyl groups (preferably $C_1$-$C_{30}$ substituted or unsubstituted alkylsulfonyl group, $C_6$-$C_{30}$ substituted or unsubstituted arylsulfonyl group, e.g., methylsulfonyl group, ethylsulfonyl group, phenylsulfonyl group, p-methyl phenylsulfonyl group), acyl groups (preferably formyl group, $C_2$-$C_{30}$ substituted or unsubstituted alkylcarbonyl group, $C_7$-$C_{30}$ substituted or unsubstituted arylcarbonyl group, e.g., acetyl group, pivaloylbenzoyl group), aryloxycarbonyl groups (preferably $C_7$-$C_{30}$ substituted or unsubstituted aryloxycarbonyl group, e.g., phenoxycarbonyl group, o-chlorophenoxycarbonyl group, m-nitrophenoxycarbonyl group, p-tert-butylphenoxycarbonyl group), alkoxycarbonyl groups (preferably $C_2$-$C_{30}$ substituted or unsubstituted alkoxycarbonyl group, e.g., methoxycarbonyl group, ethoxycarbonyl group, tert-butoxycarbonyl group, n-octadecyloxycarbonyl group), carbamoyl groups (preferably $C_1$-$C_{30}$ substituted or unsubstituted carbamoyl group, e.g., carbamolyl group, N-methylcarbamoyl group, N,N-dimethylcarbamoyl group, N,N-di-n-octylcarbamoyl group, N-(methylsulfonyl) carbamoyl group), arylazo groups and heterocyclic azo groups (preferably $C_6$-$C_{30}$ substituted or unsubstituted arylazo group, $C_3$-$C_{30}$ substituted or unsubstituted heterocyclic azo group, e.g., phenylazo group, p-chlorophenylazo group, 5-ethylthio-1,3,4-thiadiazole-2-ilazo group), imide groups (preferably $C_2$-$C_{30}$ substituted or unsubstituted phosphino group, e.g., dimethylphosphino group, diphenylphosphino group, methylphenoxyphosphino group), phosphinyl groups (preferably $C_2$-$C_{30}$ substituted or unsubstituted phosphinyl group, e.g., phosphinyl group, dioctyloxyphosphinyl group, diethoxyphosphinyl group), phosphinyloxy groups (preferably $C_2$-$C_{30}$ substituted or unsubstituted phosphinyloxy group, e.g., diphenoxyphosphinyloxy group, dioctyloxyphosphinyloxy group), phosphinylamino groups (preferably $C_2$-$C_{30}$ substituted or unsubstituted phosphinylamino group, e.g., dimethoxyphosphinylamino group, dimethyl aminophosphinylamino group), and silyl groups (preferably $C_3$-$C_{30}$ substituted or unsubstituted silyl group, e.g., trimethylsilyl group, tert-butyldimethyl silyl group, phenyldimethylsilyl group).

Among the aforementioned substituents, those having hydrogen atoms may be freed of hydrogen atoms, and then substituted by any of the aforementioned substituents. Examples of such a functional group include alkylcarbonylaminosulfonyl group, arylcarbonyl aminosulfonyl group, alkylsulfonylaminocarbonyl group, and arylsulfonylaminocarbonyl group. Specific examples of these functional groups include methylsulfonylamino carbonyl group, p-methylphenylsulfonylaminocarbonyl group, acetylaminosulfonyl group, and benzoylaminosulfonyl group.

Two or more substituents, if any, may be the same or different. If possible, these substituents may be connected to each other to form a ring.

Preferred among the compounds represented by the formula (14-A) is one wherein $R^{11}$'s each are a methyl group, $R^2$ and $R^5$ each are a hydrogen atom, $R^{13}$ is an alkyl group having three or more carbon atoms, $L^1$ is a single bond, —O—, —CO—, —NR—, —SO$_2$NR—, —NRSO$_2$—, —CONR—, —NRCO—, —COO—, —OCO— or alkinylene group (in which R represents a hydrogen atom or an alkyl or aryl group which may have substituents, preferably a hydrogen atom), $L^2$ is —O— or —NR— (in which R represents a hydrogen atom or an alkyl or aryl group which may have substituents, preferably a hydrogen atom), Ar¹ is an arylene group and n is from not smaller than 3 to not greater than 6.

Specific examples of the compounds represented by the formulae (11), (14-A) and (14-B) will be given below, but the invention is not limited thereto.

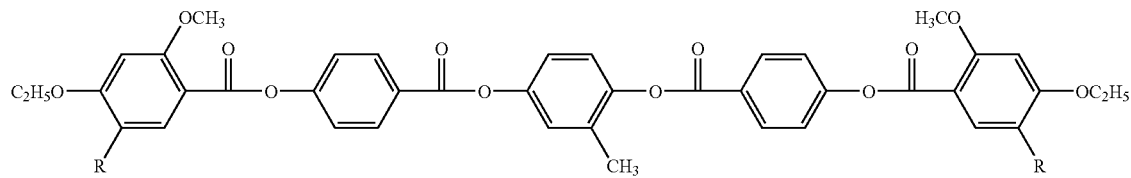

A-1; R = H
B-1; R = OCH₃

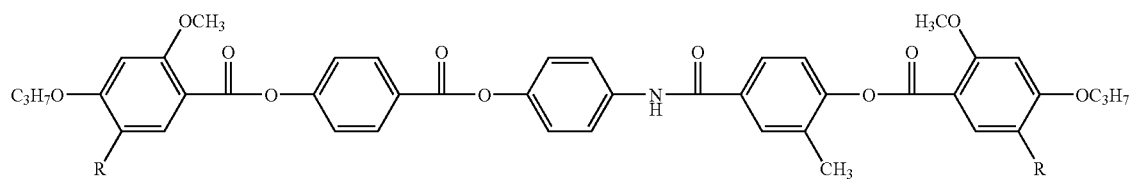

A-2; R = H
B-2; R = OCH₃

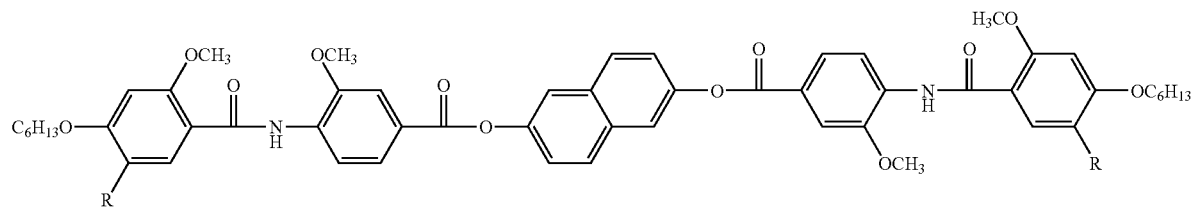

A-3; R = H
B-3; R = OCH₃

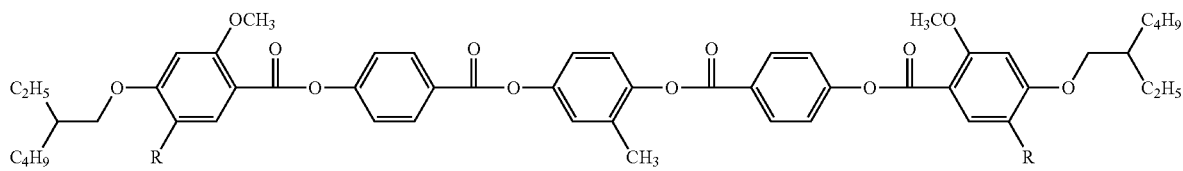

A-4; R = H
B-4; R = OCH₃

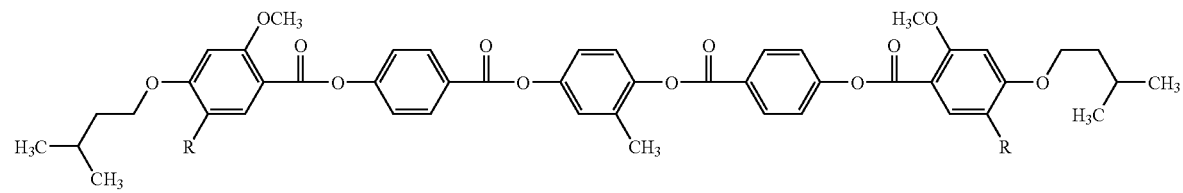

A-5; R = H
B-5; R = OCH₃

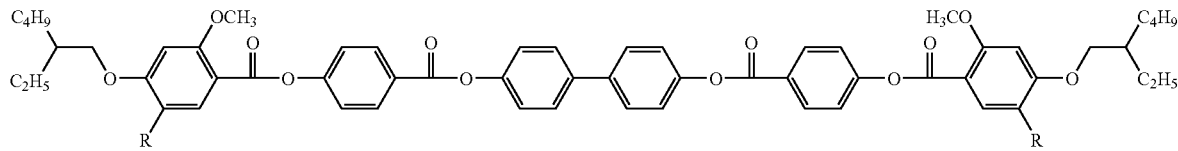

A-6; R = H
B-6; R = OCH₃

-continued
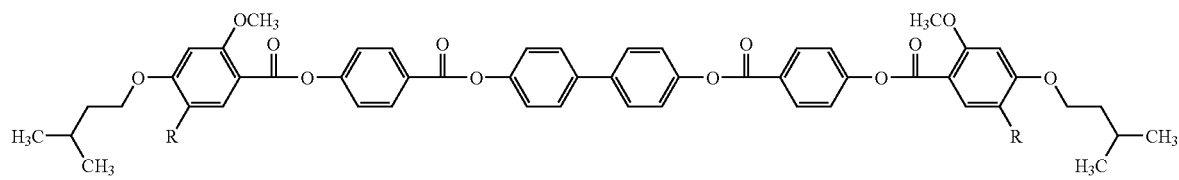
A-7; R = H
B-7; R = OCH₃
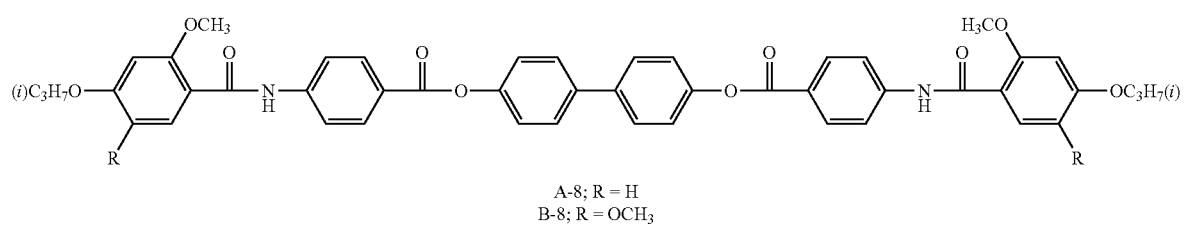
A-8; R = H
B-8; R = OCH₃
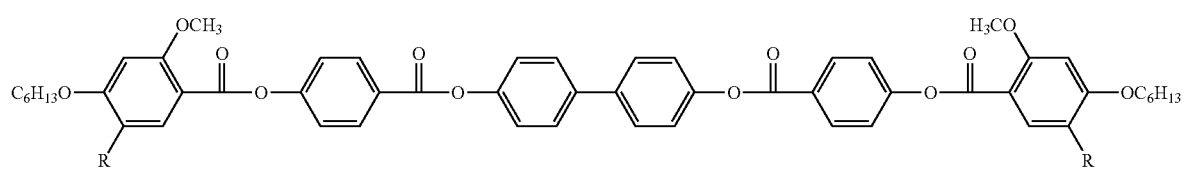
A-9; R = H
B-9; R = OCH₃
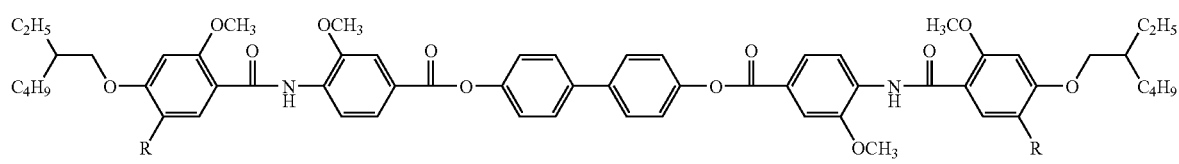
A-10; R = H
B-10; R = OCH₃
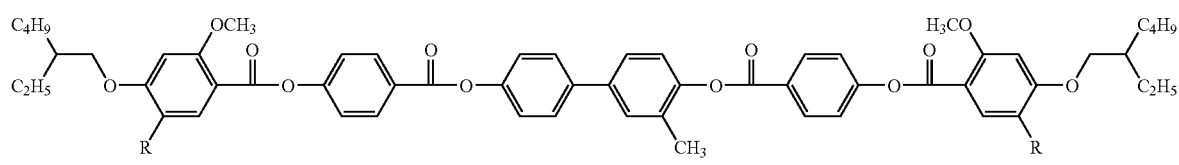
A-11; R = H
B-11; R = OCH₃
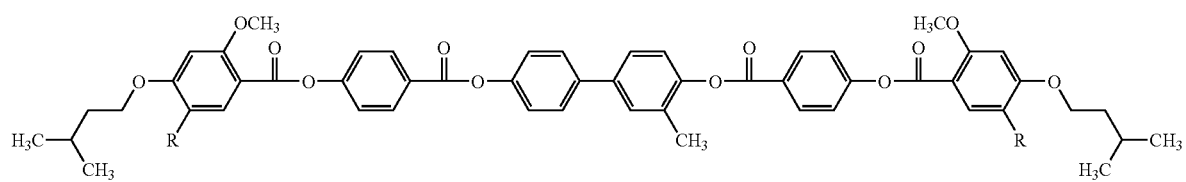
A-12; R = H
B-12; R = OCH₃
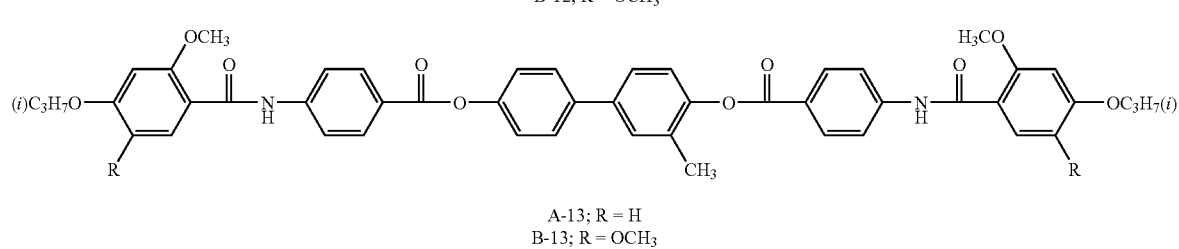
A-13; R = H
B-13; R = OCH₃

-continued
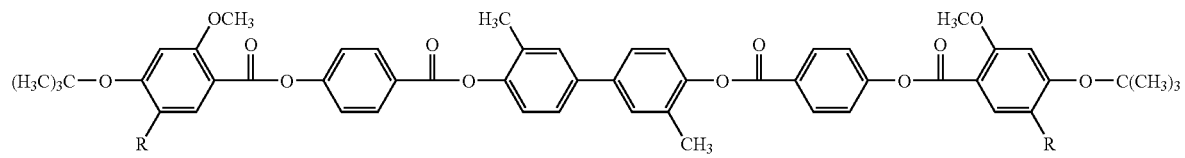
A-14; R = H
B-14; R = OCH₃
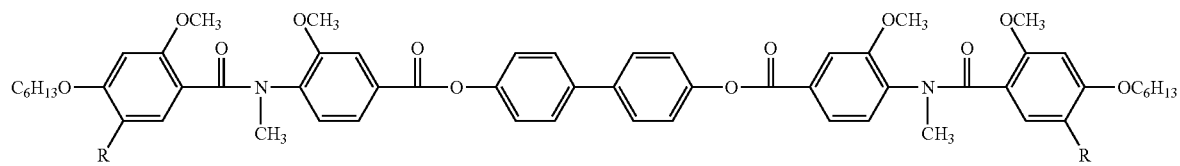
A-15; R = H
B-15; R = OCH₃
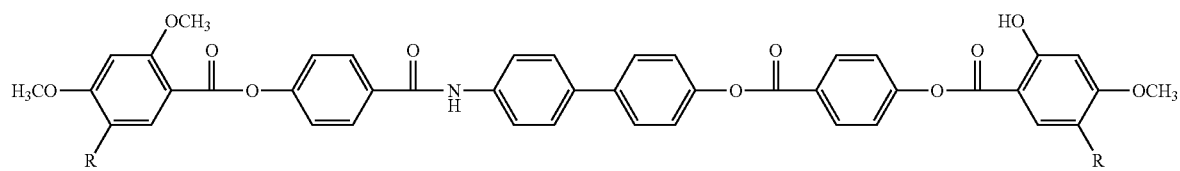
A-16; R = H
B-16; R = OCH₃
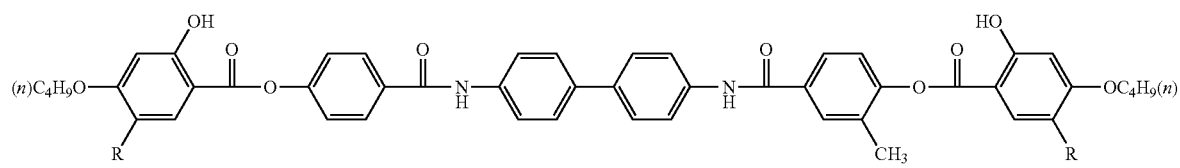
A-17; R = H
B-17; R = OCH₃
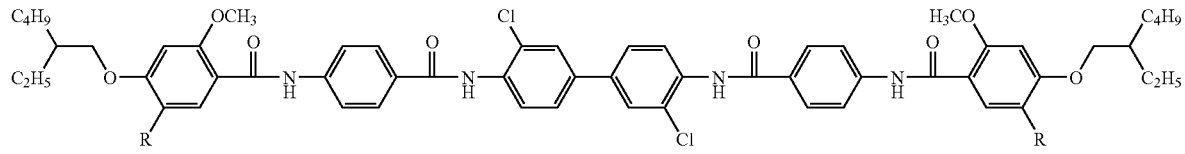
A-18; R = H
B-18; R = OCH₃
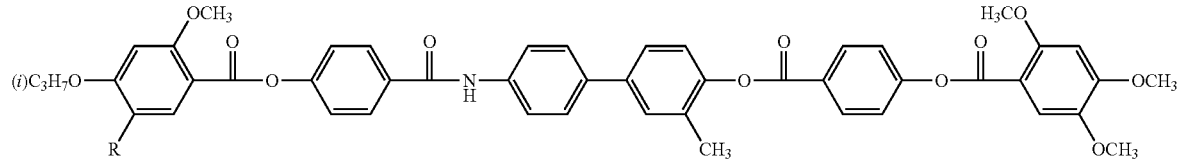
A-19; R = H
B-19; R = OCH₃
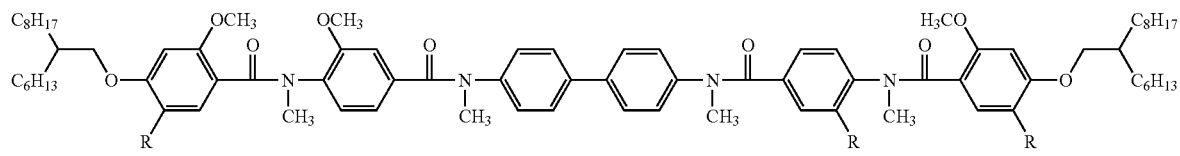
A-20; R = H
B-20; R = OCH₃

-continued
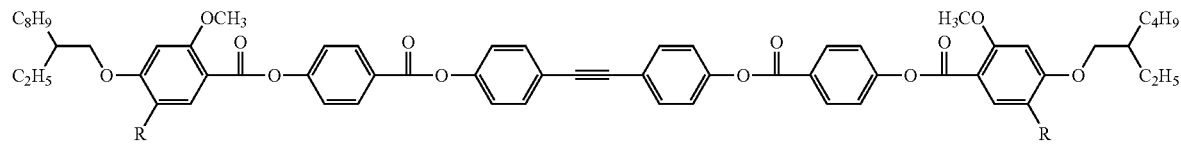
A-21; R = H
B-21; R = OCH₃
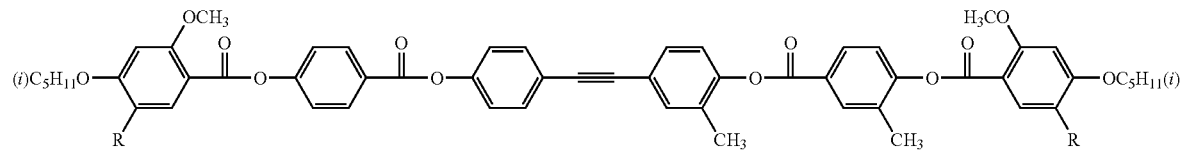
A-22; R = H
B-22; R = OCH₃
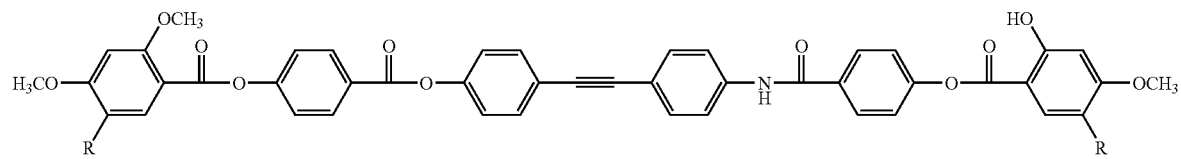
A-23; R = H
B-23; R = OCH₃
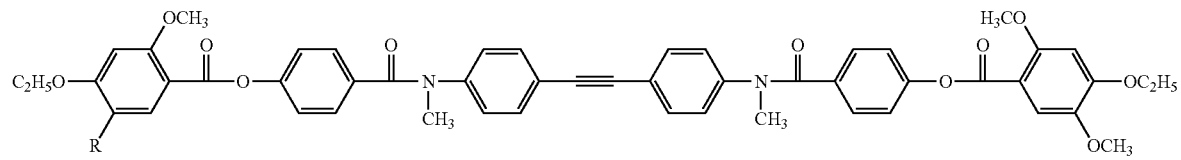
A-24; R = H
B-24; R = OCH₃
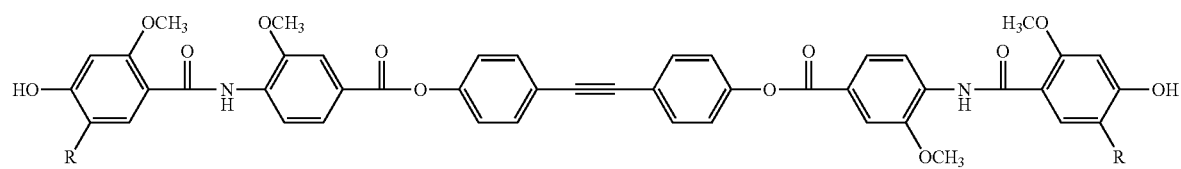
A-25; R = H
B-25; R = OCH₃
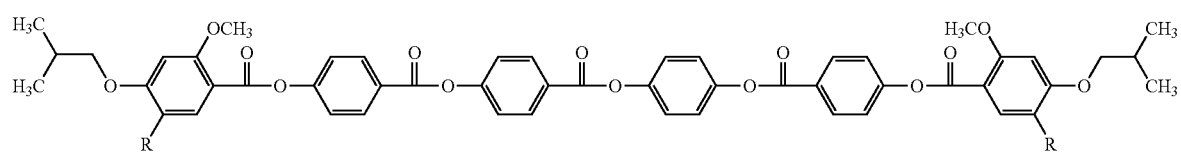
A-26; R = H
B-26; R = OCH₃
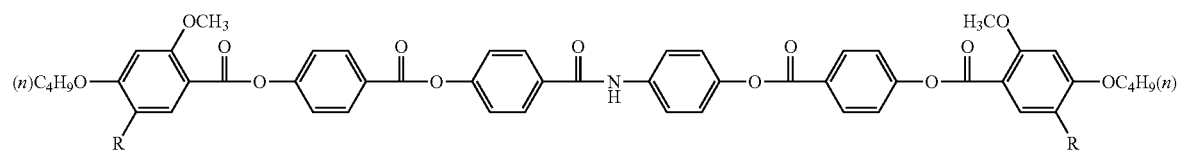
A-27; R = H
B-27; R = OCH₃

-continued
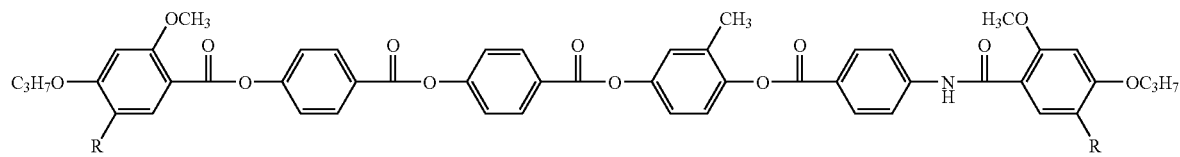
A-28; R = H
B-28; R = OCH₃
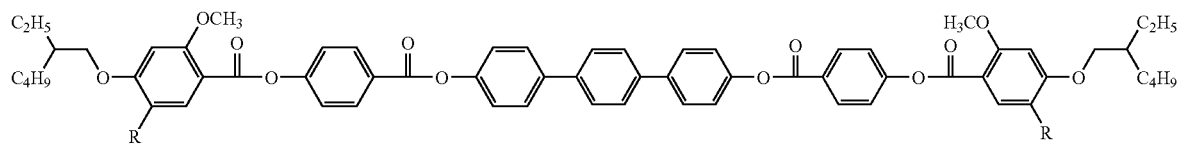
A-29; R = H
B-29; R = OCH₃
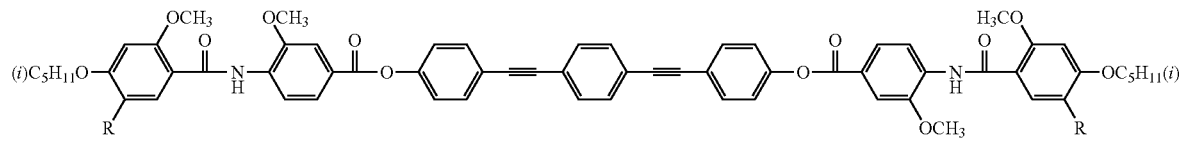
A-30; R = H
B-30; R = OCH₃
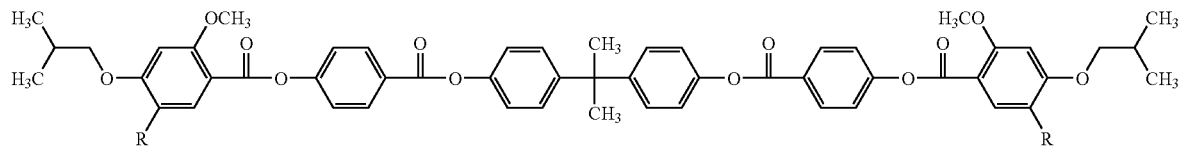
A-31; R = H
B-31; R = OCH₃
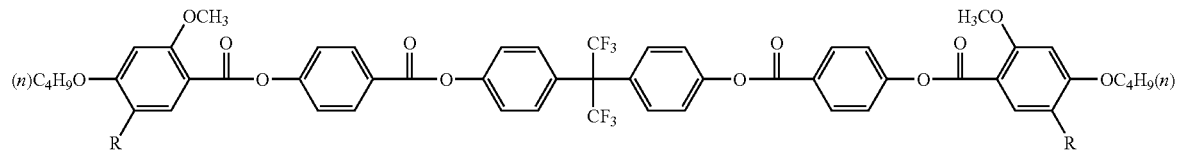
A-32; R = H
B-32; R = OCH₃
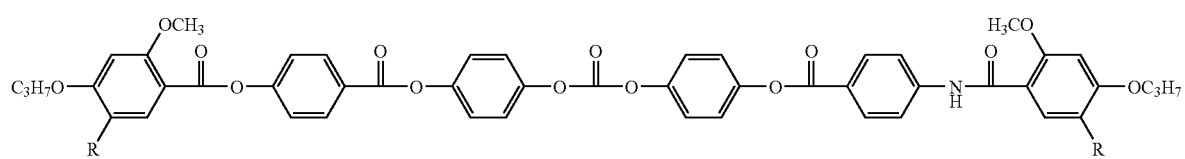
A-33; R = H
B-33; R = OCH₃
C-1
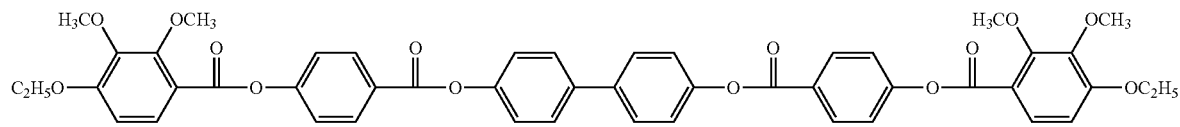
C-2
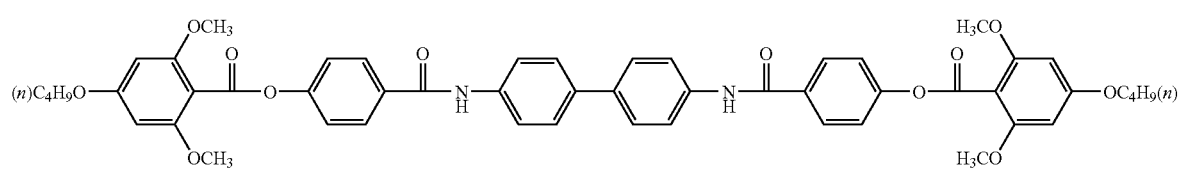

-continued

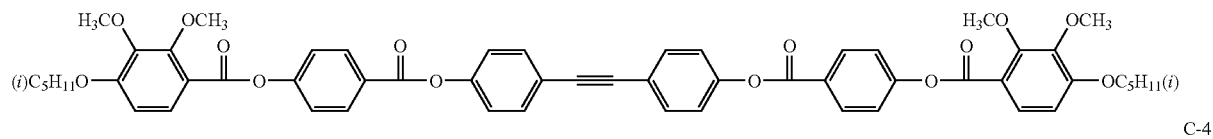
C-3

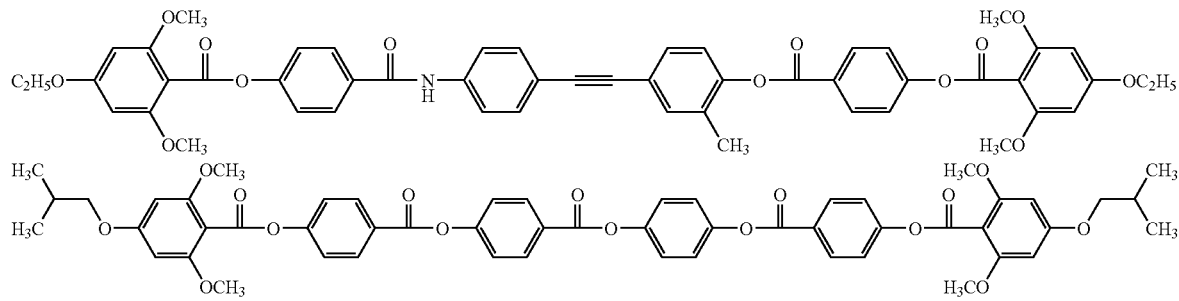
C-4

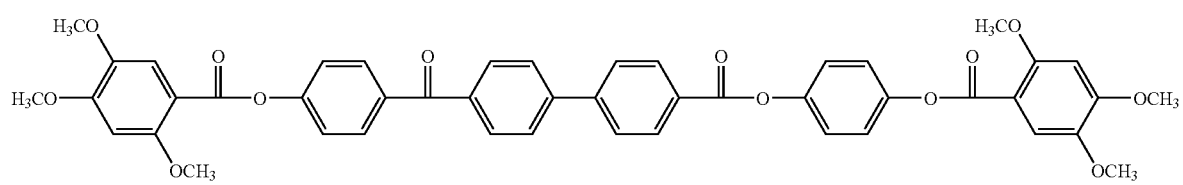
C-5

The compound represented by the formula (11) can be synthesized by synthesizing a substituted benzoic acid, and then subjecting the substituted benzoic acid to ordinary esterification reaction or amide reaction with a phenol derivative or aniline derivative. Any reaction may be employed so far as an ester bond or amide bond can be formed. For example, a method which comprises subjecting a substituted benzoic acid to functional group conversion to an acid halide, and then condensing the acid halide with a phenol derivative or aniline derivative or a method which comprises subjecting a substituted benzoic acid to dehydration condensation with a phenol derivative or aniline derivative in the presence of a condensing agent or catalyst may be employed.

Taking into account the manufacturing process, etc., the method which comprises subjecting a substituted benzoic acid to functional group conversion to an acid halide, and then condensing the acid halide with a phenol derivative or aniline derivative is preferably employed.

As a reaction solvent there may be used a hydrocarbon-based solvent (preferably toluene or xylene), ether-based solvent (preferably dimethyl ether, tetrahydrofurane or dioxane), ketone-based solvent, ester-based solvent, acetonitrile, dimethyl formamide or dimethyl acetamide. These solvents may be used singly or in admixture of two or more thereof. Preferred among these reaction solvents are toluene, acetonitrile, dimethyl formamide and dimethyl acetamide.

The reaction temperature is preferably from 0° C. to 150° C., more preferably from 0° C. to 100° C., even more preferably from 0° C. to 90° C., particularly preferably from 20° C. to 90° C.

The present reaction is preferably effected free from base. The base, if used, may be either an organic base or an inorganic base, preferably organic base such as pyridine and tertiary alkylamine (preferably triethylamine or ethyl diisopropylamine).

The compounds represented by the formulae (14-A) and (14-B) can be synthesized by any known method. For example, the compound wherein n is 4 can be obtained by connecting two molecules of intermediate:

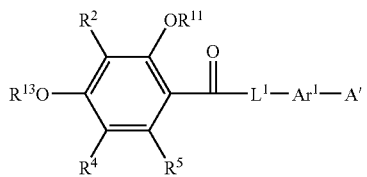

(wherein A' represents a reactive group such as carboxyl group; and $R^{11}$, $R^2$, $R^{13}$, $R^4$, $R^5$, $Ar^1$ and $L^1$ are as defined above) obtained by subjecting a raw material compound having the following structure:

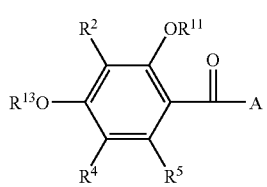

(wherein A represents a reactive group such as hydroxyl group and halogen atom; $R^{11}$, $R^2$, $R^{13}$ and $R^5$ are as defined above; and $R^4$ represents a hydrogen atom or a substituent represented by $OR^{14}$) to reaction with a derivative having a reactive site such as hydroxyl group and amino group via one molecule having the following structure:

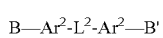

wherein B and B' each represent a reactive group such as hydroxyl group and amino group; and $Ar^2$ and $L^2$ are as defined above with reference to $Ar^1$ and $L^1$. However, the method of synthesizing the compound of the invention is not limited to this example.

The compounds represented by the formula (11) and the formulae (14-A) and (14-B) can be preferably used as retardation developing agent, particularly as retardation developing agent for providing a film having an excellent Re developability when stretched.

The retardation developing agents of the invention may be used singly or in admixture of two or more thereof. The amount of the retardation developing agent of the invention to be added is preferably from 1% to 30% by weight, more preferably from 2% to 25% by weight based on 100 parts by weight of cellulose acylate.

Referring to the method of adding the retardation developing agent of the invention, the retardation developing agent of the invention may be added to the cellulose acylate solution (dope composition) directly or in the form of solution in an organic solvent such as alcohol, methylene chloride and dioxolane.

(Production of Stretched Cellulose Acylate Film)

The cellulose acylate film of the invention can be produced by a solvent casting method. In the solvent casting method, a solution of cellulose acylate in an organic solvent (dope) is used to produce a film.

The organic solvent is preferably one selected from the group consisting of ether having from 3 to 12 carbon atoms, ketone having from 3 to 12 carbon atoms, ester having from 3 to 12 carbon atoms and halogenated hydrocarbon having from 1 to 6 carbon atoms.

The ether, ketone and ester may have a cyclic structure. A compound having two or more of the functional groups of ether, ketone and ester (i.e., —O—, —CO—, COO—) may be used as an organic solvent. The organic solvent may have other functional groups such as alcoholic hydroxyl group. The number of carbon atoms in the organic solvent having two or more functional groups preferably falls within the aforementioned preferred range of number of carbon atoms in the solvent having any of these functional groups.

Examples of the ether having from 3 to 12 carbon atoms include diisopropyl ether, dimethoxymethane, dimethoxyethane, 1,4-dioxane, 1,3-dioxolane, tetrahydrofurane, anisole, and phenethol.

Examples of the ketone having from 3 to 12 carbon atoms include acetone, methyl ethyl ketone, diethyl ketone, diisobutyl ketone, cyclohexanone, and methyl cyclohexanone.

Examples of the ester having from 3 to 12 carbon atoms include ethyl formate, propyl formate, pentyl formate, methyl acetate, ethyl acetate, and pentyl acetate.

Examples of the organic solvent having two or more functional groups include 2-ethoxyethyl acetate, 2-methoxyethanol, and 2-butoxyethanol.

The number of carbon atoms in the halogenated hydrocarbon is preferably 1 or 2, most preferably 1. The halogen atom in the halogenated hydrocarbon is preferably chlorine. The percent substitution of hydrogen atoms in the halogenated hydrocarbon by halogen is preferably from 25 to 75 mol-%, more preferably from 30 to 70 mol-%, even more preferably from 35 to 65 mol-%, most preferably from 40 to 60 mol-%. Methylene chloride is a representative halogenated hydrocarbon.

Two or more organic solvents may be used in admixture.

The cellulose acylate solution may be prepared by an ordinary method involving processing at a temperature of 0° C. or more (ordinary temperature or high temperature). The preparation of the solution may be effected by the method and apparatus for preparing a dope in an ordinary solvent casting method. In the case of ordinary method, as an organic solvent there is preferably used a halogenated hydrocarbon (particularly methylene chloride).

The amount of cellulose acylate is adjusted such that it is contained in the solution thus obtained in an amount of from 10% to 40% by weight. The amount of cellulose acylate is more preferably from 10% to 30% by weight. The organic solvent (main solvent) may have arbitrary additives described later incorporated therein.

The solution may be prepared by stirring the cellulose acylate with the organic solvent at ordinary temperature (0° C. to 40° C.). A high concentration solution may be stirred under pressure and heating. In some detail, the cellulose acylate and the organic solvent are put in a pressure vessel which is then hermetically sealed. The mixture is then stirred under pressure while being heated to a temperature range of not lower than the boiling point of the solvent at ordinary pressure to not higher than the value at which the solvent boils. The heating temperature is normally 40° C. or more, preferably from 60° C. to 200° C., more preferably from 80° C. to 110° C.

The various components may be previously mixed roughly before being put in the vessel. These components may be sequentially put in the vessel. The vessel needs to be arranged to allow stirring. An inert gas such as nitrogen gas may be injected into the vessel so that the vessel is pressed. Alternatively, the rise of vapor pressure of the solvent by heating may be utilized. Further, after the sealing of the vessel, the various components may be added under pressure.

In the case where the vessel is heated, the vessel is preferably heated externally. For example, a jacket type heating device may be used. Alternatively, the vessel may be externally provided with a plate heater connected thereto so that a liquid is circulated therethrough to heat the entire vessel.

Stirring is preferably carried out by an agitating blade provided in the vessel. The agitating blade preferably has a length long enough to reach the site in the vicinity of the wall of the vessel. The agitating blade preferably has a scraper blade provided at the end thereof for renewing the liquid layer on the wall of the vessel.

The vessel may have meters such as pressure gauge and thermometer provided therein. In the vessel, the various components are dissolved in a solvent. The dope thus prepared is cooled, and then withdrawn from the vessel. Alternatively, the dope is, withdrawn from the vessel, and then cooled using a heat exchanger.

A cold dissolution method may be employed to prepare a solution. In accordance with the cold dissolution method, the cellulose acylate can be dissolved in an organic solvent in which it can be difficultly dissolved in ordinary dissolution methods. Even a solvent capable of dissolving cellulose acylate therein in ordinary dissolution methods allows rapid provision of a uniform solution when the cold dissolution method is employed.

In the cold dissolution method, a cellulose acylate is gradually added to an organic solvent at room temperature with stirring. The amount of the cellulose acylate is preferably adjusted such that the content of cellulose acylate in the mixture reaches a range of from 10% to 40% by weight, more preferably from 10% to 30% by weight. To the mixture may be previously added arbitrary additives described later.

Subsequently, the mixture is cooled to a temperature of from −100° C. to −10° C. (preferably from −80° C. to −10° C., more preferably from −50° C. to −20° C., most preferably from −50° C. to −30° C.). Cooling may be effected in a dry ice-methanol bath (−75° C.) or a chilled diethylene glycol solution (−30° C. to −20° C.). Cooling causes the mixture of cellulose acylate and organic solvent to be solidified.

The cooling rate is preferably 4° C./min or more, more preferably 8° C./min or more, most preferably 12° C./min or more. The cooling rate is preferably as high as possible. However, the theoretical upper limit of cooling rate is 10,000° C./sec. The technical upper limit of cooling rate is 1,000° C./sec. The practical upper limit of cooling rate is 100° C./sec. The cooling rate is determined by dividing the difference between the temperature at which cooling begins and the final cooling temperature by the time between the point at which cooling begins and the point at which the final cooling temperature reaches.

Subsequently, when the solution is heated to a temperature of from 0° C. to 200° C. (preferably from 0° C. to 150° C., more preferably from 0° C. to 120° C., most preferably from 0° C. to 50° C.), the cellulose acylate is then dissolved in the organic solvent. Heating may be effected merely by allowing the solution to stand at room temperature or by heating the solution in a hot bath. The heating rate is preferably 4° C./min or more, more preferably 8° C./min or more, most preferably 12° C./min or more. The heating rate is preferably as high as possible. However, the theoretical upper limit of heating rate is 10,000° C./sec. The technical upper limit of heating rate is 1,000° C./sec. The practical upper limit of heating rate is 100° C./sec. The heating rate is determined by dividing the difference between the temperature at which heating begins and the final heating temperature by the time between the point at which heating begins and the point at which the final heating temperature reaches.

Thus, a uniform solution can be obtained. In the case where dissolution is insufficient, cooling and heating may be repeated. Whether or not dissolution is sufficient can be judged merely by observing the external appearance of the solution.

In the cold dissolution method, a sealable vessel is preferably used to avoid the contamination by water content produced by the moisture condensation during cooling. In the cooling/heating process, when cooling is effected under pressure and heat is effected under reduced pressure, the dissolution time can be reduced. In order to effect pressuring and pressure reduction, a pressure-resistant vessel is preferably used.

A 20 wt-% solution having a cellulose acetate (acetylation degree: 60.9%; viscosity-average polymerization degree: 299) in methyl acetate obtained by a cold dissolution method has a false sol-gel phase transmission point in the vicinity of 33° C. The solution stays uniform gel at a temperature of not higher than this point. Accordingly, this solution is preferably kept at a temperature of not lower than the false phase transition point, preferably a temperature of gel phase transition temperature plus about 10° C. However, this false phase transition temperature varies with the acetylation degree and viscosity-average polymerization degree of cellulose acetate, the concentration of cellulose acetate solution, and the kind of the organic solvent used.

From the cellulose acylate solution (dope) thus prepared is then produced a cellulose acylate film by a solvent casting method. The dope preferably has a retardation developing agent incorporated therein. The dope is casted over a drum or band where the solvent is then evaporated to form a film. The dope which is ready to be casted is preferably adjusted in its concentration to have a solid content of from 18% to 35%. The surface of the drum or band is preferably mirror-finished.

The dope is preferably casted over a drum or band having a surface temperature of 10° C. or less.

For the details of drying method involving solvent casting, reference can be made to U.S. Pat. Nos. 2,336,310, 2,367,603, 2,492,078, 2,492,977, 2,492,978, 2,607,704, 2,739,069 and 2,739,070, British Patents 640,731 and 7,368,892, JP-B-45-4554, JP-B-49-5614, JP-A-60-176834, JP-A-60-203430, and JP-A-62-115035. Drying on the band or drum can be carried out by blowing an inert gas such as air and nitrogen.

The film thus obtained is peeled off the drum or band, and then may be optionally dried with hot air wind the temperature of which varies successively from 100° C. to 160° C. so that the residual solvent is evaporated. For the details of this method, reference can be made to JP-B-5-17844. This method allows the reduction of the time required between casting and peeling. In order to effect this method, it is necessary that the dope be gelled at the surface temperature of the drum or band during casting.

The cellulose acylate solution (dope) thus prepared can be casted into two or more layers to form a film. In this case, solvent casting method is preferably employed to prepare a cellulose acylate film. The dope is casted over a drum or band where the solvent is then evaporated to form a film. The dope which is ready to be casted is preferably adjusted in its concentration to have a solid content of from 10% to 40%. The surface of the drum or band is preferably mirror-finished.

In order to form a plurality of layers of cellulose acylate, a plurality of cellulose acylate solutions can be casted. A solution containing a cellulose acylate may be casted through a plurality of casting nozzles provided at an interval in the running direction of the support to cause lamination by which a film is formed. A method as disclosed in JP-A-61-158414, JP-A-1-122419 and JP-A-11-198285 may be used. Alternatively, a cellulose acylate solution may be casted through two casting nozzles to form a film. A method as disclosed in JP-B-60-27562, JP-A-61-94724, JP-A-61-947245, JP-A-61-104813, JP-A-61-158413 and JP-A-6-134933 may be used. Further, a cellulose acylate film casting method which comprises extruding a high viscosity cellulose acylate solution and a low viscosity cellulose acylate solution at the same time while the high viscosity cellulose acylate solution being covered by the low viscosity cellulose acylate solution as disclosed in JP-A-56-162617 may be used.

Further, two casting nozzles may be used such that the film formed on the support through a first casting nozzle is peeled and a second casting is then effected on the side of the film in contact with the surface of the support to prepare a film. For example, a method disclosed in JP-B-44-20235 may be employed.

The cellulose acylate solutions to be casted may be the same or different. In order to functionalize a plurality of cellulose acylate layers, cellulose acylate solutions corresponding to these functions may be extruded through the respective casting nozzle. The cellulose acylate solution of the invention may be casted at the same time with other functional layer solutions (e.g., adhesive layer, dye layer, antistatic layer, antihalation layer, ultraviolet-absorbing layer, polarizing layer).

In order to form a film having a necessary thickness from a related art single layer solution, it is necessary that a cellulose acylate solution having a high concentration and a high viscosity be extruded. In this case, it is often disadvantageous in that when the cellulose acylate solution has a poor stability, a solid matter is produced to form a granular structure or deteriorate the planarity. In order to solve this problem, a plurality of cellulose acylate solutions can be casted through a casting nozzle to extrude high viscosity solutions onto the support at the same time, making it possible to prepare a film having an improved planarity and excellent surface conditions. At the same time, the use of a thick cellulose acylate solution makes it possible to eliminate drying load and raise the speed of production of film.

The cellulose acylate film may comprise a deterioration inhibitor (e.g., oxidation inhibitor, peroxide decomposer, radical inhibitor, metal inactivator, acid trapper, amine) incorporated therein. For the details of deterioration inhibitor, reference can be made to JP-A-3-199201, JP-A-5-1907073, JP-A-5-194789, JP-A-5-271471 and JP-A-6-107854. The amount of the deterioration to be added is preferably from 0.01% to 1% by weight, more preferably from 0.01% to 0.2% by weight based on the solution (dope) thus prepared. When the added amount of the deterioration inhibitor is not smaller than 0.01% by weight, the effect of the deterioration inhibitor can be sufficiently exerted to advantage. When the added amount of the deterioration inhibitor is not greater than 1% by weight, the bleeding of the deterioration inhibitor out of the surface of the film can difficultly occur to advantage. Particularly preferred examples of the deterioration inhibitor include butylated hydroxytoluene (BHT), and tribenzylamine (TBA).

The procedure from casting to post-drying may be effected in an air atmosphere or an inert gas atmosphere such as nitrogen gas. As the winding machine to be used in the production of the cellulose acylate film of the invention there may be used any commonly used winding machine. The cellulose acylate film can be wound up by a winding method such as constant tension method, constant torque method, taper tension method and programmed tension control method with a constant inner stress.

(Stretching)

As the optical compensation sheet of the invention there is used a cellulose acylate film which has been stretched (stretched cellulose acylate film). Stretching makes it possible to provide the cellulose acylate film with a desired retardation as well as a function as retardation film. The cellulose acylate film may be preferably stretched either in the width direction or in the longitudinal direction.

For the details of the crosswise stretching method, reference can be made to JP-A-62-115035, JP-A-4-152125, JP-A-4-284211, JP-A-4-298310, and JP-A-11-48271.

The stretching of the film is effected at ordinary temperature or under heating. The heating temperature is preferably not higher than the glass transition temperature of the film. The film may be stretched by treatment during drying. This is particularly effective when the solvent remains. In the case of longitudinal stretching, by adjusting the speed of the film conveying roller such that the film winding speed is higher than the film peeling speed, the film can be stretched. In the case of crosswise stretching, the film can be stretched also by conveying the film while the width thereof being retained by a tenter such that the width of the tenter is gradually raised. The film can be stretched also by stretching the film using a stretching machine after drying (preferably monoaxial stretching using a longitudinal stretching machine).

The stretching ratio of the film (percent elongation from unstretched film) is preferably from not smaller than 1% to not greater than 200%, more preferably from not smaller than 5% to not greater than 150%. It is particularly preferred that the film be stretched crosswise by a factor of from not smaller than 1% to not greater than 200%, preferably from not smaller than 5% to not greater than 150%. The stretching speed is preferably from not smaller than 1%/min to not greater than 100%/min, more preferably from not smaller than 5%/min to not greater than 80%/min, most preferably from not smaller than 10%/min to not greater than 60%/min.

The stretched cellulose acylate film of the invention is preferably produced by a process which comprises stretching the film up to maximum stretching ratio and then keeping the film at a stretching ratio lower than the maximum stretching ratio for a predetermined period of time (hereinafter referred to as "relaxation step"). The stretching ratio at the relaxation step is preferably from not smaller than 50% to not greater than 99%, more preferably from not smaller than 70% to not greater than 97%, most preferably from not smaller than 90% to not greater than 95% of the maximum stretching ratio. The relaxation time is preferably from not smaller than 1 second to not greater than 120 seconds, more preferably from not smaller than 5 seconds to not greater than 100 seconds.

By predetermining the stretching ratio at the relaxation step and the relaxation time within the above defined range, the alignment degree of the retardation developing agent can be raised, making it possible to obtain a cellulose acylate film having a high retardation and a small retardation change in the front and thickness direction. Since the retardation developing agent of the invention has a long intermolecular distance and thus requires much time to cause the alignment to settle, a method of controlling the alignment by the stretching speed and the relaxation step is particularly effective.

(Properties of Stretched Cellulose Acylate Film)

(Retardation of Film)

The terms "Re($\lambda$)" and "Rth($\lambda$)" as used herein are meant to indicate in-plane retardation and thickness direction retardation at a wavelength $\lambda$, respectively. Re($\lambda$) is measured by the incidence of light having a wavelength $\lambda$ nm in the direction normal to the film in "KOBRA 21ADH" (produced by Ouji Scientific Instruments Co. Ltd.). Rth($\lambda$) is calculated by "KOBRA 21ADH" on the basis of retardation values measured in the total three directions, i.e., Re($\lambda$), retardation value measured by the incidence of light having a wavelength $\lambda$ nm in the direction inclined at an angle of +40° from the direction normal to the film with the in-plane slow axis (judged from "KOBRA 21ADH") as an inclined axis (rotary axis), retardation value measured by the incidence of light having a wavelength $\lambda$ nm in the direction inclined at an angle of −40° from the direction normal to the film.

As a hypothetical average refractive index there may be used one disclosed in "Polymer Handbook", John Wiley & Sons, Inc. and various catalogues of optical films. For the cellulose acylate films having an unknown average refractive index, an Abbe refractometer may be used.

The average refractive index of main optical films are exemplified below.

Cellulose acylate (1.48), cycloolefin polymer (1.52), polycarbonate (1.59), polymethylene methacrylate (1.49), polystyrene (1.59). By inputting the hypothetic average refractive indexes and film thicknesses, KOBRA 21ADH calculates $n_x$ (refractive index in the slow axis direction), $n_y$ (refractive index in the fast axis direction) and $n_z$ (refractive index in the thickness direction).

The retardation of the stretched cellulose acylate film preferably satisfies the following relationships.

$$40 \text{ nm} < Re(546) < 200 \text{ nm} \tag{A'2}$$

$$10 \text{ nm} < Rth(546) < 390 \text{ nm} \tag{B'2}$$

$$0.90 < Re(480)/Re(546) < 1.10 \tag{G'}$$

$$0.90 < Re(628)/Re(546) < 1.10 \tag{H'}$$

$$0.90 < Rth(480)/Rth(546) < 1.10 \tag{I'}$$

$$0.90 < Rth(628)/Rth(546) < 1.10 \tag{J'}$$

The relationship (A'2) is preferably 60 nm<Re (546)<180 nm. The relationship (B'2) is preferably 50 nm<Rth (546) <300 nm. The relationship (G') is preferably 0.93<Re (480)/ Re (546)<1.07. The relationship (H') is preferably 0.93<Re (628)/Re (546)<1.07. The relationship (I') is preferably 0.93<Rth (480)/Rth (546)<1.07. The relationship (J') is preferably 0.93<Rth (628)/Rth (546)<1.07.

(Thickness of Stretched Cellulose Acylate Film)

The thickness of the stretched cellulose acylate film of the invention is preferably from not smaller than 10 μm to not greater than 200 μm, more preferably from not smaller than 20 μm to not greater than 150 μm, most preferably from not smaller than 30 μm to not greater than 100 μm.

(Water Content of Stretched Cellulose Acylate Film)

For the evaluation of the stretched cellulose acylate film, the stretched cellulose acylate film may be measured for equilibrium water content at a predetermined temperature and humidity. For the measurement of equilibrium water content, the stretched cellulose acylate film is allowed to stand at a predetermined temperature and humidity for 24 hours. The sample which has thus reached equilibrium is then measured for water content by Karl Fischer method. The desired water content is calculated by diving the amount (g) of water by the weight (g) of the sample.

The water content of the stretched cellulose acylate film of the invention at 25° C. and 80% RH is preferably 5.0% by weight or less, more preferably 4.3% by weight or less, most preferably 3.8% by weight or less.

(Moisture Permeability)

The various samples are each measured for moisture permeability according to the method defined in JIS Z-0208. The moisture permeability is then calculated as water content (g) evaporated per m² in 24 hours. The moisture permeability is one of physical properties of film closely related to the durability of polarizing plate. By reducing the moisture permeability of the film, the durability of the polarizing plate can be enhanced. The stretched cellulose acylate film of the invention preferably exhibits a moisture permeability of from not smaller than 200 g/m² to not greater than 1,700 g/m², more preferably from not smaller than 500 g/m² to not greater than 1,400 g/m² after 24 hours of aging at 60° C. and 95% RH.

(Saponification)

When subjected to alkaline saponification, the stretched cellulose acylate film of the invention is rendered adhesive to a polarizer material such as polyvinyl alcohol and thus can be used as a polarizing plate protective film.

The alkaline saponification of the stretched cellulose acylate film is preferably effected in a cycle of dipping the surface of the film in an alkaline solution, neutralizing the surface of the film with an acidic solution, rinsing the surface of the film and drying the surface of the film. Examples of the alkaline solution include potassium hydroxide solution and sodium hydroxide solution. The concentration of hydroxide ion is preferably from 0.1 to 5.0 mol/L, more preferably from 0.5 to 4.0 mol/L. The temperature of the alkaline solution is preferably from room temperature to 90° C., more preferably from 40° C. to 70° C.

(Photoelasticity of Stretched Cellulose Acylate Film)

The photoelasticity coefficient of the stretched cellulose acylate film of the invention is preferably 60×10⁻⁸ cm²/N or less, more preferably 20×10⁻⁸ cm²/N. The photoelasticity coefficient can be determined by means of an ellipsometer.

(Glass Transition Temperature of Stretched Cellulose Acylate Film)

The glass transition temperature of the stretched cellulose acylate film of the invention is preferably 120° C. or more, more preferably 140° C. or more. The glass transition temperature is determined by averaging the temperature at which the base line derived from the glass transition of the film begins to change and the temperature at which the base line is restored when measured at a rising rate of 10° C./min using a differential scanning calorimeter (DSC).

(Optical Anisotropic Layer)

The optical anisotropic layer of the invention will be further described hereinafter.

The optical anisotropic layer of the invention comprises at least one liquid crystal compound. As such a liquid crystal compound there is preferably used a rod-shaped liquid crystal compound or disc-shaped liquid crystal compound. The liquid crystal compound of the invention preferably has absorption at a longer wavelength than the monomer unit constituting the aforementioned stretched cellulose acylate film. In this manner, the wavelength dispersion of retardation of the optical compensation sheet can be controlled according to a desired pattern. The absorption maxima of the liquid crystal compound of the invention preferably ranges from not smaller than 200 nm to not greater than 370 nm, more preferably from not smaller than 220 nm to not greater than 350 nm, most preferably from not smaller than 240 nm to not greater than 330 nm. When the absorption maxima is seen at too long a wavelength, the skirt of absorption spectrum extends to visible light range, causing the optical compensation sheet to look yellowish.

The optical anisotropic layer of the invention is preferably formed by fixing the liquid crystal compound aligned by the alignment layer. In order to fix the liquid crystal compound aligned, the liquid crystal compound preferably has a polymerizable group.

(Rod-shaped Liquid Crystal Compound)

The rod-shaped liquid crystal compound to be incorporated in the optical anisotropic layer of the invention will be described hereinafter.

Preferred examples of the rod-shaped liquid crystal compound employable herein include azomethines, azoxys, cyanobiphenyls, cyanophenylesters, benzoic acid esters, cyclohexanecarboxylic acid phenylesters, cyanophenylcyclohexanes, cyano-substituted phenylpyrimidines, alkoxy-substituted phenypyrimidines, phenyldioxanes, tolans, and alkenyl cyclohexylbenzonitriles. Not only low molecular liquid crystal compounds but also polymer liquid crystal compounds may be used. The most desirable rod-shaped liquid crystal compound having a low molecular polymerizable group is one represented by the following formula (I).

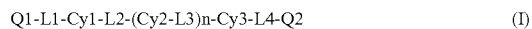

Q1-L1-Cy1-L2-(Cy2-L3)n-Cy3-L4-Q2  (I)

wherein Q1 and Q2 each independently represent a polymerizable group; L1 and L4 each independently represent a divalent connecting group; L2 and L3 each independently represent a single bond or divalent connecting group; Cy1, Cy2 and Cy3 each represent a divalent cyclic group; and n represents an integer of 0, 1 or 2.

Referring to Q1 and Q2, the polymerization reaction of the polymerizable group preferably involves addition polymerization (including ring-opening polymerization) or condensation reaction. In other words, the polymerizable group is preferably a functional group capable of undergoing addition polymerization reaction or condensation reaction. Examples of the polymerizable group will be given below.

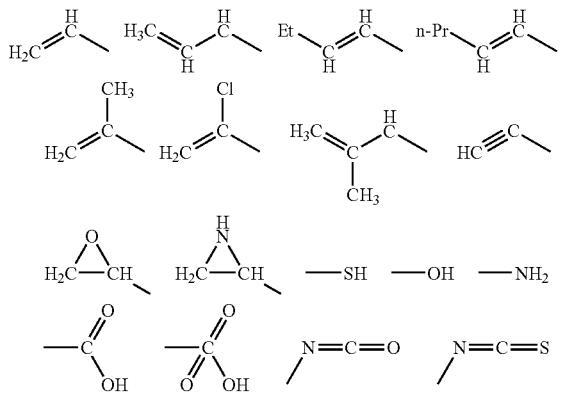

L1 and L4 each independently represent a divalent connecting group. L1 and L4 each independently are a divalent connecting group selected from the group consisting of —O—, —S—, —CO—, —NR$^2$—, divalent chainlike group, divalent cyclic group and combination thereof. R$^2$ represents a $C_1$-$C_7$ alkyl group or hydrogen atom.

Examples of the divalent connecting group having these groups in combination will be given below. These molecules each are connected to Q (Q1 or Q2) on the left side thereof and to Cy (Cy1 or Cy3) on the right side thereof L-1: —CO—O-divalent chainlike group-O—
L-2: —CO—O-divalent chainlike group-O—CO—
L-3: —CO—O-divalent chainlike group-O—CO—O—
L-4: —CO—O-divalent chainlike group-O-divalent chainlike group-
L-5: —CO—O-divalent chainlike group-O-divalent chainlike group-CO—O—
L-6: —CO—O-divalent chainlike group-O-divalent chainlike group-O—CO—
L-7: —CO—O-divalent chainlike group-O-divalent chainlike group-divalent chainlike group-
L-8: —CO—O-divalent chainlike group-O-divalent chainlike group-divalent chainlike group-CO—O—
L-9: —CO—O-divalent chainlike group-O-divalent chainlike group-divalent chainlike group-O—CO—
L-10: —CO—O-divalent chainlike group-O—CO-divalent chainlike group-divalent chainlike group-
L-11: —CO—O-divalent chainlike group-O—CO-divalent chainlike group-divalent chainlike group-CO—O—
L-12: —CO—O-divalent chainlike group-O—CO-divalent chainlike group-divalent chainlike group-O—CO—
L-13: —CO—O-divalent chainlike group-O—CO-divalent chainlike group-divalent chainlike group-divalent chainlike group-
L-14: —CO—O-divalent chainlike group-O—CO-divalent chainlike group-divalent chainlike group-divalent chainlike group-CO—O—
L-15: —CO—O-divalent chainlike group-O—CO-divalent chainlike group-divalent chainlike group-divalent chainlike group-O—CO—
L-16: —CO—O-divalent chainlike group-O—CO-divalent chainlike group-
L-17: —CO—O-divalent chainlike group-O—CO-divalent chainlike group-CO—O—
L-18: —CO—O-divalent chainlike group-O—CO-divalent chainlike group-O—CO—
L-19: —CO—O-divalent chainlike group-O—CO-divalent chainlike group-divalent chainlike group-
L-20: —CO—O-divalent chainlike group-O—CO-divalent chainlike group-divalent chainlike group-divalent chainlike group-CO—O—
L-21: —CO—O-divalent chainlike group-O—CO-divalent chainlike group-divalent chainlike group-divalent chainlike group-O—CO—

The divalent chainlike group means an alkylene group, substituted alkylene group, alkenylene group, substituted alkenylene group, alkinylene group or substituted alkinylene group. Preferred among these divalent chainlike groups are alkylene group, substituted alkylene group, alkenylene group and substituted alkenylene group. More desirable among these divalent chainlike groups are alkylene group and alkenylene group.

The alkylene group may have branches. The number of carbon atoms in the alkylene group is preferably from 1 to 12, more preferably from 2 to 10, even more preferably from 2 to 8.

The alkylene moiety of the substituted alkylene group is the same as that of the aforementioned alkylene group. Examples of the substituents on the alkylene group include halogen atoms.

The alkenylene group may have branches. The number of carbon atoms in the alkenylene group is preferably from 2 to 12, more preferably from 2 to 10, even more preferably from 2 to 8.

The alkylene moiety of the substituted alkylene group is the same as that of the aforementioned alkylene group. Examples of the substituents on the alkylene group include halogen atoms.

The alkinylene group may have branches. The number of carbon atoms in the alkinylene group is preferably from 2 to 12, more preferably from 2 to 10, even more preferably from 2 to 8.

The alkinylene moiety of the substituted alkinylene group is the same as that of the aforementioned alkinylene group. Examples of the substituents on the alkinylene group include halogen atoms.

Specific examples of the divalent chainlike group include ethylene, trimethylene, propylene, butamethylene, 1-methyl-butamethylene, pentamethylene, hexamethylene, octamethylene, 2-butenylene, and 2-butynylene.

The definition and examples of the divalent chainlike group are the same as that of Cy1, Cy2 and Cy3 described later.

R$^2$ is preferably a $C_1$-$C_4$ alkyl group or hydrogen atom, more preferably a methyl group, ethyl group or hydrogen atom, most preferably a hydrogen atom.

L$^2$ and L$^3$ each independently represent a single bond or divalent connecting group. Preferably, L$^2$ and L$^3$ each independently represent —O—, —S—, —CO—, —NR$^2$—, divalent chainlike group, divalent cyclic group or divalent connecting group or single bond selected from the group consisting of combination thereof R$^2$ is a $C_1$-$C_7$ alkyl group or hydrogen atom, preferably a $C_1$-$C_4$ alkyl group or hydrogen atom, more preferably a methyl group, ethyl group or hydrogen atom, most preferably a hydrogen atom. The divalent chainlike group and divalent cyclic group are as defined with reference to L$^1$ and L$^4$.

In the formula (I), n is 0, 1 or 2. When n is 2, the two L$^3$'s may be the same or different and the two Cy2's may be the same or different. The suffix n is preferably 1 or 2, more preferably 1.

In the formula (I), Cy1, Cy2 and Cy3 each independently represent a divalent cyclic group.

The ring contained in the cyclic group is preferably a 5-membered ring, 6-membered ring or 7-membered ring, more preferably a 5-membered ring or 6-membered ring, most preferably a 6-membered ring.

The ring contained in the cyclic group may be a condensed ring. However, a monocycle is preferred to condensed ring.

The ring contained in the cyclic group may be any of aromatic ring, aliphatic ring and heterocyclic group. Examples of the aromatic group include benzene ring and naphthalene ring. Examples of the aliphatic ring include cyclohexane ring. Examples of the heterocyclic group include pyridine ring and pyrimidine ring.

The heterocyclic group containing benzene ring is preferably 1,4-phenylene. The cyclic group containing naphthalene ring is preferably naphthalene-1,5-diil or naphthalene-2,6-diil. The cyclic group having cyclohexane ring is preferably 1,4-cyclohexylene. The cyclic ring having pyridine ring is preferably pyridine-2,5-diil. The cyclic ring having pyrimidine ring is preferably pyrimidine-2,5-diil.

The cyclic group may have substituents. Examples of the substituents on the cyclic group include halogen atoms, cyano groups, nitro groups, $C_1$-$C_5$ alkyl group, $C_1$-$C_5$ halogen-substituted alkyl group, $C_1$-$C_5$ alkoxy group, $C_1$-$C_5$ alkylthio group, $C_2$-$C_6$ acyloxy group, $C_2$-$C_6$ alkoxycarbonyl group, carbamoyl group, $C_2$-$C_6$ alkyl-substituted carbamoyl group, and $C_2$-$C_6$ acylamino group.

Examples of the polymerizable liquid crystal compound represented by the formula (I) will be given below, but the invention is not limited thereto.

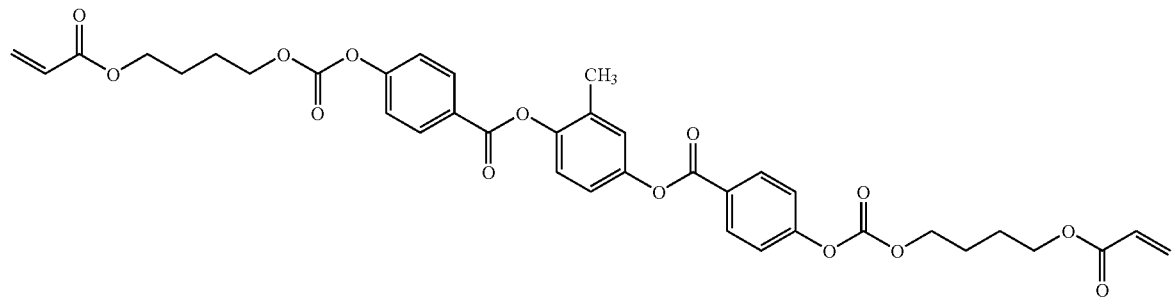

I-1)

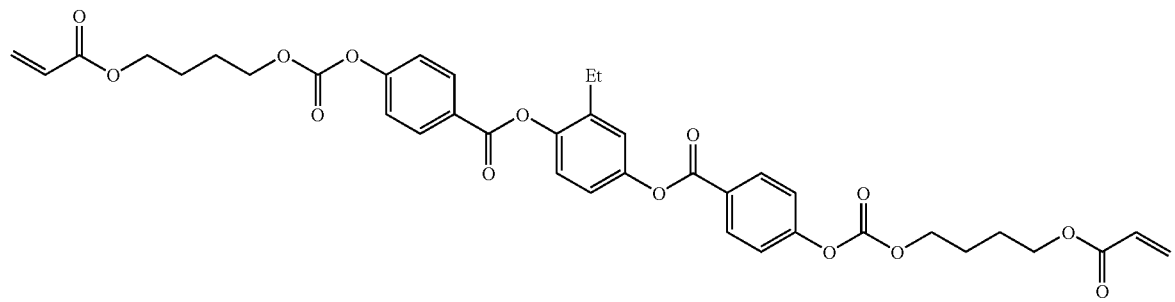

I-2)

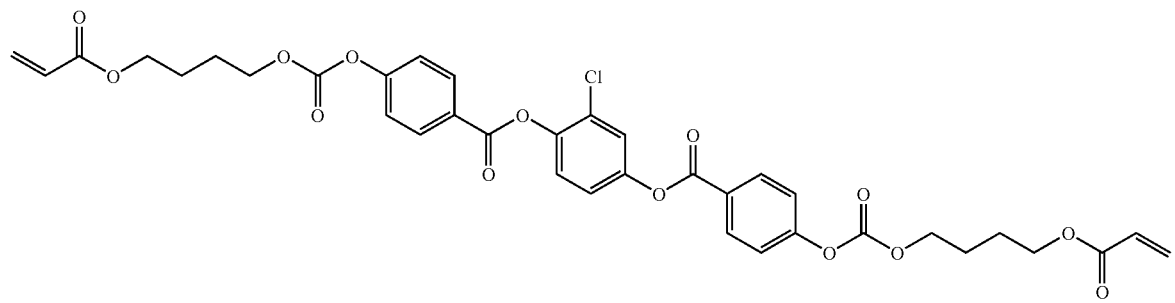

I-3)

I-4)
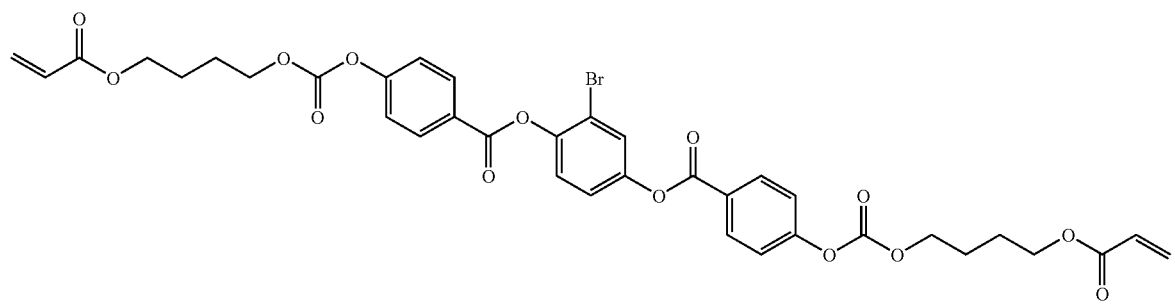
I-5)
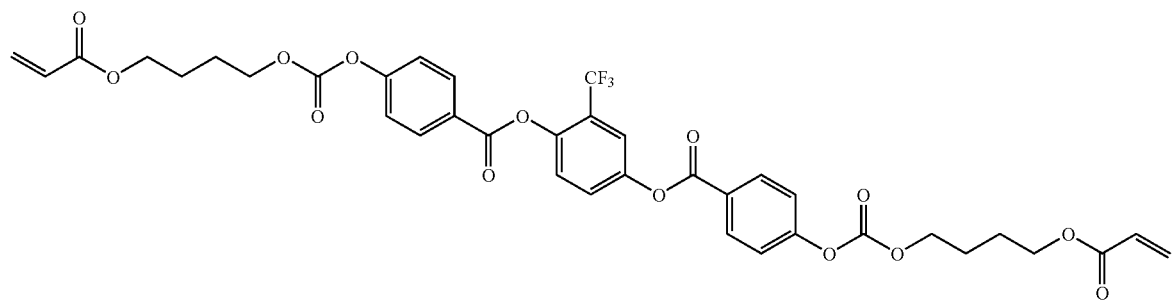
I-6)
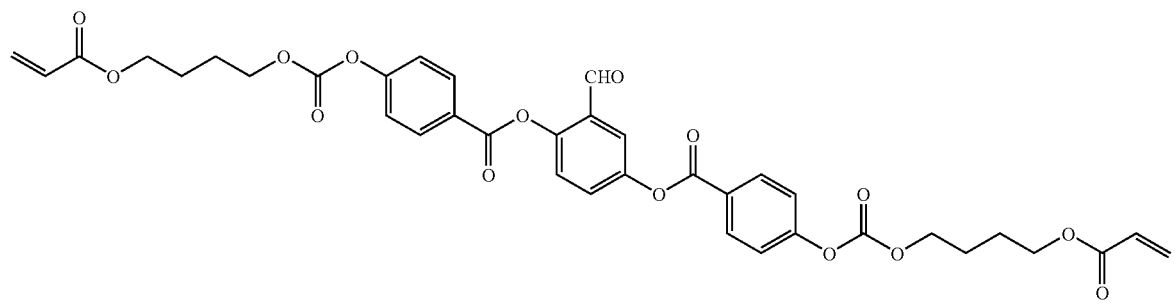
I-7)
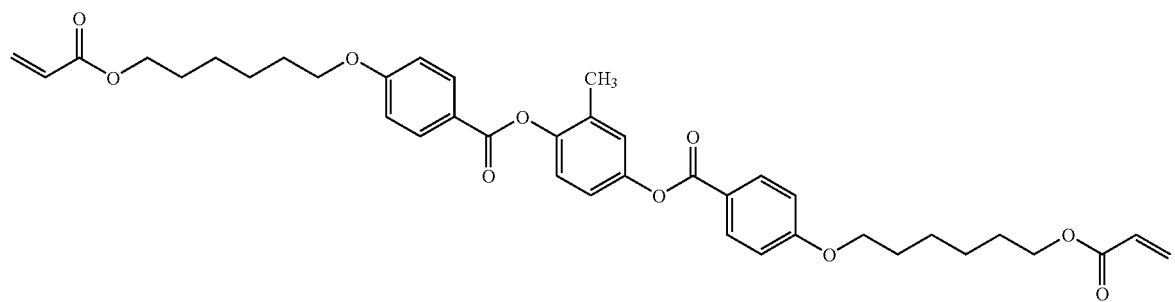
I-8)
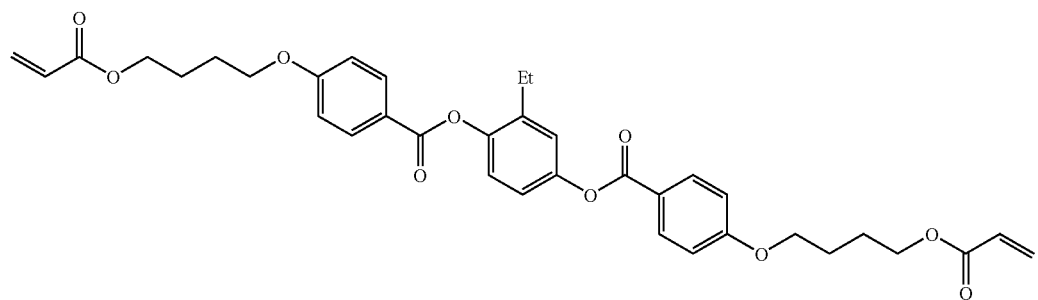

-continued
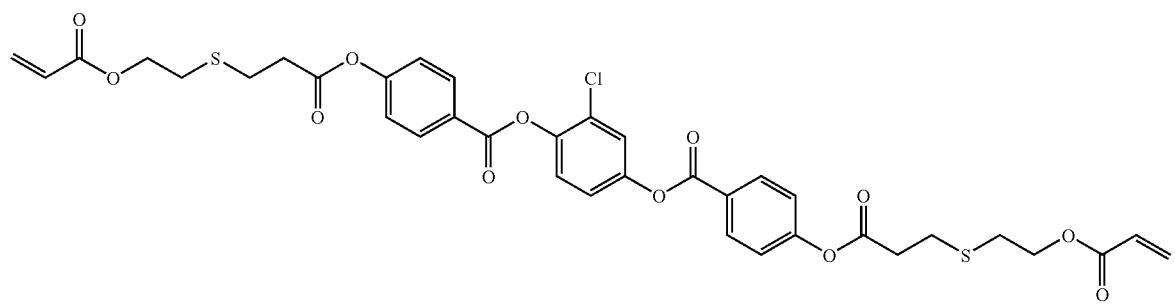
I-9)
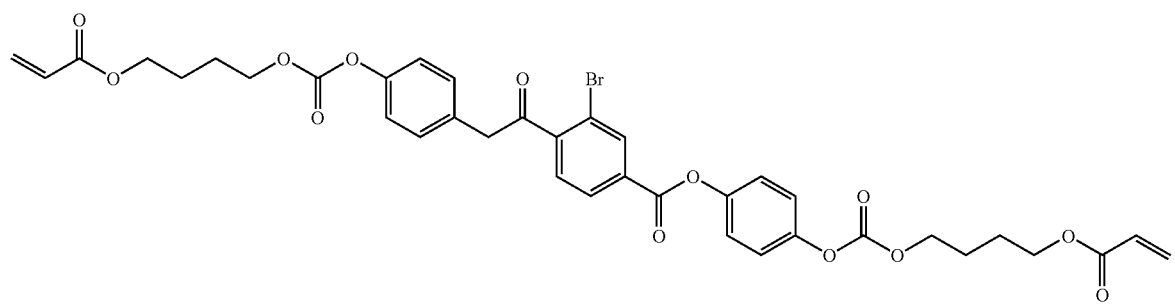
I-10)
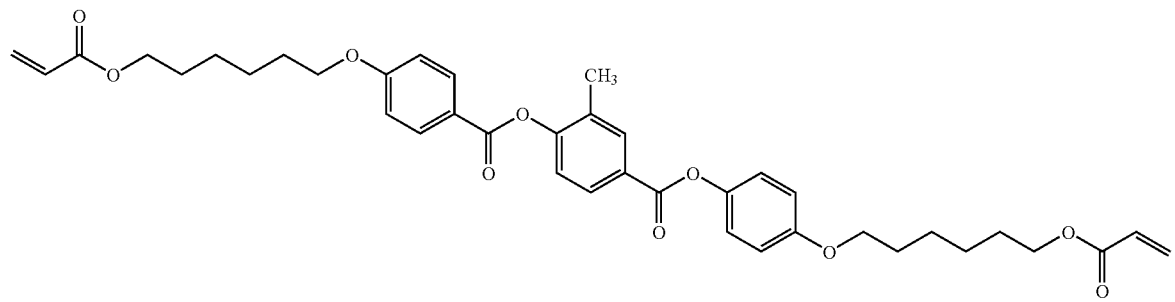
I-11)
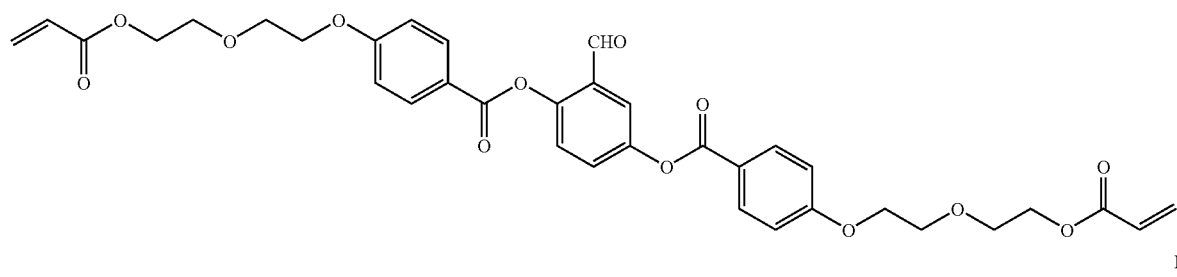
I-12)
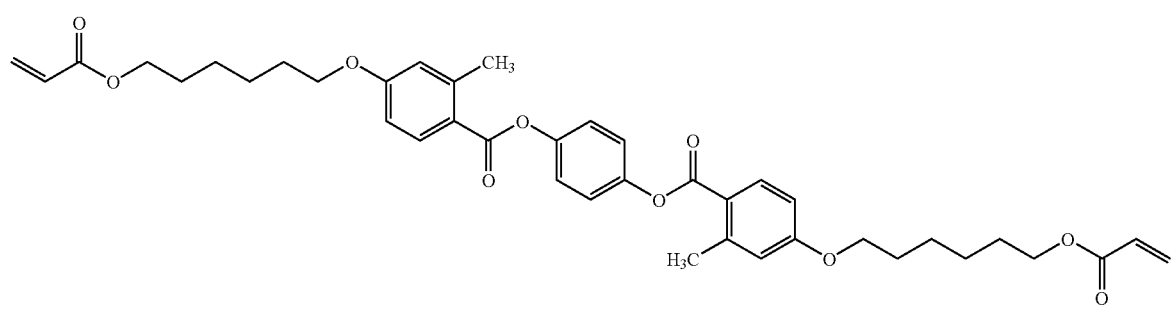
I-13)

-continued
I-14)
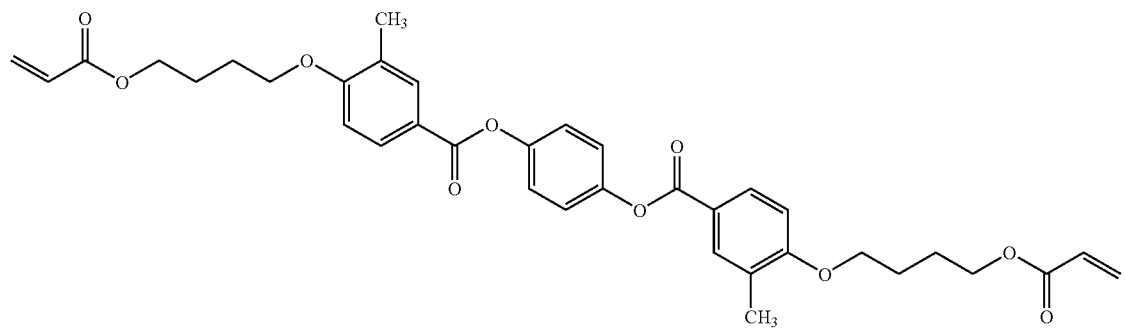
I-15)
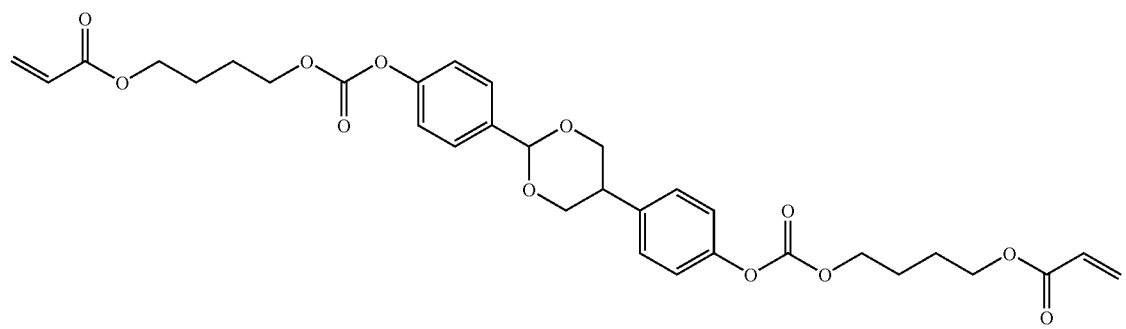
I-16)
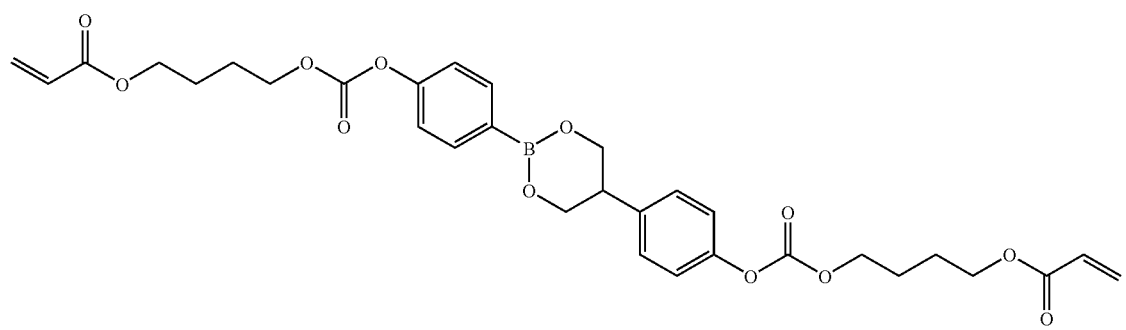
I-17)
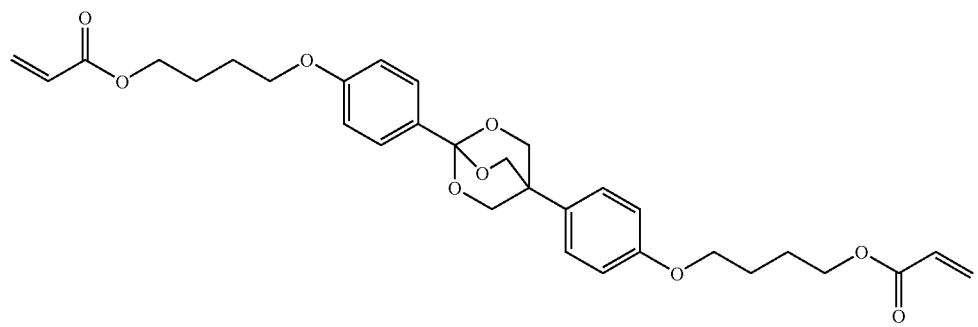
I-18)
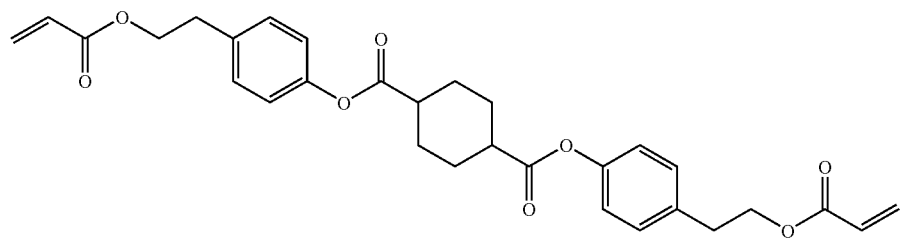

-continued
I-19)
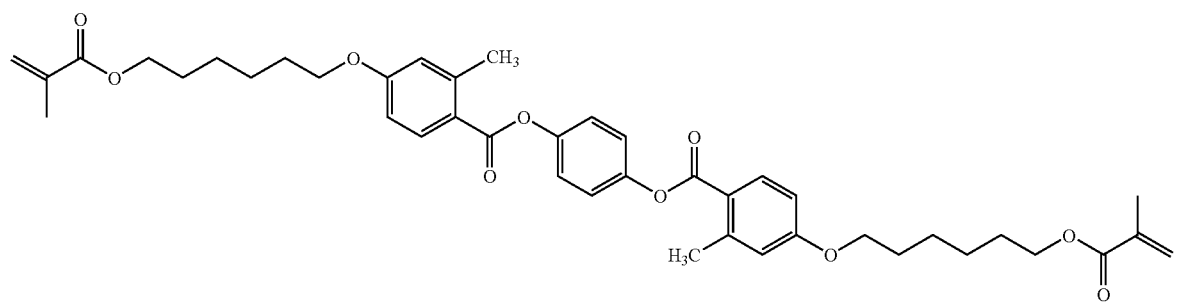
I-20)
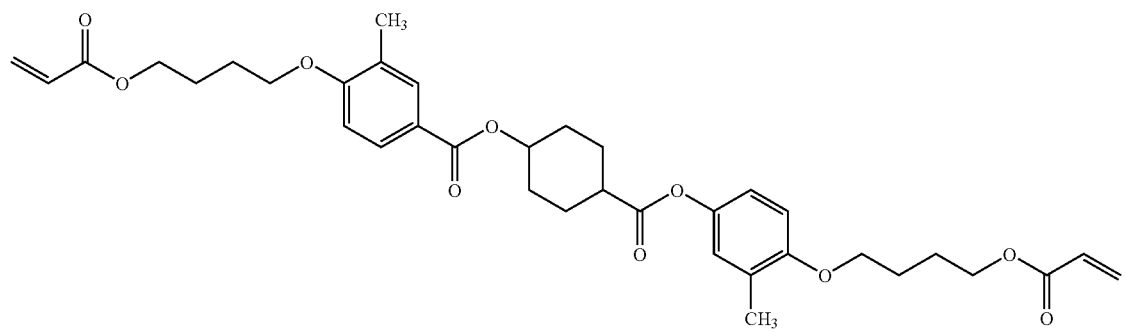
I-21)
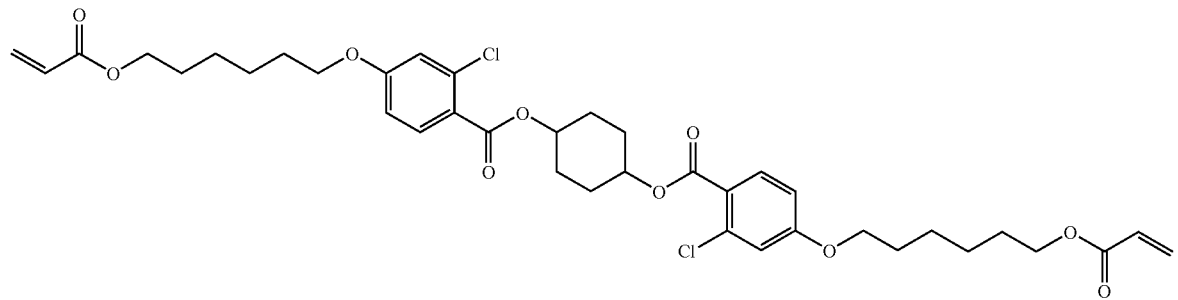
I-22)
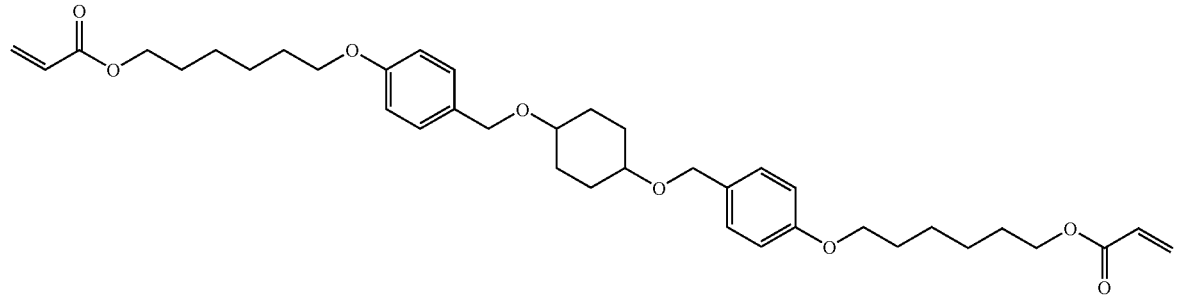

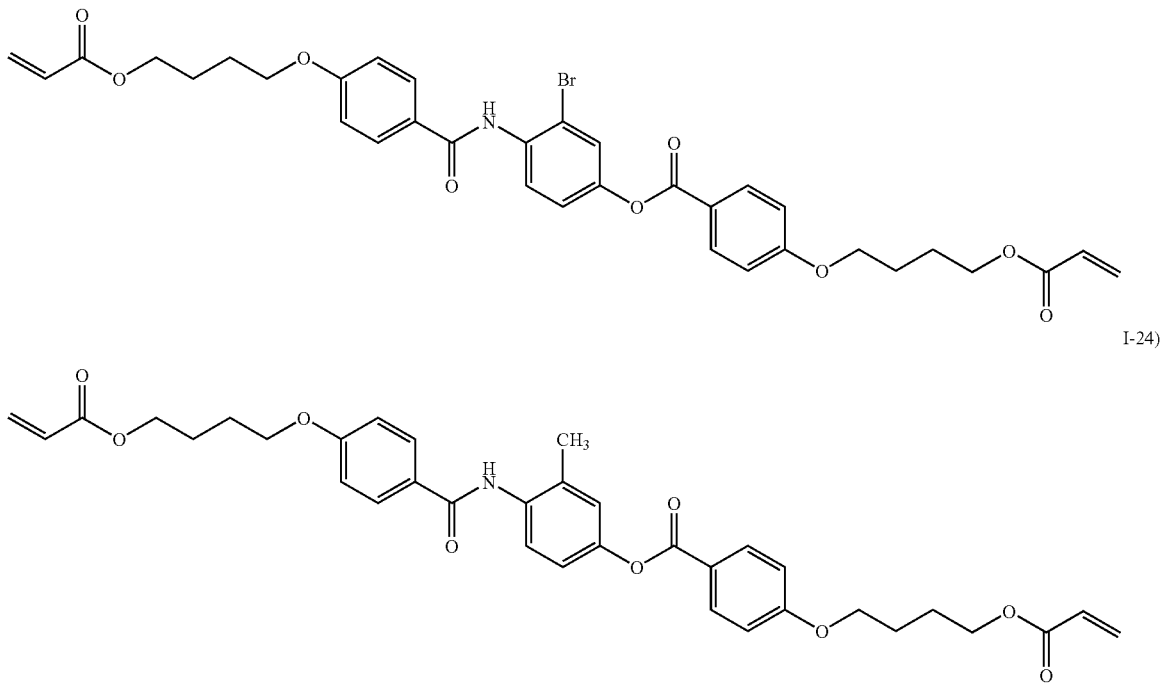

In the disc-shaped liquid crystal compound, the angle of the surface of the disc of the molecule with the surface of the transparent support changes continuously in the depth direction of the optical anisotropic layer (hybrid alignment). For the details of disc-shaped liquid crystal compound, reference can be made to various literatures (e.g., C. Destrae et al., "Mol. Cryst.", vol. 71, page 111, 1981; "Kikan Kagaku Sosetsu (Introduction to Chemistry, Quaterly)", The Chemical Society of Japan, No. 22 ("Ekisho no Kagaku (Chemistry of Liquid Crystal)), Chapter 5, 10, Section 2, 1994; B. Kohne et al., "Angew. Chem. Soc. Chem.", page 1,794, 1985; J. Zhang et al., "J. Am. Chem. Soc.", vol. 116, page 2,655, 1994). For the details of disc-shaped liquid crystal compound which is preferably incorporated in the optical anisotropic layer, reference can be made to JP-A-8-50286.

The optical anisotropic layer can be formed by spreading a coating solution containing a liquid crystal compound and optically a polymerization initiator, an average tilt angle adjustor and arbitrary additives (e.g., plasticizer, monomer, surface active agent, alignment temperature dropping agent, chiral agent) over the alignment layer.

(Polymerization Initiator)

The liquid crystal compound thus aligned can be fixed aligned. To this end, a polymerization reaction is preferably effected. Examples of the polymerization reaction employable herein include heat polymerization reaction in the presence of a heat polymerization initiator and photopolymerization reaction in the presence of a photopolymerization initiator. The photopolymerization reaction is preferred.

Examples of the photopolymerization initiator employable herein include α-carbonyl compounds (as disclosed in U.S. Pat. Nos. 2,367,661 and 2,367,670), acyloin ethers (as disclosed in U.S. Pat. No. 2,448,828), α-hydrocarbon-substituted aromatic acyloin compounds (as disclosed in U.S. Pat. No. 2,722,512), polynucleus quinone compounds (as disclosed in U.S. Pat. Nos. 3,046,127 and 2,951,758), combinations of triaryl imidazole dimer and p-aminophenyl ketone (as disclosed in U.S. Pat. No. 3,549,367), acrydine compounds and phenazine compounds (as disclosed in JP-A-60-105667 and U.S. Pat. No. 4,239,850), and oxadiazole compounds (as disclosed in U.S. Pat. No. 4,212,970).

The amount of the photopolymerization initiator to be used is preferably from 0.01% to 20% by weight, more preferably from 0.5% to 5% by weight based on the solid content of the coating solution.

As the light with which the liquid crystal compound is irradiated to cause polymerization there is preferably used ultraviolet ray.

The radiation energy is preferably from 20 mJ/cm$^2$ to 50 J/cm$^2$, more preferably from 20 mJ/cm$^2$ to 5,000 mJ/cm$^2$, even more preferably from 100 mJ/cm$^2$ to 800 mJ/cm$^2$. In order to accelerate photopolymerization reaction, irradiation with light may be effected under heating.

(Average Tilt Angle Controlling Agent)

The average tilt angle of the liquid crystal compound in the optical anisotropic layer of the invention can be adjusted by a compound having a specific surface activity.

As a compound for lowering the average tilt angle there may be used a lower aliphatic acid ester of cellulose, fluorine-containing surface active agent or compound having 1,3,5-triazine ring.

(Lower Aliphatic Acid Ester of Cellulose)

The term "lower aliphatic acid" as in the lower aliphatic acid ester of cellulose is meant to indicate an aliphatic acid having 6 or less carbon atoms. The number of carbon atoms in the aliphatic acid is preferably from 2 to 5, more preferably from 2 to 4. The aliphatic acid may have substituents (e.g., hydroxy) connected thereto. Two or more aliphatic acids may form an ester with cellulose. Examples of the lower aliphatic acid ester of cellulose include cellulose acetate, cellulose propionate, cellulose butyrate, cellulose hydroxy propionate, cellulose acetate propionate, and cellulose acetate butyrate. Cellulose acetate butyrate is particularly preferred. The butyrylation degree of cellulose acetate butyrate is preferably 30% or more, more preferably from 30% to 80%. The acetylation degree of cellulose acetate butyrate is preferably 30% or less, more preferably from 1% to 30%. The lower aliphatic acid ester of cellulose is used in an amount of from 0.01% to 1% by weight, preferably from 0.1% to 1% by weight, more preferably from 0.3% to 0.9% by weight based on the weight of the liquid crystal compound.

The compound having 1,3,5-triazine ring is preferably a compound represented by the following formula (III):

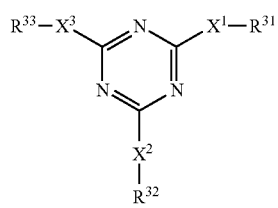

wherein $X^1$, $X^2$ and $X^3$ each independently represent a single bond, —NR— (in which R represents a $C_1$-$C_{30}$ alkyl group or hydrogen atom), —O— or —S—; and $R^{31}$, $R^{32}$ and $R^{33}$ each independently represent an alkyl group, alkenyl group, aryl group or heterocyclic group. The compound represented by the formula (III) is particularly preferably a melamine compound. In the formula (III), $X^1$, $X^2$ or $X^3$ is preferably —NR—. Alternatively, $X^1$, $X^2$ or $X^3$ is a single bond and $R^{31}$, $R^{32}$ and $R^{33}$ is a heterocyclic group having a free atomic valency at nitrogen atom. The melamine compound will be further described in connection with the formula (IV). R in —NR— is particularly preferably a hydrogen atom. $R^{31}$, $R^{32}$ and $R^{33}$ each are particularly preferably an aryl group.

The aforementioned alkyl group is preferably a chainlike alkyl group rather than cyclic alkyl group. A straight-chain alkyl group is preferred to branched chainlike alkyl group. The number of carbon atoms in the alkyl group is preferably from 1 to 30, more preferably from 2 to 30, even more preferably from 4 to 30, most preferably from 6 to 30. The alkyl group may have substituents. Examples of the substituents on the alkyl group include halogen atoms, alkoxy groups (e.g., methoxy, ethoxy, epoxyethyloxy), and acyloxy groups (e.g., acryloyloxy, methacryloyloxy). The aforementioned alkenyl group is preferably a chainlike alkenyl group rather than cyclic alkenyl group. A straight-chain alkenyl group is preferred to branched chainlike alkenyl group. The number of carbon atoms in the alkenyl group is preferably from 2 to 30, more preferably from 3 to 30, even more preferably from 4 to 30, most preferably from 6 to 30. The alkenyl group may have substituents. Examples of the substituents on the alkenyl group include halogen atoms, alkoxy groups (e.g., methoxy, ethoxy, epoxyethyloxy), and acyloxy groups (e.g., acryloyloxy, methacryloyloxy).

The aforementioned aryl group is preferably a phenyl or naphthyl, particularly preferably a phenyl. The aryl group may have substituents. Examples of the substituents on the aryl group include halogen atoms, hydroxyl groups, cyano groups, nitro groups, carboxyl groups, alkyl groups, alkenyl groups, aryl groups, alkoxy groups, alkenyloxy groups, aryloxy groups, acyloxy groups, alkoxycarbonyl groups, alkenyloxycarbonyl groups, aryloxycarbonyl groups, sulfamoyl groups, alkyl-substituted sulfamoyl groups, alkenyl-substituted sulfamoyl groups, aryl-substituted sulfamoyl groups, sulfonamide groups, carbamoyl groups, alkyl-substituted carbamoyl groups, alkenyl-substituted carbamoyl groups, aryl-substituted carbamoyl groups, amide groups, alkylthio groups, alkenylthio groups, arylthio groups, and acyl groups. The aforementioned alkyl groups have the same meaning as those previously mentioned. The alkyl moiety of the alkoxy groups, acyloxy groups, alkoxycarbonyl groups, alkyl-substituted sulfamoyl groups, sulfonamide groups, alkyl-substituted carbamoyl groups, amide groups, alkylthio groups and acyl groups, too, have the same meaning as those previously mentioned. The aforementioned alkenyl groups have the same meaning as those previously mentioned. The alkenyl moiety of the alkenyloxy group, acyloxy group, alkenyloxycarbonyl group, alkenyl-substituted sulfamoyl group, sulfonamide group, alkenyl-substituted carbamoyl group, amide group, alkenylthio group and acyl group, too, have the same meaning as those previously mentioned. Examples of the aforementioned aryl groups include phenyl, α-naphthyl, β-napthyl, 4-methoxyphenyl, 3,4-diethoxyphenyl, 4-octyloxyphenyl, and 4-dodecyloxyphenyl. The acyl moiety of the aryloxy groups, acyloxy groups, aryloxycarbonyl groups, aryl-substituted sulfamoyl groups, sulfonamide groups, aryl-substituted carbamoyl groups, amide groups, arylthio groups and acyl groups have the same meaning as the aforementioned aryl group.

The heterocyclic group wherein $X^1$, $X^2$ or $X^3$ is —NR—, —O— or —S— is preferably aromatic. The aromatic heterocyclic group is normally an unsaturated heterocyclic group, preferably a heterocyclic group having the most double bonds. The heterocyclic group is preferably a 5-membered ring, 6-membered ring or 7-membered ring, more preferably a 5-membered ring or 6-membered ring, most preferably a 6-membered ring. The hetero atom ill the heterocyclic group is preferably N, S or O, particularly preferably N. The aromatic heterocyclic group is particularly preferably a pyridine ring (heterocyclic ring is 2-pyridyl or 4-pyridyl). The heterocyclic group may have substituents. Examples of the substituents on the heterocyclic group include those exemplified with reference to the aryl moiety. The heterocyclic group wherein $X^1$, $X^2$ or $X^3$ is a single bond is preferably a heterocyclic group having a free atomic valency at nitrogen atom. The heterocyclic group having a free atomic valency is preferably a 5-membered ring, 6-membered ring or 7-membered ring, more preferably a 5-membered ring or 6-membered ring, most preferably a 5-membered ring. The heterocyclic group may have a plurality of nitrogen atoms. Alternatively, the heterocyclic group may have hetero atoms other than nitrogen atom (e.g., O, S). The heterocyclic group may have substituents. Examples of the substituents on the heterocyclic group include those exemplified with reference to the aforementioned aryl moiety. Examples of the heterocyclic group having a free atomic valency at nitrogen atom will be given below.

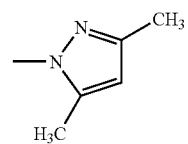

(Hc-1)

-continued (Hc-2) 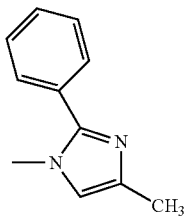

(Hc-3) 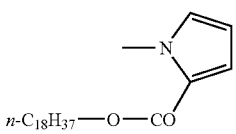

(Hc-4) 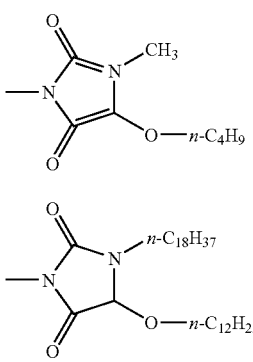

(Hc-5) 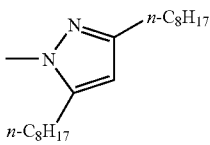

(Hc-6) 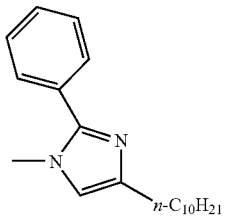

(Hc-7) 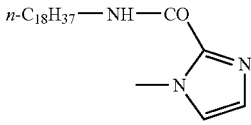

(Hc-8) 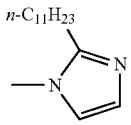

(Hc-9) 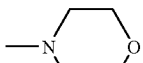

(Hc-10) 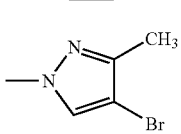

(Hc-11)

-continued (Hc-12) 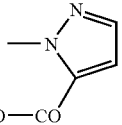

At least one of $R^{31}$, $R^{32}$ and $R^{33}$ preferably contains a $C_9$-$C_{30}$ alkylene moiety or alkenylene moiety. The $C_9$-$C_{30}$ alkylene moiety or alkenylene moiety is preferably straight-chain. The alkylene moiety or alkenylene moiety is preferably contained in the substituents on the aryl group. At least one of $R^{31}$, $R^{32}$ and $R^{33}$ preferably has a polymerizable group as a substituent. The compound having 1,3,5-triazine ring preferably has at least two polymerizable groups. The polymerizable group is preferably disposed at the end of $R^{31}$, $R^{32}$ or $R^{33}$.

By introducing a polymerizable group into the compound having 1,3,5-triazine ring, the polymerizable group can be incorporated in the optical anisotropic layer with the compound having 1,3,5-triazine ring being polymerized with a liquid crystal compound, e.g., discotic liquid crystal molecule. $R^{31}$, $R^{32}$ or $R^{33}$ having a polymerizable group as a substituent are the same as the group represented by the formula (Rp).

(Rp)-$L^5$(-P)$_n$ wherein $L^5$ represents a connecting group having a valency of (n+1); P represents a polymerizable group; and n represents an integer of from 1 to 5. In the formula (Rp), the connecting group ($L^5$) having a valency of (n+1) is preferably a connecting group having at least two groups selected from the group consisting of alkylene group, alkenylene group, aromatic group having a valency of (n+1), divalent heterocyclic residue, —CO—, —NR— (in which R represents a $C_1$-$C_{30}$ alkyl group or hydrogen atom), —O—, —S— and —SO$_2$—. The number of carbon atoms in the alkylene group is preferably from 1 to 12. The number of carbon atoms in the alkenylene group is preferably from 2 to 12. The number of carbon atoms in the aromatic group is preferably from 6 to 10. Examples of $L^5$ in the formula (Rp) will be given below. The following molecules are each connected to $X^1$, $X^2$ or $X^3$ in the formula (III) on the left side thereof (directly connected to 1,3,5-triazine ring if $X^1$, $X^2$ or $X^3$ is a single bond) and to the polymerizable group (P) (in a number of n in L53 to L59) on the right side thereof. AL means an alkylene group or alkenylene group, He means a divalent heterocyclic residue, and AR means an aromatic group. The alkylene group, alkenylene group, heterocyclic residue and aromatic group may have substituents (e.g., alkyl group, halogen atom).

L51: -AL-O—CO—
L52: -AL-O—
L53: -AR(-O-AL-O—CO—)$_n$
L54: -AR(-O-AL-O—)$_n$
L55: -AR(-O—CO-AL-O—CO—)$_n$
L56: -AR(-CO—O-AL-O—CO—)$_n$
L57: -AR(-O—CO-AR-O-AL-O—CO—)$_n$
L58: -AR(-NR—SO2-AL-O—CO—)$_n$
L59: -AR(-SO2—NR-AL-O—CO—)$_n$

The polymerizable group (P) in the formula (Rp) preferably has the following structures.

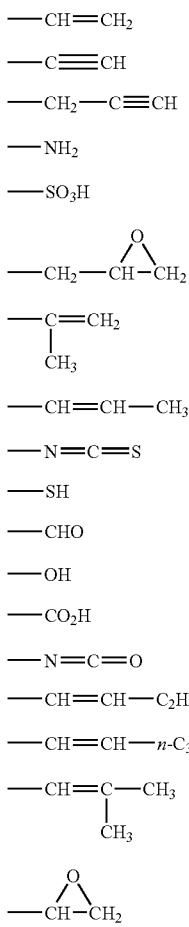

(P1) —CH=CH₂
(P2) —C≡CH
(P3) —CH₂—C≡CH
(P4) —NH₂
(P5) —SO₃H
(P6) —CH₂—CH(O)CH₂
(P7) —C(CH₃)=CH₂
(P8) —CH=CH—CH₃
(P9) —N=C=S
(P10) —SH
(P11) —CHO
(P12) —OH
(P13) —CO₂H
(P14) —N=C=O
(P15) —CH=CH—C₂H₅
(P16) —CH=CH—n-C₃H₇
(P17) —CH=C(CH₃)—CH₃

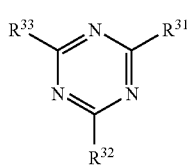
(P18) —CH(O)CH₂

The polymerizable group (P) is preferably an unsaturated polymerizable group (P1, P2, P3, P7, P8, P15, P16, P17) or an epoxy group (P6, P18), more preferably an unsaturated polymerizable group, most preferably an ethylenically unsaturated polymerizable group (P1, P7, P8, P15, P16, P17). In the formula (Rp), n represents an integer of from 4 to 12. The detailed figure is determined according to the kind of the liquid crystal compound used.

Specific examples of the compound having 1,3,5-triazine ring (except melamine compound) will be given below.

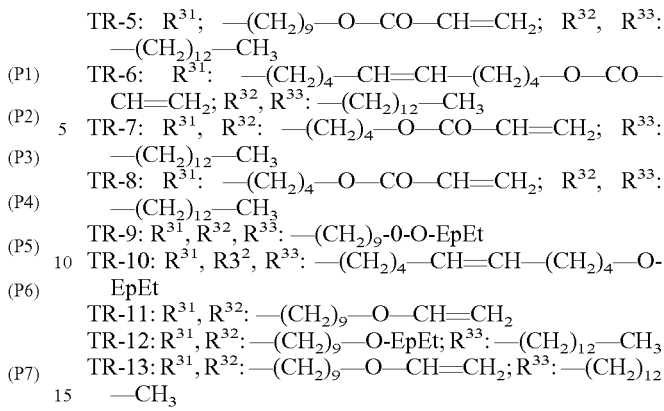
(TR-1~13)

TR-1: R³¹, R³², R³³: —(CH₂)₉—O—CO—CH=CH₂
TR-2: R³¹, R³², R³³: —(CH₂)₄—CH=CH—(CH₂)₄—O—CO—CH=CH₂
TR-3: R³¹, R³²: —(CH₂)₉—O—CO—CH=CH₂; R³³: —(CH₂)₁₂—CH₃
TR-4: R³¹, R³²: —(CH₂)₄—CH=CH—(CH₂)₄—O—CO—CH=CH₂; R³³: —(CH₂)₁₂—CH₃
TR-5: R³¹: —(CH₂)₉—O—CO—CH=CH₂; R³², R³³: —(CH₂)₁₂—CH₃
TR-6: R³¹: —(CH₂)₄—CH=CH—(CH₂)₄—O—CO—CH=CH₂; R³², R³³: —(CH₂)₁₂—CH₃
TR-7: R³¹, R³²: —(CH₂)₄—O—CO—CH=CH₂; R³³: —(CH₂)₁₂—CH₃
TR-8: R³¹: —(CH₂)₄—O—CO—CH=CH₂; R³², R³³: —(CH₂)₁₂—CH₃
TR-9: R³¹, R³², R³³: —(CH₂)₉-0-O-EpEt
TR-10: R³¹, R3², R³³: —(CH₂)₄—CH=CH—(CH₂)₄—O-EpEt
TR-11: R³¹, R³²: —(CH₂)₉—O—CH=CH₂
TR-12: R³¹, R³²: —(CH₂)₉—O-EpEt; R³³: —(CH₂)₁₂—CH₃
TR-13: R³¹, R³²: —(CH₂)₉—O—CH=CH₂; R³³: —(CH₂)₁₂—CH₃

(Note) EpEt: epoxyethyl

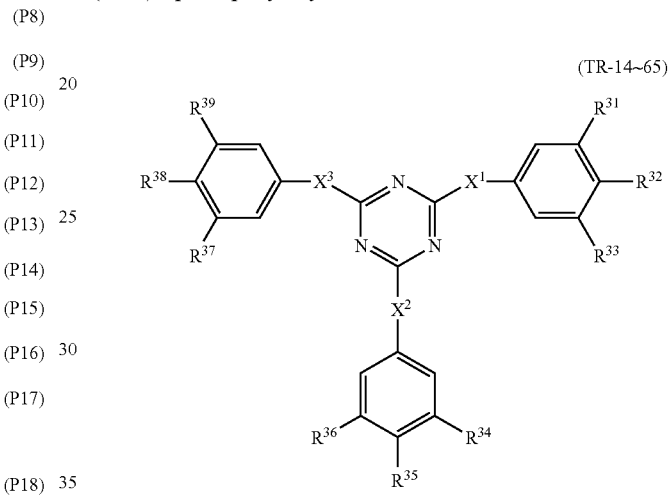
(TR-14~65)

TR-14: X¹, X², X³: —O—; R³², R³⁵, R³⁸: —O—(CH₂)₉—O—CHO—CH=CH₂
TR-15: X¹, X², X³: —O—; R³¹, R³², R³⁴, R³⁵, R³⁷, R³⁸: —O—(CH₂)₉—O—CO—CH=CH₂
TR-16: X¹, X², X³: —O—; R³², R³⁵, R³⁸: —O—(CH₂)₄—CH=CH—(CH₂)₄—O—CO—CH=CH₂
TR-17: X¹, X², X³: —O—; R³¹, R³², R³⁴, R³⁵, R³⁷, R³⁸: —O—(CH₂)₄—CH=CH—(CH₂)₄—O—CO—CH=CH₂
TR-18: X¹, X², X³: —O—; R³¹, R³³, R³⁴, R³⁶, R³⁷, R³⁹: —O—(CH₂)₉—O—CO—CH=CH₂
TR-19: X¹, X², X³: —O—; R³¹, R³², R³³, R³⁴, R³⁵, R³⁶, R³⁷, R³⁸, R³⁹: —O—(CH₂)₉—O—CO—CH=CH₂
TR-20: X¹, X²: —O—; X³: —NH—; R³², R³⁵, R³⁸: —O—(CH₂)₉—O—CHO—CH=CH₂
TR-21: X¹, X²: —O—; X³: —NH—; R³², R³⁵: —O—(CH₂)₄—O—CO—CH=CH₂; R³⁸: —O—(CH₂)₁₂—CH₃
TR-22: X¹, X²: —O—; X³: —NH—; R³², R³⁵: —O—(CH₂)₄—O—CO—CH=CH₂; R³⁷, R³⁸: —O—(CH₂)₁₂—CH₃
TR-23: X¹, X²: —O—; X³: —NH—; R³², R³⁵: —O—(CH₂)₄—O—CO—CH=CH₂; R³⁸: —O—CO—(CH₂)₁₁—CH₃
TR-24: X¹: —O—; X², X³: —NH—; R³¹, R³³: —O—(CH₂)₁₂—CH₃; R³⁵, R³⁸: —O—(CH₂)₉—O—CO—CH=CH₂
TR-25: X¹: —O—; X², X³: —NH—; R³¹, R³²: —O—(CH₂)₆—O—CH=CH₂; R³⁵, R³⁸: —O—(CH₂)₁₁—CH₃
TR-26: X¹: —O—; X², X³: —NH—; R³¹, R³², R³³: —O—(CH₂)₆—O—CH=CH₂; R³⁵, R³⁸: —O—(CH₂)₁₁—CH₃
TR-27: X¹, X²: —NH—; X³: —S—; R³², R³⁵: —O—(CH₂)₉—O—CO—CH=CH₂; R³⁸: —O—(CH₂)₁₁—CH₃

TR-28: $X^1$, $X^2$: —NH—; $X^3$: —S—; $R^{31}$, $R^{32}$, $R^{34}$, $R^{35}$: —O—$(CH_2)_9$—O—CO—CH=$CH_2$; $R^{38}$ —O—CO—$(CH_2)_{11}$—$CH_3$

TR-29: $X^1$, $X^2$: —NH—; $X^3$—S—; $R^{32}$, $R^{35}$: —O—$(CH_2)_4$—CH=CH—$(CH_2)_4$—O—CO—CH=$CH_2$; $R^{38}$: —O—CO—$(CH_2)_{11}$—$CH_3$

TR-30: $X^1$, $X^2$: —NH—; $X^3$—S—; $R^{31}$, $R^{32}$, $R^{34}$, $R^{35}$: —O—$(CH_2)_4$—CH=CH—$(CH_2)_4$—O—CO—CH=$CH_2$; $R^{38}$: —O—CO—$(CH_2)_{11}$—$CH_3$

TR-31: $X^1$, $X^2$: —NH—; $X^3$—S—; $R^{31}$, $R^{33}$, $R^{34}$, $R^{36}$: —O—$(CH_2)_9$—O—CO—CH=$CH_2$; $R^{38}$: —O—CO—$(CH_2)_{11}$—$CH_3$

TR-32: $X^1$, $X^2$: —NH—; $X^3$—S—; $R^{31}$, $R^{32}$, $R^{33}$, $R^{34}$, $R^{35}$, $R^{36}$: —O—$(CH_2)_9$—O—CO—CH=$CH_2$; $R^{38}$: —O—CO—$(CH_2)_{11}$—$CH_3$

TR-33: $X^1$, $X^2$: —O—; $X^3$: —S—; $R^{32}$, $R^{35}$, $R^{38}$: —O—$(CH_2)_9$—O—CO—CH=$CH_2$

TR-34: $X^1$, $X^2$: —O—; $X^3$: —S—; $R^{32}$, $R^{35}$: —O—$(CH_2)_4$—O—CO—CH=$CH_2$; $R^{38}$: —O—$(CH_2)_{12}$—$CH_3$

TR-35: $X^1$, $X^2$: —O—; $X^3$: —S—; $R^{32}$, $R^{35}$: —O—$(CH_2)_4$—O—CO—CH=$CH_2$; $R^{37}$, $R^{38}$: —O—$(CH_2)_{12}$—$CH_3$

TR-36: $X^1$, $X^2$: —O—; $X^3$: —S—; $R^{32}$, $R^{35}$: —O—$(CH_2)_4$—O—CO—CH=$CH_2$; $R^{38}$: —O—CO—$(CH_2)_{11}$—$CH_3$

TR-37: $X^1$: —O—; $X^2$, $X^3$: —S—; $R^{31}$, $R^{33}$: —O—$(CH_2)_{12}$—$CH_3$; $R^{35}$, $R^{38}$: —O—$(CH_2)_9$—O—CO—CH=$CH_2$

TR-38: $X^1$: —O—; $X^2$, $X^3$: —S—; $R^{31}$, $R^{32}$: —O—$(CH_2)_6$—O—CO—CH=$CH_2$; $R^{35}$, $R^{38}$: —O—$(CH_2)_{11}$—$CH_3$

TR-39: $X^1$: —O—; $X^2$, $X^3$: —S—; $R^{31}$, $R^{32}$, $R^{33}$: —O—$(CH_2)_6$—O—CO—CH=$CH_2$; $R^{35}$, $R^{38}$: —O—$(CH_2)_{11}$—$CH_3$

TR-40: $X^1$, $X^2$, $X^3$: —S—; $R^{32}$, $R^{35}$, $R^{38}$: —O—$(CH_2)_9$—O—CO—CH=$CH_2$

TR-41: $X^1$, $X^2$, $X^3$: —S—; $R^{31}$, $R^{32}$, $R^{34}$, $R^{35}$, $R^{37}$, $R^{38}$: —O—$(CH_2)_9$—O—CO—CH=$CH_2$

TR-42: $X^1$, $X^2$, $X^3$: —S—; $R^{32}$, $R^{35}$, $R^{38}$: —O—$(CH_2)_4$—CH=CH—$(CH_2)_4$—O—CO—CH=$CH_2$

TR-43: $X^1$, $X^2$, $X^3$: —S—; $R^{31}$, $R^{32}$, $R^{34}$, $R^{35}$, $R^{37}$, $R^{38}$: —O—$(CH_2)_4$—CH=CH—$(CH_2)_4$—O—CO—CH=$CH_2$

TR-44: $X^1$, $X^2$, $X^3$: —S—; $R^{31}$, $R^{33}$, $R^{34}$, $R^{36}$, $R^{37}$, $R^{39}$: —O—$(CH_2)_9$—O—CO—CH=$CH_2$

TR-45: $X^1$, $X^2$, $X^3$: —S—; $R^{31}$, $R^{32}$, $R^{33}$, $R^{34}$, $R^{35}$, $R^{36}$, $R^{37}$, $R^{38}$, $R^{39}$: —O—$(CH_2)_9$—O—CO—CH=$CH_2$

TR-46: $X^1$, $X^2$: —S—; $X^3$: —NH—; $R^{32}$, $R^{35}$, $R^{38}$: —O—$(CH_2)_9$—O—CO—CH=$CH_2$

TR-47: $X^1$, $X^2$: —S—; $X^3$: —NH—; $R^{32}$, $R^{35}$: —O—$(CH_2)_4$—O—CO—CH=$CH_2$; $R^{38}$: —O—$(CH_2)_{12}$—$CH_3$

TR-48: $X^1$, $X^2$: —S—; $X^3$: —NH—; $R^{32}$, $R^{35}$: —O—$(CH_2)_4$—O—CO—CH=$CH_2$; $R^{37}$, $R^{38}$: —O—$(CH_2)_{12}$—$CH_3$

TR-49: $X^1$, $X^2$: —S—; $X^3$: —NH—; $R^{32}$, $R^{35}$: —O—$(CH_2)_4$—O—CO—CH=$CH_2$, $R^{38}$: —O—CO—$(CH_2)_{11}$—$CH_3$

TR-50: $X^1$: —O—; $X^2$: —NH—; $X^3$: —S—; $R^{31}$, $R^{33}$: —O—$(CH_2)_{12}$—$CH_3$; $R^{35}$—O—$(CH_2)_9$—O—CO—CH=$CH_2$; $R^{38}$: —O—$(CH_2)_{12}$—$CH_3$

TR-51: $X^1$: —O—; $X^2$: —NH—; $X^3$: —S—; $R^{31}$, $R^{32}$: —O—$(CH_2)_6$—O—CO—CH=$CH_2$; $R^{35}$: —O—$(CH_2)_{11}$—$CH_3$; $R^{38}$: —O—$(CH_2)_{12}$—$CH_3$

TR-52: $X^1$: —O—; $X^2$: —NH—; $X^3$: —S—; $R^{31}$, $R^{32}$, $R^{33}$: —O—$(CH_2)_6$—O—CO—CH=$CH_2$; $R^{35}$: —O—$(CH_2)_{11}$—$CH_3$; $R^{38}$: —O—$(CH_2)_{12}$—$CH_3$

TR-53: $X^1$, $X^2$, $X^3$: —O—; $R^{32}$, $R^{35}$, $R^{38}$: —O—$(CH_2)_9$—O-EpEt

TR-54: $X^1$, $X^2$, $X^3$: —O—; $R^{31}$, $R^{32}$, $R^{34}$, $R^{35}$, $R^{37}$, $R^{38}$: —O—$(CH_2)_9$—O-EpEt

TR-55: $X^1$, $X^2$, $X^3$: —O—; $R^{32}$, $R^{35}$, $R^{38}$: —O—$(CH_2)_4$—CH=CH—$(CH_2)_4$—O-EpEt

TR-56: $X^1$, $X^2$, $X^3$: —O—; $R^{31}$, $R^{32}$, $R^{34}$, $R^{35}$, $R^{37}$, $R^{38}$: —O—$(CH_2)_4$—CH=CH—$(CH_2)_4$—O-EpEt

TR-57: $X^1$, $X^2$, $X^3$: —O—; $R^{31}$, $R^{33}$, $R^{34}$, $R^{36}$, $R^{37}$, $R^{39}$: —O—$(CH_2)_9$—O-EpEt

TR-58: $X^1$, $X^2$, $X^3$: —O—; $R^{32}$, $R^{35}$, $R^{38}$: —O—$(CH_2)_9$—O—CH=$CH_2$

TR-59: $X^1$, $X^2$: —O—; $X^3$: —NH—; $R^{32}$, $R^{35}$, $R^{38}$: —O—$(CH_2)_9$—O-EpEt

TR-60: $X^1$, $X^2$: —O—; $X^3$: —NH—; $R^{32}$, $R^{35}$: —O—$(CH_2)_4$—O-EpEt; $R^{38}$: —O—$(CH_2)_{12}$—$CH_3$

TR-61: $X^1$, $X^2$: —O—; $X^3$: —NH—; $R^{32}$, $R^{35}$: —O—$(CH_2)_4$—O-EpEt; $R^{37}$, $R^{38}$: —O—$(CH_2)_{12}$—$CH_3$

TR-62: $X^1$, $X^2$: —O—; $X^3$: —NH—; $R^{32}$, $R^{35}$: —O—$(CH_2)_4$—O-EpEt; $R^{38}$: —O—CO—$(CH_2)_{11}$—$CH_3$

TR-63: $X^1$: —O—; $X^3$: —NH—; $R^{31}$, $R^{33}$, —O—$(CH_2)_{12}$—$CH_3$; $R^{35}$, $R^{38}$—O—$(CH_2)_9$—O-EpEt

TR-64: $X^1$: —O—; $X^3$: —NH—; $R^{31}$, $R^{32}$: —O—$(CH_2)_6$—O-EpEt; $R^{35}$, $R^{38}$—O—$(CH_2)_{11}$—$CH_3$

TR-65: $X^1$, $X^2$: —O—; $X^3$: —NH—; $R^{32}$, $R^{35}$, $R^{38}$: —O—$(CH_2)_9$—O—CH=$CH_2$ (Note) Undefined R: unsubstituted (hydrogen atom); EpEt: Epoxyethyl The compound having 1,3,5-triazine ring is preferably a melamine compound represented by the following formula (IV):

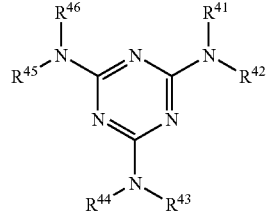

In the formula (IV), $R^{41}$, $R^{43}$ and $R^{45}$ each independently represent a $C_1$-$C_{30}$ alkyl group or hydrogen atom. $R^{42}$, $R^{44}$ and $R^{46}$ each independently represent an alkyl group, alkenyl group, aryl, group or heterocyclic group. Alternatively, $R^{41}$ and $R^{42}$, $R^{43}$ and $R^{44}$ or $R^{45}$ and $R^{46}$ are connected to each other to form a heterocyclic group. $R^{41}$, $R^{43}$ and $R^{45}$ each are preferably a $C_1$-$C_{20}$ allyl group or hydrogen atom, more preferably a $C_1$-$C_{10}$ alkyl group or hydrogen atom, most preferably a $C_1$-$C_6$ alkyl group or hydrogen atom. $R^{42}$, $R^{44}$ and $R^{46}$ each are particularly preferably an aryl group. The definition and substituents on the aforementioned alkyl group, alkenyl group, aryl group and heterocyclic group are the same as that of the various groups described with reference to the formula (III). The heterocyclic group formed by the connection of $R^{41}$ and $R^{42}$, $R^{43}$ and $R^{44}$ or $R^{45}$ and $R^{46}$ is the same as the heterocyclic group having a free atomic valency at nitrogen atom described with reference to the formula (III).

At least one of $R^{42}$, $R^{43}$ and $R^{46}$ preferably contains a $C_9$-$C_{30}$ alkylene moiety or alkenylene moiety. The $C_9$-$C_{30}$ alkylene moiety or alkenylene moiety is preferably straight-chain. The alkylene moiety or alkenylene moiety is preferably contained in the substituents on the aryl group. At least one of $R^{42}$, $R^{44}$ and $R^{46}$ preferably has a polymerizable group as a substituent. The melamine compound preferably has at least two polymerizable groups. The polymerizable group is preferably disposed at the end of $R^{42}$, $R^{44}$ and $R^{46}$. By introducing a polymerizable group into the melamine compound, the polymerizable group can be incorporated in the optical anisotropic layer with the melamine compound being polymerized with a liquid crystal compound, e.g., discotic liquid crystal molecule. $R^{42}$, $R^{44}$ and $R^{46}$ having a polymerizable group as a substituent are the same as the group represented by the formula (Rp).

Specific examples of the melamine compound will be given below.

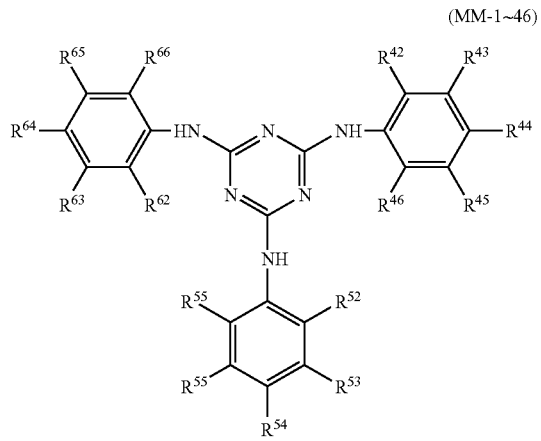
(MM-1~46)

MM-1: $R^{43}$, $R^{44}$, $R^{53}$, $R^{54}$, $R^{63}$, $R^{64}$: —O—$(CH_2)_9$—$CH_3$
MM-2: $R^{43}$, $R^{44}$, $R^{53}$, $R^{54}$, $R^{63}$, $R^{64}$: —O—$(CH_2)_{11}$—$CH_3$
MM-3: $R^{43}$, $R^{44}$, $R^{53}$, $R^{54}$, $R^{63}$, $R^{64}$: —O—$(CH_2)_{15}$—$CH_3$
MM-4: $R^{44}$, $R^{54}$, $R^{64}$: —O—$(CH_2)_9$—$CH_3$
MM-5: $R^{44}$, $R^{54}$, $R^{64}$: —O—$(CH_2)_{15}$—$CH_3$
MM-6: $R^{43}$, $R^{53}$, $R^{63}$: —O—$CH_3$; $R^{44}$, $R^{54}$, $R^{64}$: —O—$(CH_2)_{17}$—$CH_3$
MM-7: $R^{44}$, $R^{54}$, $R^{64}$: —CO—O—$(CH_2)_{11}$—$CH_3$
MM-8: $R^{44}$, $R^{54}$, $R^{64}$: —$SO_2$—NH—O—$(CH_2)_{17}$—$CH_3$
MM-9: $R^{43}$, $R^{53}$, $R^{63}$: —O—CO—$(CH_2)_{15}$—$CH_3$
MM-10: $R^{42}$, $R^{52}$, $R^{62}$: —O—CO—$(CH_2)_{17}$—$CH_3$
MM-11: $R^{42}$, $R^{52}$, $R^{62}$: —O—$CH_3$; $R^{43}$, $R^{53}$, $R^{63}$: —CO—O—$(CH_2)_{11}$—$CH_3$
MM-12: $R^{42}$, $R^{52}$, $R^{62}$: —Cl; $R^{43}$, $R^{53}$, $R^{63}$: —CO—O—$(CH_2)_{11}$—$CH_3$
MM-13: $R^{42}$, $R^{52}$, $R^{62}$: —O$(CH_2)_{11}$—$CH_3$; $R^{45}$, $R^{55}$, $R^{65}$: —$SO_2$—NH-iso-$C_3H_7$
MM-14: $R^{42}$, $R^{52}$, $R^{62}$: —Cl; $R^{45}$, $R^{55}$, $R^{65}$: —$SO_2$—NH—$(CH_2)_{15}$—$CH_3$
MM-15: $R^{42}$, $R^{46}$, $R^{52}$, $R^{56}$, $R^{62}$, $R^{66}$: —Cl; $R^{45}$, $R^{55}$, $R^{65}$: —$SO_2$—NH—$(CH_2)_{19}$—$CH_3$
MM-16: $R^{43}$, $R^{54}$: —O—$(CH_2)_9$—$CH_3$; $R^{44}$, $R^{53}$, $R^{63}$, $R^{64}$: —O—$(CH_2)_{11}$—$CH_3$
MM-17: $R^{44}$: —O—$(CH_2)_{11}$—$CH_3$; $R^{54}$: —O—$(CH_2)_{15}$—$CH_3$; $R^{64}$: —O—$(CH_2)_{17}$—$CH_3$
MM-18: $R^{42}$, $R^{45}$, $R^{52}$, $R^{55}$, $R^{62}$, $R^{65}$: —O—$CH_3$; $R^{44}$, $R^{54}$, $R^{64}$: —NH—O—$(CH_2)_{14}$—$CH_3$
MM-19: $R^{42}$, $R^{45}$, $R^{52}$, $R^{55}$, $R^{62}$, $R^{65}$: —O—$(CH_2)_3$—$CH_3$; $R^{44}$, $R^{54}$, $R^{64}$: —O—$(CH_2)_{15}$—$CH_3$
MM-20: $R^{42}$, $R^{52}$, $R^{62}$: —NH—$SO_2$—$(CH_2)_{15}$—$CH_3$; $R^{44}$, $R^{45}$, $R^{54}$, $R^{55}$, $R^{64}$, $R^{65}$: —Cl
MM-21: $R^{42}$, $R^{43}$, $R^{52}$, $R^{53}$, $R^{62}$, $R^{63}$: —F; $R^{44}$, $R^{54}$, $R^{64}$: —O—NH—$(CH_2)_{15}$—$CH_3$; $R^{45}$, $R^{46}$, $R^{55}$, $R^{56}$, $R^{65}$, $R^{66}$: —Cl
MM-22: $R^{42}$, $R^{52}$, $R^{62}$: —Cl; $R^{44}$, $R^{54}$, $R^{64}$: —$CH_3$; $R^{45}$, $R^{55}$, $R^{65}$: —NH—CO—$(CH_2)_{12}$—$CH_3$
MM-23: $R^{42}$, $R^{52}$, $R^{62}$: —OH; $R^{44}$, $R^{54}$, $R^{64}$: —$CH_3$; $R^{45}$, $R^{55}$, $R^{65}$: —O—$(CH_2)_{15}$—$CH_3$
MM-24: $R^{42}$, $R^{45}$, $R^{52}$, $R^{55}$, $R^{62}$, $R^{65}$: —O—$CH_3$; $R^{44}$, $R^{64}$: —$(CH_2)_{11}$—$CH_3$
MM-25: $R^{42}$, $R^{52}$, $R^{62}$: —NH—$SO_2$—$CH_3$; $R^{45}$, $R^{55}$, $R^{65}$: —CO—O—$(CH_2)_{11}$—$CH_3$
MM-26: $R^{42}$, $R^{52}$, $R^{62}$: —S—$(CH_2)_{11}$—$CH_3$; $R^{45}$, $R^{55}$, $R^{56}$: —$SO_2$—$NH_2$
MM-27: $R^{43}$, $R^{44}$, $R^{53}$, $R^{54}$, $R^{63}$, $R^{64}$: —O—$(CH_2)_{12}$—O—CO—CH=$CH_2$
MM-28: $R^{43}$, $R^{44}$, $R^{53}$, $R^{54}$, $R^{63}$, $R^{64}$: —O—$(CH_2)_8$—O—CO—CH=$CH_2$
MM-29: $R^{43}$, $R^{44}$, $R^{53}$, $R^{54}$, $R^{63}$, $R^{64}$: —O—CO—$(CH_2)_7$—O—CO—CH=$CH_2$
MM-30: $R^{44}$, $R^{54}$, $R^{64}$: —CO—O—$(CH_2)_{12}$—O—CO—C($CH_3$)=$CH_2$
MM-31: $R^{43}$, $R^{44}$, $R^{53}$, $R^{54}$, $R^{63}$, $R^{64}$: —O—CO-p-Ph-O—$(CH_2)_4$—O—CO—CH=$CH_2$
MM-32: $R^{42}$, $R^{44}$, $R^{52}$, $R^{54}$, $R^{62}$, $R^{64}$: —NH—$SO_2$—$(CH_2)_8$—O—CO—CH=$CH_2$; $R^{45}$, $R^{55}$, $R^{65}$: —Cl
MM-33: $R^{42}$, $R^{52}$, $R^{62}$: —NH—$SO_2$—$CH_3$; $R^{45}$, $R^{55}$, $R^{65}$: —CO—O—$(CH_2)_{12}$—O—CO—CH=$CH_2$
MM-34: $R^{44}$, $R^{54}$, $R^{64}$: —O—$(CH_2)_9$—O—CO—CH=$CH_2$
MM-35: $R^{43}$, $R^{44}$, $R^{53}$, $R^{54}$, $R^{63}$, $R^{64}$: —O$(CH_2)_9$—O—CO—CH=$CH_2$
MM-36: $R^{44}$, $R^{54}$, $R^{64}$: —O—$(CH_2)_4$—CH=CH—$(CH_2)_4$—O—CO—CH=$CH_2$
MM-37: $R^{43}$, $R^{44}$, $R^{53}$, $R^{54}$, $R^{63}$, $R^{64}$: —O—$(CH_2)_4$—CH=CH—$(CH_2)_4$—O—CO—CH=$CH_2$
MM-38: $R^{43}$, $R^{45}$, $R^{53}$, $R^{55}$, $R^{63}$, $R^{65}$: —O—$(CH_2)_9$—O—CO—CH=$CH_2$
MM-39: $R^{43}$, $R^{44}$, $R^{53}$, $R^{54}$, $R^{55}$, $R^{63}$, $R^{64}$, $R^{65}$: —O—$(CH_2)_9$—O—CO—CH=$CH_2$
MM-40: $R^{44}$, $R^{54}$: —O—$(CH_2)_4$—O—CO—CH=$CH_2$; $R^{64}$: —O—$(CH_2)_9$—O—CO—CH=$CH_2$
MM-41: $R^{44}$, $R^{54}$: —O—$(CH_2)_4$—O—CO—CH=$CH_2$; $R^{64}$: —O—$(CH_2)_{12}$—$CH_3$
MM-42: $R^{44}$, $R^{54}$: —O—$(CH_2)_4$—O—CO—CH=$CH_2$; $R^{63}$, $R^{64}$: —O—$(CH_2)_{12}$—$CH_3$
MM-43: $R^{44}$, $R^{54}$: —O—$(CH_2)_4$—O—CO—CH=$CH_2$; $R^{63}$, $R^{64}$: —O—CO—$(CH_2)_{11}$—$CH_3$
MM-44: $R^{43}$, $R^{45}$: —O—$(CH_2)_{12}$—$CH_3$; $R^{54}$, $R^{64}$: —O—$(CH_2)_9$—O—CO—CH=$CH_2$
MM-45: $R^{43}$, $R^{44}$: —O—$(CH_2)_6$—O—CO—CH=$CH_2$; $R^{54}$, $R^{64}$: —O—$(CH_2)_{11}$—$CH_3$
MM-46: $R^{43}$, $R^{44}$, $R^{45}$: —O—$(CH_2)_6$—O—CO—CH=$CH_2$; $R^{63}$, $R^{64}$: —O—$(CH_2)_{11}$—$CH_3$ (Note) Undefined R: unsubstituted (hydrogen atom); p-Ph: p-Phenylene

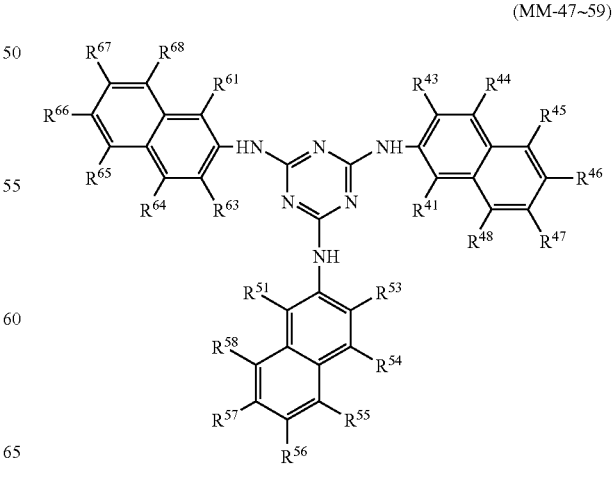
(MM-47~59)

MM-47; $R^{46}$, $R^{56}$, $R^{66}$; —SO$_2$—NH—(CH$_2$)$_{15}$—CH$_3$; $R^{48}$, $R^{58}$, $R^{68}$; —O—(CH$_2$)$_{11}$—CH$_3$

MM-48; $R^{45}$, $R^{55}$, $R^{65}$; —SO$_2$—NH—(CH$_2$)$_{17}$—CH$_3$

MM-49; $R^{46}$, $R^{56}$, $R^{66}$; —SO$_2$—NH—(CH$_2$)$_{15}$—CH$_3$

MM-50; $R^{45}$, $R^{55}$, $R^{65}$; —O—(CH$_2$)$_{17}$—CH$_3$; $R^{47}$, $R^{57}$, $R^{67}$; —SO$_2$—NH—CH$_3$

MM-51; $R^{43}$, $R^{53}$, $R^{63}$; —O—(CH$_2$)$_{15}$—CH$_3$

MM-52; $R^{41}$, $R^{51}$, $R^{61}$; —O—(CH$_2$)$_{17}$—CH$_3$

MM-53; $R^{46}$, $R^{56}$, $R^{66}$; —SO$_2$—NH-Ph; $R^{48}$, $R^{58}$, $R^{68}$; —O—(CH$_2$)$_{11}$—CH$_3$

MM-54; $R^{45}$, $R^{55}$, $R^{65}$; —O—(CH$_2$)$_{21}$—CH$_3$; $R^{47}$, $R^{57}$, $R^{67}$; —SO$_2$—NH-Ph

MM-55; $R^{41}$, $R^{51}$, $R^{61}$; -p-Ph-(CH$_2$)$_{11}$—CH$_3$

MM-56; $R^{46}$, $R^{48}$, $R^{56}$, $R^{58}$, $R^{66}$, $R^{68}$; —SO$_2$—NH—(CH$_2$)$_7$—CH$_3$

MM-57; $R^{46}$, $R^{56}$, $R^{66}$; —SO$_2$—NH—(CH$_2$)$_{10}$—O—CO—CH=CH$_2$; $R^{48}$, $R^{58}$, $R^{68}$; —O—(CH$_2$)$_{12}$—CH$_3$

MM-58; $R^{45}$, $R^{55}$, $R^{65}$; —O—(CH$_2$)$_{12}$—O—CO—CH=CH$_2$; $R^{47}$, $R^{57}$, $R^{67}$; —SO$_2$—NH-Ph

MM-59; $R^{43}$, $R^{53}$, $R^{63}$; —O—(CH$_2$)$_{16}$—O—CO—CH=CH$_2$ (Note) Undefined R: unsubstituted (hydrogen atom); Ph: Phenyl; p-Ph: p-Phenylene (MM-60~71)

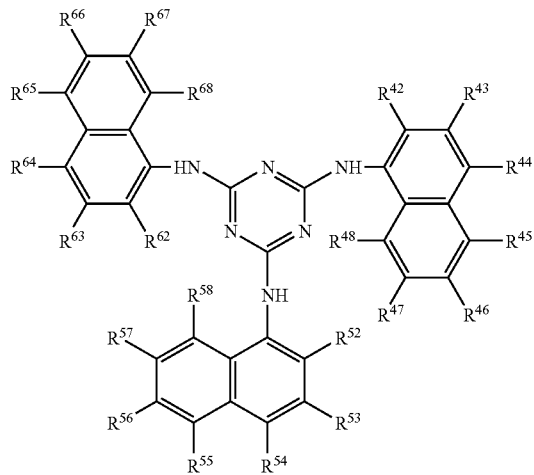

MM-60: $R^{45}$, $R^{55}$, $R^{65}$: —NH—CO—(CH$_2$)$_{14}$—CH$_3$

MM-61: $R^{42}$, $R^{52}$, $R^{62}$: —O—(CH$_2$)$_{17}$—CH$_3$

MM-62: $R^{44}$, $R^{54}$, $R^{64}$: —O—(CH$_2$)$_{15}$—CH$_3$

MM-63: $R^{45}$, $R^{55}$, $R^{65}$: —SO$_2$—NH—(CH$_2$)$_{15}$—CH$_3$

MM-64: $R^{43}$, $R^{53}$, $R^{63}$: —CO—NH—(CH$_2$)$_{17}$—CH$_3$; $R^{44}$, $R^{54}$, $R^{64}$: —OH

MM-65: $R^{45}$, $R^{55}$, $R^{65}$: —O—(CH$_2$)$_{15}$—CH$_3$; $R^{46}$, $R^{56}$, $R^{66}$: —SO$_2$—NH—(CH$_2$)$_{11}$—CH$_3$

MM-66: $R^{47}$, $R^{57}$, $R^{67}$: —O—(CH$_2$)$_{21}$—CH$_3$

MM-67: $R^{44}$, $R^{54}$, $R^{64}$: —O-p-Ph-(CH$_2$)$_{11}$—CH$_3$

MM-68: $R^{46}$, $R^{56}$, $R^{66}$: —SO$_2$—NH—(CH$_2$)$_{15}$—CH$_3$

MM-69: $R^{43}$, $R^{53}$, $R^{63}$: —CO—NH—(CH$_2$)$_{17}$—CH$_3$; $R^{44}$, $R^{54}$, $R^{64}$: —O—(CH$_2$)$_{12}$—O—CO—CH=CH$_2$

MM-70: $R^{45}$, $R^{55}$, $R^{65}$: —O—(CH$_2$)$_8$—O—CO—CH=CH$_2$; $R^{46}$, $R^{56}$, $R^{66}$: —SO$_2$—NH—(CH$_2$)$_{11}$—CH$_3$

MM-71: $R^{43}$, $R^{46}$, $R^{53}$, $R^{56}$, $R^{63}$, $R^{66}$: —SO$_2$—NH—(CH$_2$)$_8$—O—CO—CH=CH$_2$ (Note) Undefined R: unsubstituted (hydrogen atom); p-Ph: p-Phenylene (MM-72~75)

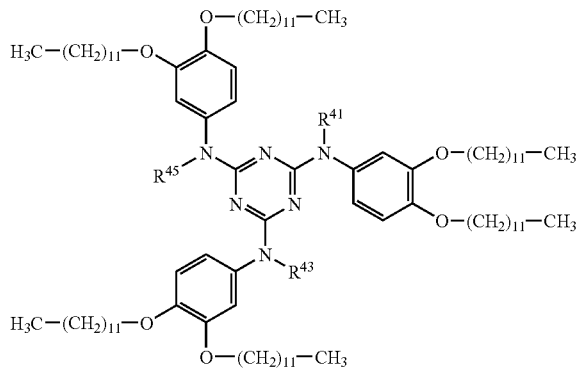

MM-72: $R^{41}$, $R^{43}$, $R^{45}$: —CH$_3$

MM-73: $R^{41}$, $R^{43}$, $R^{45}$: —C$_2$H$_5$

MM-74: $R^{41}$, $R^{43}$: —C$_2$H$_5$; $R^{45}$: —CH$_3$

MM-75: $R^{41}$, $R^{43}$, $R^{45}$: —(CH$_2$)$_3$—CH$_3$ (MM-76~88)

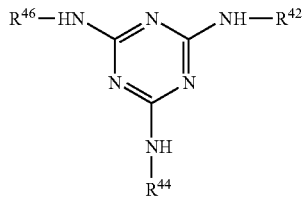

MM-76: $R^{42}$, $R^{44}$, $R^{46}$: —(CH$_2$)$_9$—O—CO—CH=CH$_2$

MM-77: $R^{42}$, $R^{44}$, $R^{46}$: —(CH$_2$)$_4$—CH=CH—(CH$_2$)$_4$—O—CO—CH=CH$_2$

MM-78: $R^{42}$, $R^{44}$: —(CH$_2$)$_9$—O—CO—CH=CH$_2$; $R^{46}$: —(CH$_2$)$_{12}$—CH$_3$

MM-79: $R^{42}$, $R^{44}$: —(CH$_2$)$_4$—CH=CH—(CH$_2$)$_4$—O—CO—CH=CH$_2$; $R^{46}$: —(CH$_2$)$_{12}$—CH$_3$

MM-80: $R^{42}$: —(CH$_2$)$_9$—O—CO—CH=CH$_2$; $R^{44}$, $R^{46}$: —(CH$_2$)$_{12}$—CH$_3$

MM-81: $R^{42}$: —(CH$_2$)$_4$—CH=CH—(CH$_2$)$_4$—O—CO—CH=CH$_2$; $R^{44}$, $R^{46}$: —(CH$_2$)$_{12}$—CH$_3$

MM-82: $R^{42}$, $R^{44}$: —(CH$_2$)$_4$—O—CO—CH=CH$_2$; $R^{46}$: —(CH$_2$)$_{12}$—CH$_3$

MM-83: $R^{42}$: —(CH$_2$)$_4$—O—CO—CH=CH$_2$; $R^4$, $R^{46}$—(CH$_2$)$_{12}$—CH$_3$

MM-84: $R^{42}$, $R^{44}$, $R^{46}$: —(CH$_2$)$_9$—O-EpEt

MM-85: $R^{42}$, $R^{44}$, $R^{46}$—(CH$_2$)$_4$—CH=CH—(CH$_2$)$_4$—O-EpEt

MM-86: $R^{42}$, $R^{44}$: —(CH$_2$)$_9$—O-EpEt; $R^{46}$: —(CH$_2$)$_{12}$—CH$_3$

MM-87: $R^{42}$, $R^{44}$, $R^{46}$: —(CH$_2$)$_9$—O—CH=CH$_2$

MM-88: $R^{42}$, $R^{44}$: —(CH$_2$)$_9$—O—CH=CH$_2$, $R^{16}$: —(CH$_2$)$_{12}$—CH$_3$ (Note) EpEt: Epoxyethy

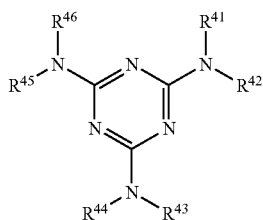
(MM-89~95)

MM-89: $R^{41}, R^{42}, R^{43}, R^{44}, R^{45}, R^{46}$: —$(CH_2)_9$—$CH_3$
M-90: $R^{41}, R^{43}, R^{45}$: —$CH_3$; $R^{42}, R^4, R^{46}$: —$(CH_2)_{17}$—$CH_3$
MM-91: $R^{41}, R^{42}, R^{43}, R^{44}$: —$(CH_2)_7$—$CH_3$; $R^{45}, R^{46}$: —$(CH_2)_5$—$CH_3$
MM-92: $R^{41}, R^{42}, R^{43}, R^{44}, R^{45}, R^{46}$: —$C_yH_x$
MM-93: $R^{41}, R^{42}, R^{43}, R^{44}, R^{45}, R^{46}$: —$(CH_2)_2$—O—$C_2H_5$
MM-94: $R^{41}, R^{43}, R^{45}$: —$CH_3$; $R^{42}, R^{44}, R^{46}$: —$(CH_2)_{12}$—O—CO—CH=$CH_2$
MM-95: $R^{41}, R^{42}, R^{43}, R^{44}, R^{45}, R^{46}$: —$(CH_2)_8$—O—CO—CH=$CH_2$ (Note) CyHx: Cyclohexyl

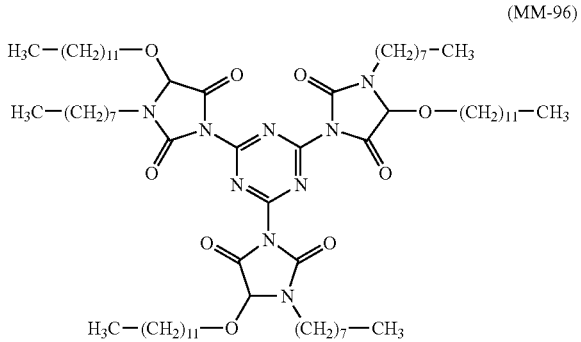
(MM-96)

As the melamine compound there may be used a melamine polymer. The melamine polymer is preferably synthesized by the polymerization reaction of a melamine compound represented by the following formula (V) with a carbonyl compound.

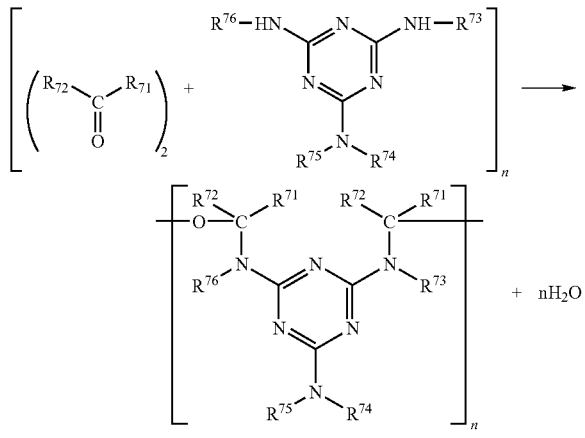
(V)

wherein $R^{71}, R^{72}, R^{73}, R^{74}, R^{75}$ and $R^{76}$ each independently represent a hydrogen atom, allyl group, alkenyl group, aryl group or heterocyclic group. The definition and substituents on the aforementioned alkyl group, alkenyl group, aryl group and heterocyclic group are the same as that of the various groups described with reference to the formula (III). The polymerization reaction of the melamine compound with the carbonyl compound is the same as the method of synthesis of ordinary melamine resin (e.g., melamine formaldehyde resin). Commercially available melamine polymers (melamine resin) may be used. The molecular weight of the melamine polymer is preferably from not smaller than 2,000 to not greater than 400,000.

At least one of $R^{71}, R^{72}, R^{73}, R^{74}, R^{75}$ and $R^{76}$ preferably contains a $C_9$-$C_{30}$ alkylene moiety or alkenylene, moiety. The $C_9$-$C_{30}$ alkylene moiety or alkenylene moiety is preferably straight-chain. The allylene moiety or alkenylene moiety is preferably contained in the substituents on the aryl group. At least one of $R^{71}, R^{72}, R^{73}, R^{74}, R^{75}$ and $R^{76}$ preferably has a polymerizable group as a substituent. The polymerizable group is preferably disposed at the end of $R^{71}, R^{72}, R^{73}, R^{74}, R^{75}$ and $R^{76}$. By introducing a polymerizable group into the melamine polymer, the polymerizable group can be incorporated in the optical anisotropic layer with the melamine polymer being polymerized with a liquid crystal compound, e.g., discotic liquid crystal molecule. $R^{71}, R^{72}, R^{73}, R^{74}, R^{75}$ and $R^{76}$ as a substituent are the same as the group represented by the formula (Rp). The polymerizable group may be incorporated in one of the carbonyl group ($R^{71}, R^{72}$) and the melamine compound ($R^{73}, R^{74}, R^{75}, R^{76}$). In the case where the melamine compound has a polymerizable group, the carbonyl compound is preferably a compound having a simple chemical structure such as formaldehyde. In the case where the carbonyl compound has a polymerizable group, the melamine compound is preferably a compound having a simple structure such as (unsubstituted) melamine.

Examples of the carbonyl compound having a polymerizable group will be described hereinafter.

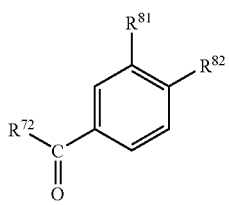
(CO-1~11)

CO-1: $R^{72}$: —H; $R^{82}$: —O—$(CH_2)_9$—O—CO—CH=$CH_2$
CO-2: $R^{72}$: —H; $R^{81}, R^{82}$: —O—$(CH_2)_9$—O—CO—CH=$CH_2$
CO-3: $R^{72}$: —H; $R^{82}$: —O—$(CH_2)_4$—CH=CH—$(CH_2)_4$—O—CO—CH=$CH_2$
CO-4: $R^{72}$: —H; $R^{81}, R^{82}$: —O—$(CH_2)_4$—CH=CH—$(CH_2)_4$—O—CO—CH=$CH_2$
CO-5: $R^{72}$: —H; $R^{81}, R^{83}$: —O—$(CH_2)_9$—O—CO—CH=$CH_2$
CO-6: $R^{72}$: —H; $R^{81}, R^{82}, R^{83}$: —O—$(CH_2)_9$—O—CO—CH=$CH_2$
CO-7: $R^{72}$: —$CH_3$; $R^{82}$: —O—$(CH_2)_9$—O—CO—CH=$CH_2$
CO-8: $R^{72}$: —$(CH_2)_{11}$—$CH_3$; $R^{82}$: —O—$(CH_2)_4$—O—CO—CH=$CH_2$
CO-9: $R^{72}$: —$(CH_2)_9$—O—CO—CH=$CH_2$; $R^{32}$: —O—$(CH_2)_4$—O—CO—CH=$CH_2$

CO-10: $R^{72}$: —$(CH_2)_9$—O—CO-EpEt; $R^{82}$: —O—$(CH_2)_4$—O—CO—CH=$CH_2$

CO-11: $R^{72}$: —$(CH_2)_4$—O—CO—CH=$CH_2$; $R^{81}$, $R^{83}$: —O—$(CH_2)_{12}$—$CH_3$ (Note) Undefined R: unsubstituted (hydrogen atom); EpEt: Epoxyethyl

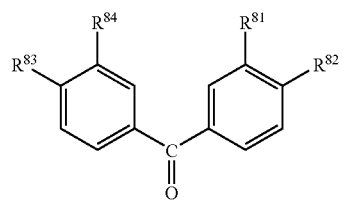
(CO-12~13)

CO-12: $R^{81}$, $R^{82}$, $R^{83}$, $R^{84}$: —O—$(CH_2)_6$—O—CO—CH=$CH_2$

CO-13: $R^{82}$, $R^{83}$: —O—$(CH_2)_9$—O—CO—CH=$CH_2$ (Note) Undefined R: unsubstituted (hydrogen atom)

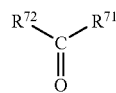
(CO-14~26)

CO-14: $R^{71}$: —$(CH_2)_9$—O—CO—CH=$CH_2$; $R^{72}$: —H

CO-15: $R^{71}$: —$(CH_2)_4$—CH=CH—$(CH_2)_4$—O—CO—CH=$CH_2$; $R^{72}$: —H

CO-16: $R^{71}$: —$(CH_2)_9$—O—CO—CH=$CH_2$; $R^{72}$: —$CH_3$

CO-17: $R^{71}$: —$(CH_2)_4$—CH=CH—$(CH_2)_4$—O—CO—CH=$CH_2$; $R^{72}$: —$CH_3$

CO-18: $R^{71}$: —$(CH_2)_9$—O—CO—CH=$CH_2$; $R^{72}$: -Ph

CO-19: $R^{71}$: —$(CH_2)_4$—CH=CH—$(CH_2)_4$—O—CO—CH=$CH_2$; $R^{72}$: -Ph

CO-20: $R^{71}$: —$(CH_2)_4$—O—CO—CH=$CH_2$; $R^{72}$: —$(CH_2)_9$—O—CO—CH=$CH_2$

CO-21: $R^{71}$: —$(CH_2)_4$—O—CO—CH=$CH_2$; $R^{72}$: —$(CH_2)_{12}$—$CH_3$

CO-22: $R^{71}$: —$(CH_2)_9$—O-EpEt; $R^{72}$: —H

CO-23: $R^{71}$: —$(CH_2)_4$—CH=CH—$(CH_2)_4$—O-EpEt; $R^{72}$: —H

CO-24: $R^{71}$, $R^{72}$: —$(CH_2)_9$—O-EpEt

CO-25: $R^{71}$, $R^{72}$: —$(CH_2)_9$—O—CO—CH=$CH_2$

CO-26: $R^{71}$, $R^{72}$: —$(CH_2)_4$—CH=CH—$(CH_2)_4$—O—CO—CH=$CH_2$ (Note) Ph: Phenyl; EpEt: Epoxyethyl Examples of the melamine polymer having a polymerizable group on the melamine compound side thereof will be described hereinafter.

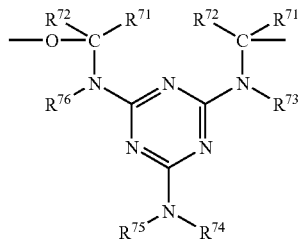
(MP-1~14)

MP-1: $R^{73}$, $R^{75}$, $R^{76}$: —$CH_2$—NH—CO—CH=$CH_2$; $R^{74}$: —$CH_2$—NH—CO—$(CH_2)_8$—$CH_3$

MP-2: $R^{71}$: —$CH_3$; $R^{73}$, $R^{75}$, $R^{76}$: —$CH_2$—NH—CO—CH=$CH_2$; $R^{74}$: —$CH_2$—NH—CO—$(CH_2)_8$—$CH_3$

MP-3: $R^{71}$, $R^{72}$: —$CH_3$; $R^{73}$, $R^{75}$, $R^{76}$: —$CH_2$—NH—CO—CH=$CH_2$; $R^{74}$: —$CH_2$—NH—CO—$(CH_2)_8$—$CH_3$

MP-4: $R^{71}$: -Ph; $R^{73}$, $R^{75}$, $R^{76}$: —$CH_2$—NH—CO—CH=$CH_2$; $R^{74}$: —$CH_2$—NH—CO—$(CH_2)_8$—$CH_3$

MP-5: $R^{73}$, $R^{76}$: —$CH_2$—NH—CO—CH=$CH_2$; $R^{74}$: —$CH_2$—NH—CO—$(CH_2)_7$—CH=CH—$(CH_2)_7$—$CH_3$; $R^{75}$: —$CH_2$—O—$CH_3$

MP-6: $R^{73}$, $R^{76}$: —$CH_2$—NH—CO—CH=$CH_2$; $R^{74}$: —$CH_2$—NH—CO—$(CH_2)_7$—CH=CH—$(CH_2)_7$—$CH_3$; $R^{75}$: —$CH_2$—OH

MP-7: $R^{73}$, $R^{76}$: —$CH_2$—NH—CO—$C_2H_5$; $R^{74}$: —$CH_2$—NH—CO—$(CH_2)_{16}$—$CH_3$; $R^{75}$: —$CH_2$—O—$CH_3$

MP-8: $R^{73}$, $R^{76}$: —$CH_2$—NH—CO—$C_2H_5$; $R^{74}$: —$CH_2$—NH—CO—$(CH_2)_{16}$—$CH_3$; $R^{75}$: —$CH_2$—OH

MP-9: $R^{73}$, $R^{76}$: —$CH_2$—O—CO—CH=$CH_2$; $R^{74}$: —$CH_2$—O—CO—$(CH_2)_7$—CH=CH—$(CH_2)_7$—$CH_3$; $R^{75}$: —$CH_2$—O—$CH_3$

MP-10: $R^{73}$, $R^{76}$: —$CH_2$—O—CO—CH=$CH_2$; $R^{74}$: —$CH_2$—O—CO—$(CH_2)_7$—CH=CH—$(CH_2)_7$—$CH_3$; $R^{75}$: —$CH_2$—OH

MP-11: $R^{73}$, $R^{76}$: —$CH_2$—O—CO—$(CH_2)_7$—CH=CH—$(CH_2)_7$—$CH_3$; $R^{74}$: —$CH_2$—NH—CO—$(CH_2)_7$—CH=CH—$(CH_2)_7$—$CH_3$; $R^{75}$: —$CH_2$—O—$CH_3$

MP-12: $R^{73}$, $R^{76}$: —$CH_2$—O—CO—$(CH_2)_7$—CH=CH—$(CH_2)_7$—$CH_3$; $R^{74}$: —$CH_2$—O—CO—$(CH_2)_7$—CH=CH—$(CH_2)_7$—$CH_3$; $R^{75}$: —$CH_2$—OH

MP-13: $R^{73}$, $R^{74}$, $R^{75}$, $R^{76}$: —$CH_2$—O—$(CH_2)_{11}$—OCO—CH=$CH_2$

MP-14: $R^{73}$, $R^{75}$, $R^{76}$: —$CH_2$—NH—CO—CH=$CH_2$; $R^{74}$: —$CH_2$—O—$(CH_2)_{16}$—$CH_3$ (Note) Undefined R: unsubstituted (hydrogen atom); Ph: Phenyl (Fluorine-containing Surface Active Agent)

The optical anisotropic layer of the invention may have a fluorine-containing surface active agent incorporated therein to have a liquid crystal compound aligned stably and uniformly therein.

The fluorine-containing surface active agent of the invention comprises a hydrophobic group having fluorine atom, a nonionic, anionic, cationic or amphoteric group and optionally a connecting group. The fluorine-containing surface active agent comprising one hydrophobic group and one hydrophilic group is represented by the following formula (II).

$$Rf-L^3-Hy \qquad (II)$$

wherein Rf represents a monovalent hydrocarbon residue substituted by fluorine atom; $L^3$ represents a single bond or divalent connecting group; and H represents a hydrophilic group. Rf in the formula (II) acts as a hydrophobic group. The hydrocarbon residue is preferably an alkyl group or aryl group. The number of carbon atoms in the alkyl group is preferably from 3 to 30. The number of carbon atoms in the aryl group is preferably from 6 to 30. Some or all of the hydrogen atoms contained in the hydrocarbon residue are substituted by fluorine atom. The hydrogen atoms contained in the hydrocarbon residue are preferably substituted by fluorine atom in a proportion of 50% or more, more preferably 60% or more, even more preferably 70% or more, most preferably 80% or more. The rest of the hydrogen atoms may be substituted by other halogen atoms (e.g., chlorine atom, bromine atom). Examples of Rf will be given below.

Rf1: $n\text{-}C_8F_{17}$—
Rf2: $n\text{-}C_6F_{13}$—
Rf3: $Cl\text{—}(CF_2\text{—}CFCl)_3\text{—}CF_2$—
Rf4: $H\text{—}(CF_2)_8$—
Rf5: $H\text{—}(CF_2)_{10}$—
Rf6: $n\text{-}C_9F_{19}$—
Rf7: Pentafluorophenyl
Rf8: $n\text{-}C_7F_{15}$—
Rf9: $Cl\text{—}(CF_2\text{—}CFCl)_2\text{—}CF_2$—
Rf10: $H\text{—}(CF_2)_4$—
Rf11: $H\text{—}(CF_2)_6$—
Rf12: $Cl\text{—}(CF_2)_6$—
Rf13: $C_3F_7$—

In the formula (II), the divalent connecting group is preferably a divalent connecting group selected from the group consisting of alkylene group, arylene group, divalent heterocyclic residue, —CO—, —NR— (in which R represents a $C_1$-$C_5$ alkyl group or hydrogen atom), —O—, —$SO_2$— and combination thereof. Examples of $L^3$ in the formula (II) will be given below. The following molecules are each connected to a hydrophobic group (Rf) on the left side thereof and to a hydroplilic group (Hy) on the right side thereof. AL means an alkylene group, Ar means an arylene group, and Hc means a divalent heterocyclic residue. The alkylene group, arylene group and divalent heterocyclic residue may have substituents (e.g., alkyl group).

L0: single bond
L31: —$SO_2$—NR—
L32: -AL-O—
L33: —CO—NR—
L34: —Ar—O—
L35: —$SO_2$—NR-AL-CO—O—
L36: —CO—O—
L37: —$SO_2$—NR-AL-O—
L38: —$SO_2$—NR-AL-
L39: —CO—NR-AL-
L40: -$AL^1$-O-$AL^2$-
L41: -Hc-AL-
L42: —$SO_2$—NR-$AL^1$-O-$AL^2$-
L43: -AR-
L44: —O-AR-$SO_2$—NR-AL-
L45: —O-AR-$SO_2$—NR—
L46: —O-AR-O—

Hy in the formula (II) is a nonionic hydrophilic group, anionic hydrophilic group, cationic hydrophilic group or combination thereof (amphoteric hydrophilic group), particularly preferably a nonionic hydrophilic group. Examples of Hy in the formula (II) will be given below.

Hy1: —$(CH_2CH_2O)_n$—H (in which n represents an integer of from 5 to 30)
Hy2: —$(CH_2CH_2O)n$-$R^1$ (in which n represents an integer of from 5 to 30; and $R^1$ represents a $C_1$-$C_6$ alkyl group)
Hy3: —$(CH_2CHOCH_2)n$-H (in which n represents an integer of from 5 to 30)
Hy4: —COOM (in which M represents a hydrogen atom, alkaline metal atom or dissociated state)
Hy5: —$SO_3M$ (in which M represents a hydrogen atom, alkaline metal atom or dissociated state)
Hy6: —$(CH_2CH_2O)_n$—$CH_2CH_2CH_2$—$SO_3M$ (in which n represents an integer of from 5 to 30; and M represents a hydrogen atom or alkaline metal atom)
Hy7: —$OPO(OH)_2$ Hy8: —$N^+(CH_3)_3.X^-$ (in which X represents a halogen atom)
Hy9: —$COONH_4$ Hy is preferably a nonionic hydrophilic group (Hy1, Hy2, Hy3), most preferably a hydrophilic group (Hy1) formed by polyethylene oxide. Examples of the fluorine-containing surface active agent represented by the formula (II) will be given below with Rf, $L^3$ and Hy by way of example.

FS-1: Rf1-L31 (R=$C_3H_7$)-Hy1 (n=6)
FS-2: Rf1-L31 (R=$C_3H_7$)-Hy1 (n=11)
FS-3: Rf1-L31 (R=$C_3H_7$)-Hy1 (n=16)
FS-4: Rf1-L31 (R=$C_3H_7$)-Hy1 (n=21)
FS-5: Rf1-L31 (R=$C_2H_5$)-Hy1 (n=6)
FS-6: Rf1-L31 (R=$C_2H_5$)-Hy1 (n=11)
FS-7: Rf1-L31 (R=$C_2H_5$)-Hy1 (n=16)
FS-8: Rf1-L31 (R=$C_2H_5$)-Hy1 (n=21)
FS-9: Rf2-L31 (R=$C_3H_7$)-Hy1 (n=6)
FS-10: Rf2-L31 (R=$C_3H_7$)-Hy1 (n=11)
FS-11: Rf2-L31 (R=$C_3H_7$)-Hy1 (n=16)
FS-12: Rf2-L31 (R=$C_3H_7$)-Hy1 (n=21)
FS-13: Rf3-L32 (AL=$CH_2$)-Hy1 (n=5)
FS-14: Rf3-L32 (AL=$CH_2$)-Hy1 (n=10)
FS-15: Rf3-L32 (AL=$CH_2$)-Hy1 (n=15)
FS-16: Rf3-L32 (AL=$CH_2$)-Hy1 (n=20)
FS-17: Rf4-L33 (R=$C_3H_7$)-Hy1 (n=7)
FS-18: Rf4-L33 (R=$C_3H_7$)-Hy1 (n=13)
FS-19: Rf4-L33 (R=$C_3H_7$)-Hy1 (n=19)
FS-20: Rf4-L33 (R=$C_3H_7$)-Hy1 (n=25)
FS-21: Rf5-L32 (AL=$CH_2$)-Hy1 (n=11)
FS-22: Rf5-L32 (AL=$CH_2$)-Hy1 (n=15)
FS-23: Rf5-L32 (AL=$CH_2$)-Hy1 (n=20)
FS-24: Rf5-L32 (AL=$CH_2$)-Hy1 (n=30)
FS-25: Rf6-L34 (AR=p-phenylene)-Hy1 (n=11)
FS-26: Rf6-L34 (AR=p-phenylene)-Hy1 (n=17)
FS-27: Rf6-L34 (AR=p-phenylene)-Hy1 (n=23)
FS-28: Rf6-L34 (AR=p-phenylene)-Hy1 (n=29)
FS-29: Rf1-L35 (R=$C_3H_7$, AL=$CH_2$)-Hy1 (n=20)
FS-30: Rf1-L35 (R=$C_3H_7$, AL=$CH_2$)-Hy1 (n=30)
FS-31: Rf1-L35 (R=$C_3H_7$, AL=$CH_2$)-Hy1 (n=40)
FS-32: Rf1-L36-Hy1 (n=5)
FS-33: Rf1-L36-Hy1 (n=10)
FS-34: Rf1-L36-Hy1 (n=15)
FS-35: Rf1-L36-Hy1 (n=20)
FS-36: Rf7-L36-Hy1 (n=8)
FS-37: Rf7-L36-Hy1 (n=13)
FS-38: Rf7-L36-Hy1 (n=18)
FS-39: Rf7-L36-Hy1 (n=25)
FS-40: Rf1-L0-Hy1 (n=6)
FS-41: Rf1-L0-Hy1 (n=11)
FS-42: Rf1-L0-Hy1 (n=16)
FS-43: Rf1-L0-Hy1 (n=21)
FS-44: Rf1-L31 (R=$C_3H_7$)-Hy2 (n=7, $R^1$=$C_2H_5$)
FS-45: Rf1-L31 (R=$C_3H_7$)-Hy2 (n=13, $R^1$=$C_2H_5$)
FS-46: Rf1-L31 (R=$C_3H_7$)-Hy2 (n=20, $R^1$=$C_2H_5$)
FS-47: Rf1-L31 (R=$C_3H_7$)-Hy2 (n=28, $R^1$=$C_2H_5$)
FS-48: Rf8-L32 (AL=$CH_2$)-Hy1 (n=5)
FS-49: Rf8-L32 (AL=$CH_2$)-Hy1 (n=10)
FS-50: Rf8-L32 (AL=$CH_2$)-Hy1 (n=15)

FS-51: Rf8-L32 (AL=CH$_2$)-Hy1 (n=20)
FS-52: Rf1-L37 (R=C$_3$H$_7$, AL=CH$_2$CH$_2$)-Hy3 (n=5)
FS-53: Rf1-L37 (R=C$_3$H$_7$, AL=CH$_2$CH$_2$)-Hy3 (n=7)
FS-54: Rf1-L37 (R=C$_3$H$_7$, AL=CH$_2$CH$_2$)-Hy3 (n=9)
FS-55: Rf1-L37 (R=C$_3$H$_7$, AL=CH$_2$CH$_2$)-Hy3 (n=12)
FS-56: Rf9-L0-Hy4 (M=H)
FS-57: Rf3-L0-Hy4 (M=H)
FS-58: Rf1-L38 (R=C$_3$H$_7$, AL=CH$_2$)-Hy4 (M=K)
FS-59: Rf4-L39 (R=C$_3$H$_7$, AL=CH$_2$)-Hy4 (M=Na)
FS-60: Rf1-L0-Hy5 (M=K)
FS-61: Rf10-L40 (AL$^1$=CH$_2$, AL$^2$=CH$_2$CH$_2$)-Hy5 (M=Na)
FS-62: Rf11-L40 (AL$^1$=CH$_2$, AL$^2$=CH$_2$CH$_2$)-Hy5 (M=Na)
FS-63: Rf5-L40 (AL$^1$=CH$_2$, AL$^2$=CH$_2$CH$_2$)-Hy5 (M=Na)
FS-64: Rf1-L38 (R=C$_3$H$_7$, AL=CH$_2$CH$_2$CH$_2$)-Hy5 (M=Na)
FS-65: Rf1-L31 (R=C$_3$H$_7$)-Hy6 (n=5, M=Na)
FS-66: Rf1-L31 (R=C$_3$H$_7$)-Hy6 (n=10, M=Na)
FS-67: Rf1-L31 (R=C$_3$H$_7$)-Hy6 (n=15, M=Na)
FS-68: Rf1-L31 (R=C$_3$H$_7$)-Hy6 (n=20, M=Na)
FS-69: Rf1-L38 (R=C$_2$H$_5$, AL=CH$_2$CH$_2$)-Hy7
FS-70: Rf1-L38 (R=H, AL=CH$_2$CH$_2$CH$_2$)-Hy8 (X=I)
FS-71: Rf11-L41 (Hc shown below, AL=CH$_2$CH$_2$CH$_2$)-Hy6 (M is dissociated)

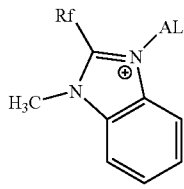

FS-71 の Hc

FS-72: Rf1-L42 (R=C$_3$H$_7$, AL$^1$=CH$_2$CH$_2$, AL$^2$=CH$_2$CH$_2$CH$_2$)-Hy6 (M=Na)
FS-73: Rf12-L0-Hy5 (M=Na)
FS-74: Rf13-L43 (AR=o-phenylene)-Hy6 (M=K)
FS-75: Rf13-L43 (AR=m-phenylene)-Hy6 (M=K)
FS-76: Rf13-L43 (AR=p-phenylene)-Hy6 (M=K)
FS-77: Rf6-L44 (R=C$_2$H$_5$, AL=CH$_2$CH$_2$)-Hy5 (M=H)
FS-78: Rf6-L45 (AR=p-phenylene, R=C$_2$H$_5$)-Hy1 (n=9)
FS-79: Rf6-L45 (AR=p-phenylene, R=C$_2$H$_5$)-Hy1 (n=14)
FS-80: Rf6-L45 (AR=p-phenylene, R=C$_2$H$_5$)-Hy1 (n=19)
FS-81: Rf6-L45 (AR=p-phenylene, R=C$_2$H$_5$)-Hy1 (n=28)
FS-82: Rf6-L46 (AR=p-phenylene)-Hy1 (n=5)
FS-83: Rf6-L46 (AR=p-phenylene)-Hy1 (n=10)
FS-84: Rf6-L46 (AR=p-phenylene)-Hy1 (n=15)
FS-85: Rf6-L46 (AR=p-phenylene)-Hy1 (n=20)

A fluorine-containing surface active agent having two or more hydrophobic or hydrophilic groups containing fluorine atom may be used. Examples of the fluorine-containing surface active agent having two or more hydrophobic or hydrophilic groups will be given below.

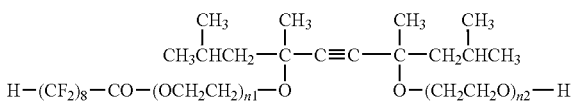

(FS-86~88)

FS-86: n1+n2=12
FS-87: n1+n2=18
FS-88: n1+n2=24

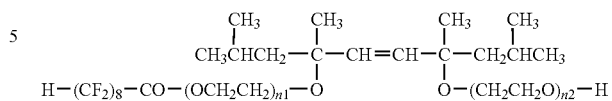

(FS-89~91)

FS-89: n1+n2=20
FS-90: n1+n2=30
FS-91: n1+n2=40

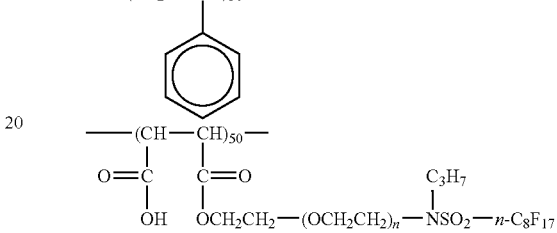

(FS-92~95)

FS-92: n=5
FS-93: n=10
FS-94: n=15
FS-95: n=20

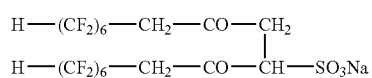

(FS-96)

Two or more fluorine-containing surface active agents may be used in combination. For the details of surface active agents, reference can be made to various literatures, e.g., Hiroshi Horiguchi, "Shin Kaimen Kasseizai (New Surface Active Agents)", Sankyo Shuppan, 1975, M. J. Schick, "Nonionic Surfactants", Marcell Dekker Inc., New York, 1967, JP-A-7-13293). The fluorine-containing surface active agent is used in an amount of from 2 to 30% by weight, preferably from 3 to 25% by weight, more preferably from 5 to 10% by weight based on the weight of the liquid crystal compound.

Two or more compounds having 1,3,5-triazine ring (including melamine compound and melamine polymer) may be used in combination. The amount of the compound having 1,3,5-triazine ring is used in an amount of from 0.01 to 20% by weight, preferably from 0.1 to 15% by weight, more preferably from 0.5 to 10% by weight based on the weight of the liquid crystal compound.

The optical anisotropic layer is formed by spreading a coating solution over the stretched cellulose acylate film of the invention or an alignment layer. As the solvent to be used in the preparation of the coating solution there is preferably used an organic solvent. Examples of the organic solvent employable herein include amides (e.g., dimethylformamide), sulfoxide (e.g., dimethyl sulfoxide), heterocyclic compounds (e.g., pyridine), hydrocarbons (e.g., benzene, hexane), allyl halides (e.g., chloroform, dichlomethane), esters (e.g., methyl acetate, butyl acetate), ketones (e.g., acetone, methyl ethyl ketone), and ethers (e.g., tetrahydrofurane, 1,2-dimethoxy ethane). Preferred among these organic solvents are alkyl halides and ketones. Two or more organic solvents may be used in combination. The spreading of the coating solution can be carried out by any known method (e.g., curtain coating method, extrusion coating method, roll coating method, spin coating method, dip coating method, print coating method, spray coating method, slide coating method). The optical anisotropic layer is preferably formed by a continuous coating method. The curtain coating method, roll coating method and slide coating method are suitable for continuous spreading.

The thickness of the optical anisotropic layer is preferably from 0.5 µm to 100 µm, more preferably from 0.5 µm to 30 µm.

(Alignment Layer)

The alignment layer is capable of determining the alignment direction of the liquid crystal compound contained in the optical anisotropic layer.

The alignment layer can be provided by a method involving rubbing of an organic compound (preferably polymer), oblique vacuum deposition of an inorganic compound, formation of microgroove or accumulation of an organic compound (e.g., ω-tricosanic acid, dioctadecyl methyl ammonium chloride, methyl stearate) by Langmuir-Blodgett method (LB membrane). Also is known an alignment layer which is rendered capable of aligning when given an electric field or magnetic field or irradiated with light.

The alignment layer is preferably formed by the rubbing of a polymer. The rubbing of a polymer is preferably effected in the direction substantially perpendicular to the slow axis of the stretched cellulose acylate film. In this manner, the slow axis of the stretched cellulose acylate film and the slow axis of the optical anisotropic layer are disposed perpendicular to each other.

In such an arrangement that the slow axis of the stretched cellulose acylate film and the slow axis of the optical anisotropic layer are disposed perpendicular to each other, Re of the stretched cellulose acylate film and Re of the optical anisotropic layer cancel each other, making it easy to adjust the wavelength dispersion of Re of the optical compensation sheet.

The polymer is preferably a polyvinyl alcohol, particularly preferably a modified polyvinyl alcohol having a hydrophobic group connected thereto. Since the hydrophobic group has an affinity for the liquid crystal compound in the optical anisotropic layer, the liquid crystal compound can be uniformly aligned by incorporating the hydrophobic group in the polyvinyl alcohol. The hydrophobic group is connected to the terminal of the main chain or side chain of the polyvinyl alcohol.

The hydrophobic group is preferably an aliphatic group (preferably alkyl or alkenyl group) or aromatic group having 6 or more carbon atoms.

In order to connect the hydrophobic group to the terminal of the main chain of the polyvinyl alcohol, a connecting group is preferably incorporated in between the hydrophobic group and the terminal of main chain. Examples of the connecting group include —S—, —C(CN)$R^1$—, —$NR^2$—, —CS—, and combination thereof. $R^1$ and $R^2$ each independently represent a hydrogen atom or $C_1$-$C_6$ alkyl group (preferably $C_1$-$C_6$ alkyl group).

In order to incorporate the hydrophobic group in the side chain of the polyvinyl alcohol, some of the acetyl groups (—CO—$CH_3$) in the vinyl acetate unit of polyvinyl alcohol may be substituted by an acyl group having 7 or more carbon atoms (—CO—$R^3$). $R^3$ represents an aliphatic or aromatic group having 6 or more carbon atoms.

Commercially available modified polyvinyl alcohols (e.g., MP103, MP203, R1130, produced by KURARAY CO., LTD.) may be used.

The saponification degree of the (modified) polyvinyl alcohol to be incorporated in the alignment layer is preferably 80% or more. The polymerization degree of the (modified) polyvinyl alcohol is preferably 200 or more.

The rubbing is effected by rubbing the surface of the alignment layer with paper or cloth in a predetermined direction several times. A cloth obtained by uniformly weaving fibers having a uniform length and thickness is preferably used.

The liquid crystal compound of the optical anisotropic layer which has once been fixed aligned can be kept aligned even if the alignment layer is removed. In other words, the alignment layer is essential in the production of optical compensation sheet to align the liquid crystal molecules but is not essential in the optical compensation sheet produced.

In the case where the alignment layer is provided interposed between the stretched cellulose acylate film and the optical anisotropic layer, an adhesive layer (undercoat layer) may be further provided interposed between the transparent support and the alignment layer.

In the optical anisotropic layer of the invention, the average tilt angle of the liquid crystal compound can be adjusted by the alignment layer containing a modified polyvinyl alcohol disclosed in JP-A-2000-155216.

(Retardation of Optical Anisotropic Layer)

When an optical compensation sheet of the invention includes a stretched polymer film, Re (546) of the optical anisotropic layer of the invention is preferably from not smaller than 10 nm to not greater than 300 nm. Rth (546) of the optical anisotropic layer of the invention is preferably from not smaller than 10 nm to not greater than 300 nm, more preferably from not smaller than 30 nm to not greater than 250 nm.

When an optical compensation sheet of the invention includes a stretched cellulose acylate film, Re (546) of the optical anisotropic layer of the invention is preferably from not smaller than 20 nm to not greater than 150 nm, more preferably from not smaller than 30 nm to not greater than 120 nm. Rth (546) of the optical anisotropic layer of the invention is preferably from not smaller than 50 nm to not greater than 200 nm, more preferably from not smaller than 100 nm to not greater than 150 nm.

Further, when an optical compensation sheet of the invention includes a stretched polymer film, the optical anisotropic layer of the invention preferably satisfies the following relationships (K) to (N).

$$1.0 < Re(480)/Re(546) < 2.0 \quad (K)$$

$$0.5 < Re(628)/Re(546) < 1.0 \quad (L)$$

$$1.0 < Rth(480)/Rth(546) < 2.0 \quad (M)$$

$$0.5 < Rth(628)/Rth(546) < 1.0 \quad (N)$$

The relationship (K) is preferably 1.02<Re (480)/Re (546) <1.50, more preferably 1.05<Re (480)/Re (546)<1.30.

The relationship (L) is preferably 0.75<Re (628)/Re (546) <0.98.

The relationship (M) is preferably 1.02<Rth (480)/Rth (546)<1.50, more preferably 1.05<Rth (480)/Rth (546)<1.30.

When an optical compensation sheet of the invention includes a stretched cellulose acylate film, the optical anisotropic layer of the invention preferably satisfies the following relationships (K') to (N').

$$1.0 < Re(480)/Re(546) < 4.0 \quad (K')$$

$$0.1 < Re(628)/Re(546) < 1.0 \quad (L')$$

$$1.0 < Rth(480)/Rth(546) < 4.0 \quad (M')$$

$$0.1 < Rth(628)/Rth(546) < 1.0 \quad (N')$$

The relationship (K') is preferably 1.2<Re (480)/Re (546) <3.0, more preferably 1.5<Re (480)/Re (546)<2.5.

The relationship (L') is preferably 0.2<Re (628)/Re (546) <0.8.

The relationship (M') is preferably 1.1<Rth (480)/Rth (546)<3.0, more preferably 1.2<Rth (480)/Rth (546)<2.5.

The relationship (N') is preferably 0.3<Rth (628)/Rth (546) <1.0, more preferably 0.5<Rth (628)/Rth (546)<1.0.

By adjusting the retardation within the above defined range, an optical compensation sheet having a high contrast and a small tint change can be obtained.

<Retardation of Optical Compensation Sheet>

The retardation of the optical compensation sheet including a stretched polymer film according to the invention preferably satisfies the following relationships:

$$30 \text{ nm} < Re(546) < 150 \text{ nm} \quad (A)$$

$$100 \text{ nm} < Rth(546) < 400 \text{ nm} \quad (B)$$

$$0.5 < Re(480)/Re(546) < 1 \quad (C)$$

$$1.0 < Re(628)/Re(546) < 2.0 \quad (D)$$

$$1.0 < Rth(480)/Rth(546) < 1.5 \quad (E)$$

$$0.7 < Rth(628)/Rth(546) < 1.0 \quad (F)$$

The relationship (A) is preferably 35 nm<Re (546)<120 nm, more preferably 40 nm<Re (546)<100 nm.

The relationship (B) is preferably 110 nm<Rth (546)<350 nm, more preferably 120 nm<Rth (546)<300 nm.

The relationship (C) is preferably 0.6<Re (480)/Re (546) <0.95, more preferably 0.7<Re (628)/Re (546)<0.9.

The relationship (D) is preferably 1.0<Re (628)/Re (546) <1.50, more preferably 1.02<Re (628)/Re (546)<1.30.

The relationship (E) is preferably 1.00<Rth (480)/Rth (546)<1.30, more preferably 1.01<Rth (480)/Rth (546)<1.20.

The relationship (F) is preferably 0.8<Rth (628)/Rth (546) <1.0, more preferably 0.85<Rth (628)/Rth (546)<0.99.

The retardation of the optical compensation sheet including a stretched cellulose acylate film according to the invention preferably satisfies the following relationships:

$$20 \text{ nm} < Re(546) < 150 \text{ nm} \quad (A')$$

$$50 \text{ nm} < Rth(546) < 400 \text{ nm} \quad (B')$$

$$0.5 < Re(480)/Re(546) < 1 \quad (C')$$

$$1.0 < Re(628)/Re(546) < 2.0 \quad (D')$$

$$1.0 < Rth(480)/Rth(546) < 2.0 \quad (E')$$

$$0.5 < Rth(628)/Rth(546) < 1.0 \quad (F')$$

The relationship (A') is preferably 35 nm<Re (546)<120 nm, more preferably 40 nm<Re (546)<100 nm.

The relationship (B') is preferably 110 nm<Rth (546)<350 nm, more preferably 120 nm<Rth (546)<300 nm.

The relationship (C) is preferably 0.6<Re (480)/Re (546) <0.95, more preferably 0.7<Re (628)/Re (546)<0.9.

The relationship (D) is preferably 1.0<Re (628)/Re (546) <1.8, more preferably 1.05<Re (628)/Re (546)<1.6.

The relationship (E') is preferably 1.05<Rth (480)/Rth (546)<1.8, more preferably 1.1<Rth (480)/Rth (546)<1.5.

The relationship (F') is preferably 0.7<Rth (628)/Rth (546) <1.0, more preferably 0.85<Rth (628)/Rth (546)<0.98.

<Preparation of Polarizing Plate>

A polarizing plate comprising the optical compensation sheet of the invention will be described hereinafter.

Figure 1B:
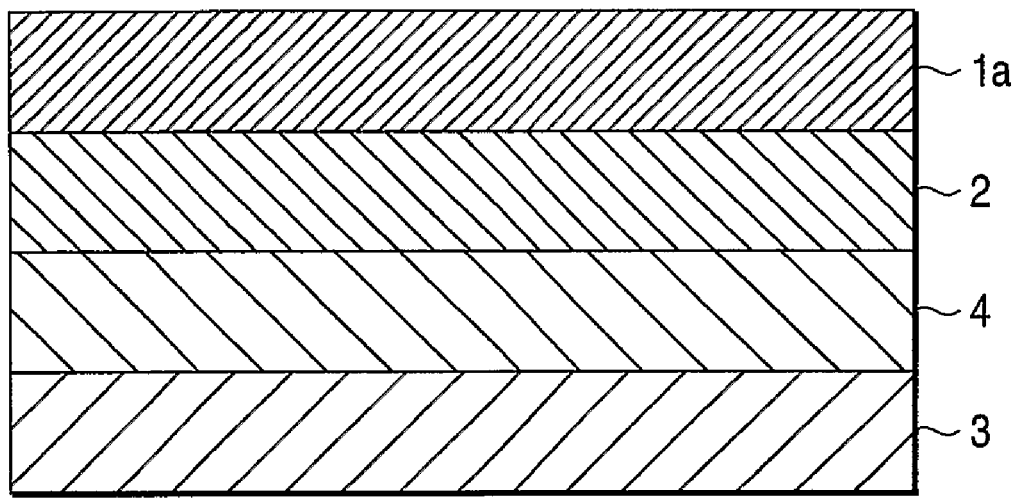

FIG. 1A is a schematic sectional diagram illustrating a polarizing plate, in which a polarizer 2 is between protective films 1 and 3. FIG. 1B is a schematic sectional diagram illustrating an exemplary example of a polarizing plate of the invention, in which an optical compensation sheet is used as a protective film of a polarizing plate. A protective film 1a is stacked on one side of a polarizer 2, and an optical compensation sheet (an optical anisotropic layer 3 and a stretched polymer film 4) is stacked on the other side of the polarizer 2, in which the stretched polymer film 4 faces to the polarizer 2.

(Protective Film)

The polarizing plate of the invention comprises a protective film provided on the both sides of a polarizer, totaling two protective films, wherein at least one sheet of protective film is an optical compensation sheet.

The other sheet of protective film to be used in the invention is preferably a transparent polymer film produced from norbornene resin, polyethylene terephthalate, polyethylene naphthalate, polycarbonate, polystyrene, polyarylate, polysulfone, cellulose acylate or the like, most preferably cellulose acylate film.

(Polarizer)

The polarizer to be used in the polarizing plate of the invention will be further described hereinafter.

The polarizer of the invention is preferably formed of polyvinyl alcohol (PVA) and a dichroic molecule. As disclosed in JP-A-11-248937, a polyvinyl-based polarizer obtained by aligning a polyene structure produced by dehydrating and dechlorinating PVA or polyvinyl chloride may be used.

PVA is a polymer material obtained by saponifying a polyvinyl acetate. PVA may contain a component copolymerizable with vinyl acetate such as unsaturated carboxylic acid, unsaturated sulfonic acid, olefin and vinylether. Further, a modified PVA containing acetoacetyl group, sulfonic acid group, carboxyl group, oxyalkylene group or the like may be used.

The saponification degree of PVA is not specifically limited but is preferably from 80 to 100 mol-%, particularly preferably from 90 to 100 mol-% from the standpoint of solubility. The polymerization degree of PVA is not specifically limited but is preferably from 1,000 to 10,000, particularly preferably from 1,500 to 5,000.

The syndiotacticity of PVA is preferably 55% or more to improve durability as disclosed in Japanese Patent No. 2978219 but may be from 45% to 52.5% as disclosed in Japanese Patent No. 3317494.

PVA which has been filmed preferably has a dichroic molecule incorporated therein to form a polarizer. As the method of producing PVA film there is preferably employed a method which comprises casting a raw material solution having a PVA-based resin dissolved in water or an organic solvent to form a film. The concentration of the polyvinyl alcohol-based resin in the raw material solution is normally from 5% to 20% by weight. By subjecting the raw material solution to film formation by casting method, PVA film having a thickness of 10 μm to 200 μm can be produced. For the details of the method of producing PVA film, reference can be made to Japanese Patent No. 3342516, JP-A-09-328593, JP-A-2001-302817, and JP-A-2002-144401.

The crystallization degree of PVA film is not specifically limited, but a PVA film having an average crystallization degree (Xc) of from 50% to 75% by weight as disclosed in Japanese Patent No. 3251073 or a PVA film having a crystallization degree of 38% or less as disclosed in JP-A-2002-236214 may be used to eliminate the in-plane dispersion of hue.

The birefringence (Δn) of PVA film is preferably small. A PVA film having a birefringence of $1.0 \times 10^{-3}$ or less as disclosed in Japanese Patent No. 3342516 is preferably used. As disclosed in JP-A-2002-228835, however, the birefringence of PVA may be from not smaller than 0.002 to not greater than 0.01 to obtain a high percent polarization while avoiding the break during the stretching of PVA film. As disclosed in JP-A-2002-060505, the value of (nx+ny)/2−nz may be from not smaller than 0.0003 to not greater than 0.01. Re (1090) of PVA is preferably from not smaller than 0 nm to not greater than 100 nm, more preferably from not smaller than 0 nm to not greater than 50 nm. Rth (1090) of PVA film is preferably from not smaller than 0 nm to not greater than 500 nm, more preferably from not smaller than 0 nm to not greater than 300 nm.

In addition, the polarizing plate of the invention may be a PVA film having a 1,2-glycol bond of 1.5 mol-% or less disclosed in Japanese Patent No. 3021494, a PVA film having optical foreign matters having a size of 5 µm or more in an amount of 500 or less per 100 cm² disclosed in JP-A-2001-316492, a PVA film having a hot water cutting temperature of 1.5° C. or less in TD direction of film disclosed in JP-A-2002-030163 or a PVA film formed of a solution having a polyvalent alcohol having a valency of from 3 to 6 such as glycerin incorporated therein in a proportion of from 1 to 100% by weight or a plasticizer disclosed in JP-A-06-289225 incorporated therein in a proportion of 15% by weight or more.

The film of the unstretched PVA film is not specifically limited but is preferably from 1 µm to 1 mm, particularly preferably from 20 µm to 200 µm from the standpoint of stability in film storage and uniformity in stretching. As disclosed in JP-A-2002-236212, a thin PVA film arranged such that the stress developed when stretched in water by a factor of from 4 to 6 is 10 N or less may be used.

As the dichroic molecule there is preferably used a high order iodine ion such as $I_3^-$ and $I_5^-$ or a dichroic dye. In the invention, a high order iodine ion is preferably used. The high order iodine ion can be produced by dipping PVA in a solution obtained by dissolving iodine in an aqueous solution of potassium iodide and/or aqueous solution of boric acid so that it is adsorbed to and aligned in PVA as described in "Application of Polarizing Plates", Ryo Nagata ed., CMC and Industrial Material, Vol. 28, 7th edition, page 39 to 45.

The dichroic dye to be used as a dichroic molecule is preferably an azo-based dye, particularly preferably a bisazo-based or trisazo-based dye. The dichroic dye is preferably water-soluble. Therefore, a hydrophilic substituent such as sulfonic acid group, amino group and hydroxyl group is preferably incorporated in the dichroic molecule to form a free acid or an alkaline metal salt, ammonium salt or amine salt.

Specific examples of the dichroic dye include benzidine-based dichroic dyes such as C. I. Direct Red 37, Congo Red (C. I. Direct Red 28), C. I. Direct Violet 12, C. I. Direct Blue 90, C. I. Direct Blue 22, C. I. Direct Blue 1, C. I. Direct Blue 151 and C. I. Direct Green 1, diphenyl urea-based dichroic dyes such as C. I. Direct Yellow 44, C. I. Direct Red 23 and C. I. Direct Red 79, stilbene-based dichroic dyes such as C. I. Direct Yellow 12, dinaphthylamine-based dichroic dyes such as C. I. Direct Red 31, and J acid-based dichroic dyes such as C. I. Direct Red 81, C. I. Direct Violet 9 and C. I. Direct Blue 78.

Further examples of the dichroic dye employable herein include C. I. Direct Yellow 8, C. I. Direct Yellow 28, C. I. Direct Yellow 86, C. I. Direct Yellow 87, C. I. Direct Yellow 142, C. I. Direct Orange 26, C. I. Direct Orange 39, C. I. Direct Orange 72, C. I. Direct Orange 106, C. I. Direct Orange 107, C. I. Direct Orange 2, C. I. Direct Orange 39, C. I. Direct Orange 83, C. I. Direct Orange 89, C. I. Direct Red 240, C. I. Direct Red 242, C. I. Direct Red 247, C. I. Direct Violet 48, C. I. Direct Violet 51, C. I. Direct Violet 98, C. I. Direct Blue 15, C. I. Direct Blue 67, C. I. Direct Blue 71, C. I. Direct Blue 98, C. I. Direct Blue 168, Direct Blue 202, Direct Blue 236, Direct Blue 249, C. I. Direct Blue 270, C. I. Direct Green 59, C. I. Direct Green 85, C. I. Direct Brown 44, C. I. Direct Brown 106, C. I. Direct Brown 195, C. I. Direct Brown 210, C. I. Direct Brown 223, C. I. Direct Brown 224, C. I. Direct Black 1, C. I. Direct Black 17, C. I. Direct Black 19, C. I. Direct Black 54, and dichroic dyes disclosed in JP-A-62-70802, JP-A-1-161202, JP-A-1-172906, JP-A-1-172907, JP-A-1-183602, JP-A-1-248105, JP-A-1-265205, and JP-A-7-261024. Two or more of these dichroic dyes may be used in admixture to produce dichroic molecules having various hues. In the case where such a dichroic dye is used, the thickness of adsorption may be 4 µm or more as disclosed in JP-A-2002-082222.

When the content of the dichroic molecules in the film is too small, the resulting percent polarization is low. Further, when the content of the dichroic molecules in the film is too great, the resulting single plate transmission is lowered. Therefore, the content of the dichroic molecules in the film is normally adjusted to a range of from 0.01% to 5% by weight based on the weight of the polyvinyl alcohol-based polymer constituting the matrix of film.

The thickness of the polarizer is preferably from 5 µm to 40 µm, more preferably from 10 µm to 30 µm. It is also preferred that the ratio A/B of the thickness of the polarizer to the thickness of the protective film be from not smaller than 0.01 to not greater than 0.16 as disclosed in JP-A-2002-174727.

The angle of crossing of the slow axis of the protective film with the absorption axis of the polarizer may be arbitrary but is preferably 0° (parallel) or 45±20°.

<Process of Producing Polarizing Plate>

A process of producing the polarizing plate of the invention will be described hereinafter.

The process of producing the polarizing plate of the invention preferably comprises a swelling step, a dyeing step, a hardening step, a stretching step, a drying step, a protective film sticking step and a drying step after sticking. The order of dyeing step; hardening step and stretching step may be arbitrarily changed. Alternatively, some of these steps may be effected at the same time in combination. Further, as disclosed in Japanese Patent No. 3331615, the hardening step is preferably followed by rinsing.

In the invention, it is particularly preferred that the swelling step, the dyeing step, the hardening step, the stretching step, the drying step, the protective film sticking step and the drying step after sticking be successively effected in this order. An on-line surface condition inspection step may be provided during or after the aforementioned steps.

The swelling step is preferably effected with water alone. As disclosed in JP-A-10-153709, however, the substrate of polarizing plate may be swollen with an aqueous solution of boric acid to control the swelling thereof for the purpose of stabilizing the optical properties and preventing the occurrence of wrinkle of the substrate of polarizing plate on the production line.

The swelling temperature and time can be arbitrarily determined, but the swelling is preferably effected at a temperature of from not lower than 10° C. to not higher than 60° C. for not shorter than 5 seconds to not longer than 2,000 seconds.

The dyeing step may be carried out by a method disclosed in JP-A-2002-86554. The dyeing can be carried out not only dipping but also by any other arbitrary methods such as spreading and spraying of iodine or dye solution. As disclosed in JP-A-2002-290025, a method may be used which comprises dyeing while controlling the iodine concentration, the dyeing bath temperature and the stretching ratio in the bath and stirring the bath solution.

In the case where a high order iodine ion is used as a dichroic molecule, the dyeing step is preferably effected with a solution obtained by dissolving iodine in an aqueous solution of potassium iodide to obtain a high contrast polarizing plate. In this case, the aqueous solution of iodine-potassium iodide preferably has an iodine concentration of from 0.05 to 20 g/l, a potassium iodide concentration of from 3 to 200 g/l and a iodine to potassium iodide weight ratio of from 1 to 2,000. The dyeing time is preferably from 10 to 1,200 seconds and the dyeing solution temperature is preferably from 10° C. to 60° C. More preferably, the iodine concentration is from 0.5 to 2 g/l, the potassium iodide concentration is from 30 to 120 g/l, the iodine to potassium iodide weight ratio is from 30 to 120, the dyeing time is from 30 to 600 seconds and the solution temperature is from 20° C. to 50° C.

Further, as disclosed in Japanese Patent No. 3145747, the dyeing solution may have a boron-based compound such as boric acid and borax incorporated therein.

The hardening step is preferably carried out by dipping the polarizing plate material in a crosslinking agent solution or spreading the crosslinking agent solution over the polarizing plate material. Further, as disclosed in JP-A-11-52130, the hardening step may be effected batchwise in several portions.

As the crosslinking agent there may be used one disclosed in U.S. Reissued Pat. No. 232,897. As disclosed in Japanese Patent 3357109, as a crosslinking agent there may be used a polyvalent aldehyde to enhance dimensional stability. However, boric acids are most preferably used. In the case where boric acid is used as a crosslinking agent to be used at the hardening step, metal ions may be added to the aqueous solution of boric acid-potassium iodide. As the metal ion there is preferably used zinc chloride. However, as disclosed in JP-A-2000-35512, a zinc salt such as zinc halide, zinc sulfate and zinc acetate may be used instead of zinc chloride.

In the invention, a PVA film is preferably dipped in an aqueous solution of boric acid-potassium iodide having zinc chloride incorporated therein so that it is hardened. Preferably, the boric acid concentration is from 1 to 100 g/l, the iodide potassium concentration is from 1 to 120 g/l, the zinc chloride concentration is from 0.01 to 10 g/l, the hardening time is from 10 to 1,200 seconds and the hardening solution temperature is from 10° C. to 60° C. More preferably, the boric acid concentration is from 10 to 80 g/l, the potassium iodide concentration is from 5 to 100 g/l, the zinc chloride concentration is from 0.02 to 8 g/l, the hardening time is from 30 to 600 seconds and the hardening solution temperature is from 20° C. to 50° C.

The stretching step is preferably carried out by a longitudinal monoaxial stretching method as disclosed in U.S. Pat. No. 2,454,515 or a tenter method as disclosed in JP-A-2002-86554. The stretching ratio is preferably from not smaller than 2 to not greater than 12, more preferably from not smaller than 3 to not greater than 10. The relationship between the stretching ratio and the thickness of raw fabric and polarizer is preferably (thickness of polarizer having protective film stuck thereto/thickness of raw fabric)×(total stretching ratio) >0.17 as disclosed in JP-A-2002-040256. Further, the relationship between the width of the polarizer which comes out of the final bath and the width of the polarizer at the time of sticking of protective film is preferably 0.80≦(width of polarizer at the time of sticking of protective film/width of the polarizer which comes out of the final bath)≦0.95 as disclosed in JP-A-2002-040247.

The drying step can be carried out by a method known in JP-A-2002-86554. However, the drying temperature is preferably from 30° C. to 100° C. The drying time is preferably from 30 seconds to 60 minutes. Further, as disclosed in Japanese Patent No. 3148513, heat treatment is preferably effected such that the underwater fading temperature reaches 50° C. or more. As disclosed in JP-A-07-325215 or JP-A-07-325218, the film is preferably aged in an atmosphere which is controlled in humidity and temperature.

The step of sticking protective film is a step of sticking two sheets of protective film to the respective side of the aforementioned polarizer which has come out of the drying step. A method is preferably used which comprises supplying an adhesive shortly before sticking, and then sticking the polarizer and the protective film over a pair of rolls in such an arrangement that they are laminated. As disclosed in JP-A-2001-296426 and JP-A-2002-86554, the water content in the polarizer during sticking is preferably adjusted to suppress the occurrence of record groove-shaped roughness attributed to the stretching of the polarizer. In the invention, a water content of from 0.1% to 30% is preferably used.

The adhesive with which the polarizer and the protective film are stuck to each other is not specifically limited. Examples of the adhesive employable herein include PVA-based resins (including modified PVA containing acetoacetyl group, sulfonic acid group, carboxyl group, oxyalkylene group, etc.), and aqueous solution of boron compound. Preferred among these adhesives are PVA-based resins. The thickness of the adhesive layer is preferably from 0.01 μm to 5 μm, particularly preferably from 0.05 μm to 3 μm after drying.

In order to enhance the adhesion between the polarizer and the protective film, the protective film is preferably subjected to surface treatment so that it is hydrophilicized before bonding. The surface treatment method is not specifically limited. However, any known method such as saponification using an alkaline solution and corona discharge may be used. The protective film which has been surface-treated may have an adhesive layer such as gelatin undercoat layer provided thereon. As disclosed in JP-A-2002-267839, the contact angle of the protective film with respect to water is 50° or less.

The drying step after sticking may be effected according to the method disclosed in JP-A-2002-86554. However, the drying temperature is preferably from 30° C. to 100° C. The drying time is preferably from 30 seconds to 60 minutes. Further, as disclosed in JP-A-07-325220, the film is preferably aged in an atmosphere which is controlled in temperature and humidity.

Referring to element content in the polarizer, the iodine content is preferably from 0.1 to 3.0 g/m$^2$, the boron content is preferably from 0.1 to 5.0 g/m$^2$, the potassium content is preferably from 0.1 to 2.00 g/m$^2$ and the zinc content is preferably from 0 to 2.00 g/m$^2$. The potassium content may be 0.2% by weight or less as disclosed in JP-A-2001-166143 or may be from 0.04 to 0.5% by weight as disclosed in JP-A-2000-035512.

As disclosed in Japanese Patent No. 3323255, in order to enhance the dimensional stability of the polarizing plate, an organic titanium compound and/or organic zirconium compound may be added at any of dyeing step, stretching step and hardening step. Alternatively, at least one compound selected from the group consisting of organic titanium compounds and organic zirconium compounds may be incorporated. Further, a dichroic dye may be added to adjust the hue of the polarizing plate.

<Properties of Polarizing Plate>

(1) Transmission and Percent Polarization

The single plate transmission of the polarizing plate is preferably from not smaller than 42.5% to not greater than 49.5%, more preferably from not smaller than 42.8% to not greater than 49.0%. The percent polarization defined by the equation 4 is preferably from not smaller than 99.900% to not greater than 99.999%, more preferably from not smaller than 99.940% to not greater than 99.995%. The parallel transmission is preferably from not smaller than 36% to not greater than 42% and the cross transmission is preferably from not smaller than 0.001% to not greater than 0.05%. The dichroicity ratio defined by the following equation 5 is preferably from not smaller than 48 to not greater than 1,215, more preferably from not smaller than 53 to not greater than 525.

$$\text{Polarization Degree (\%)} = 100 \times \sqrt{\frac{\text{Parallel transmission} - \text{cross transmission}}{\text{Parallel transmission} - \text{cross transmission}}} \quad (4)$$

The aforementioned transmission is defined by the following equation according to JIS Z8701.

$$T = K \int S(\lambda) y(\lambda) \tau(\lambda) d\lambda$$

wherein K, $S(\lambda)$, $y(\lambda)$, $\tau(\lambda)$ are as follows.

$$K = \frac{100}{\int S(\lambda) y(\lambda) d\lambda} \quad (3)$$

$S(\lambda)$: Spectral distribution of standard light for use in color display $y(\lambda)$: Color matching function in XYZ system $\tau(\lambda)$: Spectral transmission $$\text{Dichroiticity ratio (Rd)} = \frac{\log\left[\frac{\text{Single plate transmission}}{100}\left(1 - \frac{\text{Polarization degree}}{100}\right)\right]}{\log\left[\frac{\text{Single plate transmission}}{100}\left(1 + \frac{\text{Polarization degree}}{100}\right)\right]} \quad (5)$$

The iodine concentration and the single plate transmission may fall within the range defined in JP-A-2002-258051.

The parallel transmission may have a small wavelength dependence as disclosed in JP-A-2001-083328 and JP-A-2002-022950. The optical properties of the polarizing plate aligned in crossed Nicols may fall within the range defined in JP-A-2001-091736. The relationship between parallel transmission and cross transmission may fall within the range defined in JP-A-2002-174728.

As disclosed in JP-A-2002-221618, the standard deviation of parallel transmission every 10 nm at a wavelength of between 420 nm and 700 nm may be 3 or less and the minimum value of (parallel transmission/cross transmission) every 10 nm at a wavelength of between 420 nm and 700 nm may be 300 or more.

The parallel transmission and cross transmission of the polarizing plate at a wavelength of 440 nm, 550 nm and 610 nm may fall within the range defined in JP-A-2002-258042 and JP-A-2002-258043.

(2) Hue

The hue of the polarizing plate is preferably evaluated by lightness index L* and chromaticness indexes a* and b* in L*a*b* calorimetric system recommended as CIE uniform perceptive space.

For the definition of L*, a*, b*, reference can be made to "Shikisai Kogaku (Color Optics)", TOKYO DENKI UNIVERSITY, etc.

The chromaticness index a* of the single polarizing plate is preferably from not smaller than −2.5 to not greater than 0.2, more preferably from not smaller than −2.0 to not greater than 0. The chromaticness index b* of the single polarizing plate is preferably from not smaller than 1.5 to not greater than 5, more preferably from not smaller than 2 to not greater than 4.5. The chromaticness index a* of light transmitted by two sheets of polarizing plate aligned parallel to each other is preferably from not smaller than −4.0 to not greater than 0, more preferably from not smaller than −3.5 to not greater than −0.5. The chromaticness index b* of light transmitted by two sheets of polarizing plate aligned parallel to each other is preferably from not smaller than 2.0 to not greater than 8, more preferably from not smaller than 2.5 to not greater than 7. The chromaticness index a* of light transmitted by two sheets of polarizing plate aligned perpendicular to each other is preferably from not smaller than −0.5 to not greater than 1.0, more preferably from not smaller than 0 to not greater than 2. The chromaticness index b* of light transmitted by two sheets of polarizing plate aligned perpendicular to each other is preferably from not smaller than −2.0 to not greater than 2, more preferably from not smaller than −1.5 to not greater than 0.5.

The hue may be evaluated as chromaticity coordinate (x, y) calculated from X, Y and Z described above. For example, the chromaticity (xp, yp) of light transmitted by two sheets of polarizing plate aligned parallel to each other and the chromaticity (xc, yc) of light transmitted by two sheets of polarizing plate aligned perpendicular to each other may fall within the range defined in JP-A-2002-214436, JP-A-2001-166136 and JP-A-2002-169024. Further, the relationship between hue and absorbance may fall within the range defined in JP-A-2001-311827.

(3) Viewing Angle Properties

The transmission ratio and xy chromaticity difference of the polarizing plate aligned in crossed Nicols with respect to light of wavelength of 550 nm incident thereon at right angle and at an angle of 40° from the normal line in the direction of 45° from the polarizing axis preferably fall within the range defined in JP-A-2001-166135 and JP-A-2001-166137. Further, as disclosed in JP-A-10-068817, the ratio ($T_{60}/T_0$) of the transmission of the laminate of polarizing plates aligned in crossed Nicols (To) with respect to the transmission of light incident thereon at right angle and obliquely at an angle of 60° from the line normal to the laminate ($T_{60}$) is 10,000 or less. As disclosed in JP-A-2002-139625, when natural light is incident on the polarizing plate at arbitrary angle between the normal line and elevation of 80°, the transmission difference within a wavelength range of 20 nm over a range of from 520 nm to 640 nm in transmission spectrum is preferably 6% or less. As disclosed in JP-A-08-248201, the brightness difference of transmitted light at arbitrary position of 1 cm apart from the film is preferably 30% or less.

(4) Durability (4-1) Wet Heat Durability

The change of transmission and percent polarization of the polarizing plate from before to after 500 hour storage in an atmosphere of 60° C. and 95% RH each are preferably 3% or less based on the absolute value. In particular, the change of transmission is preferably 2% or less based on the absolute value and the change of percent polarization is preferably 1.0% or less based on the absolute value. Further, as disclosed in JP-A-07-077608, the percent polarization and single plate transmission of the polarizing plate are preferably 95% or more and 38% or more after allowed to stand at 80° C. and 90% RH for 500 hours.

(4-2) Dry Durability

The change of transmission and percent polarization of the polarizing plate from before to after 500 hour storage in a dry atmosphere at 80° C., too, each are preferably 3% or less based on the absolute value. In particular, the change of transmission is preferably 2% or less based on the absolute value and the change of percent polarization is preferably 1.0% or less, more preferably 0.1% or less based on the absolute value.

(4-3) Other Durability Properties

Further, as disclosed in JP-A-06-167611, the percent shrinkage of the polarizing plate after 2 hours of storage at 80° C. is preferably 0.5% or less. Moreover, the laminate of polarizing plates disposed on the both sides of glass sheet in crossed Nicols preferably exhibits x value and y value falling within the range defined in JP-A-10-068818 after 750 hours of storage in a 69° C. atmosphere. Further, the change of the ratio of spectrum intensity at 105 cm$^{-1}$ to at 157 cm$^{-1}$ by Raman spectroscopy after 200 hours of storage in an atmosphere of 80° C. and 90% RH preferably falls within the range defined in JP-A-08-094834 and JP-A-09-197127.

(5) Alignment Degree

The higher the alignment degree of PVA is, the better are polarization properties. The order parameter value calculated by polarized Raman scattering or polarized FT-IR is preferably from 0.2 to 1.0. Further, as disclosed in JP-A-59-133509, the difference between the alignment coefficient of polymer segment in the total amorphous region of the polarizer and the alignment coefficient (0.75 or more) of molecules occupying the total amorphous region is preferably at least 0.15. As disclosed in JP-A-04-204907, the alignment coefficient of the amorphous region of the polarizer is preferably from 0.65 to 0.85. The alignment coefficient of high order ions such as $I_3^-$ and $I_5^-$ is preferably from 0.8 to 1.0 as order parameter value.

(6) Other Properties

As disclosed in JP-A-2002-006133, the shrinking force of the polarizing plate in the direction along the absorption axis per unit width after 30 minutes of heating at 80° C. is preferably 4.0 N/cm or less. As disclosed in JP-A-2002-236213, when the polarizing plate is allowed to stand under 70° C. heating conditions for 120 hours, the dimensional change is preferably within ±0.6% both in the direction along the absorption axis and the direction along the polarizing axis. The percent water content of the polarizing plate is preferably 3% by weight or less as disclosed in JP-A-2002-090546. Further, as disclosed in JP-A-2000-249832, the surface roughness of the polarizing plate in the direction perpendicular to the stretching axis is preferably 0.04 µm based on the central line-average roughness. Moreover, as disclosed in JP-A-10-268294, the refractive index no of the polarizing plate in the direction along the transmission axis is preferably more than 1.6. Further, the relationship between the thickness of the polarizing plate and the protective film preferably falls within the range defined in JP-A-10-111411.

<Functionalization of Polarizing Plate>

The polarizing plate of the invention is preferably used as a functionalized polarizing plate complexed with an antireflection film for enhancing viewability of display, a brightness enhancement film or an optical film having a functional layer such as hard coat layer, forward scattering layer and anti-glare layer.

(Antireflection Film)

The polarizing plate of the invention can be used in combination with an antireflection film. As the antireflection film there may be used either a film having a reflectance of about 1.5% having only a single layer of a low refractive index material such as fluorine-based polymer provided thereon or a film having a reflectance of 1% or less utilizing multilayer interference of thin film. In the invention, a structure having a low refractive index layer and at least one layer having a higher refractive index than the low refractive index layer (i.e., high refractive index layer, middle refractive index layer) laminated on a transparent support is preferably used. Further, an antireflection film as disclosed in Nitto Giho (NITTO DENKO CORPORATION's technical report), vol. 38, No. 1, May 2000, pp. 26-28 and JP-A-2002-301783, is preferably used as well.

The refractive index of the various layers need to satisfy the following relationships.

Refractive index of high refractive index layer>refractive index of middle refractive index layer>refractive index of transparent support>refractive index of low refractive index layer As the transparent support to be used in the antireflection film there is preferably used a transparent polymer film to be used in the aforementioned polarizer protective film.

The refractive index of the low refractive index layer is from 1.20 to 1.55, preferably from 1.30 to 1.50. The low refractive index layer is preferably used as an outermost layer having scratch resistance and stainproofness. In order to enhance the scratch resistance of the low refractive index layer, a material containing a silicone group or fluorine is preferably used to render the surface of the low refractive index layer slippery.

As the fluorine-containing compound there is preferably used one disclosed in JP-A-9-222503, [0018]-[0026], JP-A-11-38202, [0019]-[0030], JP-A-2001-40284, [0027]-[0028], and JP-A-2000-284102.

As the silicone-containing compound there is preferably used a compound having a polysiloxane structure. However, a reactive silicone (e.g., Silaplane (produced by Chisso Corporation), a polysiloxane containing a silanol group at both ends thereof (as disclosed in JP-A-11-258403), etc. may be used as well. An organic metal compound such as silane coupling agent and a silane coupling agent containing a specific fluorine-containing hydrocarbon group may be condensed to each other by condensation reaction in the presence of a catalyst (compounds as disclosed in JP-A-58-142958, JP-A-58-147483, JP-A-58-147484, JP-A-9-157582, JP-A-11-106704, JP-A-2000-117902, JP-A-2001-48590, JP-A-2002-53804).

The low refractive index layer preferably comprises as additives other than described above a low refractive index inorganic compound having a primary particle diameter of from 1 nm to 150 nm such as filler (e.g., silicon dioxide (silica), fluorine-containing particle (magnesium fluoride, calcium fluoride, barium fluoride), organic ultraparticulate described in JP-A-11-3820, [0020] to [0038], and the like), a silane coupling agent, a lubricant, a surface active agent or the like incorporated therein.

The low refractive index layer is preferably formed by a gas phase method (e.g., vacuum deposition method, sputtering method, ion plating method, plasma CVD method). However, a coating method is preferably used because it allows production at reduced cost. Preferred examples of the coating method employable herein include dip coating method, air knife coating method, curtain coating method, roller coating method, wire bar coating method, gravure coating method, and microgravure coating method.

The thickness of the low refractive index layer is preferably from 30 nm to 200 nm, more preferably from 50 nm to 150 nm, most preferably from 60 nm to 120 nm.

The middle refractive index layer and the high refractive index layer preferably have a high refractive index inorganic ultraparticulate compound having an average particle diameter of 100 nm or less dispersed therein. As the high refractive index inorganic ultraparticulate compound there is preferably used an inorganic particulate compound having a refractive index of 1.65 or more such as oxide of Ti, Zn, Sb, Sn, Zr, Ce, Ta, La and In and composite oxide containing these metal atoms.

These ultraparticulate materials may be subjected to surface treatment with a surface treatment agent (silane coupling agent as disclosed in JP-A-11-295503, JP-A-11-153703 and JP-A-2000-9908, anionic compound or organic metal coupling agent as disclosed in JP-A-2001-310432) before use. Alternatively, these ultraparticulate materials may have a core-shell structure having a high refractive index particle as a core (as disclosed in JP-A-2001-166104). Further, these ultraparticulate materials may be used in combination with a specific dispersing agent (as disclosed in JP-A-11-153703, U.S. Pat. No. 6,210,858B1, JP-A-2002-2776069).

As the matrix material there may be used any known thermoplastic resin, curable resin film or the like. However, a polyfunctional material as disclosed in JP-A-2000-47004, JP-A-2001-315242, JP-A-2001-31871 and JP-A-2001-296401 and a curable film obtained from a metal alkoxide composition disclosed in JP-A-2001-293818 may be used as well.

The refractive index of the high refractive index layer is preferably from 1.70 to 2.20. The thickness of the high refractive index layer is preferably from 5 nm to 10 μm, more preferably from 10 nm to 1 μm.

The refractive index of the middle refractive index layer is adjusted so as to be in between that of the low refractive index layer and the high refractive index layer. The refractive index of the middle refractive index layer is preferably from 1.50 to 1.70.

The haze of the antireflection film is preferably 5% or less, more preferably 3% or less. The strength of the antireflection film is preferably H or more, more preferably 2H or more, most preferably 3H or more according to pencil hardness test defined in JIS K5400.

(Brightness Enhancement Film)

The polarizing plate of the invention may be used in combination with a brightness enhancement film. A brightness enhancement film acts to separate circular polarization or linear polarization. The brightness enhancement film is disposed interposed between the polarizing plate and the back light to cause back reflection or back scattering of one of circular or linear polarization toward back light. The light reflected by the back light portion causes partial change of polarized state. When the light is again incident on the brightness enhancement film and the polarizing plate, it is partially transmitted thereby. By repeating this process, the percent utilization of light can be raised to raise the front brightness by a factor of about 1.4. The brightness enhancement film has been known of anisotropic reflection type and anisotropic scattering type. Any of these types of brightness enhancement film can be combined with the polarizing plate of the invention.

As the anisotropic reflection type of brightness enhancement film there has been known a brightness enhancement film comprising a monoaxially-stretch film and an unstretched film laminated in multilayer configuration and having an anisotropy in reflectance and transmission developed by raising the difference in refractive index between stretching directions. For example, a multilayer type of brightness enhancement film using a principle of dielectric mirror (as disclosed in WO95/17691, WO95/17692, WO95/17699) and a cholesteric liquid crystal type of brightness enhancement film (as disclosed in European Patent 606940A2, JP-A-8-271731) are known. As the multilayer type of brightness enhancement film using a principle of dielectric mirror there is preferably used DBEF-E, DBEF-D or DBEF-M (produced by 3M Co., Ltd.). As the cholesteric liquid crystal type of brightness enhancement film there is preferably used NIPOCS (produced by NITTO DENKO CORPORATION). For the details of NIPOCS, reference can be made to Nitto Giho (NITTO DENKO CORPORATION's technical report), vol. 38, No. 1, May 2000, pp. 19-21.

In the invention, an anisotropic scattering type of brightness enhancement film obtained by monoaxially stretching a blend of a positive intrinsic birefringence polymer and a negative intrinsic birefringence polymer as disclosed in WO97/32223, WO97/32224, WO97/32225, WO97/32226, JP-9-274108 and JP-A-11-174231 is preferably used in combination with the aforementioned brightness enhancement film. As the anisotropic scattering type of brightness enhancement film there is preferably used DRPF-H (produced by 3M Co., Ltd.).

(Other Functional Optical Films)

The polarizing plate of the invention is also preferably used in combination with a functional optical film having a hard coat layer, a front scattering layer, an anti-glare layer, a gas barrier layer, a slip layer, an antistatic layer, an undercoat layer, a protective layer or the like provided thereon. These functional layers are preferably complexed with the antireflection layer in the aforementioned antireflection film, the optical anisotropic layer or the like within the same layer. These functional layers may be each provided on either or both of the polarizer side and the opposite side (side closer to the air) of the polarizing plate.

(Hard Coat Layer)

The polarizing plate of the invention is preferably combined with a functional optical film having a hard coat layer provided on the surface of a transparent support to have a dynamic strength such as scratch resistance. In the case where the hard coat layer is applied to the aforementioned antireflection film, it is particularly preferred that the hard coat layer be provided interposed between the transparent support and the high refractive index layer.

The hard coat layer is preferably formed by optical and/or thermal crosslinking reaction or polymerization reaction of a curable compound. As the curable functional group there is preferably used a photopolymerizable functional group. As the organic metal compound containing a hydrolyzable functional group there is preferably used an organic alkoxysilyl compound. Specific preferred examples of the composition constituting the hard coat layer employable herein include those disclosed in JP-A-2002-144913, JP-A-2000-9908 and WO00/46617.

The thickness of the hard coat layer is preferably from 0.2 µm to 100 µm.

The strength of the hard coat layer is preferably H or more, more preferably 2H or more, most preferably 3H or more according to pencil hardness test of JIS K5400. The change of abrasion of the test specimen between before and after test according to Taber test of JIS K5400 is preferably as small as possible.

As the material constituting the hard coat layer there may be used a compound containing an ethylenically unsaturated group or a compound containing a ring-opening polymerizable group. These compounds may be used singly or in combination. Preferred examples of the compound containing an ethylenically unsaturated group include polyol polyacrylates such as ethylene glycol, trimethylolpropane triacrylate, ditrimethylolpropane tetraacrylate, pentaerythritol triacrylate, pentaerythritol tetraacrylate, dipentaerythritol pentaacrylate and dipentaerythritol hexaacrylate, epoxy acrylates such as diacrylate of bisphenol A diglycidyl ether and diacrylate of hexanediol diglycidyl ether, and urethane acrylate obtained by the reaction of polyisocyanate with hydroxyl group-containing acrylate such as hydroxyethyl acrylate. Examples of commercially available compounds include EB-600, EB-40, EB-140, EB-1150, EB-1290K, IRR214, EB-2220, TMPTA, TMPTA (produced by Daicel UCB Co., Ltd.), and UV-6300, UV-1700B (produced by Nippon Synthetic Chemical Industry Co., Ltd.).

Preferred examples of the compound containing a ring-opening polymerizable group include glycidylethers such as ethylene glycol diglycidyl ether, bisphenol A diglycidyl ether, trimethylolethane triglycidyl ether, trimethylolpropane triglycidyl ether, alicyclic epoxy such as Celoxide 2021P, Celoxide 2081, Epolead GT-301, Epolead GT-401, EHPE3150CE (produced by DAICEL CHEMICAL INDUSTRY, CO., LTD.) and polycyclohexyl epoxymethyl ether of phenol novolac resin, and oxetanes such as OXT-121, OXT-221, OX-SQ and PNOX-1009 (produced by TOAGOSEI CO., LTD.). Further, the hard coat layer may be formed of a glycidyl (meth)acrylate polymer or a copolymer of glycidyl (meth)acrylate polymer with a monomer copolymerizable therewith.

The hard coat layer preferably comprises a particulate crosslinking agent such as particulate oxide of material (e.g., silicon, titanium, zirconium, aluminum) and organic particulate material (e.g., particulate crosslinking agent such as polyethylene, polystyrene, poly(meth)acrylic acid ester and polydimethylsiloxane, particulate crosslinked rubber such as SBR and NBR) incorporated therein to reduce the cure shrinkage of the hard coat layer, enhance the adhesion of the hard coat layer to the substrate and reduce curling of the hard coat-processed product of the invention. The average particle diameter of these particulate crosslinking agents is preferably from 1 nm to 20,000 nm. As the shape of the particulate crosslinking agent there may be used sphere, rod, needle, tablet or the like without any limitation. The amount of the particulate material to be used is preferably 60 vol-% or less, more preferably 40 vol-% based on the cured hard coat layer.

In the case where the aforementioned inorganic particulate material is added, the inorganic particulate material is preferably subjected to surface treatment with a surface treatment agent containing a metal such as silicon, aluminum and titanium and having a functional group such as alkoxide group, carboxylic acid group, sulfonic acid group and phosphonic acid group because the inorganic particulate material has a poor affinity for the binder polymer.

The hard coat layer is preferably cured with heat or an active energy ray. Preferably, an active energy ray such as radiation, gamma ray, alpha ray, electron ray and ultraviolet ray is used. Taking into account safety and productivity, electron ray and ultraviolet ray are particularly preferred. In the case where the hard coat layer is thermally cured, the heating temperature is preferably 140° C. or less, more preferably 100° C. or less taking into account the heat resistance of the plastic itself.

(Front Scattering Layer)

The front scattering layer is used to improve the vertical and horizontal viewing angle characteristics (hue and brightness distribution) when the polarizing plate of the invention is applied to a liquid crystal display. In the invention, a structure having particles having different refractive indexes dispersed in a binder is preferably used. For example, a structure having a specified front scattering coefficient as disclosed in JP-A-11-38208, a structure having a specified range of relative refractive index of transparent resin and particulate material as disclosed in JP-A-2000-199809 and a structure having a specified haze value of 40% or more as disclosed in JP-A-2002-107512 may be used. Further, in order to control the viewing angle properties of haze of the polarizing plate of the invention, the polarizing plate of the invention is preferably used in combination with "Lumisty" described in Sumitomo Chemical Co., Ltd.'s technical report "Optical Functional Film", pp. 31-39.

(Anti-glare Layer)

The anti-glare layer is used to scatter reflected light and prevent reflection. The anti-glare function can be given by forming roughness on the outermost surface (display side) of the liquid crystal display. The haze of the optical film having an anti-glare function is preferably from 3% to 30%, more preferably from 5% to 20%, most preferably from 7% to 20%.

The formation of roughness on the surface of the film can be carried out, e.g., by a method which comprises adding a particulate material to the film to form roughness thereon (as disclosed in JP-A-2000-271878), a method which comprises adding a small amount (0.1 to 50% by weight) of relatively great particles (particle diameter: 0.05 µm to 2 µm) to the surface of the film to form surface roughness (as disclosed in JP-A-2000-281410, JP-A-2000-95893, JP-A-2001-100004, JP-A-2001-281407) or a method which comprises physically transferring roughness onto the surface of the film (e.g., embossing method as disclosed in JP-A-63-278839, JP-A-11-183710, JP-A-2000-275401).

<Liquid Crystal Display>

The liquid crystal display for which the polarizing plate comprising the optical compensation sheet of the invention is preferably used will be described hereinafter.

Figure 4:
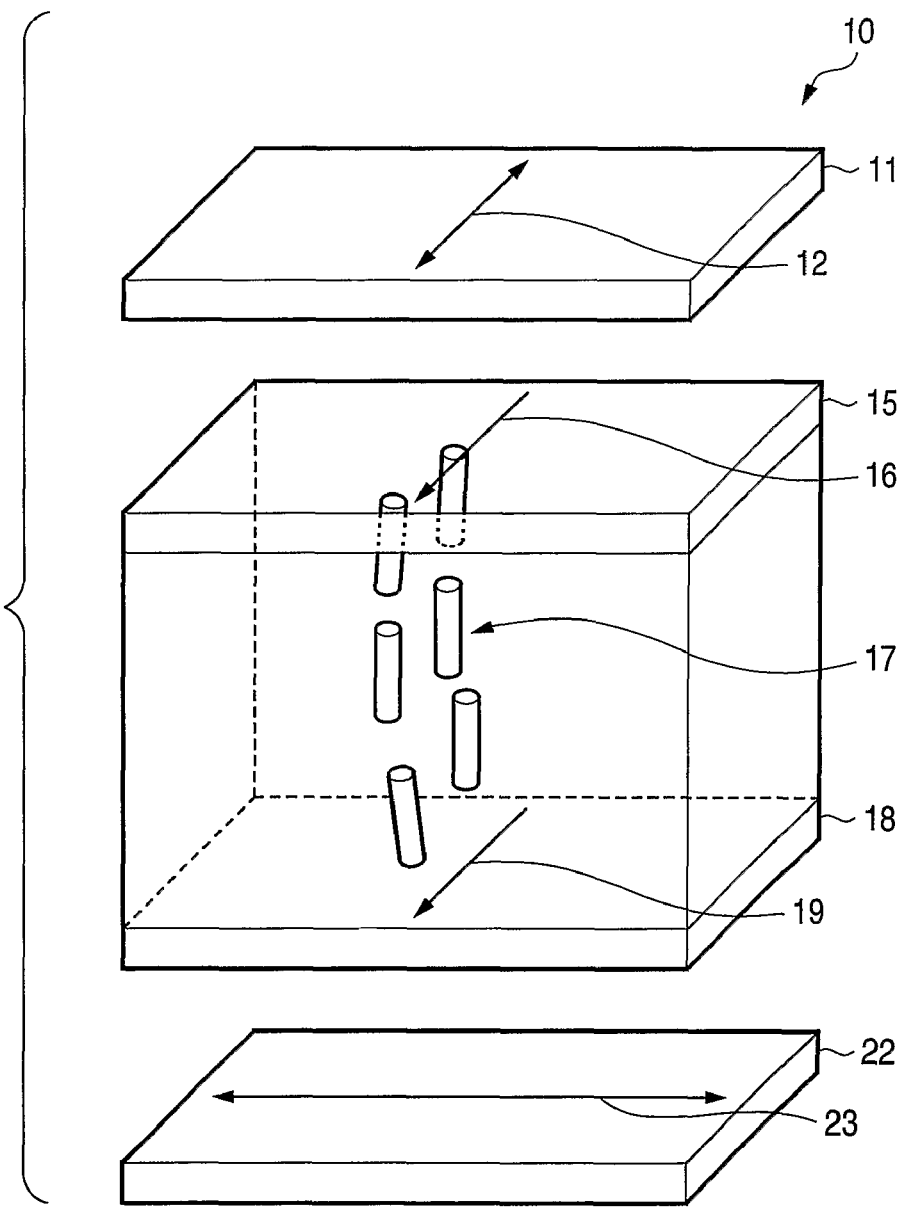
FIG. 4 is a schematic diagram illustrating an exemplary embodiment of a liquid crystal display of the invention.

FIGS. 2 and 4 each is a schematic diagram illustrating an example of the liquid crystal display of the invention. In FIG. 4, a liquid crystal display 20 comprises a liquid crystal layer 17, a liquid crystal cell composed of an upper liquid crystal cell electrode substrate 15 and a lower liquid crystal cell electrode substrate 18 disposed on the upper and lower side thereof, respectively, and an upper polarizing plate 11 and a lower polarizing plate 22 disposed on the respective side of the both sides of the liquid crystal cell. A color filter may be disposed interposed between the liquid crystal cell and the polarizing film. In the case where the liquid crystal display is used as a transmission type, a back light having a cold cathode tube, hot cathode tube, light-emitting diode, field emission element or electroluminescent element as a light source may be provided on the rear side thereof. Further, in the case where the liquid crystal display is used as a reflection type, only one sheet of the polarizing plate may be provided on the observation side. An antireflection film is provided on the rear side of the liquid crystal cell or on the inner surface of the lower substrate of the liquid crystal cell. Of course, a front light comprising the aforementioned light source may be provided on the observation side of the liquid crystal cell.

The liquid crystal display of the invention comprises at least one of the polarizing plates incorporated therein as a polarizing plate of the invention. The liquid crystal display of the invention preferably has a transparent protective film, a polarizer and an optical compensation sheet of the invention laminated therein in this order as viewed from the exterior of the device (side farthest from the liquid crystal cell). Examples of the liquid crystal display include image direct viewing type liquid crystal displays, image projection type liquid crystal displays, and optical modulation type liquid crystal displays. An active matrix liquid crystal display comprising a three-terminal or two-terminal semiconductor element such as TFT and MIM is effective in the invention. Of course, a passive matrix liquid crystal display such as STN mode called time-sharing drive is also effective in the invention.

(VA Mode)

In VA mode liquid crystal displays, a liquid crystal having a negative dielectric anisotropy, $\Delta n$ of 0.0813 and $\Delta \epsilon$ of about −4.6 is formed at a director indicating the alignment direction of liquid crystal molecule, i.e., so-called tilt angle of about 89° by rubbing alignment. The thickness d of the liquid crystal layer 17 is predetermined to 3.5 μm. The brightness of white display varies with the magnitude of the product $\Delta n d$ of the thickness d of the liquid crystal layer 71 and the refractive anisotropy $\Delta n$ of the liquid crystal layer 7. Therefore, the product $\Delta n d$ is predetermined to a range of from 0.2 to 0.5 to obtain the highest brightness.

The upper polarizing plate 11 and the lower polarizing plate 22 of the liquid crystal cell are laminated in such arrangement that the absorption axis 12 of the upper polarizing plate 1 and the absorption axis 23 of the lower polarizing plate 22 are substantially perpendicular to each other. On the inner side of the upper liquid crystal cell electrode substrate 15 and the lower liquid crystal cell electrode substrate 18 are formed a transparent electrode (not shown). When no drive voltage is applied to the electrode, e.g., in non-driven state, the liquid crystal molecules in the liquid crystal layer 17 are aligned substantially perpendicular to the surface of the substrate. As a result, the polarized state of light transmitted by the liquid crystal panel shows little or no change. In other words, the liquid crystal display realizes an ideal black display in non-driven state. In driven state, on the other hand, the liquid crystal molecules are inclined parallel to the surface of the substrate. As a result, the light transmitted by the liquid crystal panel changes in its polarized state due to the inclined liquid crystal molecules. In other words, the liquid crystal display realizes while display in driven state. In FIG. 4, the reference numerals 16 and 19 each indicate alignment control direction.

In the invention, an electric field is applied across the upper and lower substrates. Therefore, a liquid crystal material having a negative dielectric anisotropy such that the liquid crystal molecules respond in the direction perpendicular to the direction of electric field was used. In the case where the electrode is disposed on one of the substrates and an electric field is applied in the crosswise direction parallel to the surface of the substrate, as the liquid crystal material there is used one having a positive dielectric anisotropy.

In VA mode liquid crystal displays, it is scarcely practiced to use a chiral agent commonly used in TN mode liquid crystal displays because the chiral agent deteriorates the dynamic response. In some cases, however, the chiral agent may be added to eliminate malalignment.

VA mode liquid crystal displays are characterized by a high response and a high contrast. However, VA mode liquid crystal displays are disadvantageous in that they show a high contrast as viewed from front side but shows a deteriorated contrast as viewed obliquely. During black display, the liquid crystal molecules are aligned perpendicular to the surface of the substrate. As viewed from the front side, the liquid crystal molecules show little or no birefringence, giving a low transmission and hence a high contrast. However, as viewed obliquely, the liquid crystal molecules undergo birefringence. Further, the angle of cross of the absorption axis of the upper and lower polarizing plates is 90° (right angle) as viewed from the front side but is more than 90° as viewed obliquely. The two factors cause the occurrence of light leakage and contrast drop as viewed obliquely. In order to solve these problems, an optical compensation sheet is disposed.

During white display, the liquid crystal molecules are inclined. In the direction opposite the direction of inclination, the magnitude of birefringence of liquid crystal molecules as viewed obliquely varies to make difference in brightness and tone. In order to solve these problems, one pixel of the liquid crystal display is divided into a plurality of regions to provide a structure called multi-domain.

(Multi-domain)

In VA mode liquid crystal displays, for example, when an electric field is applied, the liquid crystal molecules are inclined in a plurality of regions in one pixel to average the viewing angle properties. In order to divide alignment in one pixel, the electrode is provided with slits or protrusions, the direction of electric field is varied or the density of electric field is deviated. In order to a viewing angle uniformly all over the directions, the number of divisions may be raised. Quartering or octaring or higher division may be effected to obtain a uniform viewing angle. In particular, when the alignment is octared, the absorption of the polarizing plate can be predetermined to be an arbitrary angle.

At the border of regions of alignment division, the liquid crystal molecules can difficultly respond. Therefore, during normally black display, black display is maintained, raising a problem of brightness drop. In order to solve this problem, a chiral agent can be added to the liquid crystal material to reduce the border region.

EXAMPLES

The invention will be further described in the following examples, but the invention is not limited thereto. The term "parts" as used hereinafter is meant to indicate "parts by weight".

Example 1

Preparation of Optical Compensation Sheet A-1

(Preparation of Stretched Polymer Film A-1>

(Preparation of polarizing plate protective film A-1)

The following composition was charged in a mixing tank where they were then stirred and filtered through a paper filter having an average pore diameter of 34 μm and a sintered metallic filter.

| (Cyclic polyolefin solution D-5) | |
|---|---|
| Cyclic polyolefin: ARTON-G | 150 parts by weight |
| Liquid paraffin: (Daphne Oil CP68, produced by Idemitsu Kosan Co., Ltd) | 15 parts by weight |
| Dichloromethane | 450 parts by weight |
| Surface active agent RZ-13 | 0.7 parts by weight |

R-13: iso-$C_8H_{17}$—$C_6H_4$—O—$(CH_2CH_2O)_3$—$(CH_2)_2SO_3Na$

The following composition including the above-prepared cyclic polyolefin solution D-5 was charged in a dispersing machine to prepare a fine particles dispersion.

| (Fine particles dispersion M-5) | |
|---|---|
| Particulate silica having average primary particle diameter of 16 nm ("AEROSIL R972", produced by Nippon Aerosil Co., Ltd.) | 2 parts by weight |
| Dichloromethane | 83 parts by weight |
| Cyclic polyolefin solution D-5 | 10 parts by weight |

100 parts by weight of the cyclic polyolefin solution M-5 and 1.35 parts by weight of the fine particles dispersion M-5 were mixed to prepare a film formation dope. The dope was then casted using a band casting machine. When the residual solvent content reached about 25% by weight, the film thus obtained was peeled off the band and then dried at a temperature of 120° C.

Using a tenter heated at a temperature of 170° C., the film was stretched 1.7 times in both of machine and wide directions, and then kept at a temperature of 90° C. for 1 minute for cooling and kept at a room temperature for cooling. Thereafter, the film was taken out from the tenter. The obtained polymer film A-1 thus produced had a thickness of 63 μm.

The stretched polymer film (A-1) exhibited Re (480)/Re (546) of 1.01, Re (628)/Re (546) of 0.99, Rth (480)/Rth (546) of 1.00, Rth (682)/Rth (546) of 1.00, and a photoelastic modulus of $2 \times 10^{-8}$ cm$^2$/N.

(Provision of Adhesion-providing Layer)

A coating solution having the following formulation was spread over the both sides of the stretched polymer film (A-1) thus obtained to a dry thickness of 0.3 μm to form a hydrophobic cellulose ester-containing layer (DAC-containing layer).

| (Formulation of coating solution) | |
|---|---|
| Cellulose diacetate (DAC: acetate flakes L-AC, produced by Daicel UCB Co., Ltd.; prepared in the form of 5 wt-% acetone solution) | 50 ml |
| Ethyl acetate | 40 ml |
| Methanol | 10 ml |
| Aerosil R-972 (produced by Nihon Aerosil Co., Ltd.; dispersed such that the average particle diameter reached 0.3 μm) | 1 g |

(Formation of Alignment Layer)

Using a #14 wire bar coater, a coating solution having the following formulation was spread over one side of the stretched polymer film (A-1) thus coated with an adhesion-providing layer at a rate of 24 ml/m$^2$. The coated material was dried with 60° C. hot air for 60 seconds and then with 90° C. hot air for 150 seconds.

Subsequently, the layer thus formed was subjected to rubbing in the direction of 90 ° with respect to the stretching direction (substantially the same as slow axis) of the stretched polymer film (A-1).

| Formulation of alignment layer coating solution: | |
|---|---|
| Modified polyvinyl alcohol shown below | 20 parts by weight |
| Water | 360 parts by weight |
| Methanol | 120 parts by weight |
| Glutaraldehyde (crosslinking agent) | 1.0 part by weight |

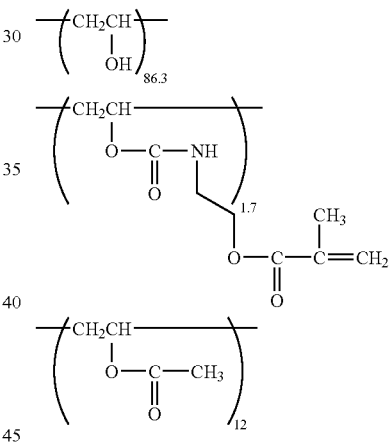

(Preparation of Optical Anisotropic Layer)

Using a #6 wire bar coater, a coating solution having the following formulation was spread over the alignment layer at a rate of 23.1 ml/m$^2$. The alignment layer was attached to a metal frame, and then heated in a 100° C. constant temperature tank for 2 minutes so that the liquid crystal compound was aligned. Subsequently, the alignment layer was irradiated with ultraviolet rays from a 120 W/cm high pressure mercury vapor lamp at 90° C. for 1 minute to cause the polymerization of the liquid crystal compound. Thereafter, the alignment layer was allowed to cool to room temperature.

| Formulation of optical anisotropic layer coating solution: | |
|---|---|
| Rod-shaped liquid crystal compound I-6 | 100 parts by weight |
| Crosslinking goup-containing polymer (1) | 0.7 parts by weight |
| Fluorine containing surface active agent (Megaface F-780-F, produced by Dainippon Ink and Chemicals, Inc.) | 0.5 parts by weight |

-continued

| Formulation of optical anisotropic layer coating solution: | |
|---|---|
| Photopolymerization initiator (Irgacure 907, produced by Ciba Specialty Chemicals Co., Ltd.) | 2.9 parts by weight |
| Sensitizer (Kayacure DETX, produced by Nippon Kayaku Corporation) | 1.0 part by weight |
| Methyl ethyl ketone | 262 parts by weight |

Crosslinling group-contianing polymer (1):

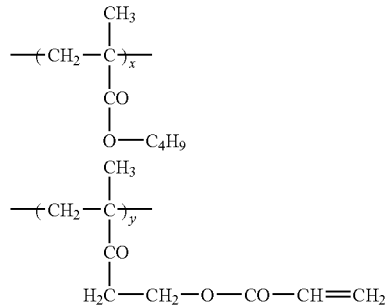

The optical anisotropic layer showed Re (480)/Re (546) of 1.11, Re (628)/Re (546) of 0.95, Rth (480)/Rth (546) of 1.11 and Rth (628)/Rth (546) of 0.95.

The arrangement was made such that the slow axis of the stretched polymer film A-1 and the slow axis of the optical anisotropic layer cross each other at right angles.

Example 2

Preparation of Optical Compensation Sheet A-2

(Preparation of Stretched Polymer Film A-2)

100 parts by weight of the cyclic polyolefin solution M-5 and 1.35 parts by weight of the fine particles dispersion M-5 were mixed to prepare a film formation dope. The dope was then casted using a band casting machine. When the residual solvent content reached about 25% by weight, the film thus obtained was peeled off the band and then dried at a temperature of 120° C.

Using a tenter heated at a temperature of 170° C., the film was stretched 1.5 times in both of machine and wide directions, and then kept at a temperature of 90° C. for 1 minute for cooling and kept at a room temperature for cooling. Thereafter, the film was taken out from the tenter. The obtained polymer film A-2 thus produced had a thickness of 69 μm.

The stretched polymer film (A-2) exhibited Re (480)/Re (546) of 1.01, Re (628)/Re (546) of 0.99, Rth (480)/Rth (546) of 1.00, Rth (682)/Rth (546) of 1.00, and a photoelastic modulus of $1 \times 10^{-8}$ cm$^2$/N.

The arrangement was made such that the slow axis of the stretched polymer film A-2 and the slow axis of the optical anisotropic layer cross each other at right angles.

(Surface Treatment of Film)

The stretched polymer film (A-2) was subjected to corona discharge on the both sides thereof at 12 W·min/m$^2$ using a corona discharger produced by Kasuga Electric Works Ltd. to become hydrophilic.

(Formation of Alignment Layer)

Using a #14 wire bar coater, a coating solution having the following formulation was spread over one side of the stretched polymer film (A-2) thus coated with an adhesion-providing layer at a rate of 24 ml/m$^2$. The coated material was dried with 60° C. hot air for 60 seconds and then with 90° C. hot air for 150 seconds.

Subsequently, the layer thus formed was subjected to rubbing in the direction of 90° with respect to the stretching direction (substantially the same as slow axis) of the stretched polymer film (A-2).

| Formulation of alignment layer coating solution: | |
|---|---|
| Modified polyvinyl alcohol shown below | 20 parts by weight |
| Water | 360 parts by weight |
| Methanol | 120 parts by weight |
| Glutaraldehyde (crosslinking agent) | 1.0 part by weight |

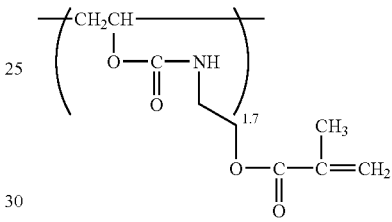

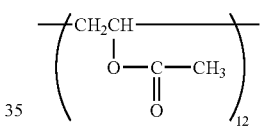

(Preparation of Optical Anisotropic Layer)

Using a #4 wire bar coater, a coating solution having the following formulation was spread over the alignment layer at a rate of 15.4 ml/m$^2$. The alignment layer was attached to a metal frame, and then heated in a 100° C. constant temperature tank for 2 minutes so that the liquid crystal compound was aligned. Subsequently, the alignment layer was irradiated with ultraviolet rays from a 120 W/cm high pressure mercury vapor lamp at 90° C. for 1 minute to cause the polymerization of the liquid crystal compound. Thereafter, the alignment layer was allowed to cool to room temperature.

| Formulation of optical anisotropic layer coating solution: | |
|---|---|
| Rod-shaped liquid crystal compound I-1 | 100 parts by weight |
| Crosslinking goup-containing polymer (1) | 0.7 parts by weight |
| Fluorine containing surface active agent (Megaface F-780-F, produced by Dainippon Ink and Chemicals, Inc.) | 0.5 parts by weight |
| Photopolymerization initiator (Irgacure 907, produced by Ciba Specialty Chemicals Co., Ltd.) | 2.9 parts by weight |
| Sensitizer (Kayacure DETX, produced by Nippon Kayaku Corporation) | 1.0 part by weight |
| Methyl ethyl ketone | 253 parts by weight |

The optical anisotropic layer showed Re (480)/Re (546) of 1.05, Re (628)/Re (546) of 0.97, Rth (480)/Rth (546) of 1.05 and Rth (628)/Rth (546) of 0.97.

Comparative Example 1

<Preparation of Optical Compensation Sheet B-1>

(Preparation of Cellulose Acylate Film B-1)

The following compositions were charged in a mixing tank where they were then stirred to prepare a cellulose acylate solution B.

| Formulation of cellulose acylate solution B: | |
|---|---|
| Cellulose acylate having acetylation degree of 1.0 and propionylation degree of 1.4 | 100.0 parts by weight |
| Triphenyl phosphate (plasticizer) | 9.0 parts by weight |
| Ethyl phthalyl ethyl glycolate (plasticizer) | 3.5 parts by weight |
| Methylene chloride (first solvent) | 362.0 parts by weight |
| Ethanol (second solvent) | 100.0 parts by weight |

<Preparation of Matting Agent Solution>

The following compositions were charged in a dispersing machine where they were then stirred to prepare a matting agent solution.

| Formulation of matting agent solution: | |
|---|---|
| Particulate silica having average particle diameter of 20 nm "AEROSIL R972" (produced by Nippon Aerosil Co., Ltd.) | 2.0 parts by weight |
| Methylene chloride (first solvent) | 75.0 parts by weight |
| Methanol (second solvent) | 12.7 parts by weight |
| Cellulose acylate solution B | 10.3 parts by weight |

<Preparation of Solution of Additive>

The following compositions were charged in a mixing tank where they were then heated with stirring to prepare an ultraviolet absorber solution.

| Formulation of ultraviolet absorber solution: | |
|---|---|
| Ultraviolet absorber (A) | 4 parts by weight |
| Ultraviolet absorber (B) | 2 parts by weight |
| Methylene chloride (first by solvent) | 75.2 parts weight |
| Ethanol (second solvent) | 11.2 parts by weight |

Ultraviolet absorber (A)

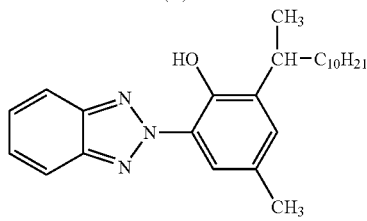

-continued

Formulation of ultraviolet absorber solution:

Ultraviolet absorber (B)

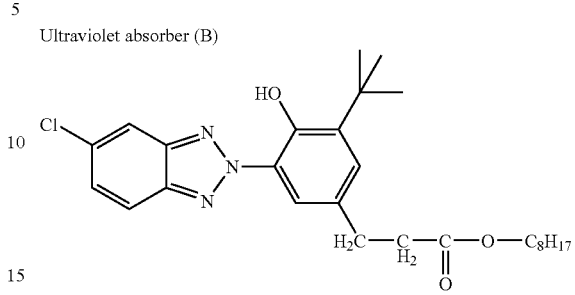

1.3 parts by weight of the aforementioned matting agent solution and 6.0 parts by weight of the aforementioned ultraviolet absorber were filtered, and then mixed by an in-line mixer. To the mixture were then added 92.7 parts by weight of the cellulose acylate solution B. The mixture was then stirred by the in-line mixer. The mixture was then casted using a band casting machine. When the residual solvent content reached 36% by weight, the web thus obtained was peeled off the band. Using a tenter, the web was crosswise stretched up to a stretching ratio of 40% and an atmosphere temperature of 130° C., and then kept at a temperature of 140° C. for 30 seconds. The residual solvent content at the start of stretching was 15% by weight. Thereafter, the clip was detached from the web. The web was then dried at a temperature of 130° C. for 40 minutes to produce a stretched cellulose acylate film. The stretched cellulose acylate film thus produced had a residual solvent content of 0.1% by weight an a thickness of 90 μm.

(Alkaline Treatment of Film)

The stretched cellulose acylate film B-1 was dipped in a 2.3 mol/L aqueous solution of sodium hydroxide at 55° C. for 3 minutes. The stretched cellulose acylate film B-1 was washed in a rinsing bath at room temperature, and then neutralized with a 0.05 mol/L sulfuric acid at 30° C. The stretched cellulose acylate film was again washed in a rinsing bath at room temperature, and then dried with 100° C. hot air.

Thus, a comparative optical compensation sheet B-1 was prepared.

Comparative Example 2

<Preparation of Optical Compensation Sheet B-2>

(Preparation of Cellulose Acylate Film B-2)

The following compositions were charged in a mixing tank where they were then stirred to prepare a cellulose acylate solution C.

| Formulation of cellulose acylate solution C: | |
|---|---|
| Cellulose acylate having acetylation degree of 1.1 and propionylation degree of 1.5 | 100.0 Parts by weight |
| Triphenyl phosphate (plasticizer) | 9.0 parts by weight |
| Ethyl phthalyl ethyl glycolate (plasticizer) | 3.5 parts by weight |
| Methylene chloride (first solvent) | 362.0 parts by weight |
| Ethanol (second solvent) | 100.0 parts by weight |

<Preparation of Matting Agent Solution>

The following compositions were charged in a dispersing machine where they were then stirred to prepare a matting agent solution.

| Formulation of matting agent solution: | |
| --- | --- |
| Particulate silica having average particle diameter of 20 nm "AEROSIL R972" (produced by Nippon Aerosil Co., Ltd.) | 2.0 parts by weight |
| Methylene chloride (first solvent) | 75.0 parts by weight |
| Methanol (second solvent) | 12.7 parts by weight |
| Cellulose acylate solution C | 10.3 parts by weight |

<Preparation of Solution of Additive>

The following compositions were charged in a mixing tank where they were then heated with stirring to prepare an ultraviolet absorber solution.

| Formulation of ultraviolet absorber solution: | |
| --- | --- |
| Ultraviolet absorber (A) | 4.0 parts by weight |
| Ultraviolet absorber (B) | 2.0 parts by weight |
| Methylene chloride (first solvent) | 75.2 parts by weight |
| Ethanol (second solvent) | 11.2 parts by weight |

1.3 parts by weight of the aforementioned matting agent solution and 6.0 parts by weight of the aforementioned ultraviolet absorber were filtered, and then mixed by an in-line mixer. To the mixture were then added 92.7 parts by weight of the cellulose acylate solution B. The mixture was then stirred by the in-line mixer. The mixture was then casted using a band casting machine. When the residual solvent content reached 36% by weight, the web thus obtained was peeled off the band. Using a tenter, the web was crosswise stretched up to a stretching ratio of 20% and an atmosphere temperature of 130° C., and then kept at a temperature of 140° C. for 30 seconds. The residual solvent content at the start of stretching was 15% by weight. Thereafter, the clip was detached from the web. The web was then dried at a temperature of 130° C. for 40 minutes to produce a stretched cellulose acylate film. The stretched cellulose acylate film thus produced had a residual solvent content of 0.1% by weight an a thickness of 96 μm.

(Alkaline Treatment of Film)

The cellulose acylate film B-2 was dipped in a 1.5 N aqueous solution of sodium hydroxide at 55° C. for 3 minutes. The cellulose acylate film B-2 was washed in a rinsing bath at room temperature, and then neutralized with a 0.1 N sulfuric acid at 30° C. The cellulose acylate film was again washed in a rinsing bath at room temperature, and then dried with 100° C. hot air. Thus, a comparative optical compensation sheet B-2 was prepared.

<Measurement of Physical Properties of Film>

(Measurement of Optical Characteristics)

Using a Type KOBRA-21ADH automatic birefringence meter (produced by Ouji Scientific Instruments Co., Ltd.), these films were each measured for Re and Rth at 25° C. and 60% RH. The measuring was effected at a wavelength of 480 nm, 546 nm and 628 nm.

(Measurement of Photoelastic Modulus)

These films were each cut into a specimen having a size of 3.5 cm×12 cm. These specimens were each then measured for Re under load of 250 g, 500 g, 1,000 g and 1,500 g. From the inclination of the straight line of Re change with respect to stress was then calculated photoelastic modulus. The measuring wavelength was 630 nm.

The measurements of physical properties of film are set forth in Table 1.

TABLE 1

| Optical compensation sheet | Thickness (μm) | Re (nm) | | | | | Rth (nm) | | | | | Photoelastic modulus ($\times 10^{-13}$ cm$^2$/dyn) | Remarks |
| --- | --- | --- | --- | --- | --- | --- | --- | --- | --- | --- | --- | --- | --- |
| | | 480 nm | 546 nm | 628 nm | 480 nm/ 546 nm | 628 nm/ 546 nm | 480 nm | 546 nm | 628 nm | 480 nm/ 546 nm | 628 nm/ 546 nm | | |
| A-1 | 65 | 53 | 67 | 74 | 0.79 | 1.10 | 321 | 313 | 308 | 1.03 | 0.98 | 3 | Inventive |
| A-2 | 70 | 54 | 58 | 60 | 0.93 | 1.03 | 246 | 243 | 241 | 1.01 | 0.99 | 2 | Inventive |
| B-1 | 90 | 82 | 86 | 91 | 0.95 | 1.06 | 218 | 224 | 231 | 0.97 | 1.03 | 11 | Comparative |
| B-2 | 96 | 49 | 52 | 54 | 0.94 | 1.04 | 138 | 136 | 134 | 1.01 | 0.99 | 12 | Comparative |

* cm$^2$/dyn = $10^5$ cm$^2$/N

Example 3

<Preparation of Polarizing Plate>

(Saponification of Stretched Polymer Film)

A commercially available cellulose acylate film (Fujitac TD80) was dipped in a 1.5 mol/L aqueous solution of sodium hydroxide at 55° C. for 1 minute. The cellulose acylate film was washed in a rinsing bath at room temperature, and then neutralized with a 0.05 mol/l sulfuric acid at 30° C. The cellulose acylate film was again washed in a rinsing bath at room temperature, and then dried with 100° C. hot air.

(Preparation of Polarizer)

A polyvinyl alcohol film having a polymerization degree of 1,700 and a thickness of 39 μm was swollen in a 30° C. hot water bath, and then stretched by a factor of about 4 in a 30° C. dye bath comprising an aqueous solution of iodine and potassium iodide. Subsequently, the polyvinyl alcohol film was stretched and crosslinked in a 50° C. crosslinking bath comprising boric acid and potassium iodide in such a manner that the total stretching ratio reached 5.5. The polyvinyl alcohol film was dipped in a 35° C. aqueous solution of potassium iodide for 10 seconds to adjust the hue thereof. The polyvinyl alcohol film was rinsed, and then dried to obtain a polarizer having a thickness of 18 μm. The polarizer thus obtained had a water content of 14%. The polarizer also exhibited a birefringence ($\Delta n$) of 0.0482, a transmission of 43% and a percent polarization of 99.9% at a wavelength of 900 nm.

The birefringence was determined by dividing the phase difference ($\Delta nd$) determined at a wavelength of 900 nm using a parallel nicols rotation method by the thickness d (nm).

For the measurement of transmission, a Type DOT-3 spectrophotometer (produced by MURAKAMI COLOR RESEARCH LABORATORY CO., Ltd.) was used. Y value was obtained by subjecting the measurements to visibility correction by a 2 degree field of view (C light source) according to JIS Z8701.

For the determination of percent polarization, two sheets of polarizer which had been laminated in such an arrangement that the polarizing axis thereof are parallel to each other and two sheets of polarizer which had been laminated in such an arrangement that the polarizing axis thereof cross each other were measured for transmission (H0 and H90, respectively) according to the aforementioned transmission measuring method. The measurements were then subjected to calculation by the following equation. The measurements of parallel transmission (H0) and cross transmission (H90) were subjected to visibility correction for Y value.

$$\text{Polarization degree (\%)} = \{(H0-H90)/(H0+H90)\}^{1/2} \times 100$$

(Preparation of Adhesive)

10 parts of a polyester-based urethane (Takelax XW-74-C154, produced by MITSUI TAKEDA CHEMICALS, INC.) and 1 part of an isocyanate-based crosslinking agent (Takenate WD-725, produced by MITSUI TAKEDA CHEMICALS, INC.) were dissolved in water to prepare a solution having a solid content adjusted to 20%. This solution was then used as an adhesive.

Preparation of Polarizing Plate 1

The aforementioned adhesive solution was spread over the both sides of the polarizer. The optical compensation sheet A-1 prepared in Example 1 and Fujitac TD80 which had been saponified as mentioned above were stuck to the respective side of the polarizer in such an arrangement that the polarizer was interposed therebetween. The laminate was then heated to 40° C. in an oven for 72 hours so that the adhesive was dried and cured to prepare a polarizing plate 1. The optical compensation sheet A-1 was stuck to the polarizer in such an arrangement that the optical anisotropic layer was disposed on the air side. The polarizing plate thus obtained exhibited a transmission of 42% and a percent polarization of 99.9%.

Preparation of Polarizing Plate 2

The aforementioned adhesive solution was spread over the both sides of the polarizer. The optical compensation sheet A-2 prepared in Example 2 and Fujitac TD80 which had been saponified as mentioned above were stuck to the respective side of the polarizer in such an arrangement that the polarizer was interposed therebetween. The laminate was then heated to 40° C. in an oven for 72 hours so that the adhesive was dried and cured to prepare a polarizing plate 2. The optical compensation sheet A-2 was stuck to the polarizer in such an arrangement that the optical anisotropic layer was disposed on the air side. The polarizing plate thus obtained exhibited a transmission of 41% and a percent polarization of 99.9%.

Comparative Example 3

(Preparation of Polarizing Plate 3)

The optical compensation sheet B-1 prepared in Comparative Example 1 and Fujitac TD80 which had been saponified as mentioned above were stuck to the respective side of the polarizer in such an arrangement that the polarizer was interposed therebetween similarly to Example 3. The laminate was then heated to 40° C. in an oven for 72 hours so that the adhesive was dried and cured to prepare a polarizing plate 3. The polarizing plate thus obtained exhibited a transmission of 43% and a percent polarization of 99.9%.

(Preparation of Polarizing Plate 4)

The optical compensation sheet B-2 prepared in Comparative Example 2 and Fujitac TD80 which had been saponified as mentioned above were stuck to the respective side of the polarizer in such an arrangement that the polarizer was interposed therebetween similarly to Example 3. The laminate was then heated to 40° C. in an oven for 72 hours so that the adhesive was dried and cured to prepare a polarizing plate 4. The polarizing plate thus obtained exhibited a transmission of 42% and a percent polarization of 99.9%.

Example 4

Figure 3:
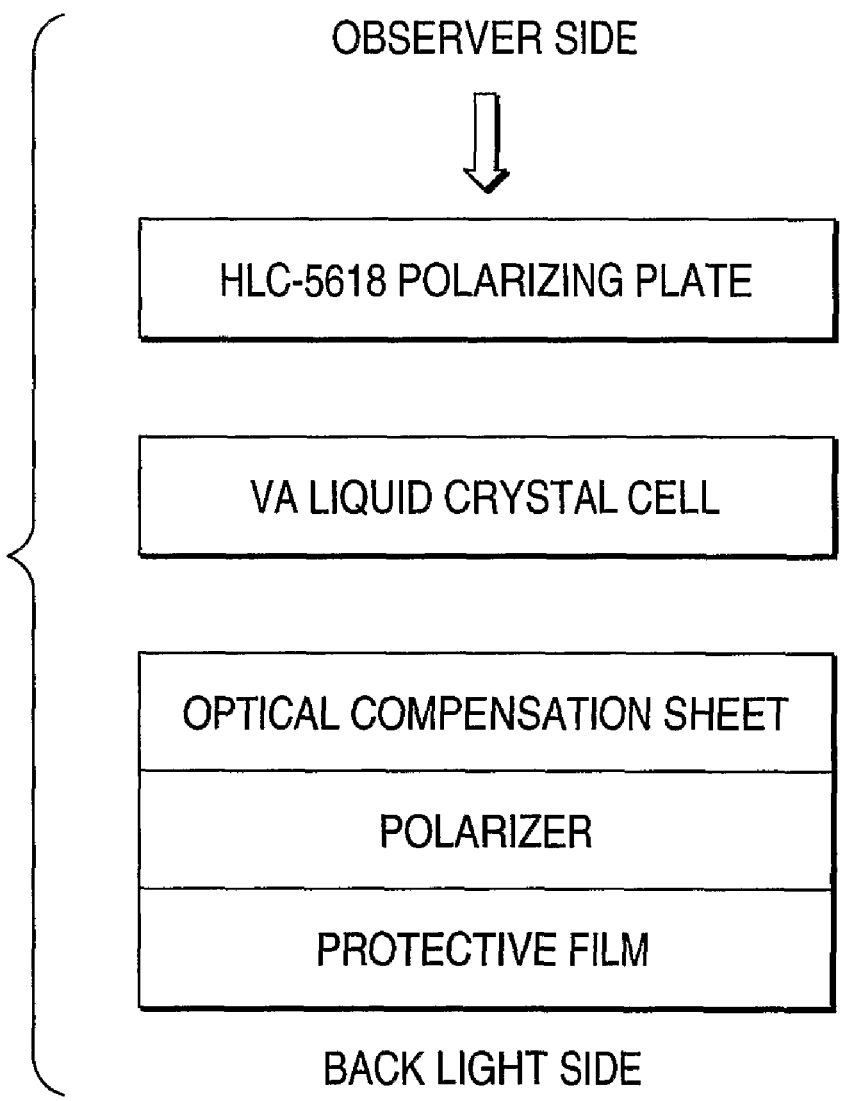
FIG. 3 is a schematic diagram illustrating a schematic diagram illustrating an exemplary embodiment of a liquid crystal display of the invention.

A liquid crystal display of FIG. 3 was prepared. In some detail, an upper polarizing plate, a VA mode liquid crystal cell (upper substrate, liquid crystal layer, lower substrate) and a lower polarizing plate were laminated in this order as viewed from the observer (from above). A backlight source was then disposed. In the following examples, as the upper polarizing plate there was used a commercially available polarizing plate (HLC2-5618) and as the lower polarizing plate there was each used the polarizing plates 1 to 4.

<Preparation of Liquid Crystal Cell>

A liquid crystal cell was prepared by injecting a liquid crystal material having a negative dielectric anisotropy ("MLC6608", produced by Melc Co., Ltd.) into the cell gap (3.6 μm) between the substrates and then sealing the cell gap to form a liquid crystal layer between the substrates. The retardation of the liquid crystal layer (i.e., product $\Delta n \cdot d$ of the thickness d (μm) of the liquid crystal layer and the dielectric anisotropy $\Delta n$ of the liquid crystal layer) was predetermined to be 275 nm. The liquid crystal material was vertically aligned.

One sheet of a commercially available super high contrast product (HLC2-5618, produced by SANRITZ CORPORATION) was stuck to the upper polarizing plate of the aforementioned liquid crystal display comprising a vertically-aligned liquid crystal cell (FIG. 3) with an adhesive and one sheet of the polarizing plate 1 prepared in Example 3 was stuck to the lower polarizing plate of the liquid crystal display with an adhesive on the observer side and the back light side thereof, respectively, in such an arrangement that the optical compensation sheet (A-1) was disposed on the liquid crystal side thereof to prepare a liquid crystal display 1. The liquid crystal display was arranged in crossed Nicols such that the transmission axis of the polarizing plate on the observer side extends vertically while the transmission axis of the polarizing plate on the back light side extends horizontally.

Comparative Example 4

The polarizing plate 3 was also used to prepare liquid crystal display 2 in the same manner as in Example 4.

<Evaluation of Tint Change>

The liquid crystal displays prepared in Example 4 and Comparative Example 4 were each then measured for change of front tint between shortly after lighting and after 500 hours of lighting at 30° C. and 80% RH using Ezcontrast (produced by ELDI Inc.). From the measurements were then determined absolute tint change values Δx, Δy on xy chromaticity diagram.

The results are set forth in Table 2 below.

TABLE 2

| Sample No. | Δx | Δy | Remarks |
| --- | --- | --- | --- |
| Liquid crystal display 1 | 0.02 | 0.03 | Inventive |
| Liquid crystal display 2 | 0.06 | 0.07 | Comparative |

As can be seen in the results of Table 2, the polarizing plate comprising an inventive optical compensation sheet shows little tint change to advantage even after prolonged lighting of the liquid crystal display in which it is incorporated.

Example 5

(Preparation and Evaluation 2 of VA Liquid Crystal Display)

To a 3 wt-% aqueous solution of polyvinyl alcohol was added octadecyl dimethyl ammonium chloride (coupling agent) in an amount of 1% by weight. The solution was spread over a glass substrate with ITO electrode, subjected to heat treatment at 160° C., and then subjected to rubbing to form a vertically-aligned layer. The rubbing was effected on two sheets of glass substrate in opposing directions. The two sheets of glass substrate were opposed to each other in such an arrangement that the cell gap (d) reached 5 μm. Into the cell gap was then injected a liquid crystal compound (Δn: 0.08) mainly composed of ester-based component and ethane-based component to prepare a vertically-aligned liquid crystal cell. The product of Δn and d was 400 nm.

The polarizing plate 2 prepared above was then stuck to the both sides of the vertically-aligned liquid crystal cell thus prepared with an adhesive sheet in such an arrangement that the optical compensation sheet (A-2) was disposed on the cell side thereof to prepare a liquid crystal display 3.

Comparative Example 5

The polarizing plate 4 prepared above was stuck to the both sides of the vertically-aligned liquid crystal cell with an adhesive sheet in the same manner as in Example 5 to prepare a liquid crystal display 4.

<Evaluation of Tint Change>

The liquid crystal displays prepared in Example 5 and Comparative Example 5 were each then measured for change of front tint between shortly after lighting and after 1000 hours of lighting at 30° C. and 80% RH using Ezcontrast (produced by ELDI Inc.). From the measurements were then determined absolute tint change values Δx, Δy on xy chromaticity diagram.

The results are set forth in Table 3 below.

TABLE 3

| Sample No. | Δx | Δy | Remarks |
| --- | --- | --- | --- |
| Liquid crystal display 3 | 0.04 | 0.04 | Inventive |
| Liquid crystal display 4 | 0.09 | 0.10 | Comparative |

As can be seen in the results of Table 3, the polarizing plate comprising an inventive optical compensation sheet shows little tint change to advantage even after prolonged lighting of the liquid crystal display in which it is incorporated.

The molar absorptivity of the retardation developing agents used in the following examples and comparative examples are set forth in Table 4.

For the measurement of molar absorptivity, the retardation developing agent was dissolved in methylene chloride. The solution thus obtained was then measured using a Type UV3400 spectrophotometer (produced by Shimadzu Corporation).

TABLE 4

| Retardation developing agent | Molar absorptivity | | |
| --- | --- | --- | --- |
| | 330 nm | 360 nm | 700 nm |
| A-7 | less than 100 | less than 100 | less than 100 |
| B-7 | 17,000 | 340 | less than 100 |

Example 6

<Preparation of Optical Compensation Sheet A-1>

(Preparation of Polarizing Plate Protective Film A-1)

(Preparation of Cellulose Acylate Solution)

The following compositions were charged in a mixing tank where they were then stirred to prepare a cellulose acylate solution.

| (Formulation of cellulose acylate solution) | |
| --- | --- |
| Cellulose acetate (CA-1) having acetylation degree of 2.8 | 100.0 parts by weight |
| Plasticizer: triphenyl phosphate | 6.0 parts by weight |
| Plasticizer: biphenyl phosphate | 3.0 parts by weight |
| Methylene chloride (first solvent) | 402.0 parts by weight |
| Methanol (second solvent) | 60.0 parts by weight |

(Preparation of Matting Agent Solution)

The following compositions were charged in a dispersing machine where they were then stirred to prepare a matting agent solution.

| (Formulation of matting agent solution) | |
| --- | --- |
| Particulate silica having average particle diameter of 20 nm "AEROSIL R972" (produced by Nippon Aerosil Co., Ltd.) | 2.0 parts by weight |
| Methylene chloride (first solvent) | 75.0 parts by weight |
| Methanol (second solvent) | 12.7 parts by weight |
| Cellulose acylate solution | 10.3 parts by weight |

(Preparation of Retardation Developing Agent Solution)

The following compositions were charged in a mixing tank where they were then heated with stirring to prepare a retardation developing agent solution.

| (Formulation of retardation developing agent solution) | |
|---|---|
| Retardation developing agent (A-7) | 20.0 parts by weight |
| Methylene chloride (first solvent) | 58.4 parts by weight |
| Methanol (second solvent) | 8.7 parts by weight |
| Cellulose acylate solution | 12.8 parts by weight |

94.3 parts by weight of the aforementioned cellulose acylate solution, 1.3 parts by weight of a matting agent solution and 4.4 parts by weight of a retardation developing agent solution were filtered, and then mixed. The mixture was then casted using a band casting machine. When the residual solvent content reached 35% by weight, the web thus obtained was peeled off the band. Using a tenter, the web was crosswise stretched at a rate of 30%/min up to a stretching ratio of 29% and a temperature of 140° C., and then kept at a temperature of 140° C. and a stretching ratio of 26% for 30 seconds. Thereafter, the clip was detached from the web. The web was then dried at a temperature of 140° C. for 40 minutes to produce a stretched cellulose acylate film (CAF1). The stretched cellulose acylate film thus produced had a residual solvent content of 0.2% by weight and a thickness of 80 μm.

The stretched cellulose acylate film showed Re (480)/Re (546) of 1.01, Re (628)/Re (546) of 0.99, Rth (480)/Rth (546) of 0.94 and Rth (628)/Rth (546) of 1.07.

(Saponification of Stretched Cellulose Acylate Film)

Over the stretched cellulose acylate film (CAF1) thus prepared was spread a solution having the following formulation at a rate of 5.2 mL/m². The coated material was then dried at 60° C. for 10 minutes. The surface of the film was washed with flowing water for 10 seconds, and then blown with 25° C. air so that it was dried.

| (Formulation of saponifying solution) | |
|---|---|
| Isopropyl alcohol | 818 parts by weight |
| Water | 167 parts by weight |
| Propylene glycol | 187 parts by weight |
| "EMALEX", produced by NIHON EMULSION CO., LTD. | 10 part by weight |
| Potassium hydroxide | 67 parts by weight |

(Formation of Alignment Layer)

Using a #14 wire bar coater, a coating solution having the following formulation was spread over one side of the stretched cellulose acylate film (CAF1) thus saponified at a rate of 24 ml/m². The coated material was dried with 60° C. hot air for 60 seconds and then with 90° C. hot air for 150 seconds.

Subsequently, the alignment layer thus formed was subjected to rubbing in the direction of 90° with respect to the stretching direction (substantially the same as slow axis) of the stretched cellulose acylate film (CAF1) thus saponified.

| Formulation of alignment layer coating solution: | |
|---|---|
| Modified polyvinyl alcohol shown below | 20 parts by weight |
| Water | 360 parts by weight |
| Methanol | 120 parts by weight |
| Glutaraldehyde (crosslinking agent) | 1.0 part by weight |

-continued

Formulation of alignment layer coating solution:

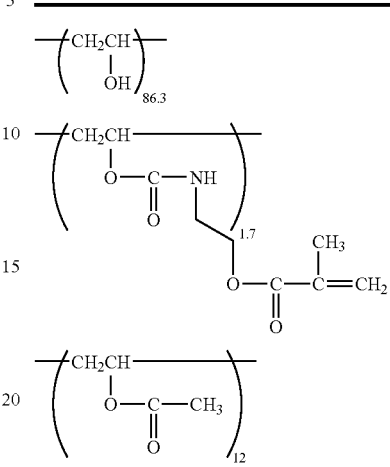

(Preparation of Optical Anisotropic Layer)

Using a #1.4 wire bar coater, a coating solution having the following formulation was spread over the alignment layer at a rate of 5.4 ml/m². The alignment layer was attached to a metal frame, and then heated in a 130° C. constant temperature tank for 2 minutes so that the liquid crystal compound was aligned. Subsequently, the alignment layer was irradiated with ultraviolet rays from a 120 W/cm high pressure mercury vapor lamp at 90° C. for 1 minute to cause the polymerization of the liquid crystal compound. Thereafter, the alignment layer was allowed to cool to room temperature.

| Formulation of optical anisotropic layer coating solution: | |
|---|---|
| Rod-shaped liquid crystal compound I-6 | 91 parts by weight |
| Melamine polymer (MP-5) | 1 part by weight |
| Ethylene oxide-modified trimethylol propane triacrylate (V#360, produced by OSAKA ORGANIC CHEMICAL INDUSTRY LTD.) | 9 parts by weight |
| Cellulose acetate butyrate (CAB531-1, produced by Eastman Kodak Co., Ltd.) | 1.5 part by weight |
| Photopolymerization initiator (Irgacure 907, produced by Ciba Specialty Chemicals Co., Ltd.) | 3 parts by weight |
| Sensitizer (Kayacure DETX, produced by Nippon Kayaku Corporation) | 1 part by weight |
| Methyl ethyl ketone | 214.2 parts by weight |

The optical anisotropic layer showed Re (480)/Re (546) of 1.64, Re (628)/Re (546) of 0.57, Rth (480)/Rth (546) of 1.5 and Rth (628)/Rth (546) of 0.6.

Example 7

<Preparation of Optical Compensation Sheet A-3>

(Preparation of Polarizing Plate Protective Film A-2)

[Preparation of Cellulose Acylate Solution]

The following compositions were charged in a mixing tank where they were then stirred to prepare a cellulose acylate solution.

| (Formulation of cellulose acylate solution) | |
|---|---|
| Cellulose acetate (CA-2) having acetylation degree of 2.7 | 100.0 parts by weight |
| Plasticizer: triphenyl phosphate | 6.0 parts by weight |
| Plasticizer: biphenyl phosphate | 3.0 parts by weight |
| Methylene chloride (first solvent) | 402.0 parts by weight |
| Methanol (second solvent) | 60.0 parts by weight |

(Preparation of Matting Agent Solution)

The following compositions were charged in a dispersing machine where they were then stirred to prepare a matting agent solution.

| (Formulation of matting agent solution) | |
|---|---|
| Particulate silica having average particle diameter of 20 nm "AEROSIL R972" (produced by Nippon Aerosil Co., Ltd.) | 2.0 parts by weight |
| Methylene chloride (first solvent) | 75.0 parts by weight |
| Methanol (second solvent) | 12.7 parts by weight |
| Cellulose acylate solution | 10.3 parts by weight |

(Preparation of Retardation Developing Agent Solution)

The following compositions were charged in a mixing tank where they were then heated with stirring to prepare a retardation developing agent solution.

| (Formulation of retardation developing agent solution) | |
|---|---|
| Retardation developing agent (B-7) | 10.0 parts by weight |
| Methylene chloride (first solvent) | 58.4 parts by weight |
| Methanol (second solvent) | 8.7 parts by weight |
| Cellulose acylate solution | 12.8 parts by weight |

94.3 parts by weight of the aforementioned cellulose acylate solution, 1.3 parts by weight of a matting agent solution and 4.4 parts by weight of a retardation developing agent solution were filtered, and then mixed. The mixture was then casted using a band casting machine. When the residual solvent content reached 33% by weight, the web thus obtained was peeled off the band. Using a tenter, the web was crosswise stretched at a rate of 15%/min up to a stretching ratio of 25% and a temperature of 140° C., and then kept at a temperature of 140° C. and a stretching ratio of 22% for 30 seconds. Thereafter, the clip was detached from the web. The web was then dried at a temperature of 140° C. for 40 minutes to produce a stretched cellulose acylate film (CAF2). The stretched cellulose acylate film thus produced had a residual solvent content of 0.2% by weight and a thickness of 94 µm. The stretched cellulose acylate film showed Re (480)/Re (546) of 1.03, Re (628)/Re (546) of 0.98, Rth (480)/Rth (546) of 0.99 and Rth (628)/Rth (546) of 1.01.

(Saponification of Stretched Cellulose Acylate Film)

Over the stretched cellulose acylate film (CAF2) thus prepared was spread a solution having the following formulation at a rate of 5.2 mL/m². The coated material was then dried at 60° C. for 10 minutes. The surface of the film was washed with flowing water for 10 seconds, and then blown with 25° C. air so that it was dried.

| (Formulation of saponifying solution) | |
|---|---|
| Isopropyl alcohol | 818 parts by weight |
| Water | 167 parts by weight |
| Propylene glycol | 187 parts by weight |
| "EMALEX", produced by NIHON EMULSION CO., LTD. | 10 parts by weight |
| Potassium hydroxide | 67 parts by weight |

(Formation of Alignment Layer)

Using a #14 wire bar coater, a coating solution having the following formulation was spread over one side of the stretched cellulose acylate film (CAF2) thus saponified at a rate of 24 ml/m². The coated material was dried with 60° C. hot air for 60 seconds and then with 90° C. hot air for 150 seconds.

Subsequently, the alignment layer thus formed was subjected to rubbing in the direction of 90° with respect to the stretching direction (substantially the same as slow axis) of the stretched cellulose acylate film (CAF2) thus saponified.

| Formulation of alignment layer coating solution: | |
|---|---|
| Modified polyvinyl alcohol | 20 parts by weight |
| Water | 360 parts by weight |
| Methanol | 120 parts by weight |
| Glutaraldehyde (crosslinking agent) | 1.0 parts by weight |

(Preparation of Optical Anisotropic Layer)

Using a #1.4 wire bar coater, a coating solution having the following formulation was spread over the alignment layer at a rate of 5.4 ml/m². The alignment layer was attached to a metal frame, and then heated in a 130° C. constant temperature tank for 2 minutes so that the liquid crystal compound was aligned. Subsequently, the alignment layer was irradiated with ultraviolet rays from a 120 W/cm high pressure mercury vapor lamp at 90° C. for 1 minute to cause the polymerization of the liquid crystal compound. Thereafter, the alignment layer was allowed to cool to room temperature.

| Formulation of optical anisotropic layer coating solution: | |
|---|---|
| Rod-shaped liquid crystal compound I-9 | 91 parts by weight |
| Melamine polymer (MP-5) | 2 parts by weight |
| Ethylene oxide-modified trimethylol propane triacrylate (V#360, produced by OSAKA ORGANIC CHEMICAL INDUSTRY LTD.) | 10 parts by weight |
| Cellulose acetate butyrate (CAB531-1, produced by Eastman Kodak Co., Ltd.) | 1.0 parts by weight |
| Photopolymerization initiator (Irgacure 907, produced by Ciba Specialty Chemicals Co., Ltd.) | 3 parts by weight |
| Sensitizer (Kayacure DETX, produced by Nippon Kayaku Corporation) | 1 part by weight |
| Methyl ethyl ketone | 214.2 parts by weight |

The optical anisotropic layer showed Re (480)/Re (546) of 1.4, Re (628)/Re (546) of 0.65, Rth (480)/Rth (546) of 1.3 and Rth (628)/Rth (546) of 0.7.

Example 8

<Preparation of Optical Compensation Sheet A-3>

(Preparation of Polarizing Plate Protective Film A-3)

([Preparation of Cellulose Acylate Solution]

The following compositions were charged in a mixing tank where they were then stirred to prepare a cellulose acylate solution.

| (Formulation of cellulose acylate solution) | |
|---|---|
| Cellulose acetate (CA-3) having acetylation degree of 2.47 | 100.0 parts by weight |
| Plasticizer: triphenyl phosphate | 6.0 parts by weight |
| Plasticizer: biphenyl phosphate | 3.0 parts by weight |
| Methylene chloride (first solvent) | 402.0 parts by weight |
| Methanol (second solvent) | 60.0 parts by weight |

(Preparation of Matting Agent Solution)

The following compositions were charged in a dispersing machine where they were then stirred to prepare a matting agent solution.

| (Formulation of matting agent solution) | |
|---|---|
| Particulate silica having average particle diameter of 20 nm "AEROSIL R972" (produced by Nippon Aerosil Co., Ltd.) | 2.0 parts by weight |
| Methylene chloride (first solvent) | 75.0 parts by weight |
| Methanol (second solvent) | 12.7 parts by weight |
| Cellulose acylate solution | 10.3 parts by weight |

94.3 parts by weight of the aforementioned cellulose acylate solution and 1.3 parts by weight of a matting agent solution were filtered, and then mixed. The mixture was then casted using a band casting machine. When the residual solvent content reached 40% by weight, the web thus obtained was peeled off the band. Using a tenter, the web was crosswise stretched at a rate of 100%/min up to a stretching ratio of 33% and a temperature of 145° C., and then kept at a temperature of 140° C. and a stretching ratio of 32% for 30 seconds. Thereafter, the clip was detached from the web. The web was then dried at a temperature of 140° C. for 40 minutes to produce a stretched cellulose acylate film (CAF3). The stretched cellulose acylate film thus produced had a residual solvent content of 0.2% by weight and a thickness of 98 μm. The stretched cellulose acylate film showed Re (480)/Re (546) of 0.97, Re (628)/Re (546) of 1.03, Rth (480)/Rth (546) of 0.95 and Rth (628)/Rth (546) of 1.03.

(Saponification of Stretched Cellulose Acylate Film)

The stretched cellulose acylate film (CAF3) thus prepared was dipped in a 1.3 mol/L aqueous solution of sodium hydroxide at 55° C. for 2 minutes, washed in a rinsing bath at room temperature, neutralized with a 0.05 mol/L sulfuric acid at 30° C., again washed in a rinsing bath at room temperature, and then dried with 100 C hot air. Thus, the stretched cellulose acylate film (CAF3) was saponified on the surface thereof.

(Formation of Alignment Layer)

Using a #14 wire bar coater, a coating solution having the following formulation was spread over one side of the stretched cellulose acylate film (CAF3) thus saponified at a rate of 24 ml/m². The coated material was dried with 60° C. hot air for 60 seconds and then with 90° C. hot air for 150 seconds.

Subsequently, the alignment layer thus formed was subjected to rubbing in the direction of 90° with respect to the stretching direction (substantially the same as slow axis) of the stretched cellulose acylate film (CAF3) thus saponified.

| Formulation of alignment layer coating solution: | |
|---|---|
| Modified polyvinyl alcohol used in Example 6 | 20 parts by weight |
| Water | 360 parts by weight |
| Methanol | 120 parts by weight |
| Glutaraldehyde (crosslinking agent) | 1.0 part by weight |

(Preparation of Optical Anisotropic Layer)

Using a #1.4 wire bar coater, a coating solution having the following formulation was spread over the alignment layer at a rate of 5.4 ml/m². The alignment layer was attached to a metal frame, and then heated in a 130° C. constant temperature tank for 2 minutes so that the liquid crystal compound was aligned. Subsequently, the alignment layer was irradiated with ultraviolet rays from a 120 W/cm high pressure mercury vapor lamp at 90° C. for 1 minute to cause the polymerization of the liquid crystal compound. Thereafter, the alignment layer was allowed to cool to room temperature.

| Formulation of optical anisotropic layer coating solution: | |
|---|---|
| Rod-shaped liquid crystal compound I-12 | 90 parts by weight |
| Melamine polymer (MP-5) | 2 parts by weight |
| Ethylene oxide-modified trimethylol propane triacrylate (V#360, produced by OSAKA ORGANIC CHEMICAL INDUSTRY LTD.) | 9 parts by weight |
| Cellulose acetate butyrate (CAB531-1, produced by Eastman Kodak Co., Ltd.) | 1.5 part by weight |
| Photopolymerization initiator (Irgacure 907, produced by Ciba Specialty Chemicals Co., Ltd.) | 3 parts by weight |
| Sensitizer (Kayacure DETX, produced by Nippon Kayaku Corporation) | 1 part by weight |
| Methyl ethyl ketone | 214.2 parts by weight |

The optical anisotropic layer showed Re (480)/Re (546) of 1.5, Re (628)/Re (546) of 0.52, Rth (480)/Rth (546) of 1.2 and Rth (628)/Rth (546) of 0.8.

Comparative Example 5

<Preparation of Optical Compensation Sheet B-1>

(Preparation of Cellulose Acylate Film B-1>

The following compositions were charged in a mixing tank where they were then stirred to prepare a cellulose acylate solution B.

| Formulation of cellulose acylate solution B: | |
|---|---|
| Cellulose acylate having acetylation degree of 1.6 and propionylation degree of 1.0 | 100.0 parts by weight |
| Triphenyl phosphate (plasticizer) | 8.0 parts by weight |
| Ethyl phthalyl ethyl glycolate (plasticizer) | 1.5 parts by weight |
| Methylene chloride (first solvent) | 348.0 parts by weight |
| Ethanol (second solvent) | 100.0 parts by weight |

<Preparation of Matting Agent Solution>

The following compositions were charged in a dispersing machine where they were then stirred to prepare a matting agent solution.

| Formulation of matting agent solution: | |
|---|---|
| Particulate silica having average particle diameter of 20 nm "AEROSIL R972" (produced by Nippon Aerosil Co., Ltd.) | 2.0 parts by weight |
| Methylene chloride (first solvent) | 75.0 parts by weight |
| Methanol (second solvent) | 12.7 parts by weight |
| Cellulose acylate solution B | 10.3 parts by weight |

<Preparation of Solution of Additive>

The following compositions were charged in a mixing tank where they were then heated with

| Formulation of ultraviolet absorber solution: | |
|---|---|
| Retardation developing agent (A) | 10.0 parts by weight |
| Retardation developing agent (B) | 10.0 parts by weight |
| Methylene chloride (first solvent) | 75.2 parts by weight |
| Ethanol (second solvent) | 11.2 parts by weight |

Retardation developing agent (A)

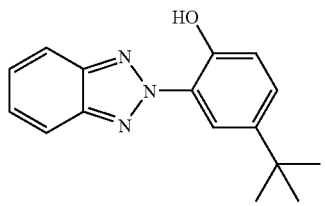

Retardation developing agent (B)

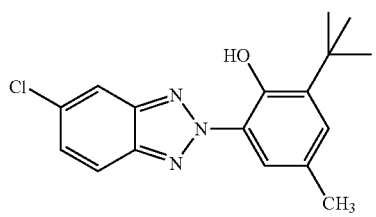

1.3 parts by weight of the aforementioned matting agent solution and 6.0 parts by weight of the aforementioned retardation developing agent solution were filtered, and then mixed by an in-line mixer. To the mixture were then added 92.7 parts by weight of the cellulose acylate solution B. The mixture was then stirred by the in-line mixer. The mixture was then casted using a band casting machine. When the residual solvent content reached 36% by weight, the web thus obtained was peeled off the band. Using a tenter, the web was crosswise stretched up to a stretching ratio of 40% and an atmosphere temperature of 130° C., and then kept at a temperature of 140° C. for 30 seconds. The residual solvent content at the start of stretching was 15% by weight. Thereafter, the clip was detached from the web. The web was then dried at a temperature of 130° C. for 40 minutes to produce a stretched cellulose acylate film. The stretched cellulose acylate film thus produced had a residual solvent content of 0.1% by weight and a thickness of 90 μm.

The stretched cellulose acylate film showed Re (480)/Re (546) of 1.15, Re (628)/Re (546) of 1.11, Rth (480)/Rth (546) of 1.15 and Rth (628)/Rth (546) of 1.09.

(Alkaline Treatment of Film)

The stretched cellulose acylate film B-1 was dipped in a 2.3 mol/L aqueous solution of sodium hydroxide at 55° C. for 3 minutes. The stretched cellulose acylate film B-1 was washed in a rinsing bath at room temperature, and then neutralized with a 0.05 mol/L sulfuric acid at 30° C. The stretched cellulose acylate film was again washed in a rinsing bath at room temperature, and then dried with 100° C. hot air. Thus, a comparative optical compensation sheet B-1 was prepared.

Comparative Example 6

<Preparation of Optical Compensation Sheet B-2>

(Preparation of Stretched Polymer Film 2)

A stretched polycarbonate film having a thickness of 80 μm was used as a support for the spread of the following liquid crystal layer.

(Preparation of Polymerizable-Liquid Crystal Coating Solution)

75 parts by weight of a liquid crystal material (A), 1 part by weight of Irgacure Irg 184 (produced by Ciba Specialty Chemicals Inc.) and 25 parts by weight of toluene were mixed. To the mixture were then added 10 parts by weight of a chiral agent (B) to prepare a polymerizable liquid crystal coating solution.

Liquid crystal material (A)

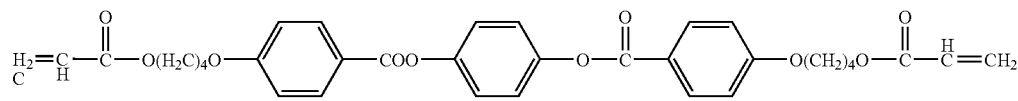

-continued

Chiral agent (B)

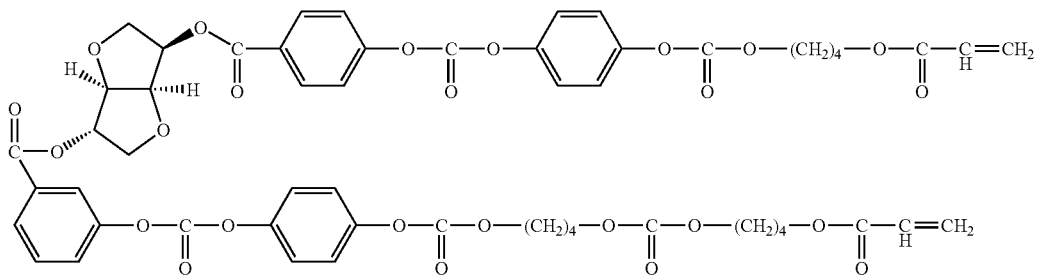

(Formation of Chiral Nematic (Cholesteric) Liquid Crystal Layer)

The aforementioned coating solution thus prepared was spread over the stretched polymer film 2 using a spin coating method. Subsequently, the film having the polymerizable liquid crystal coating solution spread thereon was heated to 110° C. over a hot plate for 6 minutes so that the residual solvent was removed to develop a twist-aligned liquid crystal structure.

Subsequently, the liquid crystal layer thus formed was irradiated with ultraviolet rays (20 mJ/cm$^2$; wavelength: 365 nm) to obtain a laminated structure of chiral nematic (cholesteric) liquid crystal layer having a thickness of 3.8 μm.

<Measurement of Retardation of Optical Compensation Sheet>

(Measurement of Optical Characteristics)

Using a Type KOBRA-21ADH automatic birefringence meter (produced by Ouji Scientific Instruments Co., Ltd.), the optical compensation sheets A-1 to A-3 and B-1 and B-2 were each measured for Re and Rth at 25° C. and 60% RH. The measuring was effected at a wavelength of 480 nm, 546 nm and 628 nm. The results are set forth in Table 5.

These optical compensation sheets were each washed in a rinsing bath at room temperature, and then dried with 100° C. hot air.

Example 10

<Preparation of Polarizing Plate>

(Saponification of Polarizing Plate Protective Film)

A commercially available cellulose acylate film (Fujitac TD80) was dipped in a 1.5 mol/L aqueous solution of sodium hydroxide at 55° C. for 1 minute. The cellulose acylate film was washed in a rinsing bath at room temperature, and then neutralized with a 0.05 mol/l sulfuric acid at 30° C. The cellulose acylate film was again washed in a rinsing bath at room temperature, and then dried with 100° C. hot air.

(Preparation of Polarizer)

A polyvinyl alcohol film having a polymerization degree of 1,700 and a thickness of 39 μm was swollen in a 30° C. hot water bath, and then stretched by a factor of about 4 in a 30° C. dye bath comprising an aqueous solution of iodine and

TABLE 5

| Optical compensation sheet | Re (nm) | | | | | Rth (nm) | | | | | Remarks |
|---|---|---|---|---|---|---|---|---|---|---|---|
| | 480 nm | 546 nm | 628 nm | 480 nm/ 546 nm | 628 nm/ 546 nm | 480 nm | 546 nm | 628 nm | 480 nm/ 546 nm | 628 nm/ 546 nm | |
| A-1 | 48 | 62 | 90 | 0.77 | 1.29 | 257 | 249 | 245 | 1.03 | 0.98 | Inventive |
| A-2 | 65 | 81 | 92 | 0.80 | 1.14 | 146 | 134 | 125 | 1.09 | 0.93 | Inventive |
| A-3 | 42 | 46 | 49 | 0.91 | 1.07 | 229 | 224 | 219 | 1.02 | 0.98 | Inventive |
| B-1 | 59 | 52 | 47 | 1.13 | 0.90 | 184 | 165 | 159 | 1.12 | 0.96 | Comparative |
| B-2 | 51 | 56 | 61 | 0.91 | 1.09 | 204 | 194 | 187 | 1.05 | 0.96 | Comparative |

Example 9

(Saponification of Optical Compensation Sheet)

The optical compensation sheets A-1 and A-2 were each dipped in a 2.3 mol/L aqueous solution of sodium hydroxide at 55° C. for 3 minutes. These optical compensation sheets were each washed in a rinsing bath at room temperature, and then neutralized with a 0.05 mol/L sulfuric acid at 30° C.

potassium iodide. Subsequently, the polyvinyl alcohol film was stretched and crosslinked in a 50° C. crosslinking bath comprising boric acid and potassium iodide in such a manner that the total stretching ratio reached 5.5 times. The polyvinyl alcohol film was dipped in a 35° C. aqueous solution of potassium iodide for 10 seconds to adjust the hue thereof. The polyvinyl alcohol film was rinsed, and then dried to obtain a polarizer having a thickness of 18 μm. The polarizer thus obtained had a water content of 14%. The polarizer also exhibited a birefringence (Δn) of 0.0482, a transmission of 43% and a percent polarization of 99.9% at a wavelength of 900 nm.

The birefringence was determined by dividing the phase difference (Δnd) determined at a wavelength of 900 nm using a parallel nicols rotation method by the thickness d (nm).

For the measurement of transmission, a Type DOT-3 spectrophotometer (produced by MURAKAMI COLOR RESEARCH LABORATORY CO., Ltd.) was used. Y value was obtained by subjecting the measurements to visibility correction by a 2 degree field of view (C light source) according to JIS Z8701.

For the determination of percent polarization, two sheets of polarizer which had been laminated in such an arrangement that the polarizing axis thereof are parallel to each other and two sheets of polarizer which had been laminated in such an arrangement that the polarizing axis thereof cross each other at right angles were measured for transmission (H0 and H90, respectively) according to the aforementioned transmission measuring method. The measurements were then subjected to calculation by the following equation. The measurements of parallel transmission (H0) and crossing transmission (H90) were subjected to visibility correction for Y value.

Polarization degree (%)={($H0-H90$)/($H0+H90$)}$^{1/2}$×100

(Preparation of Adhesive)

10 parts of a polyester-based urethane (Takelax XW-74-C154, produced by MITSUI TAKEDA CHEMICALS, INC.) and 1 part of an isocyanate-based crosslinking agent (Takenate WD-725, produced by MITSUI TAKEDA CHEMICALS, INC.) were dissolved in water to prepare a solution having a solid content adjusted to 20%. This solution was then used as an adhesive.

(Preparation of Polarizing Plate A-1)

The aforementioned adhesive solution was spread over the both sides of the polarizer. The optical compensation sheet A-1 saponified in Example 9 and Fujitac TD80 which had been saponified as mentioned above were stuck to the respective side of the polarizer in such an arrangement that the polarizer was interposed therebetween. The laminate was then heated to 40° C. in an oven for 72 hours so that the adhesive was dried and cured to prepare a polarizing plate A-1. The optical compensation sheet A-1 was stuck to the polarizer in such an arrangement that the optical anisotropic layer was disposed on the air side. The polarizing plate thus obtained exhibited a transmission of 41% and a percent polarization of 99.9%.

(Preparation of Polarizing Plate A-2)

The aforementioned adhesive solution was spread over the both sides of the polarizer. The optical compensation sheet A-2 saponified in Example 9 and Fujitac TD80 which had been saponified as mentioned above were stuck to the respective side of the polarizer in such an arrangement that the polarizer was interposed therebetween. The laminate was then heated to 40° C. in an oven for 72 hours so that the adhesive was dried and cured to prepare a polarizing plate A-2. The optical compensation sheet A-2 was stuck to the polarizer in such an arrangement that the optical anisotropic layer was disposed on the air side. The polarizing plate thus obtained exhibited a transmission of 42% and a percent polarization of 99.9%.

(Preparation of Polarizing Plate A-3)

The aforementioned adhesive solution was spread over the both sides of the polarizer. The optical compensation sheet A-3 saponified in Example 8 and Fujitac TD80 which had been saponified as mentioned above were stuck to the respective side of the polarizer in such an arrangement that the polarizer was interposed therebetween. The laminate was then heated to 40° C. in an oven for 72 hours so that the adhesive was dried and cured to prepare a polarizing plate A-3. The optical compensation sheet A-3 was stuck to the polarizer in such an arrangement that the optical anisotropic layer was disposed on the air side. The polarizing plate thus obtained exhibited a transmission of 42% and a percent polarization of 99.9%.

(Preparation of Polarizing Plate B-1)

Comparative Example 7

The aforementioned adhesive solution was spread over the both sides of the polarizer. The optical compensation sheet B-1 saponified in Comparative Example 6 and Fujitac TD80 which had been saponified as mentioned above were stuck to the respective side of the polarizer in such an arrangement that the polarizer was interposed therebetween. The laminate was then heated to 40° C. in an oven for 72 hours so that the adhesive was dried and cured to prepare a polarizing plate B-1. The polarizing plate thus obtained exhibited a transmission of 41% and a percent polarization of 99.9%.

Comparative Example 8

(Surface Treatment of Optical Compensation Sheet B-2)

The optical compensation sheet (B-2) was subjected to corona discharge on the polycarbonate film side thereof at 12 W·min/m$^2$ using a corona discharger produced by Kasuga Electric Works Ltd.

(Preparation of Polarizing Plate B-2)

In the same manner as in Example 10, the optical compensation sheet B-2 and Fujitac TD80 which had been saponified as mentioned above were stuck to the polarizer in such an arrangement that the polarizer was interposed therebetween, and then dried and cured at 40° C. in an over for 72 hours to prepare a polarizing plate B-2. The optical compensation sheet B-2 was stuck to the polarizer in such an arrangement that it comes in contact with the polarizer on the polycarbonate side thereof. The polarizing plate thus obtained exhibited a transmission of 40% and a percent polarization of 99.4%.

Example 11

(Durability Test on Polarizing Plate)

The polarizing plates (A-2) and (B-2) prepared in Example 10 and Comparative Example 8, respectively, were each cut into a specimen having a size of 20 cm×20 cm which was then aged at 60° C. and 90% RH for 500 hours and observed for adhesion between the polarizer and the protective film. As a result, the inventive polarizing plate (A-2) was observed to have a good adhesion while the comparative polarizing plate (B-2) was observed to show exfoliation at the polarizer-polycarbonate interface at the four corners of the square.

It was made obvious that the polarizing plates (A-1) to (A-3), which comprise the inventive optical compensation sheet, exhibit good polarizing properties and an excellent durability under high temperature and humidity conditions as compared with the polarizing plate (B-2), which comprises the comparative optical compensation sheet.

Example 12

A liquid crystal display of FIG. 3 was prepared. In some detail, an upper polarizing plate, a VA mode liquid crystal cell (upper substrate, liquid crystal layer, lower substrate) and a lower polarizing plate (optical compensation sheet, polarizer, protective film) were laminated in this order as viewed from the observer (from above). A backlight source was then disposed. In the following examples, as the upper polarizing plate there was used a commercially available polarizing plate (HLC2-5618) and as the lower polarizing plate there was used an inventive polarizing plate.

<Preparation of Liquid Crystal Cell>

A liquid crystal cell was prepared by injecting a liquid crystal material having a negative dielectric anisotropy ("MLC6608", produced by Melc Co., Ltd.) into the cell gap (3.8 μm) between the substrates and then sealing the cell gap to form a liquid crystal layer between the substrates. The retardation of the liquid crystal layer (i.e., product $\Delta n \cdot d$ of the thickness d (μm) of the liquid crystal layer and the dielectric anisotropy $\Delta n$ of the liquid crystal layer) was predetermined to be 300 nm. The liquid crystal material was vertically aligned.

A commercially available super high contrast product (HLC2-5618, produced by SANRITZ CORPORATION) was stuck to the upper polarizing plate of the aforementioned liquid crystal display comprising a vertically-aligned liquid crystal cell (FIG. 3) with an adhesive and the polarizing plate (A-1) prepared in Example 10 was stuck to the lower polarizing plate of the liquid crystal display with an adhesive in such an arrangement that the optical compensation sheet (A-1) was disposed on the liquid crystal side thereof to prepare a liquid crystal display (A-1). The liquid crystal display was arranged in crossed Nicols such that the transmission axis of the polarizing plate on the observer side extends vertically while the transmission axis of the polarizing plate on the back light side extends horizontally.

Comparative Example 9

The polarizing plates (B-1) and (B-2) were also used to prepare liquid crystal displays (B-1) and (B-2), respectively, in the same manner as in Example 7.

<Evaluation of Tint Change>

The liquid crystal displays (A-1) and (B-1) prepared in Example 10 and Comparative Example 9, respectively, were each then measured for change of tint between direction angle of 0° and direction angle of 80° at an extreme angle of 60° using Ezcontrast (produced by ELDI Inc.). From the measurements were then determined absolute tint change values $\Delta x$, $\Delta y$ on xy chromaticity diagram. The results are set forth in Table 6 below.

TABLE 6

| Sample No. | $\Delta x$ | $\Delta y$ | Remarks |
|---|---|---|---|
| Liquid crystal display A-1 | 0.05 | 0.04 | Inventive |
| Liquid crystal display B-1 | 0.17 | 0.21 | Comparative |

As can be seen in the results of Table 6, the polarizing plate comprising an inventive optical compensation sheet shows little tint change to advantage even after prolonged lighting of the liquid crystal display in which it is incorporated.

(Evaluation of Reliability of Liquid Crystal Display)

The liquid crystal displays (A-1) and (B-2) thus prepared were each continuously lighted for 1,000 hours at 35° C. and 80% RH. As a result, the liquid crystal display (A-1) showed a uniform and good image while the liquid crystal display (B-1) showed light leakage at the four corners of the screen.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-51750 and JP2005-82765, filed February 25 and Mar. 22, 2005, respectively, the contents of which are incorporated herein by reference.

The invention claimed is:

1. An optical compensation sheet comprising: a stretched polymer film: and an optical anisotropic layer containing a liquid crystal compound, wherein the optical compensation sheet has retardations satisfying relationships (A) to (F):

$30 \text{ nm} < Re(546) < 150 \text{ nm}$ (A)

$100 \text{ nm} < Rth(546) < 400 \text{ nm}$ (B)

$0.5 < Re(480)/Re(546) < 1$ (C)

$1.0 < Re(628)/Re(546) < 2.0$ (D)

$1.0 < Rth(480)/Rth(546) < 1.5$ (E)

$0.7 < Rth(628)/Rth(546) < 1.0$ (F)

wherein Re ($\lambda$) is a retardation (nm) in a plane of the optical compensation sheet at a wavelength of $\lambda$ nm; and Rth ($\lambda$) is a retardation (nm) in a direction perpendicular to the plane of the optical compensation sheet at a wavelength of $\lambda$ nm.

2. The optical compensation sheet according to claim 1, wherein the stretched polymer film has a slow axis at a right angle to a slow axis of the optical anisotropic layer.

3. The optical compensation sheet according to claim 1, wherein the stretched polymer film has retardations satisfying relationships (G) to (J):

$0.95 < Re(480)/Re(546) < 1.05$ (G)

$0.95 < Re(628)/Re(546) < 1.05$ (H)

$0.95 < Rth(480)/Rth(546) < 1.05$ (I)

$0.95 < Rth(628)/Rth(546) < 1.05$ (J)

wherein Re ($\lambda$) is the retardation (nm) in a plane of the stretched polymer film at a wavelength of $\lambda$ nm; and Rth ($\lambda$) is the retardation (nm) in a direction perpendicular to the plane of the stretched polymer film at a wavelength of $\lambda$ nm.

4. The optical compensation sheet according to claim 1, wherein the optical anisotropic layer has retardations satisfying relationships (K) to (N):

$1.0 < Re(480)/Re(546) < 2.0$ (K)

$0.5 < Re(628)/Re(546) < 1.0$ (L)

$$1.0 < Rth(480)/Rth(546) < 2.0 \quad (M)$$

$$0.5 < Rth(628)/Rth(546) < 1.0 \quad (N)$$

wherein Re (λ) is a retardation (nm) in a plane of the optical anisotropic layer at a wavelength of λ nm; and Rth (λ) is a retardation (nm) in a direction perpendicular to the plane of the optical anisotropic layer at a wavelength of λ nm.

5. The optical compensation sheet according to claim 1, wherein the stretched polymer film has a photoelastic modulus of $5 \times 10^{-13}$ cm$^2$/dyn ($5 \times 10^{-8}$ cm$^2$/N) or less.

6. The optical compensation sheet according to claim 1, wherein the stretched polymer film is a cycloolefin polymer film.

7. An optical compensation sheet comprising: a stretched cellulose acylate film: and an optical anisotropic layer containing a liquid crystal compound, wherein the optical compensation sheet has retardations satisfying relationships (A'), (B'), (C), (D), (E') and (F'):

$$20\ nm < Re(546) < 150\ nm \quad (A')$$

$$50\ nm < Rth(546) < 400\ nm \quad (B')$$

$$0.5 < Re(480)/Re(546) < 1 \quad (C)$$

$$1.0 < Re(628)/Re(546) < 2.0 \quad (D)$$

$$1.0 < Rth(480)/Rth(546) < 2.0 \quad (E')$$

$$0.5 < Rth(628)/Rth(546) < 1.0 \quad (F')$$

wherein Re (λ) is a retardation (nm) in a plane of the optical compensation sheet at a wavelength of λ nm; and Rth (λ) is a retardation (nm) in a direction perpendicular to the plane of the optical compensation sheet at a wavelength of λ nm.

8. The optical compensation sheet according to claim 7, wherein the stretched cellulose acylate film has a slow axis at a right angle to a slow axis of the optical anisotropic layer.

9. The optical compensation sheet according to claim 7, wherein the stretched cellulose acylate film has retardations satisfying relationships (G') to (J'):

$$0.90 < Re(480)/Re(546) < 1.10 \quad (G')$$

$$0.90 < Re(628)/Re(546) < 1.10 \quad (H')$$

$$0.90 < Rth(480)/Rth(546) < 1.10 \quad (I')$$

$$0.90 < Rth(628)/Rth(546) < 1.10 \quad (J')$$

wherein Re (λ) is a retardation (nm) in a plane of the stretched cellulose acylate film at a wavelength of λ nm; and Rth (λ) is a retardation (nm) in a direction perpendicular to the plane of the stretched cellulose acylate film at a wavelength of λ nm.

10. The optical compensation sheet according to claim 7, wherein the optical anisotropic layer has retardations satisfying relationships (K') to (N'):

$$1.0 < Re(480)/Re(546) < 4.0 \quad (K')$$

$$0.1 < Re(628)/Re(546) < 1.0 \quad (L')$$

$$1.0 < Rth(480)/Rth(546) < 4.0 \quad (M')$$

$$0.1 < Rth(628)/Rth(546) < 1.0 \quad (N')$$

wherein Re (λ) is a retardation (nm) in a plane of the optical anisotropic layer at a wavelength of λ nm; and Rth (λ) is a retardation (nm) in a direction perpendicular to the plane of the optical anisotropic layer at a wavelength of λ nm.

11. The optical compensation sheet according to claim 7, wherein the stretched cellulose acylate film contains a cellulose acylate having a substitution degree of 2.00 to 2.90.

12. The optical compensation sheet according to claim 7, wherein the stretched cellulose acylate film is stretched in a wide direction thereof at a factor of 1% to 200%.

13. The optical compensation sheet according to claim 7, wherein the stretched cellulose acylate film contains a retardation developing agent having a molar absorptivity of 1,000 or less at a wavelength of 360 nm to 700 nm.

14. The optical compensation sheet according to claim 13, wherein the retardation developing agent is represented by formula (11):

$$R^{13}O \underset{R^4}{\overset{R^2}{-}}\underset{R^5}{\overset{OR^{11}}{-}} \overset{O}{\underset{}{-}} L^1 -(Ar^1 - L^2)_n - Ar^2$$

wherein $R^2$, $R^4$ and $R^5$ each independently represent a hydrogen atom or substituent; $R^{11}$ and $R^{13}$ each independently represent a hydrogen atom or alkyl group; $L^1$ and $L^2$ each independently represent a single bond or divalent group; $Ar^1$ represents an arylene group or aromatic heterocyclic group; $Ar^2$ represents an aryl group or aromatic heterocyclic group; n represents an integer of 3 or more; and $L^2$'s and $Ar^1$'s present in a number of n are the same or different, with the proviso that $R^{11}$ and $R^{13}$ are different from each other and the alkyl group represented by $R^{13}$ is free of hetero atom.

15. A polarizing plate comprising: a polarizer; and two protective films, the polarizer being between the two protective films, wherein at least one of the two protective films is an optical compensation sheet according to claim 1.

16. A liquid crystal display comprising: a liquid crystal cell; and two polarizing plates, the liquid crystal cell being between the two polarizing plates, wherein at least one of the two polarizing plates is a polarizing plate according to claim 15.

17. The liquid crystal display according to claim 16, wherein the liquid crystal cell is of VA mode.

\* \* \* \* \*